(12) United States Patent
Aman et al.

(10) Patent No.: US 9,094,615 B2
(45) Date of Patent: Jul. 28, 2015

(54) AUTOMATIC EVENT VIDEOING, TRACKING AND CONTENT GENERATION

(75) Inventors: James A. Aman, Telford, PA (US); Paul Michael Bennett, Harleysville, PA (US)

(73) Assignee: INTHEPLAY, INC., Lansdale, PA (US)

( * ) Notice: Subject to any disclaimer, the term of this patent is extended or adjusted under 35 U.S.C. 154(b) by 2120 days.

(21) Appl. No.: 11/578,710

(22) PCT Filed: Apr. 18, 2005

(86) PCT No.: PCT/US2005/013132
§ 371 (c)(1),
(2), (4) Date: Jun. 12, 2007

(87) PCT Pub. No.: WO2005/099423
PCT Pub. Date: Oct. 27, 2005

(65) Prior Publication Data
US 2007/0279494 A1   Dec. 6, 2007

Related U.S. Application Data

(63) Continuation-in-part of application No. 10/006,444, filed on Nov. 20, 2001, now Pat. No. 7,483,049.

(60) Provisional application No. 60/536,091, filed on Apr. 16, 2004.

(51) Int. Cl.
*H04N 7/18* (2006.01)
*H04N 7/173* (2011.01)
(Continued)

(52) U.S. Cl.
CPC .............. *H04N 5/262* (2013.01); *G01S 3/7864* (2013.01); *G06K 9/00711* (2013.01);
(Continued)

(58) Field of Classification Search
USPC ........................................................ 348/157
See application file for complete search history.

(56) References Cited

U.S. PATENT DOCUMENTS 5,293,354 A    3/1994  Costabile
5,714,997 A *  2/1998  Anderson ....................... 348/39
(Continued)

FOREIGN PATENT DOCUMENTS

EP         0 947 096       10/1999
GB         2339504      *   1/2000
WO         WO 00/73858      12/2000

OTHER PUBLICATIONS

International Search Report dated Jun. 23, 2006.
(Continued)

*Primary Examiner* — Angela Nguyen
(74) *Attorney, Agent, or Firm* — Stradley Ronon Stevens & Young, LLP

(57) ABSTRACT

An automatics system 100 that uses one to three grids 20*cm* of overhead cameras 20*c* to first video an event area 2. Overall bandwidth is greatly reduced by intelligent hubs 26 that extract foreground blocks 10*m* based upon initial and continuously updated background images 2*r*. The hubs also analyze current images 10*c* to constantly locate, classify and track in 3D the limited number of expected foreground objects 10. As objects 10 of interest are tracked, the system automatically directs ptz perspective view cameras 40*c* to follow the activities. These asynchronous cameras 40*c* limit their images to defined repeatable pt angles and zoom depths. Pre-captured venue backgrounds 2*r* at each repeatable ptz setting facilitate perspective foreground extraction. The moving background, such as spectators 13, is removed with various techniques including stereoscopic side cameras 40*c-b* and 40*c-c* flanking each perspective camera 40*c*. The tracking data 101 derived from the overhead view 102 establishes event performance measurement and analysis data 701. The analysis results in statistics and descriptive performance tokens 702 translatable via speech synthesis into audible descriptions of the event activities corresponding to overhead 102 and perspective video 202.

110 Claims, 56 Drawing Sheets

(51) Int. Cl.
   *H04N 5/262*   (2006.01)
   *G01S 3/786*   (2006.01)
   *G06K 9/00*    (2006.01)
   *G06K 9/20*    (2006.01)
   *G06Q 30/02*   (2012.01)
   *G06T 7/20*    (2006.01)
   *G06T 19/00*   (2011.01)
   *H04N 5/232*   (2006.01)
   *H04N 5/235*   (2006.01)
   *H04N 5/247*   (2006.01)
   *H04N 5/268*   (2006.01)
   *H04N 5/272*   (2006.01)
   *H04N 5/278*   (2006.01)
   *H04N 5/33*    (2006.01)

(52) U.S. Cl.
   CPC .............. *G06K 9/209* (2013.01); *G06Q 30/02* (2013.01); *G06T 7/2053* (2013.01); *G06T 7/2066* (2013.01); *G06T 7/2093* (2013.01); *G06T 19/00* (2013.01); *G06T 19/006* (2013.01); *H04N 5/232* (2013.01); *H04N 5/2357* (2013.01); *H04N 5/23238* (2013.01); *H04N 5/247* (2013.01); *H04N 5/268* (2013.01); *H04N 5/2627* (2013.01); *H04N 5/272* (2013.01); *H04N 5/278* (2013.01); *H04N 5/332* (2013.01); *G06K 2009/2045* (2013.01); *G06T 2207/10016* (2013.01); *G06T 2207/30221* (2013.01); *G06T 2207/30241* (2013.01)

(56) References Cited

U.S. PATENT DOCUMENTS

| | | | |
|---|---|---|---|
| 5,745,126 | A | 4/1998 | Jain |
| 6,359,647 | B1 | 3/2002 | Sengupta et al. |
| 6,446,261 | B1 * | 9/2002 | Rosser .................. 725/34 |
| 6,707,487 | B1 | 3/2004 | Aman et al. |
| 7,793,205 | B2 * | 9/2010 | Errico et al. ............ 715/201 |
| 2003/0033318 | A1 * | 2/2003 | Carlbom et al. ......... 707/102 |
| 2003/0033602 | A1 * | 2/2003 | Gibbs et al. ............. 725/46 |
| 2004/0194129 | A1 | 9/2004 | Carlbom et al. |

OTHER PUBLICATIONS

European Search Report dated Jul. 9, 2009.

\* cited by examiner

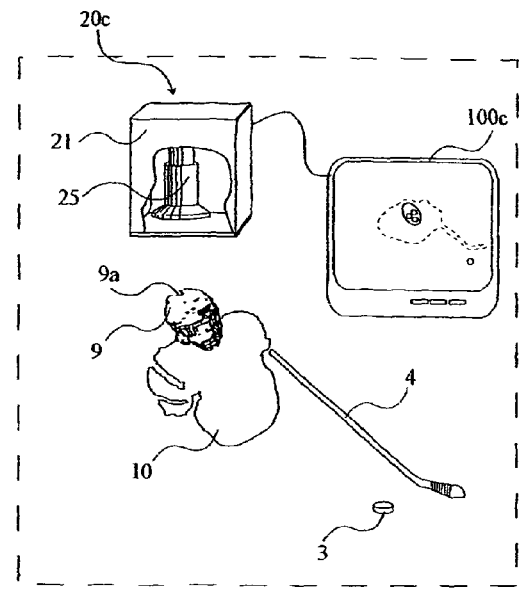
*Fig. 4a*
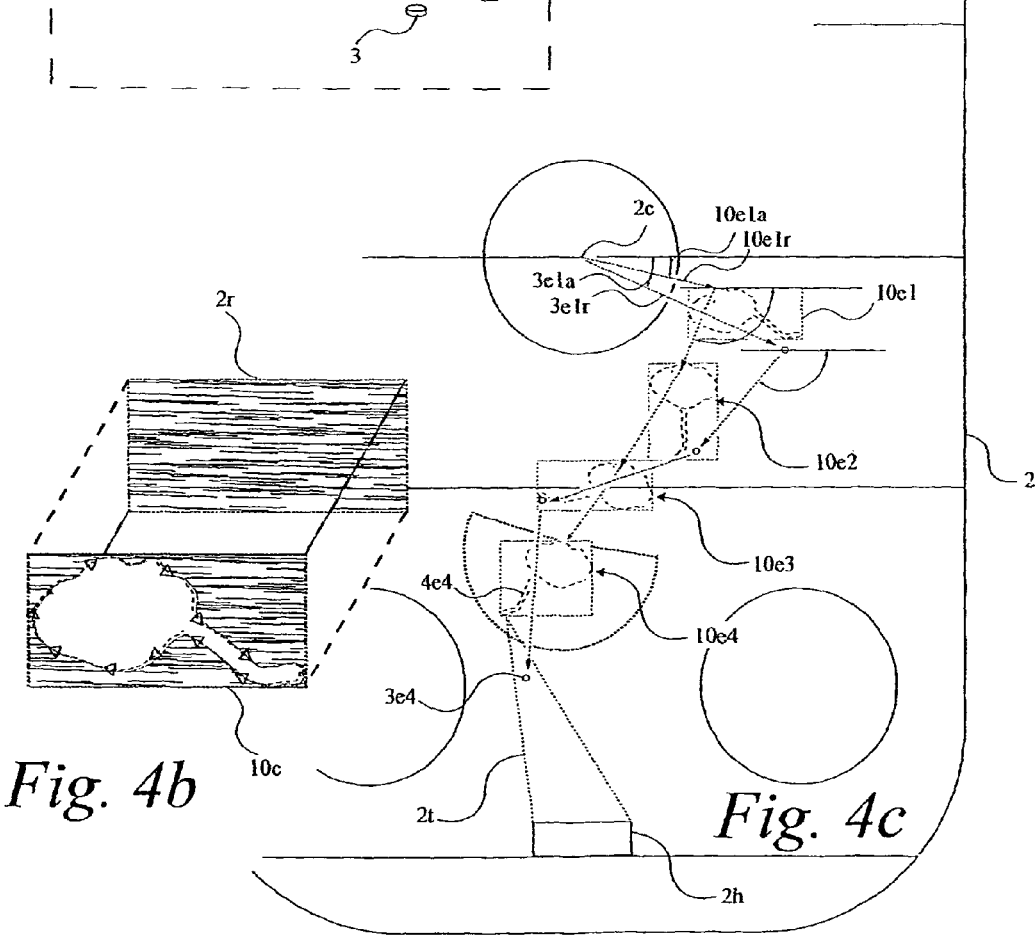
*Fig. 4b*
*Fig. 4c*

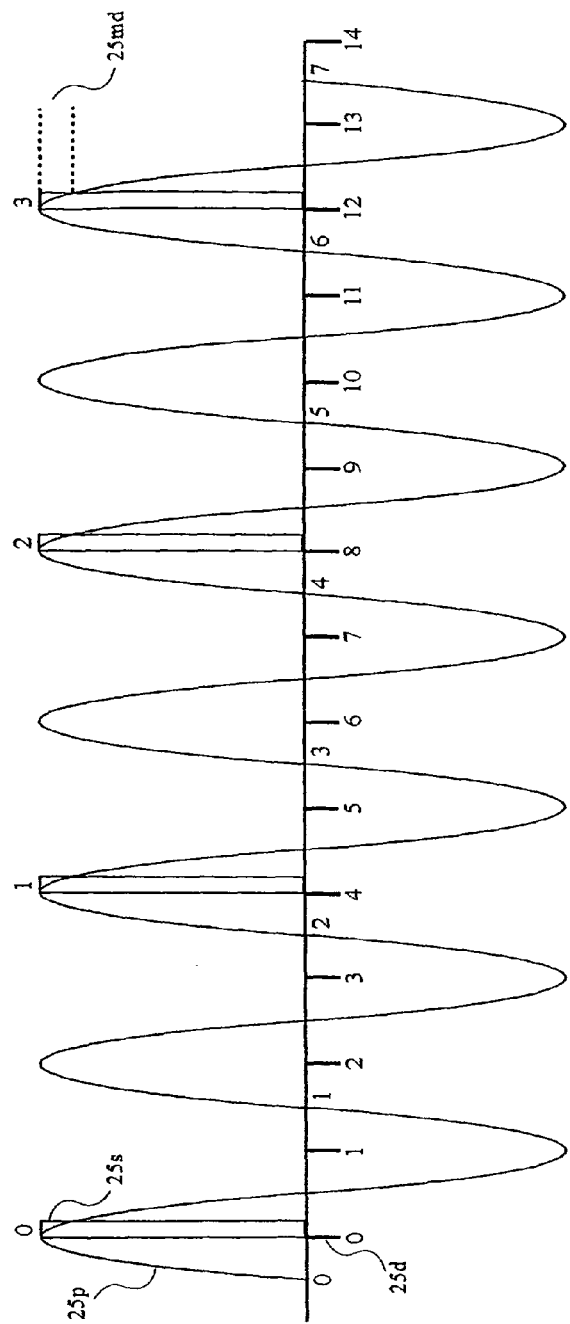
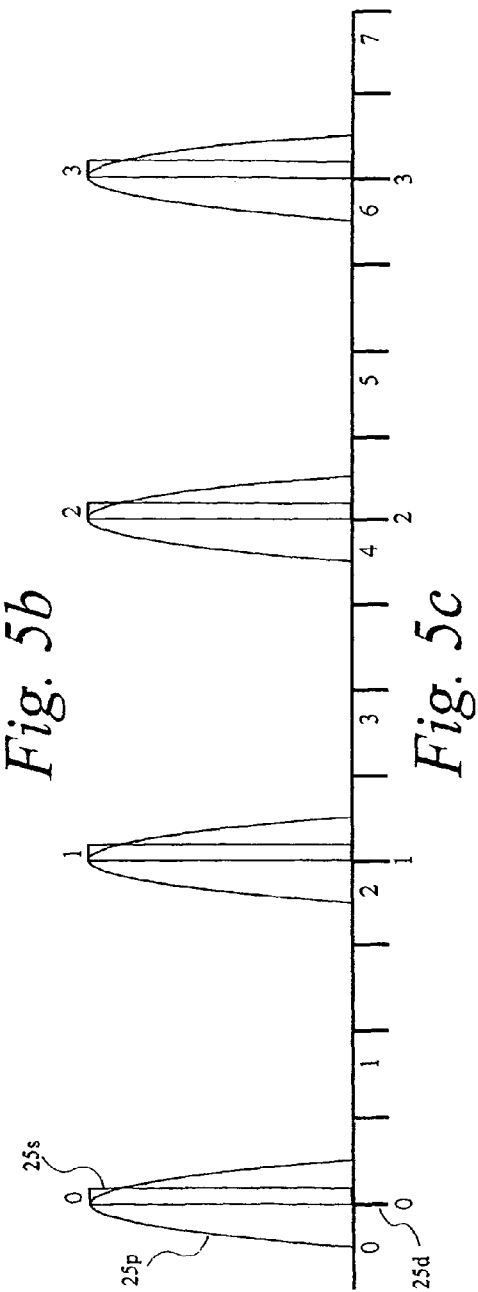

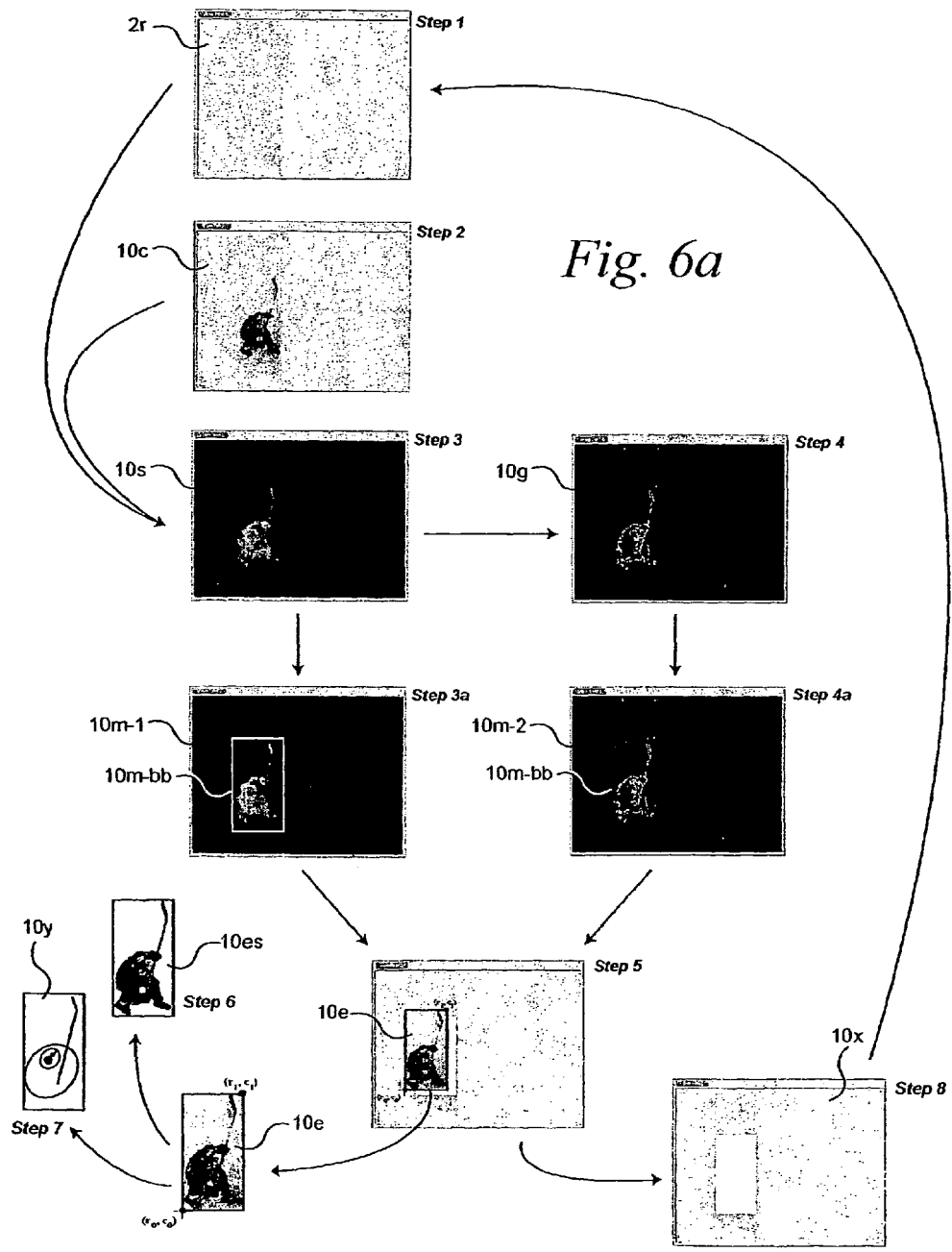

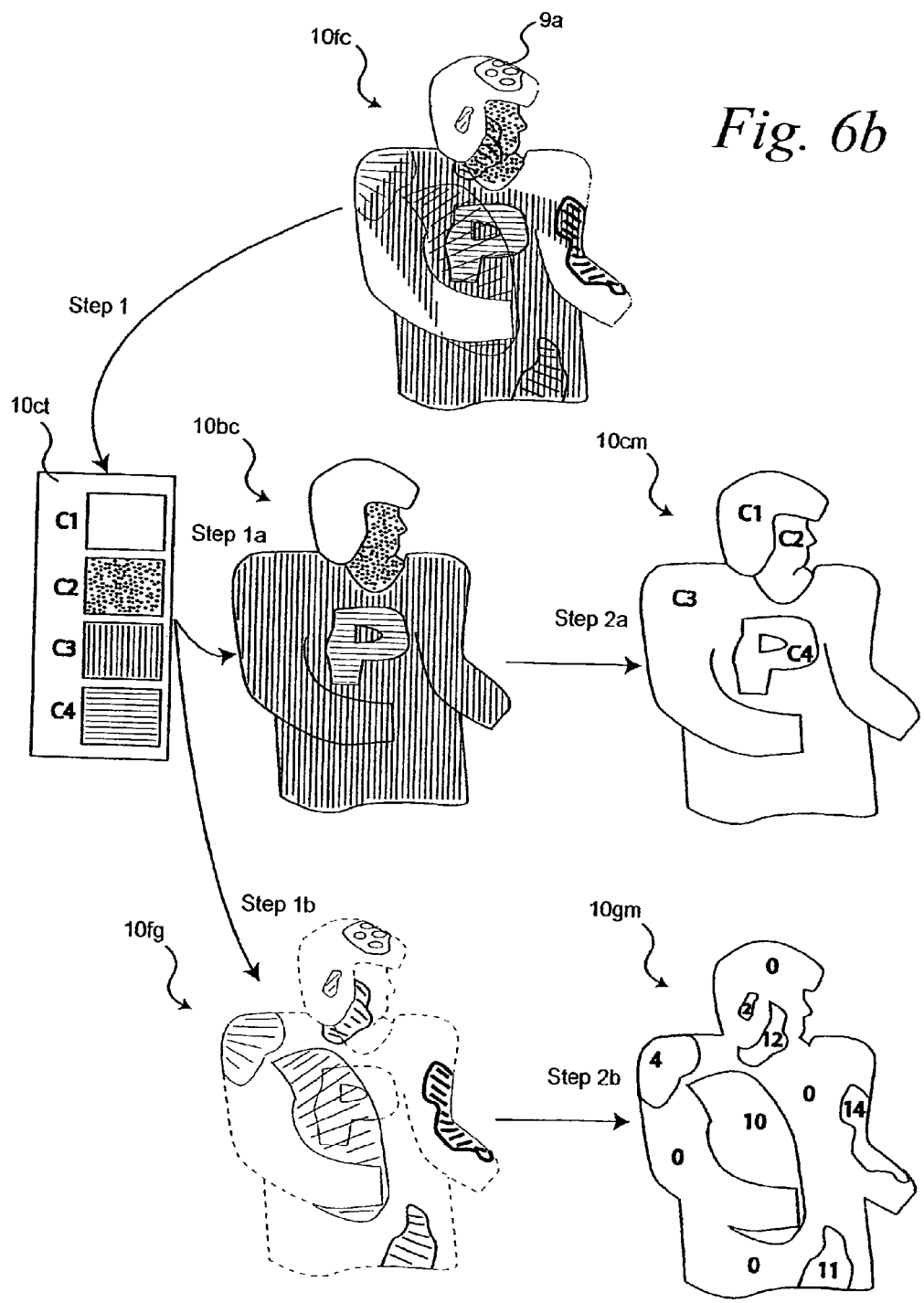

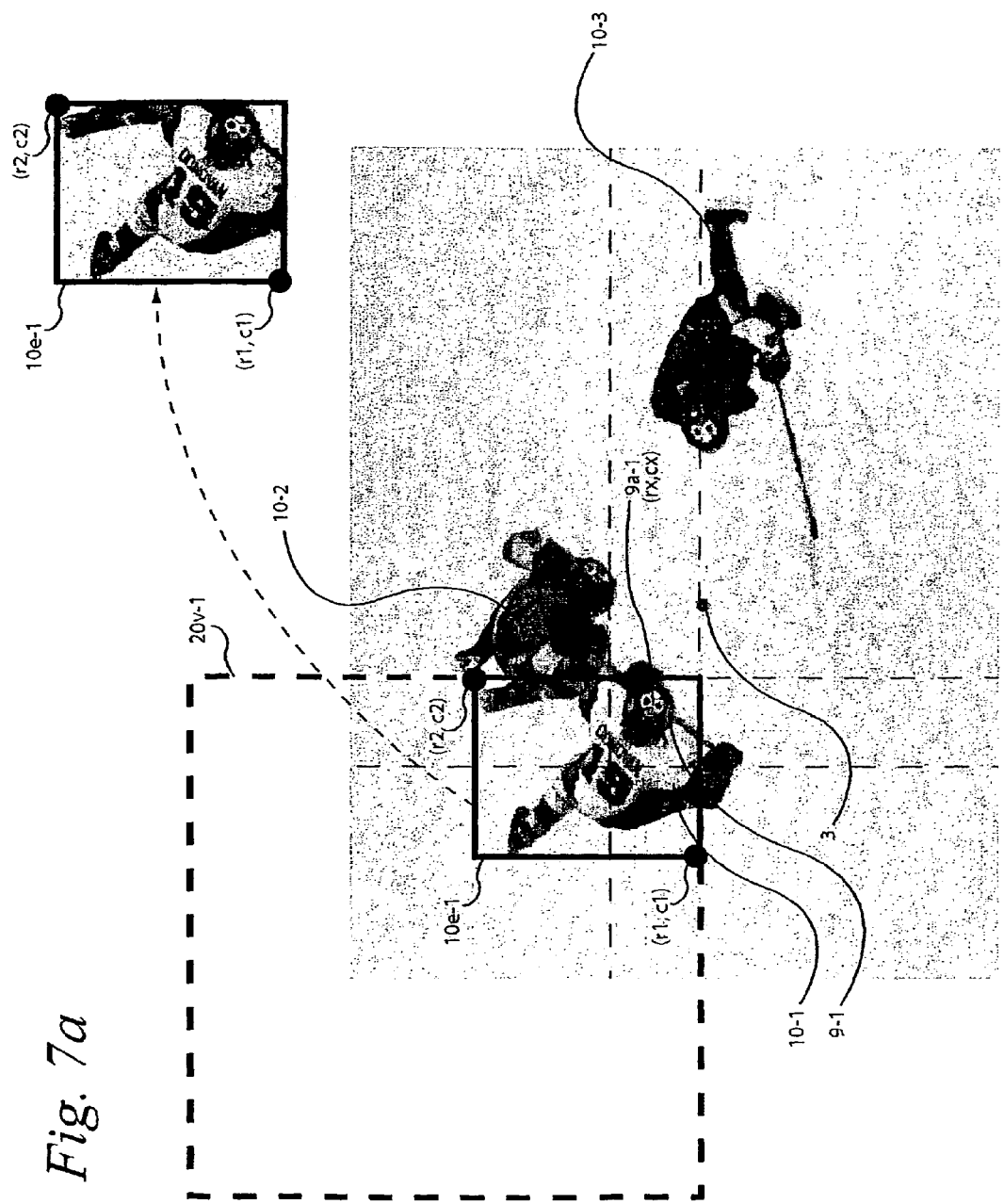

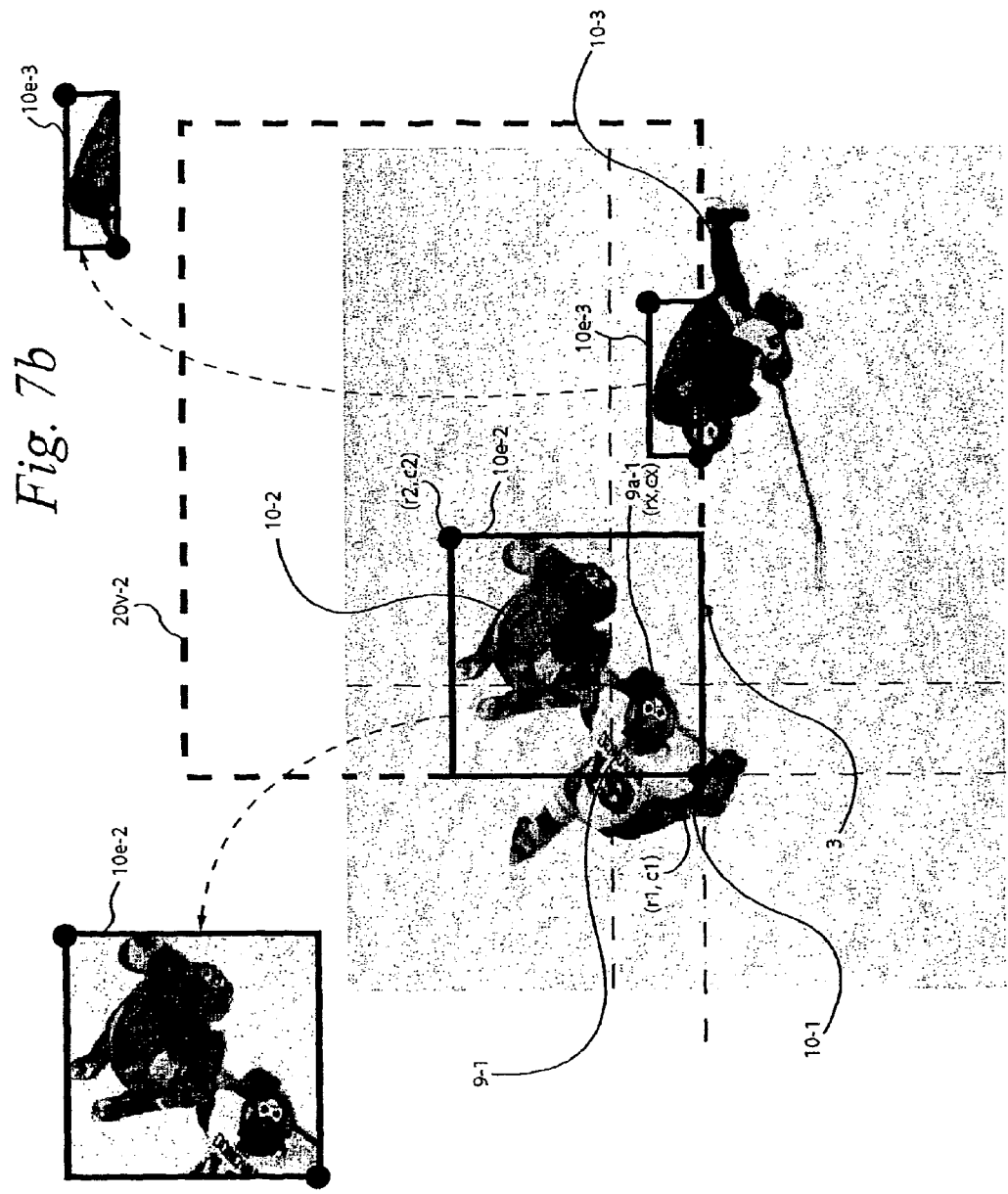

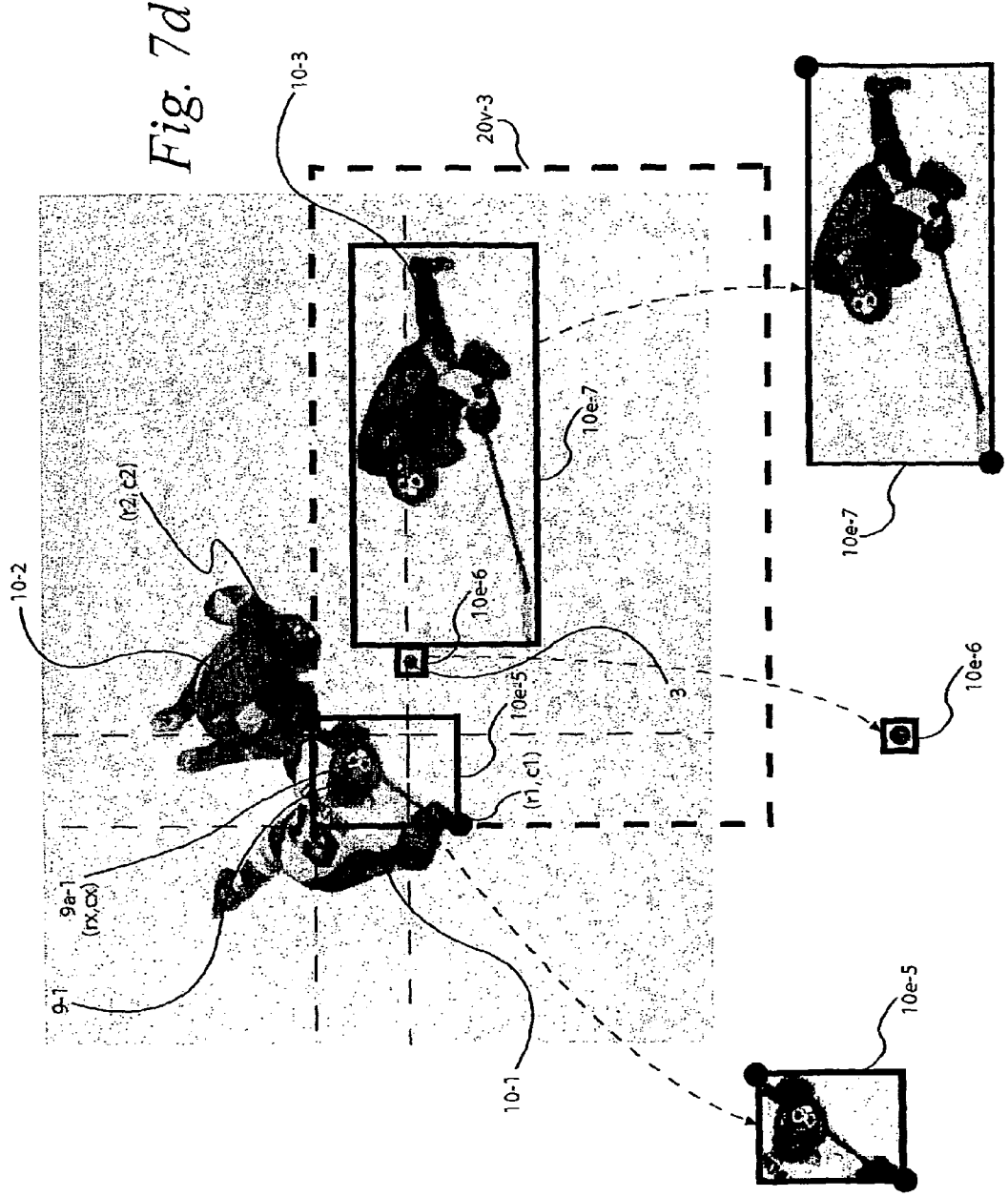

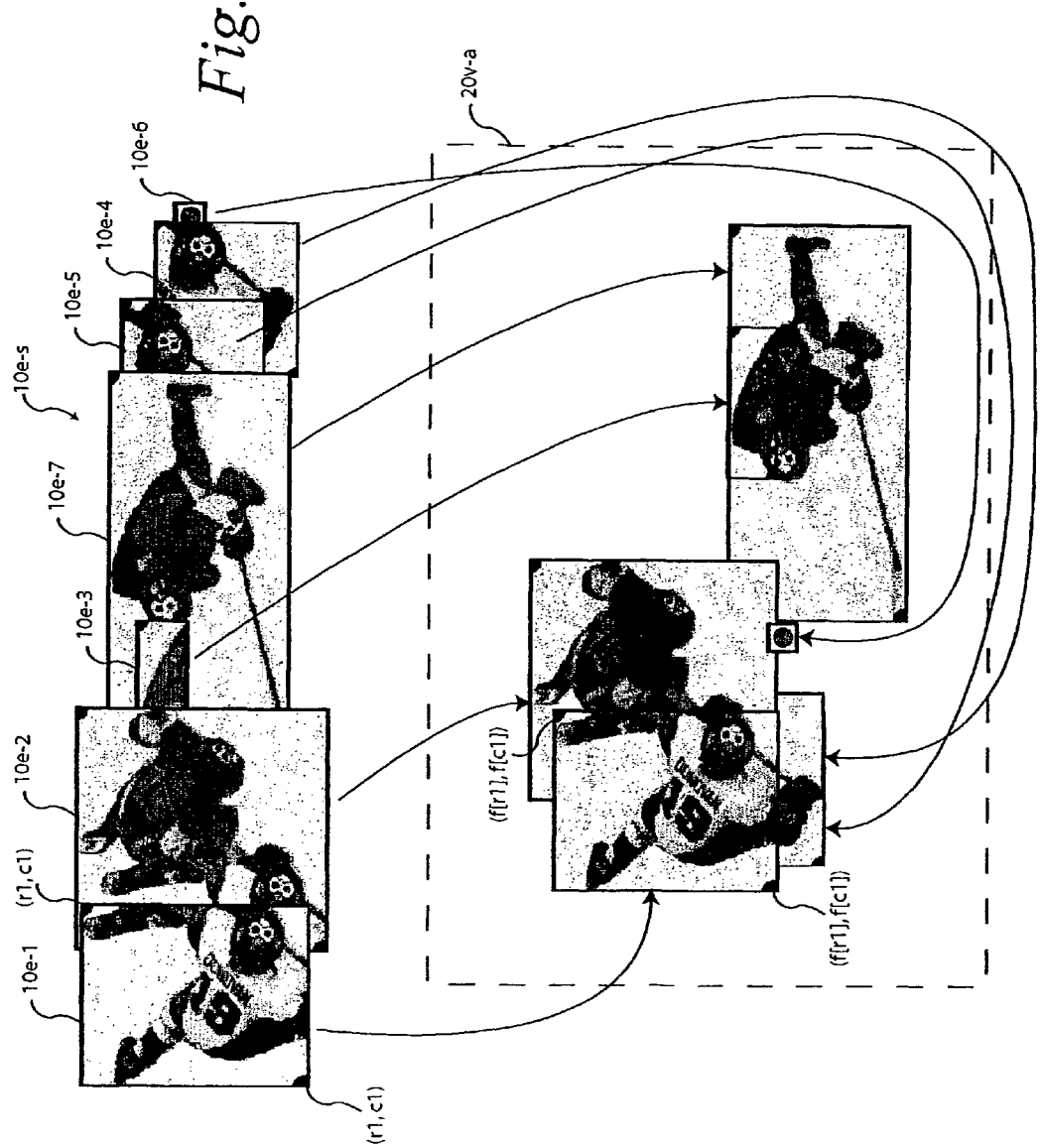

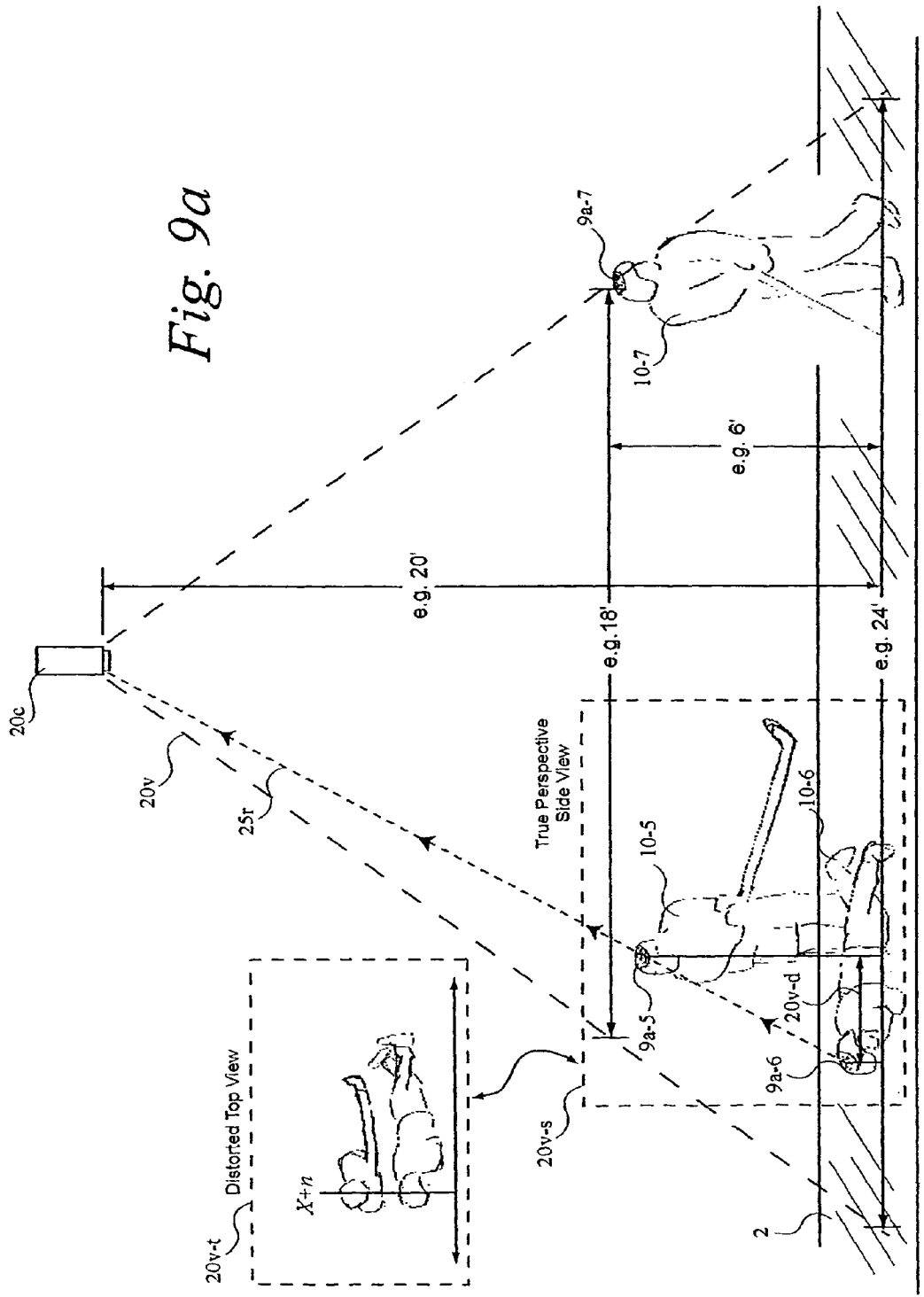

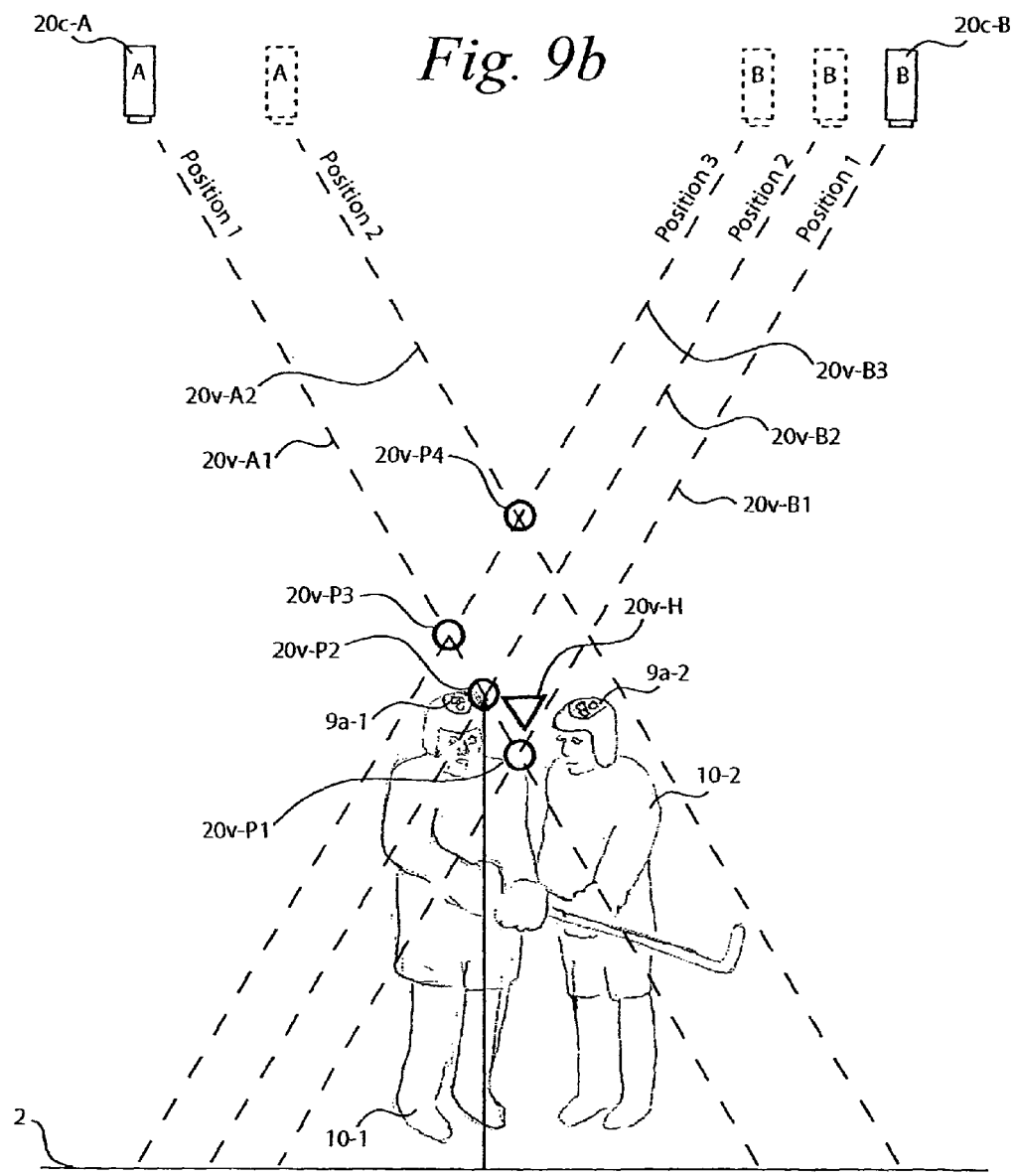

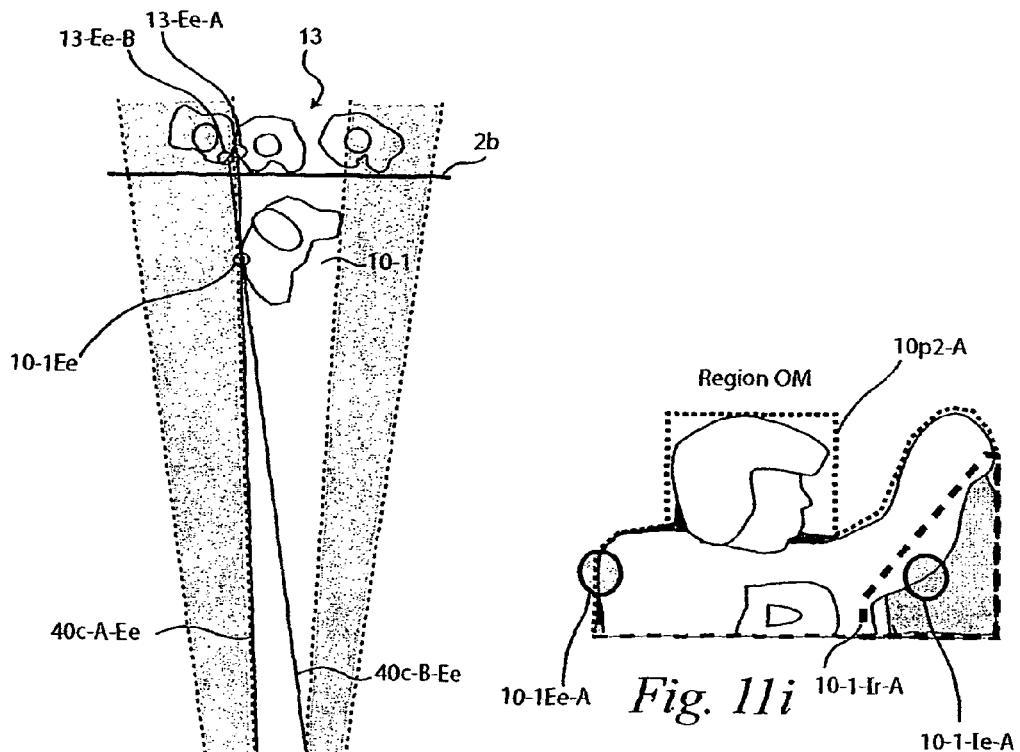
*Fig. 11g*
*Fig. 11i*
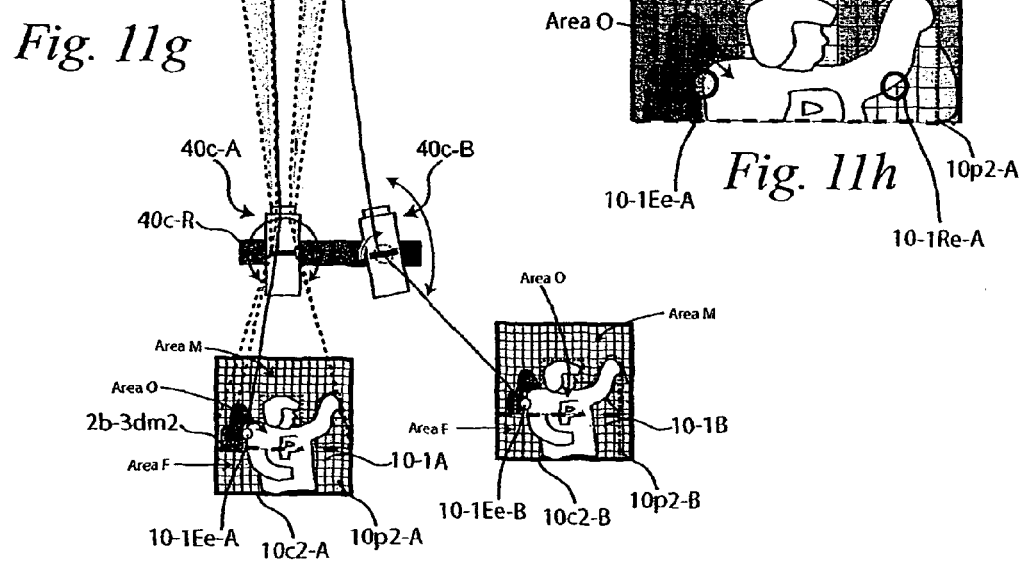
*Fig. 11h*

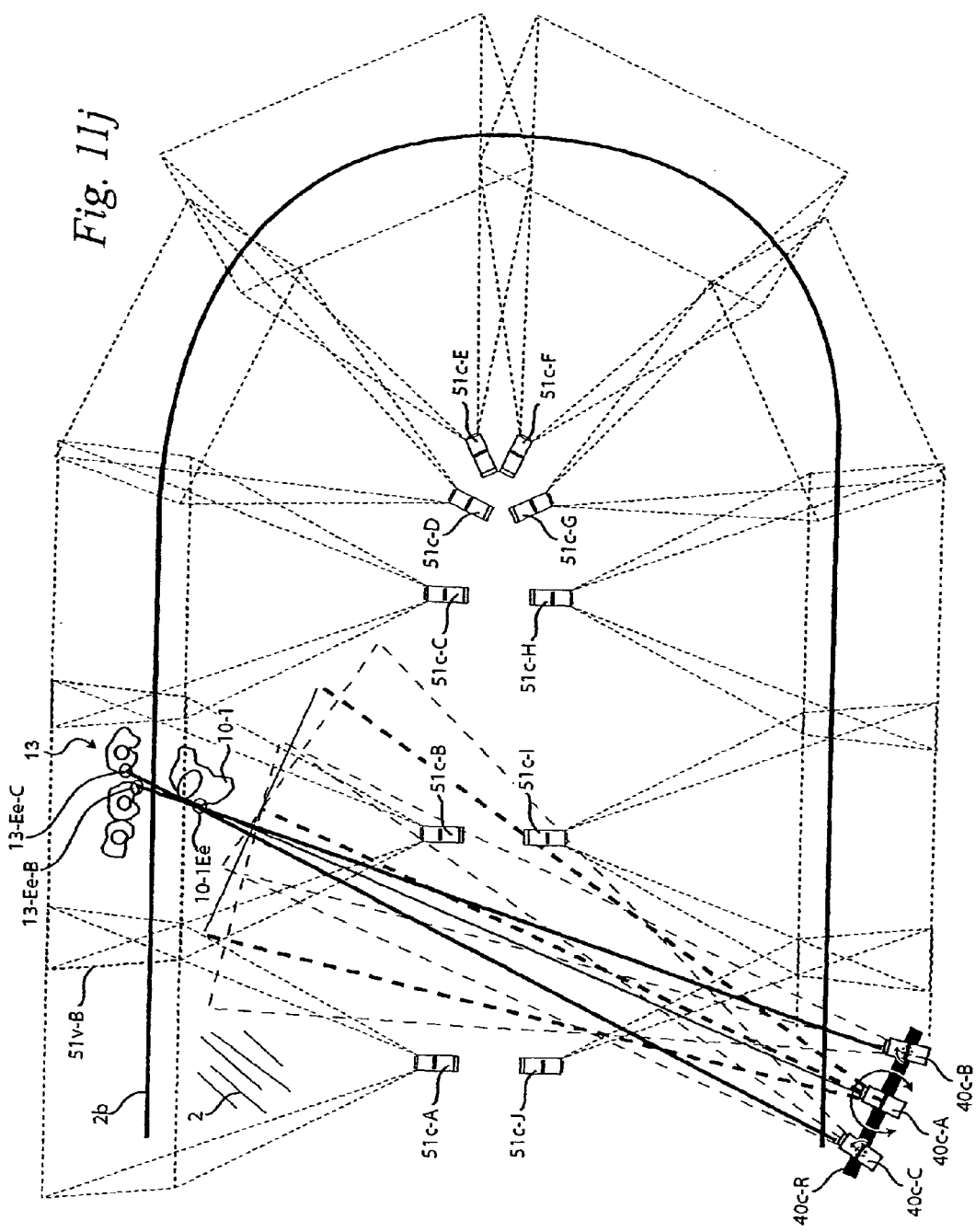

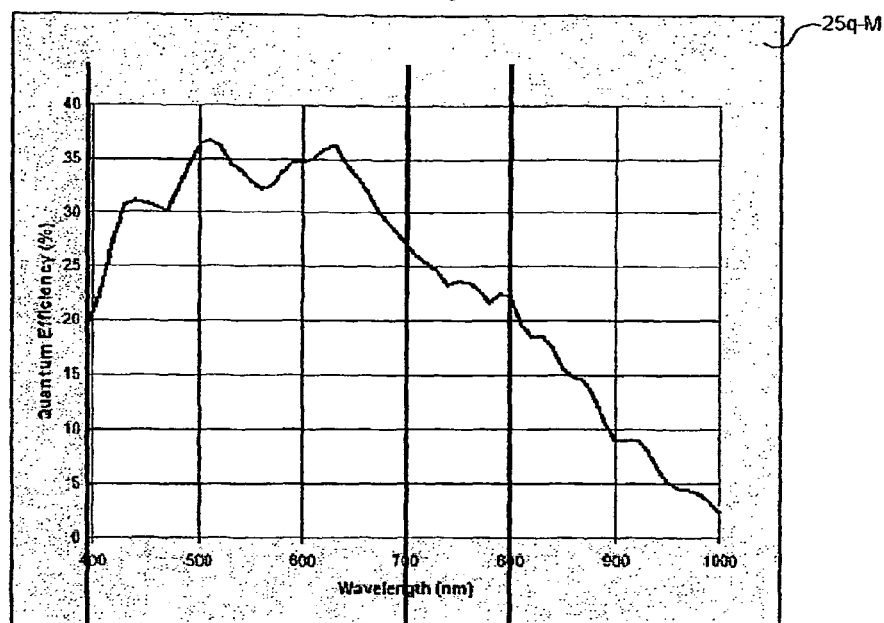
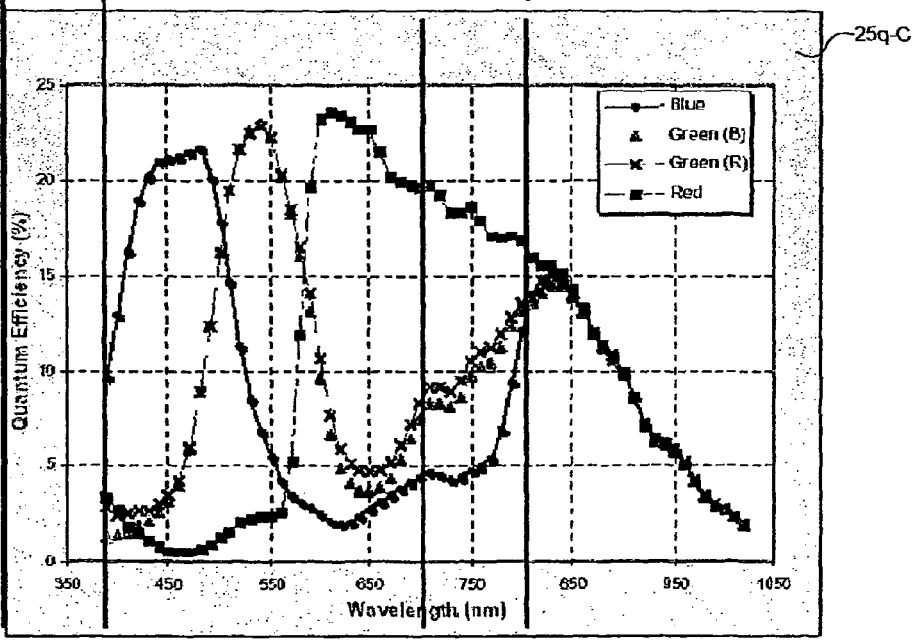
Fig. 15

Fig. 17
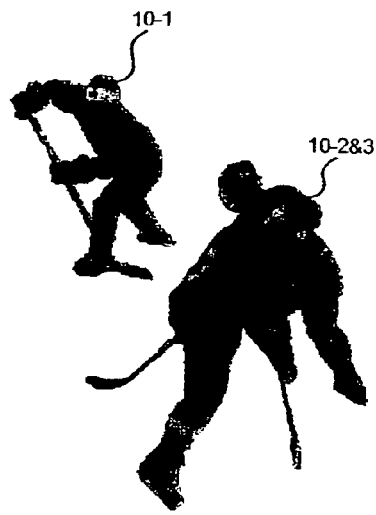
Step 1:
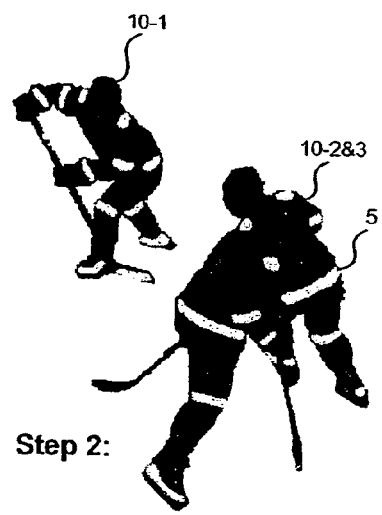
Step 2:
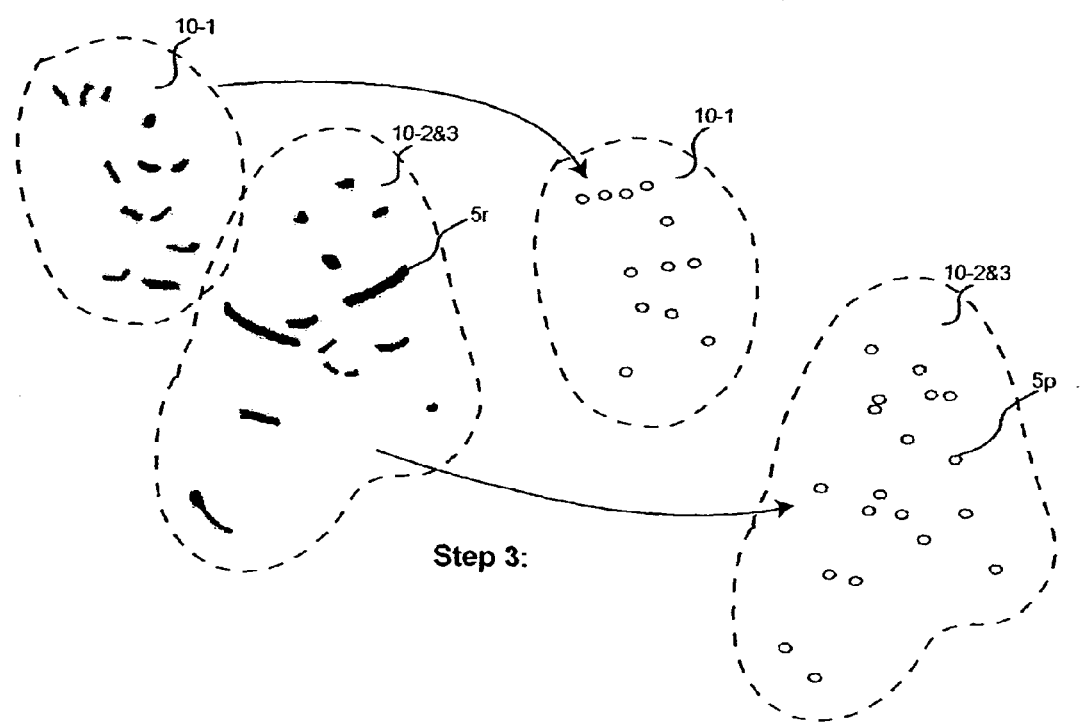
Step 3:

AUTOMATIC EVENT VIDEOING, TRACKING AND CONTENT GENERATION

This application claims the benefit of U.S. Provisional Application No. 60/563,091 filed on 16 Apr. 2004, the contents of which are incorporated herein by reference.

TECHNICAL FIELD

The present invention relates to automatic systems for videoing an event, tracking its participants and subsequently creating multi-media content and broadcasts.

BACKGROUND ART

The present invention is a continuation in part of U.S. patent application Ser. No. 10/006,444, filed on Nov. 20, 2001 entitled "Optimizations for Live Event, Real-Time, 3-D Object Tracking" and issued as U.S. Pat. No. 7,483,049.

Furthermore, the present invention incorporates by reference and claims the benefit of priority of the U.S. Provisional Application 60/563,091, filed on Apr. 14, 2004, entitled Automatic Sports Broadcasting System, with the same named inventors.

By today's standards, a multi-media sporting event broadcast that might typically be viewed through a television includes at least the following information:
- video of the game, preferably spliced together from multiple views;
- replay's of key events;
- audio of the game;
- graphic overlays of key statistics such as the score and other basic game metrics;
- ongoing "play-by-play" audio commentary;
- graphic overlays providing game analysis and summaries, and
- advertisements inserted as clips during game breaks or as graphic overlays during play.

Furthermore, after or while this information is collected, generated and assembled, it must also be encoded for transmission to one or more remote viewing devices such as a television or computer; typically in real-time. Once received on the remote viewing device, it must also be decoded and therefore returned to a stream of visual and auditory output for the viewer.

Any manual, semi-automatic or automatic system designed to create this type of multi-media: broadcast, must at least be able to:
- track official game start/stop times, calls and scoring;
- track participant and game object movement;
- collect game video and audio;
- analyze participant and game object movement;
- create game statistics and commentary based upon the game analysis;
- insert advertisements as separate video/audio clips or graphic overlays;
- encode and decode a broadcast of the streams of video, audio, and game metric information;

The present inventors are not aware of any fully automatic systems for creating sports broadcasts. There are many drawbacks to the current largely manual systems and methodologies some of which are identified as follows:
- the cost of creating such broadcasts are significant both in terms of equipment and labor and therefore excludes smaller markets such as amateur and youth sports;
- for practical reasons such as equipment and labor costs, the number of filming cameras is limited,
- the typical broadcaster relies upon manually operated filming cameras to anticipate and follow the game action, but in practice it is difficult to consistently capture the more important and interesting events from the most desirable angles;
- there is currently no practical means of creating a complete overhead view of the ongoing game that can be best used for game analysis and explanation;
- current videoing technology is synchronized to the broadcast standards, such as NTSC, which regulate the frequency of image capture to be 29.97 frames per second which is consequently out-of-sync with typical indoor high-wattage lighting systems that fluctuate at intervals of 120 times per second, thus causing inconsistent lighting conditions per individual image frame;
- current filming technology is all based in visible light and does not take advantage of potential information collection that is possible in the non-visible spectrums;
- while some current systems can follow the game object, such as a puck, they cannot also automatically identify and track all participants, determining their locations and orientation throughout the entire contest;
  - while some systems can automatically film the game centered around the detected location of the game object, they cannot additionally anticipate action based upon the knowledge of tracked participants or direct other cameras to follow these tracked participants;
- current systems cannot automatically track key spectators such as coaches, family members and other VIP so as to automatically film them during or after key game action;
- game analysis, especially for more dynamic and fast moving sports such as ice hockey, can require hundreds to thousands of ongoing observations which are extremely difficult for manual systems to accurately record, let alone interpret in real-time;
- there are currently no systems capable of creating a flow of tokens to describe game action that can be used to automatically direct synthesized and pre-recorded speech adding commentary to the ongoing game;
- while inserting advertisements as clips into the ongoing game feed is relatively straightforward, adding overlaid graphics to the game action video is more problematic and requires greater forms of automation;
- current practice typically does not automate the interface between the official game start and stop times in order to help automatically regulate the broadcast stream of live action, replays, commentary video and advertisements;
- current practice typically does not automate the interface between the official scorekeeper in order to help automatically determine official game scoring, penalties and other rulings;
- current systems have no way of delineating game events based upon tracked participants and information collected from an interface with the official scoring and ruling system;
- current broadcasts are primarily designed to be output through a television and are therefore limited especially to the tv's display and computational shortcomings as well as its smaller broadcast bandwidths that constrain the total amount of presentable information;
- while targeted for television output, broadcasts are not designed to take advantage of current computer technology that is now able to generate realistic graphic renderings of both the human form and surrounding environments in real-time;

current broadcasts are not interactive thereby allowing the viewer to dynamically select between multiple video feeds to be viewed either singularly or in combination;

current encoding techniques do not take advantage of newer video and audio compression technologies or possibilities therefore wasting bandwidth that could be used to either provide additional information or to conserve broadcaster capacity;

Traditionally, professional broadcasters have relied upon a team of individuals working on various aspects of this list of tasks. For instance, a crew of cameramen would be responsible for filming a game from various angles using fixed and/or roving cameras. These cameras may also collect audio from the playing area and/or crew members would use fixed and/or roving microphones. Broadcasters would typically employ professional commentators to watch the game and provide both play-by-play descriptions and ongoing opinions and analysis. These commentators have access to the game scoreboard and can both see and hear the officials and referees as they oversee the game. They are also typically supported by statisticians who create meaningful game analysis summaries and are therefore able to provide both official and unofficial game statistics as audio commentary. Alternatively, this same information may be presented as graphic overlays onto the video stream with or without audible comment. All of this collected and generated information is then presented simultaneously to a production crew that selects the specific camera views and auditory streams to meld into a single presentation. This production crew has access to official game start and stop times and uses this information to control the flow of inserted advertisements and game action replays. The equipment used by the production team automatically encodes the broadcast into a universally accepted form which is than transmitted, or broadcast, to any and all potential viewing devices. The typical device is already built to accept the broadcaster's encoded stream and to decode this into a set of video and audio signals that can be presented to the viewers through appropriate devices such as a television and/or multi-media equipment.

Currently, there are no fully, or even semi-automatic systems for creating a video and/or audio broadcast of a sporting event. The first major problem that must be solved in order to create such a system is:

How Does an Automated System Become "Aware" of the Game Activities?

Any fully automated broadcast system would have to be predicated on the ability of a tracking system to continuously follow and record the location and orientation of all participants, such as players and game officials, as well as the game object, such as a puck, basketball or football. The present inventors taught a solution for this requirement in their first application entitled "Multiple Object Tracking System." Additional novel teachings were disclosed in their continuing application entitled "Optimizations for Live Event, Real-Time, 3-D Object Tracking." Both of these applications specified the use of cameras to collect video images of game activities followed by image analysis directed towards efficiently determining the location and orientation of participants and game objects. Important techniques were taught including the idea of gathering overall object movement from a grid of fixed overhead cameras that would then automatically direct any number of calibrated perspective tracking and filming cameras.

Other tracking systems exist in the market such as those provided by Motion Analysis Corporation. Their system, however, is based on fixed cameras placed at perspective filming angles thereby creating a filled volume of space in which the movements of participants could be adequately detected from two or more angles at all times. This approach has several drawbacks including the difficult nature of uniformly scaling the system in order to encompass the different sizes and shapes of playing areas. Furthermore, the fixed view of the perspective cameras is overly susceptible to occlusions as two or more participants fill the same viewing space. The present inventors prefer first determining location and orientation based upon the overhead view which is almost always un-blocked regardless of the number of participants. While the overhead cameras cannot sufficiently view the entire body, the location and orientation information derived from their images is ideal for automatically directing a multiplicity of calibrated perspective cameras to minimize player occlusions and maximize body views. The Motion Analysis system also relied upon visible, physically intrusive markings including the placement of forty or more retroreflective spheres attached to key body joints and locations. It was neither designed nor intended to be used in a live sporting environment. A further drawback to using this system for automatic sports broadcasting is its filtering of captured images for the purposes of optimizing tracking marker recognition. Hence, the resulting image is insufficient for broadcasting and therefore a complete second set of cameras would be required to collect the game film.

Similarly, companies such as Trakus, Inc. proposed solutions for tracking key body points, (in the case of ice hockey a player's helmet,) and did not simultaneously collect meaningful game film. The Trakus system is based upon the use of electronic beacons that emit pulsed signals that are then collected by various receivers placed around the tracking area. Unlike the Motion Analysis solution, the Trakus system could be employed in live events but only determines participant location and not orientation. Furthermore, their system does not collect game film, either from the overhead or perspective views.

Another beacon approach was also employed in Honey et. al.'s U.S. Pat. No. 5,912,700 assigned to Fox Sports Productions, Inc. Honey teaches the inclusion of infrared emitters in the game object to be tracked, in their example a hockey puck. A series of two or more infrared receives detects the emissions from the puck and passes the signals to a tracking system that first triangulates the puck's location and second automatically directs a filming camera to follow the puck's movement.

It is conceivable that both the Trakus and Fox Sports systems could be combined forming a single system that could continuously determine the location of all participants and the game object. Furthermore, building upon techniques taught in the Honey patent, the combined system could be made to automatically film the game from one or more perspective views. However, this combined system would have several drawbacks. First, this system can only determine the location of each participant and not their orientation that is critical for game analysis and automated commentary. Second, the beacon based system is expensive to implement in that it requires both specially constructed (and therefore expensive) pucks and to have transmitters inserted into player's helmets. Both of these criteria are impractical at least at the youth sports levels. Third, the tracking system does not additionally collect overhead game film that can be combined to form a single continuous view. Additionally, because these solutions are not predicated on video collection and analysis, they do not address the problems attendant to a multi-camera, parallel processing image analysis system.

Orad Hi-Tech Systems, is assigned U.S. Pat. No. 5,923,365 for a Sports Event Video manipulating system. In this patent by inventor Tamir, a video system is taught that allows an operator to select a game participant for temporary tracking using a video screen and light pen. Once identified, the system uses traditional edge detection and other similar techniques to follow the participant from frame-to-frame. Tamir teaches the use of software based image analysis to track those game participants and objects that are viewable anywhere within the stream of images being captured by the filming camera. At least because the single camera cannot maintain a complete view of the entire playing area at all times throughout the game, there are several difficulties with this approach. Some of these problems are discussed in the application including knowing when participants enter and exit the current view or when they are occluding each other. The present inventors prefer the use of a matrix of overhead cameras to first track all participants throughout the entire playing area and with this information to then gather and segment perspective film—all without the user intervention required by Tamir.

Orad Hi-Tech Systems, is also assigned U.S. Pat. No. 6,380,933 B1 for a Graphical Video System. In the patent, inventor Sharir discloses a system for tracking the three-dimensional position of players and using this information to drive pre-stored graphic animations enabling remote viewers to view the event in three dimensions. Rather than first tracking the players from an overhead or substantially overhead view as preferred by the present inventors, in one embodiment Sharir relies upon a calibrated theodolite that is manually controlled to always follow a given player. The theodolite has been equipped to project a reticle, or pattern, that the operator continues to direct at the moving player. As the player moves, the operator adjusts the angles of the theodolite that are continuously and automatically detected. These detected angles provide measurements that can locate the player in at least the two dimensions of the plane orthogonal to the axis of the theodolite. Essentially, this information will provide information about the player's relative side-to-side location but will not alone indicate how far they are away from the theodolite. Sharir anticipated having one operator/theodolite in operation per player and is therefore relying upon this one-to-one relationship to indicate player identity. This particular embodiment has several drawbacks including imprecise three-dimensional location tracking due to the single line-of-sight, no provision for player orientation tracking as well the requirement for significant operator interaction.

In a different embodiment in the same application, Sharir describes what he calls a real-time automatic tracking and identification system that relies upon a thermal imager boresighted on a stadium camera. Similar to the depth-of-field problem attendant to the theodolite embodiment, Sharir is using the detected pitch of the single thermal imaging camera above the playing surface to help triangulate the player's location. While this can work as a rough approximation, unless there is an exact feature detected on the player that has been calibrated to the player's height, than the estimation of distance will vary somewhat based upon how far away the player truly is and what part of the player is assumed to be imaged. Furthermore, this embodiment also requires potentially one manually operated camera per player to continuously track the location of every player at all times throughout the game. Again, the present invention is "fully" automatic especially with respect to participant tracking. In his thermal imaging embodiment, Sharir teaches the use of a laser scanner that "visits" each of the blobs detected by the thermal imager. This requires each participant to wear a device consisting of an "electro-optical receiver and an RF transmitter that transmits the identity of the players to an RF receiver." There are many drawbacks to the identification via transmitter approach as previously discussed in relation to the Trakus beacon system. The present inventors prefer a totally passive imaging system as taught in prior co-pending and issued applications and further discussed herein.

And finally, in U.S. Pat. Nos. 5,189,630 and 5,526,479 Barstow et. al. discloses a system for broadcasting a stream of "computer coded descriptions of the (game) sub-events and events" that is transmitted to a remote system and used to recreate a computer simulation of the game. Barstow anticipates also providing traditional game video and audio essentially indexed to these "sub-events and events" allowing the viewer to controllably recall video and audio of individual plays. With respect to the current goals of the present application, Barstow's system has at least two major drawbacks. First, these "coded descriptions" are detected and entered into the computer database by an "observer who attends or watches the event and monitors each of the actions which occurs in the course of the event." The present inventors prefer and teach a fully automated system capable of tracking all of the game participants and objects thereby creating an on going log of all activities which may then be interpreted through analysis to yield distinct events and outcomes. The second drawback is an outgrowth of the first limitation. Specifically, Barstow teaches the pre-establishment of a "set of rules" defining all possible game "events." He defines an "event" as "a sequence of sub-events constituted by a discrete number of actions selected from a finite set of action types . . . . Each action is definable by its action type and from zero to possibly several parameters associated with that action type." In essence, the entire set of "observations" allowable to the "observer who attends or watches" the game must conform to this pre-established system of interpretation. Barstow teaches that "the observer enters associated parameters for each action which takes place during the event." Of course, as previously stated, human observers are extremely limited in their ability to accurately detect and timely record participant location and orientation data that is of extreme importance to the present inventor's view of game analysis. Barstow's computer simulation system builds into itself these very limitations.

Ultimately, this stream of human observations that has been constrained to a limited set of action types is used to "simulate" the game for a remote viewer.

With respect to an automated system capable of being "aware" of the game activities, only the teachings of the present inventors address an automatic system for:

collecting overhead film that can be dually used for both tracking and videoing;

specifying how this mosaic of overlapping, overhead film can be combined into a single contiguous and continuous video stream;

analyzing the video stream to determine both the location and orientation of the participants and game objects;

determining three dimensional information including the height of the game object off of the playing surface;

analyzing the film to determine the identity of participants who are wearing unique affixed markings such as encoded helmet stickers;

directing perspective ID cameras to follow detected participants for the purposes of collecting isolated images of their jersey number and other existing identifying marks;

alternatively determining participant identification by performing pattern recognition on these key isolated images of participant jersey numbers and other identifying marks;

directing perspective filming cameras to collect additional video and locate additional body points;

additionally collecting overhead and perspective video from the non-visible spectrum including ultraviolet and infrared frequencies that can be used to locate specially placed non-visible markings placed on a given participants key body locations;

dynamically creating a three-dimensional kinetic body model of participants using the tracked locations of the non-visible markings;

creating separate film and tracking databases from these continuous streams of overhead and perspective images;

analyzing the tracking database in real-time to detect and classify individual game events;

directing perspective videoing cameras to follow detected unfolding events of current or potential significance from camera angles anticipated to best reveal the game action, and directing these same perspective cameras that might normally capture images at roughly 30 frames per second to occasionally capture higher 60, 90, 120 or more frames when selected key events are unfolding thereby supporting slow and supper-slow motion replays.

In order to create a complete automatic broadcasting system, additional problems needed to be resolved such as:

How can a System Filming High Speed Motion that Requires Fast Shutter Speeds Synchronize Itself to the Lighting System?

The typical video camera captures images at the NTSC Broadcast standard of 29.97 frames per second. Furthermore, most often they use what is referred to as full integration which means that each frame is basically "exposed" for the maximum time between frames. In the case of 29.97 frames per second, the shutter speed would be roughly $\frac{1}{30}^{th}$ of a second. This approach is acceptable for normal continuous viewing but leads to blurred images when a single frame is frozen for "stop action" or "freeze frame" viewing. In order to do accurate image analysis on high-speed action, it is both important to capture at least 30 if not 60 frames per second and that each frame be captured with a shutter speed of $\frac{1}{500}^{th}$ to $\frac{1}{1000}^{th}$ of a second. Typically, image analysis is more reliable if there is less image blurring.

Coincident with this requirement for faster shutter speeds to support accurate image analysis, is the issue of indoor lighting at a sport facility such as an ice hockey rink. A typical rink is illuminated using two separate banks of twenty to thirty metal halide lamps with magnetic ballasts. Both banks, and therefore all lamps, are powered by the same alternating current that typically runs at 60 HZ, causing 120 "on-off" cycles per second. If the image analysis cameras use a shutter speed of $\frac{1}{120}^{th}$ or greater, for instance $\frac{1}{500}^{th}$ or $\frac{1}{1000}^{th}$ of a second, then it is possible that the lamp will essentially be "off" or discharged when the cameras sensor is being exposed. Hence, what is needed is a way to synchronize the camera's shutter with the lighting to be certain that it only captures images when the lamps are discharging. The present application teaches the synchronization of the high-shutter-speed tracking and filming cameras with the sports venue lighting to ensure maximum, consistent image lighting.

How can a Practical, Low-Cost System be Built to Process the Simultaneous Image Flow from Approximately Two Hundred Cameras Capturing Thirty to One Hundred and Twenty Images Per Second?

Current technology such as that provided by Motion Analysis Corporation, typically supports up to a practical maximum of thirty-two cameras. For an indoor sport such as youth ice hockey, where the ceiling is only twenty-five to thirty-feet off the ice surface, the present inventors prefer a system of eighty or more cameras to cover the entire tracking area. Furthermore, as will be taught in the present specification, it is beneficial to create two to three separate and complete overlapping views of the tracking surface so that each object to be located appears in at least two views at all times. The resulting overhead tracking system preferably consists of 175 or more cameras. At 630×630 pixels per image and three bytes per pixel for encoded color information amounting to 1 MB per frame, the resulting data stream from a single camera is in the range of 30 MB to 60 MB per second. For 175 cameras this stream quickly grows to approximately 125 GB per second for a 60 frames per second system. Current PC's can accept around 1 GB per second of data that they may or may not be able to process in real-time.

In any particular sporting event, and especially in ice hockey, the majority of the playing surface will be empty of participants and game objects at any given time, especially when viewed from overhead. For ice hockey, any single player is estimated to take up approximately five square feet of viewing space. If there are on average twenty players per team and three game officials, then the entire team could fit into 5 sq. ft. ×23 players=115 sq. ft./all players. A single camera in the present specification is expected to cover 18 ft. by 18 ft. for a total of 324 sq. ft. Hence, all of the players on both teams as well as the game officials could fit into the equivalent of a single camera view, and therefore generate only 30 MB to 60 MB per second of bandwidth. This is a reduction of over 200 times from the maximum data stream and would enable a conventional PC to process the oncoming stream.

What is needed is a system capable of extracting the moving foreground objects, such as participants and game objects, in real-time creating a minimized video image dataset. This minimized dataset is then more easily analyzed in real-time allowing the creation of digital metrics that symbolically encode participant locations, orientations, shapes and identities. Furthermore, this same minimized dataset of extracted foreground objects may also be reassembled into a complete view of the entire surface as if taken by a single camera. The present invention teaches a processing hierarchy including a first bank of overhead camera assemblies feeding full frame data into a second level of intelligent hubs that extract foreground objects and creating corresponding symbolic representations. This second level of hubs then passes the extracted foreground video and symbolic streams into a third level of multiplexing hubs that joins the incoming data into two separate streams to be passed off to both a video compression and a tracking analysis system, respectively.

What is the Correct Configuration of Overhead Filming Cameras Necessary to Accurately Locate Participants and Game Objects in Three Dimensions without Significant Image Distortion?

The approach of filming a sporting event from a fixed overhead view has been the starting point for other companies, researcher's and patent applications. One such research team is the Machine Vision Group (MVG) based out of the Electrical Engineering Department of the University of Ljubljana, of Slovenia. Their approach implemented on a handball court, uses two overhead cameras with wide angle lenses to capture a roughly one hour match at 25 frames per second. The processing and resulting analysis is done post-event with the help of an operator, "who supervises the tracking process." By using only two cameras, both the final processing time and the operator assistance are minimized. However, this savings on total acquired image data necessitated the use of the wide angle lens to cover the larger area of a half court for each single camera. Furthermore, significant computer processing time is expended to correct for the known distortion created by the use of wide angle lenses. This eventuality hinders the possibility for real-time analysis. Without real-time analysis, the overhead tracking system cannot drive one or more perspective filming cameras in order to follow the game action. What is needed is a layout of cameras that avoids any lens distortion that would require image analysis to correct. The present invention teaches the uses of a grid of cameras, each with smaller fields-of-view and therefore no required wide-angle lenses. However, as previously mentioned the significantly larger number of simultaneous video streams quickly exceeds existing computer processing limits and therefore requires novel solutions as herein disclosed. The system proposed by the MVG also appears to be mainly focused on tracking the movements of all the participants. It does not have the additional goal of creating a viable overhead-view video of the contest that can be watched similar to any traditional perspective-view game video. Hence, while computer processing can correct for the severe distortion caused by the camera arrangement choices, the resulting video images are not equivalent to those familiar to the average sports broadcast viewer. What is needed is an arrangement of cameras that can provide minimally distorted images that can be combined to create an acceptable overhead video. The present invention teaches an overlapping arrangement of two to three grids of cameras where each grid forms a single complete view of the tracking surface. Also taught is the ideal proximity of adjacent cameras in a single grid, based upon factors such as the maximum player's height and the expected viewing area comprised by a realistic contiguous grouping of players. The present specification teaches the need to have significant overlap in adjacent camera views as opposed to no appreciable overlap such as with the MVG system.

Furthermore, because of the limited resolution of each single camera in the MVG system, the resulting pixels per inch of tracking area is insufficient to adequately detect foreground objects the size of a handball or identification markings affixed to the player such as a helmet sticker. What is needed is a layout of cameras that can form a complete view of the entire tracking surface with enough resolution to sufficiently detect the smallest anticipated foreground object, such as the handball or a puck in ice hockey. The present invention teaches just such an arrangement that in combination with the smaller fields of view per individual camera and the overlapping of adjacent fields-of-view, in total provides an overall resolution sufficient for the detection of all expected foreground objects.

Similar to the system proposed by MVG, Larson et al. taught a camera based tracking system in U.S. Pat. No. 5,363, 297 entitled "Automated Camera-Based Tracking System for Sports Contests." Larson also proposed a two camera system but in his case one camera was situated directly above the playing surface while the other was on a perspective view. It was also anticipated that an operator would be necessary to assist the image analysis processor, as with the MVG solution. Larson further anticipated using beacons to help track and identify participants so as to minimize the need for the separate operator.

How can Perspective Filming Cameras be Controlled so that as they Pan, Tilt and Zoom their Collected Video can be Efficiently Processed to Extract the Moving Foreground from the Fixed and Moving Background and to Support the Insertion of Graphic Overlays?

As with the overhead cameras, the extraction of moving foreground objects is of significant benefit to image compression of the perspective film. For instance, a single perspective filming camera in color at VGA resolutions would fill up approximately 90% of a single side of a typical DVD. Furthermore, this same data stream would take up to 0.7 MB per second to transmit over the Internet, far exceeding current cable modem capacities. Therefore, the ability to separate the participants moving about in the foreground from the playing venue forming the background is of critical issue for any broadcast intended especially to be presented over the Internet and/or to include multiple simultaneous viewing angles. However, this is a non-trivial problem when considering that the perspective cameras are themselves moving thus creating the effect even the fixed aspects of the background are moving in addition to the moving background and foreground.

As previously mentioned, the present inventors prefer the use of automated perspective filming cameras whose pan and tilt angles as well as zoom depths are automatically controlled based upon information derived in real-time from the overhead tracking system. There are other systems, such as that specified in the Honey patent, that employ controlled pan/tilt and zoom filming cameras to automatically follow the game action. However, the present inventors teach the additional step of limiting individual frame captures to only occur at a restricted set of allow camera angles and zoom depths. For each of these allowed angles and depths, a background image will be pre-captured while no foreground objects are present; for example at some time when the facility is essentially empty. These pre-captured background images are then stored for later recall and comparison during the actual game filming. As the game is being filmed by each perspective camera, the overhead system will continue to restrict images to the allowed, pre-determined angles and depths. For each current image captured, the system will look up the appropriate stored background image matching the current pan/tilt and zoom settings. This pre-stored, matched background is then subtracted from the current image thereby efficiently revealing any foreground objects, regardless of whether or not they are moving. In effect, it is as if the perspective cameras were stationary similar to the overhead cameras.

While typical videoing cameras maintain their constant NTSC broadcast rate of 29.97 frames per second, or some multiple thereof, the perspective cameras in the present invention will not follow this standardized rate. In fact, under certain circumstances they will not have consistent, fixed intervals between images such as $1/30^{th}$ of a second. The actual capture rate is a dependent upon the speed of pan, tilt and zoom motions in conjunction with the allowed imaging angles and depths. Hence, the present inventors teach the use of an automatically controlled videoing camera that captures images at an asynchronous rate. In practice, these cameras are designed to maintain an average number of images in the equivalent range such as 30, 60 or 90 frames per second. After capturing at an asynchronous rate, these same images are then synchronized to the desired output standard, such as NTSC. The resulting minimal time variations between frames are anticipated to be unintelligible to the viewer. The present inventors also prefer synchronizing these same cameras to the power lines driving the venue lighting thereby supporting higher speed image captures. These higher speed captures will result in crisper images, especially during slow or freeze action and will also support better image analysis.

The present inventors also teach a method for storing the pre-captured backgrounds from the restricted camera angles and zoom depths as a single panoramic. At any given moment, the current camera pan and tilt angles as well as zoom depth can be used to index into the panoramic dataset in order to create a single-frame background image equivalent to the current view. While the panoramic approach is expected to introduce some distortion issues it has the benefit of greatly reducing the required data storage for the pre-captured backgrounds.

In addition to removing the fixed background from every current image of a perspective camera, there will be times when the current view includes a moving background such as spectators in the surrounding stands. Traditional methods for removing this type of background information include processing and time extensive intra and inter-frame image analysis. The present inventors prefer segmenting each captured image from a perspective camera into one to two types of background regions based upon a pre-measured three-dimensional model of the playing venue and the controlled angles and depth of the current image. Essentially, by knowing where each camera is pointed with respect to the three-dimensional model at any given moment, the system can always determine which particular portion of the playing venue is in view. In some cases, this current view will be pointed wholly onto the playing area of the facility as opposed to some portion of the playing area and surrounding stands. In this case, the background is of the fixed type only and simple subtraction between the pre-stored background and the current image will yield the foreground objects. In the alternate case, were at least some portion of the current view includes a region outside of the playing area, than the contiguous pixels of the current image corresponding to this second type of region can be effectively determined in the current image via the three-dimensional model. Hence, the system will know which portion of each image taken by a perspective filming camera covers a portion of the venue surrounding the playing area. It is in the surrounding areas that moving background objects, such as spectators may be found.

The present inventors further teach a method for employing the information collected by the overhead cameras to create a topological three-dimensional profile of any and all participants who may happen to be in the same field-of-view of the current image. This profile will serve to essentially cut out the participants profile as it overlays the surrounding area that may happen to be in view behind them. Once this topological profile is determined, all pixels residing in the surrounding areas that are determined to not overlap a participant (i.e. they are not directly behind the player,) are automatically dropped. This "hardware" assisted method of rejecting pixels that are not either a part of the fixed background or a tracked participant, offers considerable efficiency over traditional software methods.

After successfully removing, or segmenting, the image foreground from its fixed and moving backgrounds, the present inventors teach the limited encoding and transmission of just the foreground objects. This reduction in overall information to be transmitted and/or stored yields expected Internet transfer rates of less than 50 KB and full film storage of 0.2 GB, or only 5% of today's DVD capacity. Upon decoding, several options are possible including the reinstatement of the fixed background from a panoramic reconstruction pre-stored on the remote viewing system. It is anticipated that the look of this recombined image will be essentially indistinguishable from the original image. All that will be missing is minor background surface variations that are essentially insignificant and images of the moving background such as the spectators. The present inventors prefer the use of state of the art animation techniques to add a simulated crowd to each individual decoded frame. It is further anticipated that these same animation techniques could be both acceptable and preferable for recreating the fixed background as opposed to using the pre-transmitted panoramic.

With respect to the audio coinciding to the game film, the present inventors anticipate either transmitting an authentic capture or alternatively sending a synthetic translation of the at least the volume and tonal aspects of the ambient crowd noise. This synthetic translation is expected to be of particular value for broadcasts of youth games where there tends to be smaller crowds on hand. Hence, as the game transpires, the participants are extracted from the playing venue and transmitted along with an audio mapping of the spectator responses. On the remote viewing system, the game may then be reconstructed with the original view of the participants overlaid onto a professional arena, filled with spectators whose synthesized cheering is driven by the original spectators.

With respect to the recreation of the playing venue background on the remote viewing system, both the "real-image" and "graphically-rendered" approaches have the additional advantage of being able to easily overlay advertisements. Essentially, after recreating the background using either actual pre-stored images of the venue or graphic animations, advertisements can be placed in accordance with the pre-known three-dimensional map and transmitted current camera angle being displayed. After this, the transmitted foreground objects are overlaid forming a complete reconstruction. There are several other inventors who have addressed the need for overlaying advertisements onto sports broadcasts. For instance, there are several patents assigned to Orad Hi-Tech Systems, LTD including U.S. Pat. Nos. 5,903,317, 6,191,825 B1, 6,208,386 B1, 6,292,227 B1, 6,297,853 B1 and 6,384,871 B1. They are directed towards "apparatus for automatic electronic replacement of a billboard in a video image." The general approach taught in these patents limits the inserted advertisements to those areas of the image determined to already contain existing advertising. Furthermore, these systems are designed to embed these replacement advertisements in the locally encoded broadcast that is then transmitted to the remote viewer. This method naturally requires transmission bandwidth for the additional advertisements now forming a portion of the background (which the present inventors do not transmit.)

The present inventors prefer to insert these advertisements post transmission on the remote viewing device as a part of the decoding process. Advertisements can be placed anywhere either in the restored life-like or graphically animated background. If it is necessary to place a specific ad directly on top of an existing ad in the restored life-like image, the present inventors prefer a calibrated three-dimensional venue model that describes the player area and all important objects, hence the location and dimensions of billboards. This calibrated three-dimensional model is synchronized to the same local coordinate system used for the overhead and perspective filming cameras. As such, the camera angle and zoom depth transmitted with each sub-frame of foreground information not only indicates which portion of the background must be reconstructed according to the three-dimensional map, but also indicates whether or not a particular billboard is in view and should be overlaid with a different ad.

Other teachings exist for inserting static or dynamic images into a live video broadcast which covers a portion of the purposes of the present Automated Sports Broadcasting System. For instance, in U.S. Pat. No. 6,100,925 assigned to Princeton Video Image, Inc., Rosser et al. discloses a method that relies upon a plurality of pre-known landmarks within a given venue that have been calibrated to a local coordinate system in which the current view of a filming camera can be sensed and calculated. Hence, as the broadcast camera freely pans, tilts and zooms to film a game, its current orientation and zoom depth is measured and translated via the local coordinate system into an estimate of its field-of-view. By referring to the database of pre-known landmarks, the system is able to predict when and where any given landmark should appear in any given field-of-view. Next, the system employs pattern matching between the pixels in the current image anticipated to represent a landmark and the pre-known shape, color and texture of the landmark. Once the matching of one or more landmarks is confirmed, the system is then able to insert the desired static or dynamic images. In an alternative embodiment, Rosser suggest using transmitters embedded in the game object in order to triangulate position in essence creating a moving landmark. This transmitter approach for tracking the game object is substantially similar to at least that of Trakus and Honey.

Like the Orad patents for inserting advertisements, the teachings of Rosser differ from the present invention since the inserted images are added to the encoded broadcast prior to transmission, therefore taking up needed bandwidth. Furthermore, like the Trakus and Honey solutions for beacon based object tracking, Rosser's teachings are not sufficient for tracking the location and orientation of multiple participants. At least these, as well as other drawbacks, prohibit the Rosser patent from use as an automatic broadcasting system as defined by the present inventors.

With the similar purpose of inserting a graphic into live video, in U.S. Pat. No. 6,597,406 B2 assigned to Sportvision, Inc., inventor Gloudeman teaches a system for combining a three-dimensional model of the venue with the detected camera angle and zoom depth. An operator could then interact with the three-dimensional model to select a given location for the graphic to be inserted. Using the sensed camera pan and tilt angles as well as zoom depth, the system would then transform the selected three-dimensional location into a two-dimensional position in each current video frame from the camera. Using this two-dimensional position, the desired graphic is then overlaid onto the stream of video images. As with other teachings, Gloudeman's solution inserts the graphic onto the video frame prior to encoding; again taking up transmission bandwidth. The present inventors teach a method for sending this insertion location information along with the extracted foreground and current camera angles and depths associated with each frame or sub-frame. The remote viewing system then decodes these various components with pre-knowledge of both the three-dimensional model as well as the background image of the venue. During this decode step, the background is first reconstructed from a saved background image database or panorama, after which advertisements and/or graphics are either placed onto pre-determined locations or inserted based upon some operator input. And finally, the foreground is overlaid creating a completed image for viewing. Note that the present inventors anticipate that the information derived from participant and game object tracking will be sufficient to indicate where graphics should be inserted thereby eliminating the need for operator input as specified by Gloudeman.

How can a System Track and Identify Players Without Using any Special Markings?

The governing bodies of many sports throughout the world, especially at the amateur levels, do not allow any foreign objects, such as electronic beacons, to be placed upon the participants. What is needed is a system that is capable of identifying participants without the use of specially affixed markings or attached beacons. The present inventors are not aware of any systems that are currently able to identify participants using the same visual markings that are available to human spectators, such as a jersey team logo, player number and name. The present application builds upon the prior applications included by reference to show how the location and orientation information determined by the overhead cameras can be used to automatically control perspective view cameras so as to capture images of the visual markings. Once captured, these markings are then compared to a pre-known database thereby allowing for identification via pattern matching. This method will allow for the use of the present invention in sports where participants do not wear full equipment with headgear such as basketball and soccer.

How Can a Single Camera be Constructed to Create Simultaneous Images in the Visible and Non-Visible Spectrums to Facilitate Tire Extraction of the Foreground Objects Followed by Tie Efficient Locating of any Non-Visible Markings?

As was first taught in prior applications of the present inventors, it is possible to place marks in the form of coatings onto surfaces such as a player's uniform or game equipment. These coatings can be specially formulated to substantially transmit electromagnetic energy in the visible spectrum from 380 nm to 770 nm while simultaneously reflecting or absorbing energies outside of this range. By transmitting the visible spectrum, these coatings are in effect "not visually apparent" to the human eye. However, by either absorbing or reflecting the non-visible spectrum, such as ultraviolet or infrared, these coatings can become detectable to a machine vision system that operates outside of the visible spectrum. Among other possibilities, the present inventors have anticipated placing these "non-apparent" markings on key spots of a player's uniform such as their shoulders, elbows, waist, knees, ankles, etc. Currently, machine vision systems do exist to detect the continuous movement of body joint markers at least in the infrared spectrum. Two such manufacturers known to the present inventors are Motion Analysis Corporation and Vicon. However, in both company's systems, the detecting cameras have been filtered to only pass the infrared signal. Hence, the reflected energy from the visible spectrum is considered noise and eliminated before it can reach the camera sensor.

The present inventors prefer a different approach that places what is known as a "hot mirror" in front of the camera lens that acts to reflect the infrared frequencies above 700 nm off at a 45° angle. The reflected infrared energy is then picked up by a second imaging sensor responsive to the near-infrared frequencies. The remaining frequencies below 700 nm pass directly through the "hot mirror" to the first imaging sensor. Such an apparatus would allow the visible images to be captured as game video while simultaneously creating an exactly overlapping stream of infrared images. This non-visible spectrum information can then be separately processed to pinpoint the location of marked body joints in the overlapped visible image. Ultimately, this method is an important tool for creating a three-dimensional kinetic model of each participant. The present inventors anticipate optionally including these motion models in the automated broadcast. This kinetic model dataset will require significantly less bandwidth than the video streams and can be used on the remote system to drive an interactive, three-dimensional graphic animation of the real-life action.

How Can Spectators be Tracked and Filmed, and the Playing Venue be Audio Recorded in a Way that Allows this Additional Non-Participant Video and Audio to be Meaningfully Blended into the Game Broadcast?

For many sports, especially at the youth levels where the spectators are mostly parents and friends, the story of a sporting event can be enhanced by recording what is happening around and in support of the game. As mentioned previously, creating a game broadcast is an expensive endeavor and that is typically reserved for professional and elite level competition. However, the present inventors anticipate that a relatively low cost automated broadcast system that delivered its content over the Internet could open up the youth sports market. Given the fact that most youth sports are attended by the parents and guardians of the participants, the spectator base for a youth contest represents a potential source of interesting video and audio content. Currently, no system exists that can automatically associate the parent with the participant and subsequently track the parents location throughout the contest. This tracking information can then be used to optionally video any given parent(s) as the game tracking system becomes aware that their child/participant is currently involved in a significant event.

Several companies have either developed or are working on radio frequency (RF) and ultra-wide band (UWB) wearable tag tracking systems. These RF and UWB tags are self-powered and uniquely encoded and can, for instance, be worn around an individual spectator's neck. As the fan moves about in the stands or area surrounding the game surface, a separate tracking system will direct one or more automatic pan/tilt/zoom filming cameras towards anyone, at any time. The present inventors envision a system where each parent receives a uniquely encoded tag to be worn during the game allowing images of them to be captured during plays their child is determined to be involved with. This approach could also be used to track coaches or VIP and is subject to many of the same novel apparatus and methods taught herein for filming the participants.

How Can the Official Indications of Game Clock Start and Stop Times be Detected to Allow for the Automatic Control of the Scoreboard and for Time Stamping of the Filming and Tracking Databases?

The present invention for automatic sports broadcasting is discussed primarily in relation to the sport of ice hockey. In this sport as in many, the time clock is essentially controlled by the referees. When the puck is dropped on a face-off, the official game clock is started and whenever a whistle is blown or a period ends, the clock is stopped. Traditionally, especially at the youth level, a scorekeeper is present monitoring the game to watch for puck drops and listen for whistles. In most of the youth rinks this scorekeeper is working a console that controls the official scoreboard and clock. The present inventors anticipate interfacing this game clock to the tracking system such that at a minimum, as the operator starts and stops the time, the tracking system receives appropriate signals. This interface also allows the tracking system to confirm official scoring such as shots, goals and penalties. It is further anticipated that this interface will also accept player numbers indicating official scoring on each goal and penalty. The present inventors are aware at least one patent proposing an automatic interface between a referee's whistle and the game scoreboard. In U.S. Pat. No. 5,293,354, Costabile teaches a system that is essentially tuned to the frequency of the properly blown whistle. This "remotely actuatable sports timing system" includes a device worn by a referee that is capable of detecting the whistle's sound waves and responding by sending off its own RF signal to start/stop the official clock. At least four drawbacks exist to Costabile's solution. First, the referee is required to wear a device which, upon falling could cause serious injury to the referee. Second, while this device can pick up the whistle sound, it is unable to distinguish which of up to three possible referees actually blew the whistle. Third, if the whistle if the airflow through the whistle is not adequate to create the target detection frequencies, then Costabile's receiver may "miss" the clock stoppage. And finally, it does include a method for detecting when a puck is dropped, which is how the clock is started for ice hockey.

The present inventors prefer an alternate solution to Costabile that includes a miniturized air-flow detector in each referees whistle. Once air-flow is detected, for instance as it flows across an internal pinwheel, a unique signal is generated and automatically transmitted to the scoreboard interface thereby stopping the clock. Hence, the stoppage is accounted to only one whistle and therefore referee. Furthermore, the system is built into the whistle and carries no additional danger of harm to the referee upon falling. In tandem with the air-flow detecting whistle, the present inventors prefer using a pressure sensitive band worn around two to three fingers of the referee's hand. Once a puck is picked up by the referee and held in his palm, the pressure sensor detects the presence of the puck and lights up a small LED for verification. After the referee sees the lit LED, he then is ready and ultimately drops the puck. The pressure on the band is released and a signal is sent to the scoreboard interface starting the official clock.

By automatically detecting clock start and stops times as well as picking up official game scoring through a scoreboard interface, the present invention uses this information to help index the captured game film.

How can Tracking Data Determined by Video Image Analysis be Used to Create Meaningful Statistics and Performance Metrics that can be Compared to Subjective Observation thereby Providing for Positive Feed-Back to Influence the Entire Process?

Especially for the ice hockey, many of the player movements in sports are too fast and too numerous to quantify by human based observation. In practice, game observers will look to quantify a small number of well-defined, easily observed events such as "shots" or "hits." Beyond this, many experienced observers will also make qualitative assessments concerning player and team positioning, game speed and intensity, etc. This former set of observations comes without verifiable measurement. At least the Trakus and Orad systems have anticipated the benefit of a stream of verifiable, digitally encoded measurements. This stream of digital performance metrics is expected to provide the basis for summarization into a newer class of meaningful statistics. However, not only are there significant drawbacks to the apparatus and methods proposed by Trakus and Orad for collecting these digital metrics, there is at least one key measurement that is missing. Specifically, the present inventors teach the collection of participant orientation in addition to location and identity. Furthermore, the present inventors are the only system to teach a method applicable to live sports for collecting continuous body joint location tracking above and beyond participant location tracking.

This continuous accumulation of location and orientation data recorded by participant identity thirty times or more per second yields a significant database for quantifying and qualifying the sporting event. The present inventors anticipate submitting a continuation of the present invention teaching various methods and steps for translating these low level measurements into meaningful higher level game statistics and qualitative assessments. While the majority of these teachings will be not addressed in the present application, what is covered is the method for creating a feed-back loop between a fully automated "objective" game assessment system and a human based "subjective" system. Specifically, the present inventors teach a method of creating "higher level" or "judgment-based" assessments that can be common to both traditional "subjective" methods and newer "objective" based methods. Hence, after viewing a game, both the coaching staff and the tracking system rate several key aspects of team and individual play. Theoretically, both sets of assessments should be relatively similar. The present inventors prefer capturing the coaches "subjective" assessments and using them as feed-back to automatically adjust the weighting formulas used to drive the underlying "objective" assessment formulas.

Most of the above listed references are addressing tasks or portions of tasks that support or help to automate the traditional approach to creating a sports broadcast. Some of the references suggest solutions for gathering new types of performance measurements based upon automatic detection of player and/or game object movements. What is needed is an automatic integrated system combining solutions to the tasks of:
  tracking official game start/stop times, calls and scoring;
  automatically tracking participant and game object movement using a multiplicity of substantially overhead viewing cameras;
  automatically assembling a single composite overhead view of the game based upon the video images captured by the tracking system;
  collecting video from one or more perspective view cameras that are automatically directed to follow the game action based upon the determined participant and game object movement;
  automatically collecting game audio and creating matched volume and tonal mappings;
  analyzing participant and game object movement to create game statistics and performance measurements forming a stream of game metrics;
  automatically creating performance descriptor tokens based upon the game metrics describing the important game activities;
  dynamically assembling combinations of the video, game metrics, performance tokens and audio information into an encoded broadcast based upon remote viewer directives;
  transmitting the broadcast and receiving back interactive viewer directives;
  decoding the broadcast into a stream of video and audio signals capable of being presented on the viewing device, where
  the background may be chosen by the viewer to match either the original or a different facility, in either "natural" or "animated" formats;
  the overhead game view and a multiplicity of perspective views are available under user direction in either video, gradient "colorized line-art" or symbolic formats;
  standard and custom advertisements are inserted, preferably based upon the known profile of the viewer, as separate video/audio clips or graphic overlays;
  statistics, performance measurements and other game analysis are graphically overlaid onto the generated video;
  audio game commentary is automatically synthesized based upon the performance tokens, and
  crowd noise is automatically synthesized based upon the matched volume and tonal mappings as an alternative to the "natural" recorded game audio.

When taken together, the individual sub-systems for performing these tasks become an Automatic Event Videoing, Tracking and Content Generation System.

Given the current state of the art in CMOS image sensors, Digital Signal Processors (DSP's), Field Programmable Arrays (FPGA's) and other digital electronic components as well as general computing processors, image optics, and software algorithms for performing image segmentation and analysis it is possible to create a massively parallel, reasonably priced machine vision based sports tracking system. Also, given the additional state of the art in mechanical pan/tilt and electronic zoom devices for use with videoing cameras along with algorithms for encoding and decoding highly segmented and compressed video, it is possible to create a sophisticated automatic filming system controlled by the sports tracking system. Furthermore, given state of the art low cost computing systems, it is possible to breakdown and analyze the collected player and game object tracking information in real-time forming a game metrics and descriptor database. When combined with advancements in text-to-speech synthesis, it is then possible to create an Automatic Event Videoing, Tracking and Content Generation System capable of recording, measuring, analyzing, and describing in audio the ensuing sporting event in real-time. Using this combination of apparatus and methods provides opportunities for video compression significantly exceeding current standards thereby providing opportunities for realistically distributing the resulting sports broadcast over non-traditional mediums such as the Internet.

While the present invention will be specified in reference to one particular example of sports broadcasting, as will be described forthwith, this specification should not be construed as a limitation on the scope of the invention, but rather as an exemplification of the preferred embodiments thereof. The inventors envision many related uses of the apparatus and methods herein disclosed only some of which will be mentioned in the conclusion to this applications specification. For purposes of teaching the novel aspects of the invention, the example of a sport to be automatically broadcast is that of an ice-hockey game. Accordingly, the underlying objects and advantages of the present invention are to provide sub-systems in support of, and comprising an Automatic Event Videoing, Tracking and Content Generation System with the following capabilities:

1. tracking official game start/stop times, calls and scoring through:
  the use of a referees whistle capable of transmitting a uniquely encoded identification signal upon the detection of airflow;
  the use of a band to be worn over the fingers that is capable of transmitting a uniquely encoded identification signal upon the sensing of pressure when the game object, such as a puck, is either picked up or released, and
  the interfacing of the official game scoring data collection device that is typically used to control the scoreboard.
2. automatically tracking participant and game object movement using a multiplicity of substantially overhead viewing cameras:
  by first detecting and following the participant and game object shapes from a substantially overhead, fixed camera matrix capable of both tracking and filming, and:
    synchronizing these tracking and filming cameras to the power cycles of the venue lighting system in order to ensure maximum, consistent image-to-image lighting;
    where the fixed overhead filming cameras first capture an image of the background known to be absent of foreground objects, the background image of which can then be used during game filming to support the real-time extraction of any participants and game objects (collectively referred to as foreground objects) that may be traversing the background so that they may be efficiently analyzed;
    where the fixed overhead cameras stream their data into image extracting hubs whose purpose is at least to perform this extraction of the foreground from the background, also referred to as segmentation, in real-time prior to multiplexing the resulting extracted foreground objects into a single minimal stream to be passed on to an analysis computer;
so that the larger stream of video data emanating from the multiplicity of overhead cameras can be reduced in total pixel area to a volume of data capable of being received and processed by a typical computer system;
where a multiplicity of image extracting hubs stream their data into multiplexing hubs whose purpose is to join together the incoming streams of extracted foreground objects into a single stream for presentation to another multiplexing hub or an analysis computer;
so that the analysis computer is capable of receiving the total multiplicity of streams as a reduced number of streams acceptable into its typical number of input paths;
where the tracking information determined for these foreground objects at least includes the continuous location and orientation of each participant and game object while they are within the field of play;
using markings such as uniquely encoded helmet stickers in order to identify individual participants coincident with the tracking of their shapes;
using non-visible coatings to mark selected body points on each participant and by directing the reflected non-visible frequencies entering the overhead filming cameras to a separate sensor;
analyzing these coincident non-visible images to identify and track specific body points on each participant, and
creating a grid of overhead cameras whose views overlap so a to collectively form a single view of the tracking surface below;
where the area covered by the overlap between any adjacent cameras is enough to ensure that any foreground object that transverses the junction remains within all views for a minimal distance;
where this minimal distance at least includes the size of any player identification marks such as a helmet sticker;
where this minimal distance preferably includes enough area to keep a single participant in view while standing;
creating an overhead matrix comprising at least two overhead grids, offset to each other, such that any foreground object is always in view of at least two cameras, one from each of the two grids, at all times;
so that image analysis of these foreground objects from the two separate views can create three dimensional tracking information;
preferably adding a third overhead grid to the overhead matrix such that any foreground object remains in the view of at least three cameras, one from each of the three grids, at all times;
so that more than one camera must malfunction before a foreground object is no longer seen by two cameras, and
so that composite images created of the foreground objects may have minimal distortion by always selecting the one view from any of the three viewing cameras that is the most centered;
by using the tracking location and orientation information concerning each participant to automatically direct a plurality of ID filming cameras affixed from a perspective view throughout the venue to controllably capture images of selected participants including identifying portions of their uniforms such as their jersey numbers;
to use the captured images of a selected participant's uniform, preferably including their jersey number, to compare and pattern match against a pre-known database thereby allowing for participant identification without necessitating the use of an added marking such as a helmet sticker, and
by using a wireless handheld device to allow coaches to indicate, in real-time, game moments for review, where these moments are stored as time markers and cross indexed to both the indicating coach and the plurality of tracked data and collected film.

3. automatically assembling a single composite overhead view of the game based upon the video images captured by the tracking system:
where an automatic video content assembly and compression computer system ultimately sorts and combines the video information of the extracted foreground objects contained in all of the incoming streams being received from one or more multiplexing hubs, themselves receiving from other multiplexing hubs or extractions hubs, themselves receiving from all cameras within all the overhead grids comprising the overhead matrix;
where any foreground object determined to have been touching one or more edges of its capturing camera's view, is first combined with any extracted foreground objects from adjacent cameras within the same overhead grid that are overlapping along one or more equivalent physical pixel locations,
so that a multiplicity of contiguous foreground objects, from a single overhead grid, are first constructed from the pieces captured by adjacent cameras within that grid;
where each constructed or otherwise already contiguous foreground object captured within a single grid is then compared to the foreground objects, determined to be occupying the same physical space, that were captured from the one or preferably two other overhead grids;
where the result of the comparison is to select the one view of the foreground object that contains the least image distortion;
a where each minimally distorted contiguous foreground object may comprise one or more participants;
where these foreground objects may be determined to contain more than one participant by detecting the presence of more than one helmet sticker or other identifying mark, or
where the total pixel mass of the contiguous foreground object is determined to be that reasonably expected for a given number of participants greater than one;
where contiguous foreground objects determined to comprise more than one participant are then preferably broken into separate smaller foreground objects centered about the best estimated location of each detected participant;
where the separate smaller objects are thought to contain only a single participant and are indexed at least according to the identity of that participant, and
where it is immaterial that body portions of one participant are included in the separated smaller objects of an adjoining participant, if at least the total video information contained in the forcibly separated smaller objects equals the total video information of the original contiguous (larger) foreground object.
so that a single collection of the least distorted views of all participants, broken up and indexed by participant and game objects as best as is possible, is created with minimal delay from real-time for each beat of image capture across all cameras in the overhead matrix;
where the expected beats of image capture might be every $1/30^{th}$, $1/60^{th}$ or $120^{th}$ of a second and faster;
where the same separate participant or game object images are then sorted into distinct streams within the time (or temporal) domain as each successive beat of the capturing cameras creates an additional single collection of least distorted views, and
where any unidentifiable objects from a single collection form their own distinct temporal stream with any other unidentifiable objects, determined to overlap the same physical local, from the next single collection.

4. collecting video from one or more perspective view cameras that are automatically directed to follow the game action based upon the determined participant and game object movement;
by using the tracking location and orientation information concerning each participant and the game object to automatically direct a plurality of game filming cameras affixed from distinct perspective views throughout the venue;
where the pan/tilt and zoom settings of each perspective filming camera are automatically controlled and the capturing of images is restricted to distinct combinations of these settings rather than a particular fixed time beat such as $1/30^{th}$ or $1/6^{th}$ of a second;
where for each possible distinct combination of pan/tilt and zoom settings, an image is first captured when the venue background is known to be absent of foreground objects, the background image of which can then be used during game filming to support the real-time extraction of foreground objects as they traverse the background thereby supporting image compression;
where the total collection of background images for a given perspective camera, covering all possible distinct combinations of pan/tilt and zoom (P/T/Z) settings, are additional combined to form a single larger background panoramic;
where this panoramic can be queried based upon the current P/T/Z settings of the associated filming cameras in order to extract the equivalent original venue background overlapping the current image;
where the extracted foreground objects from each current frame of each perspective filming camera are broken into separate streams by participant in a manner similar to that taught for the overhead filming system, based upon tracking information determined by the overhead system;
where a table of pre-known color tones are established for all participant skin complexions as well as home and away uniforms, such that each pixel in the extracted foreground images can be encoded to represent one of these color tones less a grayscale overlay thereby increasing image compression;
using non-visible coatings to mark selected body points on each participant and directing the reflected non-visible frequencies entering the perspective filming cameras to a separate sensor;
analyzing these coincident non-visible images to identify and track specific body points on each participant;
by using transponders to track the location and orientation of one or more roving, manually operated filming cameras so as to align its captured film with the determined location and orientation of the participants and game objects, and
by using transponders to track the location of selected spectators and to controllably direct spectator filming cameras based upon the determined game actions of the participants and their relationship to the tracked spectators.

5. automatically collecting game audio and creating matched volume and tonal mappings;
by using audio recorders placed throughout the venue to capture a three-dimensional soundscape of the game that is stored both in traditional audio formats, and
by sampling the traditional audio recording in order to create compressed volume and tonal maps that may be used to drive a synthesized rendering of crowd noise.

6. analyzing participant and game object movement to create game statistics and performance measurements forming a stream of game metrics:
where the continuum of tracked locations, orientations and identities of the participants and the game object is interpreted as a series of distinct and overlapping events, where each event is categorized and associated at least by time sequence with the tracking and filming databases;
where any given overhead or perspective filming camera may be operated at some multiple of the standard motion frame rate, typically 30 fps, in order to capture enough video to support slow and super-slow motion playback, and
where the critically of a given event determined to be in view of a given filming camera is used to automatically determine if these extra multiple of video frames should be kept or discarded;
by using these interpreted events to automatically accumulate basic game statistics;
including the capturing of subjective assessments of participant performance, typically from the coaching staff after the game has completed, where the assessments of which are comparable to those made objectively based upon the automatically interpreted events and statistics, thereby forming a feedback loop provided to both the subjective and objective analysis sources in order to help refine their respective assessment methods.

7. automatically creating performance descriptor tokens based upon the game metrics describing the important game activities:
by creating a three-dimensional venue model that calibrates the tracking and filming cameras into a single local coordinate system, from which the interpreted events can be translated in combination with predefined game rules into at least the recording of game scoring and other traditional statistics, and
by using participant and game object movements as calibrated to the playing venue along with the interpreted events, scoring and other statistics to generate a continuous output of descriptive tokens that themselves can be used as input into a text-to-speech synthesis module for the automatic creation of game commentary.

8. dynamically assembling combinations of the video, game metrics, performance tokens and audio information into an encoded broadcast based upon remote viewer directives; where the assembled video stream may compose:
   the single composite overhead view of the game encoded as a traditional stream of current images;
   one or more perspective views of the game encoded as a traditional stream of current images;
   either or both of the overhead and perspective views alternatively encoded as a derivative of the traditional streams of current images encoded as:
      streams of extracted blocks minimally containing all of the relevant foreground objects,
         where the pan/tilt and zoom settings associated with each and every image in the current stream, for each perspective view camera, are also transmitted;
      "localized" sub-streams of extracted blocks further sorted in the spatial domain based upon the identification of the player primarily imaged in the block;
      "normalized" sub-streams of "localized" extracted blocks further expanded and rotated so as to minimize expected player image motion within the temporal domain;
      "localized" and "normalized" sub-streams further separated into face and non-face regions;
      separated non-face regions further separated into color underlay and grayscale overlay images, and color underlay images encoded as color tone regions.
      any of the derivative forms of the traditional streams alternately encoded as gradient images;
      the single composite overhead view represented in a symbolic, rather than video or gradient format;
   where the assembled metrics stream may compose:
      an ongoing accumulation of performance measurements and analysis derived from the continuous stream of participant and game object tracking information created via image analysis of the single composite overhead view;
   where the assembled audio stream may compose:
      the traditional ambient audio recordings of the venue surroundings, or,
         compressed volume and tonal maps derived from the ambient audio recordings that may be used to direct the automatic generation of synthesized crowd noise;
      a stream of tokens encoding a description of the game activities that may be used to direct the automatic generation of synthesized game commentary;
   by using the determined game stop and re-start times along with the interpreted events to selectively alter the contents of the video stream;
      where alternative perspective view angles may be added to the stream based upon the measured game activities in order to serve as replays;
      where additional captured images greater than the traditional 30 frames per second may be transmitted and then added to the prior transmitted original 30 frames per second in order to all for slow motion replays;
   by receiving user profile and preferences along with direct interactive user feedback in order to change any portion of the video, metrics or audio streams.
9. transmitting the broadcast and receiving back interactive viewer directives;
   using current standards such as broadcast video for television and MPEG-4 or H.264 for the Internet, or using variations of current standards designed to take advantage of the additional information created by the present application that support higher levels of broadcast stream compression.
10. decoding the transmitted broadcast into a stream of video and audio signals capable of being presented on the viewing device, where:
    selected information is transmitted, or otherwise provided to the decoding system prior to receiving the transmitted broadcast including:
       a 3-D model of the venue in which the contest is being played;
       a database of "natural" background images, one image for each allowed pan/tilt and zoom setting for each perspective view camera;
          a panoramic background for each perspective view camera representing a compressed compilation of the database of "natural" background images;
       a database of advertisement images mapped to the 3-D venue model;
       a color tone table representing the limited number of possible skin tones, uniform and game equipment colors to be used when decoding the video stream;
       a database of standard poses of the participants expected to play in the broadcasted game cross-indexed at least by participant identification and also by pose information including orientation and approximately body pose;
          where the standard poses for each participant are pre-captured in the same uniforms and equipment they are expected to be wearing and using during the broadcasted contest;
       a database of translation rules controlling how the stream of tonal and volume map information is to be converted into synthesized crowd noise;
       a database of translation rules controlling how the stream of tokens encoding the game activities are to be converted into text for subsequent translation from text-to-speech;
    selected information is accepted locally, on the decoding system, for use in directing what information is included in the broadcast and how this information is presented, such as:
       a viewer profile and preferences database that is established prior to the broadcast and includes information such as:
          the viewers name, age, address, relationship to the event as well as other traditional demographic data;
          the viewers preferences, at least including indicators for:
             using natural or animated backgrounds;
             using the background from the actual or a substitute facility;
             using natural or synthesized crowd noise;
             the voices to be used for the synthesized audio game commentary, and
             the style of presentation.
       the same viewer profile and preferences database that is amended before and during the broadcast in include viewer indications of:
          the distinct overhead and perspective views to be transmitted;
          the format of the transmitted overhead stream such as natural, gradient or symbolic;
          the format of each of the transmitted perspective streams such as natural or gradient;
          the detail of the metrics stream;

the inclusion of the performance tokens necessary to automate the synthesized game commentary, and the format of the audio stream such as natural or synthesized (and therefore based upon the volume and tonal maps).

selected portions of the transmitted broadcast are saved off into a historical database for use in the present and future similar broadcasts, the information including:

a database of captured game poses of the participants playing in the broadcast event stored and cross-indexed at least by participant identification and also by pose information including orientation and approximately body pose;

a database of accumulated performance information concerning the teams and participants of the current broadcast, and a database of the automatically chosen translations of descriptive tokens used to drive the synthesized game commentary.

decoding is based upon current standards such as broadcast video for television and MPEG-4 or H.264 for the Internet, including additional optional steps for:

recreating natural and/or animated backgrounds;

overlaying advertisements onto the recreated background;

overlaying graphics of game performance statistics, measurements and analysis onto the recreated background;

where the above steps of recreating the background and overlaying advertisements and other graphics are based primarily upon information including:

the three-dimensional venue layout, the relative location of the associated perspective filming camera, the transmitted pan/tilt and zoom settings for each current image, and the information available in the viewer preferences and profile dataset;

translating the decoded pixels of the foreground participants via the pre-known color tone table into true color representations to be mixed with the separately decoded grayscale overlay information;

overlaying the decoded extracted blocks of foreground participants and game objects onto the recreated background based upon the transmitted relative location, orientation and/or rotation of the extracted blocks;

adding the actual venue recordings or creating synthesized crowd noise based upon the transmitted volume and tonal maps, creating synthesized game commentary based upon the transmitted game descriptive tokens derived from the interpretation of tracking data, and inserting advertisement video/audio clips interwoven with the transmitted game activities based upon the tracked and determined game stop and re-start times.

Many of the above stated objects and advantages are directed towards subsystems that have novel and important uses outside of the scope of an Automatic Event Videoing, Tracking and Content Generation System, as will be understood by those skilled in the art. Furthermore, the present invention provides many novel and important teachings that are useful, but not mandatory, for the establishment of an Automatic Event Videoing, Tracking and Content Generation System. As will be understood by a careful reading of the present and referenced applications, any automatic event videoing, tracking and content generation system does necessarily need to include all of the teachings of the present inventors but preferably includes at least those portions in combinations claimed in this and any subsequent related divisional or continued applications. Still further objects and advantages of the present invention will become apparent from a consideration of the drawings and ensuing descriptions.

DISCLOSURE OF INVENTION

Referring to FIG. 1, the Automatic Event Videoing, Tracking and Content Generation System 1 comprises seven subsystems as follows:

1—A tracking system 100 that first creates a tracking database 101 and overhead image database 102;

2—An automatic game filming system 200 that inputs data from the tracking database 101, maintains the current pan/tilt orientation and zoom depth of all automatic cameras in center-of-view database 201 and collects film database 202;

3—An interface to manual game filming 300 that maintains the current location, pan/tilt orientation and zoom depth of all manual filming cameras in camera location & orientation database 301 and collects film database 302;

4—An automatic spectator tracking & filming system 400 that maintains the current location of all tracked spectators in spectator tracking database 401 and then collects a spectator A/V (audio/video) database 402;

5—A player & referee identification system 500 that uses image recognition of jersey numbers to update the tracking database 101;

6—A game clock and official scoring interface system 600 that updates the tracking database with clock start and stop time information, 7—A performance measurement & analysis system 700 that inputs data from tracking database 101 and creates performance analysis database 701 and performance descriptors database 702, 8—An interface to performance commentators 800 that collects V/A (video/audio) information from live commentators for storage in commentator V/A (video/audio) database 801 and inputs information from performance analysis database 701 and performance descriptors database 702 from which it generates automated commentator descriptors 802, as would be used with a speech synthesis system, 9—An automatic content assembly & compression system 900 that receives input from every database created by systems 100 through 800 in addition to three-dimensional venue model database 901 and three-dimensional ad model database 902 and then selectively and conditionally creates a blended audio/video output stream that is compressed and stored as encoded broadcast 904. Broadcast 904 is then optionally transmitted either over local or remote network links to a receiving computer system running broadcast decoder 950 that outputs automatic sports broadcast 1000.

Note that the tracking system 100, as well as aspects of the automatic game filming system 200 and the performance measurement & analysis system 700, is based upon earlier applications of the present inventors of which the present invention is a continuation-in-part. Those preceding applications are herein incorporated by reference and include:

1—Multiple Object Tracking System, filed Nov. 20, 1998, now U.S. Pat. No. 6,567,116 B1;

2—Method for Representing Real-Time Motion, filed - - -;

3—Optimizations for Live-Event, Real-Time, 3-D Object Tracking, filed - - -.

The present specification is directed towards the additional teachings of the present inventors that incorporate and build upon these referenced applications. For the purpose of clarity, only those descriptions of the tracking system 100, the automatic game Filming system 200 and the performance measurement & analysis system 700 that are necessary and sufficient for specifying the present automatic sports broadcast system 1 are herein repeated. As with these prior references, the present invention provides its examples using a description of ice hockey although the teachings included in this and prior specifications are applicable to sports in general and to many other applications beyond sports. These other potential applications will be discussed further in the Conclusion to this Specification.

Referring next to FIG. 2, there is shown tracking system 100 first comprising multiple cameras 25, each enclosed within case 21, forming fixed overhead camera assembly 20c and mounted to the ceiling above ice surface 2, such that they cover a unique but slightly overlapping section of surface 2 as depicted by camera field-of-view 20v. Images captured by each individual overhead camera assembly 20c are received by image analysis computer 100c that then creates a tracking database 101 of 2-D player and puck movement; the methods of which will be described in the ensuing paragraphs. Tracking computer 100c also receives continuous images from perspective view camera assemblies 30c that allow tracking database 101 to farther include "Z" height information, thereby creating a three-dimensional tracking dataset. The automatic game filming system 200 then inputs player, referee and puck continuous location information from tracking database 101 in order to automatically direct one or more filming camera assemblies 40c. Assemblies 40c capture the action created by one or more players 10 with puck 3 for storage in automatic game film database 202. Note that combined fields-of-view 20v of the multiple overhead cameras assemblies 20c are ideally large enough to cover player bench areas 2f and 2g as well as penalty box area 2h and entrance/exit 2e. In this way, players and referees are constantly tracked throughout the entire duration of the game even if they are not in the field-of-play or if there is a stoppage of time.

Referring next to FIG. 3, there is shown an alternate depiction of the same concepts illustrated in FIG. 2. As can be seen, tracking system 100 first comprises a matrix of camera assemblies 20c m forming a regular and complete grid over tracking surface 2 as well as the immediate surrounding entrance/exit, player rest areas 2f and 2g and penalty area 2h. Each assembly 20c is so aligned next to its neighbors such that its field-of-view 20v overlaps by ideally at least an amount sufficiently greater than the maximum size of helmet sticker 9a on player 10. In this way, sticker 9a will constantly be visible within at least one field-of-view 20v. As players such as 10 proceed from entrance 1 exit 2e onto tracking surface 2 and ultimately into and out of rest areas 2f and 2g and penalty area 2h their constant location is tracked by image analysis computer 100c. The constant location of referees, the puck and other movable game equipment such as sticks in the case of ice hockey are also tracked and recorded by analysis computer 100c. This tracking information is communicated via network in real-time to automatic game filming system 200 that controls a multiplicity of filming camera assemblies 40c placed throughout the player venue.

It should be noted that the overhead and perspective film gathered by system 100 via first overhead camera assemblies 20c and second perspective camera assemblies 30c are time synchronized with the film gathered by automatic filming camera assemblies 40c. As will be taught in the present invention, at least tracking camera assemblies 20c and 30c, and preferably including filming assemblies 40c, receive their power signals in coordination with the lighting system used in the tracking venue. As will be shown in discussion of FIGS. 5b and 5c, this allows the images captured by these camera assemblies 20c, 30c and 40c to be synchronized to the "on" cycles of the alternating current that drives the lighting system, thus ensuring maximum image brightness and consistency of brightness across multiple images. In this case, all of the cameras are controlled to be "power" synchronized to an even multiple of the alternating frequency of the power lines. This frequency will not exactly match the existing frequency of state of the art filming cameras that is built around the television broadcast NTSC standard, that is 29.97 frames per second. As will be further taught especially in discussion of FIG. 11a, there is significant advantage to further controlling the shutter of the filming camera assemblies 40c to be additionally synchronized to a finite set of allowed pan and tilt angles as well as zoom depths. This subsequent "motion" synchronization is then ideally merged with the "power" synchronization forming a "motion-power" synchronization for at least filming assemblies 40c, but also ideally for perspective camera assemblies 30c. The anticipated shutter frequency of the "motion-power" synchronized assemblies 30c and 40c may not be regular in interval, and may not match the shutter frequency of the "power" only synchronized overhead assemblies 20c. In this case, the sequence of images streaming from the "motion-power" synchronized assemblies 30c and 40c, that are potentially asynchronous in time, will be assigned the time frame equivalent to either the prior or next closest image in time captured by the overhead assemblies 20c, that are synchronous in time. In this way, all film gathered by tracking system 100 and automatic game filming system 200 will be "frame"synchronized driven by the "time-beat" or frequency of the power lines. It is expected that any differences between the actual time an image was captured from either an assembly 30c or 40c, and its resulting assigned time frame, will be minimal and for all intensive purposes undetectable to the human viewer. Hence, when a viewer is stopping and starting their review of game film taken from either the overhead assemblies 20c or the perspective assemblies 30c and 40c, they can switch between any of these multiple views with the perception that they are viewing the same exact instances in actual time, even though they may not be.

Referring next to FIGS. 4a, 4b and 4c, there is shown a sequence of illustrations describing the overall technique for determining the X-Y locations of all foreground objects via image analysis by computer 100c, while simultaneously accomplishing extraction of the moving foreground image from the fixed background. First, in FIG. 4a there is depicted player 10, wearing helmet 9 onto which is attached sticker 9a and holding stick 4 near puck 3; all of which are in view of overhead assembly 20c. Assembly 20e captures and transmits its continuous images to tracking analysis computer 100c that ultimately determines the location and therefore outlines of foreground objects such as player 10, helmet sticker 9a, stick 4 and puck 3. Subsequent FIGS. 5a through 10h will further teach the apparatus and methods illustrated in FIGS. 4a, 4b and 4e. In FIG. 4b, there is shown current image 10c taken by assembly 20c and subtracted from pre-stored background image 2r. As will be taught, this and subsequent method steps will yield extracted foreground objects such as 10e1, 10e2, 10e3 and 10e4 as depicted in FIG. 4c. In this case, foreground objects 10e1 through 10e4 are the consecutive extractions of player 10. Within each extraction, tracking analysis computer 100c additionally determines the presence of helmet sticker 9a. Once found, the centroid of sticker 9a is calculated and for instance, mapped to the center 2c of the tracking surface 2. This location mapping can be described in polar coordinates as angle 10e1a and distance 10e1r. Similarly, the location of puck 3 is tracked and mapped, for instance as angle 3e1a and distance 3e1r.

It should be noted that the actual local coordinate system used to encode object movement in optional. The present inventors prefer a polar coordinate system focused around the center of the tracking surface. However, other systems are possible including an X, Y location method focused on the designated X and Y, or "north-south/east-west" axis of the tracking surface. This X, Y method will be referred to in the remainder of the present application, as it is simpler to present than the polar coordinates method. In either case, what is important is that by storing the continuous locations matched to exact times of various objects, the tracking system 100 can relay this information in real-time across a network for instance, to both the automatic game filming system 200 as well as the performance measurement & analysis system 700. System 700 is then able to calculate many useful measurements beginning with object accelerations and velocities and leading to complex object interrelationships. For instance, player 10, captured as 10e4, is determined to have shot puck 3, captured as 3e4, at hockey goal 2h. This shot by player 10 is then recorded as a distinct event with a distinct beginning and ending time. Further derivations of information include, for example, the shooting triangle 2t formed by the detected and located end of stick 4, captured as 4e 4 and the posts of goal 2h. Such and similar "content" measurements, while touched upon in the present invention, will be the focus of an upcoming application from the present inventors.

Referring next to FIG. 5a, there is shown the preferred embodiment the matrix of overhead camera assemblies 20cm (depicted in FIG. 3) comprising one or more overhead cameras assembly groups, such as 20g-1 and 20g-2. Each group such as 20g-1, further comprises individual assemblies such as 20c-1, 20c-2, 20c-3 and 20c-4. Multiple assemblies such as 20c-1 through 20c-4, comprising a single group, such as 20g-1, each stream their captured images 10c to a dedicated image extraction hub, such as 26-1.

Subsequently, one or more extraction hubs, such as 26-1 or 26-2, stream their extracted foreground images, such as 10e-1 and 10e-2&3, and their corresponding symbolic representations, such as 10y-1 and 10y-2&3, to a multiplexing hub 28 that multiplexes these streams. One or more multiplexing hubs, such as 28, then pass their extracted image streams, such as 10es, to automatic content assembly & compression system 900 for processing. Hubs, such as 28, also pass their corresponding symbolic representation streams, such as 10ys to tracking analysis computer 100c.

Overhead camera assemblies such as 20c-1, further comprise lens 25a that focuses light from the scene in field-of-view 20v onto image sensor 25b. Sensor 25b is preferably a CMOS digital imager as is commonly available from such suppliers as National Semiconductor, Texas Instruments or Micron. Such imagers are readily available at different pixel resolutions and different frame rates in addition to monochrome versus color. The present inventors prefer using sensors from a company known as the Fill Factory who supplies a monochrome sensor with part number IBISSA-1300-M2 that can process 630×630 pixels at 60 frames per second. There equivalent color sensor part number is IBIS5A-1300-C. Image sensors 25b are controlled by a programmable processing element such as FPGA 25c. Processing element 25c retrieves captured images 10c from sensor 25b in timed synchronization with the "on" cycle of the power lines as they drive the surrounding lighting system (as will be further described along with FIGS. 5b and 5c.) Processing element 25c, of assembly 20c-1 for example, then outputs images 10c across link 27 to the input circuitry of image extraction hub 26-1. Various input/output protocols are available such as USB or Fire-wire and should be chosen based upon the frame rate of sensor 25b and the distance between processing element 25c and input circuitry to hub 26-1, among other considerations. Processing element 26a is preferably a Digital Signal Processor (DSP) that is capable of executing many complex mathematical transformations on images 10c at high speeds. Element 26a receives input of one or more image streams 10c from one or more overhead camera assemblies, such as 20c-1, 20c-2, 20c-3 and 20c-4, depending primarily upon its processing capabilities and the data input rate. Note that a single hub, such as 26-1, is capable of essentially merging the multiple fields-of-view of the individual camera assemblies, such as 20c-1 through 20c-4, into a single combined view 20w as seen by overhead tracking camera grid 20g-1. Hence, the present inventors are teaching an apparatus that co-joins multiple image sensors into a single larger virtual sensor with a proportionately increased pixel resolution and field-of-view.

Irrespective of how many individual cameras, such as 20c-1, and individual processing element 26a in a hub, such as 26-1, can simultaneously combine, (e.g. whether one, four or eight cameras,) the overall design remains identical and therefore scalable. For each incoming image 10c, from each inputting camera 20c-1, element 26a first retrieves background image 2r from hub memory 26c to be mathematically compared to yield resulting foreground object block, e.g. 10e-1. (The method preferred by the present inventors for this process of foreground extraction is discussed in more detail during the upcoming discussion of FIG. 6a.) Once foreground images, such as 10e-1, have been extracted, they will ideally comprise only the portions of image 10c that are necessary to fully contain the pixels associated with foreground objects such as player 10, helmet sticker 9a or puck 3. Sequential processing element 26b, such as a microprocessor or FPGA, then examines these extracted regions, such as 10e-1, in order to locate any helmet stickers 9a and subsequently identify a captured player, such as 10. Element 26b also creates a symbolic representation, such as 10y-1, associated with each extracted frame, such as 10e-1. This representation includes information such as:

The total foreground pixels detected in the extracted block
The total number of potential pucks located in the extracted block
Fore each potential puck detected:
    The X, Y centroid of the puck
The total number of helmet stickers detected in the extracted block
For each helmet sticker detected:
    The X, Y centroid of the identified helmet sticker
    The numeric value encoded by the helmet sticker
    The direction in which the helmet sticker is oriented
If only a single helmet sticker is detected and the number of foreground pixels counted is within the range expected for a single player,
    then a elliptical shape best fitting the foreground pixels surrounding or near the detected helmet sticker
    the vectors best representing any detected shape matching that anticipated for a player's stick
If more than one helmet sticker is detected, or if the number of foreground pixels counted indicates that more than a single player is present in the current extracted block, then:

The block is automatically split up along boundaries lines equidistant between detected helmet stickers or determined foreground pixel "weighted centers," where:
Each weighted center uses calculating steps such as X, Y histograms to determine the center locations of any preponderance of foreground pixels After determining extracted blocks such as 10e-1 and their corresponding symbolic representations, such as 10y-1, hubs, such as 26-1, output this stream to multiplexing hubs, such as 28. As will be appreciated by those skilled in the art, multiplexing hub 28 effectively joins the multiple lower bandwidth streams from one or more extraction hubs, such as 26-1 and 26-2, into two higher bandwidth streams, 10es and 10ys, for input into the next stage. The purpose for this multiplexing of streams is to reduce the number of input/output ports necessary on the computers associated with the next stages. Furthermore, the stream of extracted foreground images 10es represents a significantly smaller dataset than the sum total of all image frames 10c from all the cameras assemblies, such as 20c-1, that are required to create a single combined field-of-view large enough to encompass the entire tracking surface 2 and its surrounding areas such as 2e, 2f, 2g and 2h.

Referring next to FIG. 5b, metal halide lamps are a typical type of lighting used to illuminate large areas such as an indoor hockey rink. These lamps use magnetic ballasts that are directly coupled to the 60 Hz power lines running throughout the rink. In FIG. 5b, there is shown the 60 Hz waveform 25p of a typical power line. Ideally, all of the lighting used to illuminate the tracking area is driven from the same power lines and is therefore receiving the same waveform 25p. The metal halide lamps connected to these ballets will regularly discharge and re-ignite each half-cycle of the power line waveform 25p. Although undetectable to the naked eye, the lighting in such a configuration is actually fluctuating on and off 120 times per second. When image sensors such as 25b are being used to capture high-speed sports action, the shutter speed of assembly 20c is ideally set at $\frac{1}{500}^{th}$ to $\frac{1}{1000}^{th}$ of a second or greater. At these speeds, it is necessary to synchronize the capturing of images off of the sensor 25b to the maximum discharging 25md of energy through the lamps. Otherwise, the images will vary in ambient brightness causing degradation in image analysis performance. Although current state of the art industrial cameras do allow external control of their shutters, they are designed to capture images at the NTSC broadcast industry standard of 29.97 frames per second. At this rate, the frequency of image captures will tend to drift through the out-of-synch on-off cycle of the lamps thereby creating a pulsating dimming of the resulting image stream. The present invention uses the same power lines that drive the tracking surface lighting to drive the filming cameras. First, the 60 Hz sinusoidal waveform 25p is converted into a 60 Hz square waveform 25s that is then used by processing element 25c to trigger the electronic shutter of assembly 20c at instances that correspond to the determined maximum discharge 25md that itself corresponds to the peak of the sinusoidal wave 25p. FIG. 5b shows the series 25d1, 25d2, 25d3 through 25d8 of instances along power line waveform 25p when all of the connected lamps are expected to discharge. Also depicted is the series of signals 25s1 and 25s2 that are used by processing element 25c to controllably activate the electronic shutter of camera sensor 25b; thus accomplishing "power" synchronization of all tracking camera assemblies such as 20c and 30c as well as filming cameras such as 40c with the venue lighting and each other. The actual selection for frequency of signal 25s, programmed into processing elements such as 25c, will be the appropriate sub-integral of the power-line frequency offering the desired frame rate, e.g. 30, 60, 90, 120 fps that matches the image sensor's, such as 25b, functionality.

As will be understood by those skilled in the art, assemblies such as 20c, that capture images at a rate of 30 frames per second, are operating faster than the NTSC standard. Therefore, by dropping an extra frame over a calculated time period they can be made to match the required broadcasting standard transmission rate. For instance, every second that assembly 20c operates at 30 frames per second, it would be creating 30−29.97=0.03 more frames than necessary. To accumulate one entire extra frame it will take $\frac{1}{0.03}$=33⅓ seconds. Hence, after 33⅓ seconds assembly 20c will have captured 33.333*30=1000 images. Over this same 33⅓ seconds, the NTSC standard will have required the transmission of 33.333*29.97=999. Assembly 20c will have created 1 more frame than required by the NTSC standard which can simply be dropped.

Referring next to FIG. 5c there is depicted the same waveform 25p that has been additionally clipped in order to remove a certain number of its power cycles. By so doing, venue lighting is effectively "dimmed" to the spectator's and participant's perception. However, tracking system 100 continues to receive well lit images via assemblies 20c that remain synchronized to the remaining "on" cycles of the additionally clipped waveform 25p. It should be noted that this technique can be used to synchronize camera assemblies such as 20c, 30c and 40c to area strobe lighting thereby ensuring that images are captured only when the strobe is firing.

Referring next to FIG. 6a, there is depicted the preferable steps of the method for extracting the foreground image from the current frame as follows:

Step 1 involves capturing and storing an image of the background 2r prior to the introduction of foreground objects. For instance, an image of the ice surface 2 prior to the presence of any players 10 or puck 3.

Step 2 involves the capturing of current images 10c by cameras assemblies such as 20c, 30c or 40c. For instance, as controlled by processing element 25c to capture images off of sensor 25b in camera assembly 20c-1.

Step 3 involves the mathematical subtraction of current image 10c from background image 2r yielding subtracted image 10s. The present inventing works with either grayscale or color representations of the current image 10c. With grayscale, each pixel may for instance take on a value of 0=black to 256=white. These grayscale values are directly available in the case where the image sensor 25b is monochrome and can be easily calculated in the case where image sensor 25b is color, as will be understood by those skilled in the art. Once the image is acquired, the subtraction process is performed by processing element 26b yielding pixel by pixel difference values. Pixels that do not represent a foreground object will have minimal to no subtracted difference value from the corresponding background pixel. Element 26b then compares this difference value of the subtracted pixels to a threshold, below which the given pixel in the subtracted image 10s is treated as identical to corresponding pixel in the background image 2r. If the pixel is determined to be within the threshold considered identical, then the corresponding pixel in the subtracted image 10s is set to 0, or black, otherwise it is left alone.

Step 3a involves the pixel by pixel examination of the resulting subtracted image 10s in order to determine the minimum rectangle, bounding box 10m-bb, required to enclose any contiguous foreground object. Since Step 3 essentially removes all background pixels by setting them to a 0 value, then the foreground image is simply determined to be any pixel with a value greater than 0. The present inventors prefer searching the image in regular progression such a row by row, top to bottom. However, as will be understood by those skilled in the art, other methods are possible. For instance, the present system is ideally designed to have a minimum of two pixels on any given foreground object to be detected. In practice, there may be three pixels per inch or higher resolution while the smallest expected foreground object for hockey would be the puck 3. The diameter of a regulation size puck 3 is roughly three inches while its thickness is roughly one inch. Hence, even while rolling perfectly on its edge, puck 3 will take up at least thee pixels along one axis and nine along the orthogonal axis. For this reason, the preferred regular progression is additionally modified to first; always cover the outer edges of the frame in order to identify foreground objects that are overlapping with adjacent views 20v, and, second; to skip every "X" rows and "Y" columns. The parameters of "X" and "Y" are preferably dynamic and modifiable based upon the ongoing image analysis. For instance, at a minimum, each parameter would be set to "X"="Y"=2 pixels thereby directing the search to pick up the $1^{th}$, $4^{th}$, $7^{th}$, $10^{th}$ row and column respectively. This would reduce the total pixels to be minimally searched to 33%*33%=17% (approximately.) Under other circumstances, both parameters could be significantly increased since the next largest foreground object for ice hockey is a player's 10 glove. Such an object might take up a minimum of twenty by twenty pixels, thus allowing for "X"="Y"=20. This increase of parameter could be set under the feedback condition that indicates that the puck is not expected to be within the view 20v of a given assembly 20c or, conversely, has now been found within view 20v. Furthermore, since most often a player 10 does not loose their glove, the practical minimal object will be the player 10 or their stick. In these cases, the parameters of "X" and "Y" can be greatly increased.

During this minimal search process, once a foreground pixel is found, it is registered as the upper and lower row as well as left and right column of the newly identified object. As the search proceeds to the next column on the right in the same horizontal row, if the next pixel is also found to be greater than 0, then that column now becomes the rightmost. If the next pixel is found to equal 0, and to therefore be a part of the background, then the preferred method returns backward by ½ "X" to check the pixel in between the last detected foreground pixel and the first detected background pixel. If this pixel is greater than 0, it becomes the rightmost column and "X" is reset temporarily to "X"/4 and the search continues again to the right. If the pixel was found to be equal to 0, then the method would again search backward by ½ of ½ "X". Of course, at anytime if the fraction of "X" becomes less than 1 the search ends. A similar strategy follows from the original detected foreground pixel as the search is conducted downward to the next lowest row on the same column. However, for each additional pixel in lower rows of the same original column are determined to be greater than 0, the column by column variable searching must be conducted in both directions. Therefore, the method is followed to examine columns to the right and left. It should be noted, that once the first foreground pixel is found, then the search continues and becomes both a search to bound the foreground object as well as a search extending out to potentially find new objects. In any case, ultimately one or more foreground objects will be found and an approximate minimum bounding box 10m-bb will have been created by continually expanding the upper and lower rows as well as the left and right columns. After this approximate box is found, the present inventors prefer searching pixel by pixel along the upper, lower, left and right edges of the box. As the search takes place, for each foreground pixel detected, the search will continue in the direction away from the box's interior. In this fashion, portions of the foreground object that are extending out of the original approximate box will be detected and therefore cause the box to grow in size. Ultimately, and by any acceptable steps, the minimum box will be identified in Step 3a.

Step 4 involves examining small blocks of adjacent pixels from the subtracted image 10s in order to determine their average grayscale value. Once determined, the average grayscale value of one block is compared to that of its neighboring blocks. If the difference is below a dynamically adjustable threshold value, then the corresponding pixel in the gradient image 10g is set to 0 (black); otherwise it is set to 256 (white). Thus, wherever there is a large enough change in contrast within the subtracted image 10s, the pixels of the gradient image log are set to white forming in effect a "line-drawing" of the foreground object. Note that Step 3 may optionally be skipped in favor of creating the gradient image 10g directly from the current image 10c, thereby saving processing time.

Step 4a involves finding the minimum bounding box 2r-Bb that fully encloses the "line-drawing" created in Step 4. The upper edge of the bounding box 10m-bb is determined by finding the "highest row" in the image that contains at least one pixel of the "line-drawing." Similarly, the lower edge of the bounding box 10m-bb represents the "lowest row," while the left and right edges of the box represent the "leftmost" and "rightmost columns" respectively. Fore this purpose, the present inventors prefer employing a method exactly similar to that described in Step 3a. As will be shown in the following Step 5, this minimum bounding box 10m-bb is important as a means for removing from the current image 10c a lesser amount of information containing a foreground object.

Step 5 involves using the calculated bounding box 10m-bb, regardless of whether it is based upon the subtracted image 10s or the gradient image 10g, to remove, or "cut-out" from the current image 10c a foreground block 10e. For each current image 10c being processed by element 26b of hub 26, the above stated Steps may find anywhere from zero to many foreground blocks, such as 10e. It is possible that there would be a single foreground block 10e that equaled the same size as the original image 10c. It is also possible that a single foreground block 10e contain more than one player. What is important is that the images 10c, being simultaneously captured across the multiplicity of camera assemblies, such as 20c-1, would form a combined database too large for processing by today's technologies. And that this entire stream of data is being significantly reduced to only those areas of the surface 2 where foreground objects 10e (players, referees, equipment, the puck, etc.) are found.

Step 6 involves the processing of each extracted foreground block 10e to further set any and all of its detected background pixels to a predetermined value such as null thereby creating scrubbed block 10es. These pixels can be determined by comparing each pixel of block 10e to the background image 2r, similar to the image subtraction of Step 3. Alternatively, the image 10s could be examined within its corresponding bounding box 10m-bb. Any pixels of 10s already set to zero are background pixels and therefore can be used to set the corresponding pixel of extracted block 10e to the null value.

Step 7 involves the conversion of scrubbed block 10es into a corresponding symbolic representation 10y, as detailed above in the discussion of FIG. 5a. The present inventors prefer a representation 10y that includes symbols for helmet sticker 9a showing both its location and orientation, player 10's body and stick as well as puck 3.

Step 8 involves taking the remainder of the current image 10x, that has been determined to not contain any foreground objects, in order to "refresh" the background image 2r. In the instances of sports, where the tracking surface 2 may be for example frozen ice or a grassy field, the background itself may very slightly between successive current images 10c. This "evolving" of the background image can lead to successive false indications of a foreground object pixels. This Step 8 of "refreshing" includes copying the value of the pixel in the remainder or "leftover" portion of image 10x directly back to the corresponding pixel of the background image 2r. The preferred embodiment uses a second threshold to determine if the calculated difference between a pixel in the background image 2r and the current image I Ox is enough to warrant updating the background 2r. Also in the preferred embodiment, the background is updated with all pixels that are outside of the outermost edge of the "line-drawing" created in Step 4, rather than the bounding box 2r-Bb created in Steps 3a or 4a. As can be seen in the depiction of Step 5, there are non-foreground, i.e. background pixels that are encompassed by the minimum bounding box 2r-Bb. These pixels can also contribute to the "refreshing" step.

As will be understood by those skilled in the art, there are great efficiencies to be gained by merging all of the logical steps into a pixel-by-pixel analysis. Hence, rather than going through the entire image, pixel-by-pixel, and performing Step 3 and then returning back to the first pixel to begin Step 3a, Step 4, Step 4a, etc., Steps 1 through Step 8 can be performed in sequence on a single pixel or small group of pixels before proceeding on the next pixel or small group to redo the same sequence of Steps. The present inventors prefer this approach because it supports the least amount of memory access versus processor register to register movement and calculation.

Referring next to FIG. 6b there is depicted the full-color upper portion 10fc of a player whose jersey, helmet and face comprise, for example, four base colors tones 10ct. It is typically the case in team sports, that the entire player and uniform would have a limited number of individual colors. For instance, color C1 could be white, color C2 could be flesh, color C3 could be black and color C4 could be orange. In the case of color versus monochrome images, after all foreground objects such as 10e have been successfully extracted, then in Step 1 hub 26 will optionally further deconstruct object 10e. In the depicted case for example, full-color upper portion 10fc is separated into base color image 10bc in Step 1a and grayscale image 10fg in Step 1b. This separation is conducted on a pixel-by-pixel basis as each pixel is compared to the base color tone chart 10ct to find its nearest color. This comparison effectively determines the combination of base tone 10ct, such as C1, C2, C3 and C4, and grayscale overlay that best accounts for the original pixel value. The grayscale overlays are simply shading values between the minimum of 0, i.e. no shading, and the maximum of 256, i.e. full shading.

This end result separation from an original extracted foreground image such as 10fc into its base color image 10bc and grayscale image 10fg provide an additional significant advantage for image compression. Traditional techniques typically rely upon a three byte encoding, for instance using one byte or 256 variations per each main color of red, blue and green (RBG.) Hence, a 640 by 480 VGA resolution RGB image that includes 307,200 total pixels requires 921,600 bytes of storage to encode full color. The present invention's solution for effectively separating moving foreground objects from still and moving backgrounds provides this subsequent opportunity to limit the total colors that must be encoded for any given foreground pixel to a set of pre-known values. Hence, if the total base colors on both teams were less than sixteen, the max color encoding would be four bits or one-half byte per pixel as opposed to three bytes per pixel for RGB full color. Also, since studies have shown that the human eye has difficulty detecting more than sixteen shades, the grayscale overlay image 10fg would require and additional four bits or one-half byte per pixel. The present method taught herein would then require only ½ byte for the color tone as well as ½ byte for grayscale. The resulting 1 byte per pixel is just $\frac{1}{3}^{rd}$ of the information used in a traditional RGB method.

It should be emphasized that the present invention teaches the dropping all background pixels, or at least those outside of the minimum bounding box 10m-bb, such that the majority of pixels in any current image are potentially compressed by 100%. With respect to the remaining foreground pixels that may be potentially compressed by 66%, the present inventors prefer the creation of an additional color map 10cm (Step 2a) and grayscale map 10gm (Step 2b.) Note that outermost edge of each map, 10cm and 10gm, is identical to 10fc and represents the outline of the foreground image. By storing the inner edges belonging to each map 10cm and 10gm, it is possible to simply record a single color or grayscale value representing the color tone or grayscale value respectively, of each interior region. This method shown in Steps 2a and 2b provides potential for further increasing the image compression by recording the outline of regions of the same pixel value without requiring the interior regions to be encoded. Note a tradeoff between the methods for encoding perimeters versus the method for minimally encoding individual successive pixels. As long as the perimeter encoding method requires the same amount of data per perimeter pixel as required to minimally encode a single pixel of an entire frame, than the perimeter approach will provide additional compression opportunities. Note that upcoming FIGS. 6f and 6g focus on two preferred perimeter encoding methods.

The present inventors anticipate that the number of color tone regions needing to be encoded, as shown in 10cm, is mostly dependent upon the viewing angle of the image capture camera. Hence, the regions on a jersey are fixed by design but will tend to break into smaller regions within the camera's view as a given player bends and moves or is included by other players. However, the grayscale regions 10gm are more directly under the control of the chosen extraction method. Hence, more regions will tend to be formed as the allowed range of grayscale for any given region is lessened. This lessening of grayscale range will add to the final resultant pictures realism while adding to the overall bandwidth to encode and transmit the same information. The present inventors prefer an approach that dynamically adjusts both the levels of grayscale detected and the smallest regions allowed. Hence, by choosing to distinguish eight grayscales versus sixteen or thirty-two, in is anticipated that there will be fewer larger regions in the map 10gm. Again, these fewer regions will require less bytes to encode. Furthermore, adjacent regions determined to be of minimal grayscale difference could be merged using the average grayscale as an additional technique for minimizing region encoding.

Referring next to FIG. 6c, there is shown the same full color upper portion 10fc as depicted in FIG. 6b prior to being separated into base color image 10bc and grayscale image 10fg. In this case, full color image 10fc is first separated into all facial region 10cm-a (Step 1c) and full region with null-facial area 10cm-b (Step 2a.) As will be presented especially in association with upcoming FIGS. 11a through 11f, tracking system 100 provides detailed three-dimensional topological information that can be used to easily locate the area of any extracted foreground object that is expected to include a player's face. For instance, when viewed from overhead assemblies such as 20*c*, the player 10 depicted in perspective view full color image 10*fc* includes a helmet sticker 9*a*. Once detected by tracking system 100, sticker 9*a* provides the viewed player's identity. This same identity can be used to index to a database of preset player body and head dimensions. Using such pre-stored player head dimensions as well as the detected (X,Y, Z) location of the helmet sticker, hubs 26 are able to quickly estimate the maximum area within an extracted full color image 10*fc* that should include the player's face. (Note that since the head size of most players will be relatively similar, the present inventors prefer using a preset global head size value for all players and participants.) In addition to the measurement information leading to the location of facial region 10*cm-a*, the present inventors also note that the skin color of a participant will be in its own distinct color tone(s), such as C2 shown in FIG. 6*b*. Hence, during extraction of full color image 10*fc*, hub 26 may also create a minimum bounding box around any foreground areas where a know skin color tone, such as C2, is found. The present inventors prefer first using the topological information to locate a given player's expected facial region and then examining this maximum estimated region to see if it contains facial color tones. The region can then be collapsed or expanded as needed based upon the results of this examination. In either case, after extracting facial region 10*cm-a* from full color image 10*fc*, any foreground pixels determined to be of non-facial color tones are set to null. Conversely, in the remaining full region with null-facial area 10*cm-b*, all foreground pixels determined to be of facial color tones are set to null.

It should be noted that the present inventors anticipate the use of the present invention in sports such as basketball were the players 10 do not wear helmets. As will be discussed with upcoming FIG. 14, tracking system 100 has other methods for determining player identity apart from the use of a helmet sticker 9*a*. In this alternate approach, the location of a player 10's head region will still be available via image analysis and hence will be able to support the method taught in association with the present FIG. 6*c*. In the case of a sport such as basketball, the present inventors prefer separating the head region as shown into 10*cm-a* and representing the remaining potion of the player 10's body in full color region 10*cm-b*, even though it too will contain flesh tones, such as C2.

Referring next to FIG. 6*d*, there is shown a stream 10*es-cm* of successive facial region sub-frames 10*cm-a*1 through 10*cm-a*8 representing a given time slice of captured player 10 activity. As discussed previously in reference to FIG. 6*c*, a given extracted block 10*es* such as full color upper portion 10*fc* is expected to contain a sub-region that includes at least some of a participant's face and hair. It is anticipated that this minimum area containing the facial region 10*cm-a* of a player 10 will change in size due most often to player 10 movement or zooming of the filming camera assembly. In either case, the net effect is the same and will cause "zoomed-in" sub-frames such as 10*cm-a*4 or 10*cm-a*5 to be larger in terms of total pixels than "zoomed-out" sub-frames such as 10*cm-a*1 or 10*cm-a*8. As will be understood by those skilled in the art, in order to facilitate frame-to-frame compression, it is first desirable to align the centroids of each individual sub-frame, such as 10*cm-a*1 through 10*cm-a*8 along an axis 10*cm*-Ax. Furthermore, each sub-frame should also be placed into a standard size carrier frame 10*cm*-CF. Once each sub-frame 10*cm-a*1 through 10*cm-a*8 is centered inside an equal sized carrier 10*cm*-Cf it is then easier to find and map overlapping compressible similarities between successive sub-frames.

Note that each sub-frame such as 10*cm-a*1 through 10*cm-a*8 carries with it the row and column absolute pixel coordinates (r1, c1) and (r2, c2). These coordinates indicates where each sub-frame was lifted from with respect to the original extracted block 10*es*, such as full color upper portion 10*fc*. Since each extracted block 10*e* s itself is also mapped to the original captured image frame 10*c*, then ultimately each facial region sub-frame such as 10*cm-a*1 through 10*cm-a*8 can be refit back into its proper position in a reconstructed image meant to match original image 10*c*.

Still referring to FIG. 6*d*, depending upon their size, individual sub-frames such as 10*cm-a*1 may take up more or less space in the standard sized carrier frame 10*cm*-CF. For instance, sub-frame 10*cm-a*1 takes up less space and would need to be expanded, or digitally zoomed by 60% to completely fill the example carrier frame 10*cm*-CF. On the other hand, sub-frame 10*cm-a*5 comes from an original image 10*c* that was already zoomed in on the player 10 whose facial region 10*cm-a* it contains. Therefore, sub-frame 10*cm-a*5 would only need to be zoomed by 10% for example in order to completely fill the carrier frame 10*cm*-CF. The present inventors prefer creating a single separate Stream A 10*es-cm-db*1 for each individual player 10 as identified by tracking system 100. For each sub-frame such as 10*cm-a*1 it is necessary to maintain the associated absolute pixel coordinates (r1, c1) and (r2, c2) marking its extracted location along with its centering offset and zoom factor within carrier frame 10*cm*-CF. As will be appreciated by those skilled in the art, this information is easily obtained and operated upon and can be transmitted in association with each sub-frame such as 10*cm-a*1 so that each sub-frame may be later "unpacked" and refit into a recreation of original image 10*c*.

Referring next to FIG. 6*e*, the same stream 10*es-cm* depicted in FIG. 6*d* is shown as a series of successive facial region sub-frames 10*cm-a*1 through 10*cm-a*8 centered along axis 10*cm*-Ax and expanded to maximally fit into carrier frame 10*cm*-CF. In summary, the true movement of these facial regions has been "removed," first by extracting common compressible regions, second by aligning their centroids, and third by expanding them to roughly the same sized sub-frame pixel area. While this resultant stream 10*es-cm* is expected to be highly compressible using traditional "full motion" capable methods such as MPEG, it is further expected to be even more compressible using standards such as XYZ that is used for "minimal motion" video telecommunications. Hence, the present apparatus and methods teach a way of essentially converting "full motion" video that is best compressed using techniques such as MPEG, into "minimal motion" video, that can use simpler compression methods that typically experience significantly higher compression ratios.

Referring next to FIG. 6*f*, there is shown the preferred layout of the identifying helmet sticker 9*a* as attached, for example, to helmet 9 on upper portion 10*fc* of a typical player. Also depicted is single identifying shape 9*a-c* that comprises inner circle 9*a-c* i encompassed by outer circle 9*a-co*. The circular shape is preferred because the helmet sticker 9*a* is expected to transverse equally in every direction in three-dimensional space. Therefore, by using a circle, each overhead assembly such as 20*c* will have the maximum potential for locating and identifying a majority of each circular shape 9*a-c*. Assuming a monochrome sensor 25*b* in overhead assemblies such as 20*c*, then inner circle 9*a-ci* is preferably filled in with the shades depicted in three tone list 9*a-3t* or four tone list 9*a-4t*. Each tone list, 9*a-3t* and 9*a-4t* comprises black (0) or white (256) and a remaining number of grayscale tones spread equidistant between black and white. This method provides maximum detectable differentiation between any two adjacent inner circles 9*a-ci*. Depending upon the grayscale tone selected for inner circle 9a-ci, outer circle 9a-co is filled in with either black or white, depending upon which tone will create the greatest contrast between inner circle 9a-ci and outer circle 9a-co. This is important since preferred Step 4, depicted in FIG. 6a, will cause inner circles 9a-ci on helmet sticker 9a to be outlined during the creation of gradient image 10g. Presuming that sensor 25b detects color rather than monochrome, the present inventors anticipate optionally using distinct colors such as red, blue and green in addition to black and white within circles 9a-ci or 9a-co.

There is further depicted helmet sticker view one 9a-v1, view two 9a-v2, view three 9a-v3 (which is sticker 9a) and view four 9a-v4. Starting with view one 9a-v1, there is shown the preferred arrangement of four circles 9a-c1, 9a-c2, 9a-c3 and 9a-c4. Similar to the rational for using the circular shape, circles 9a-c1 through 9a-c4 are arranged to provide maximum viewing throughout all expected angles of orientation. It is anticipated that not all of the circles 9a-c1 through 9a-c4 will always be within the current overhead assembly view 20v, but is expected that this arrangement will increase this likelihood. Further note that since circles 9a-c1 and 9a-c4 are further apart from circles 9a-c2 and 9a-c3 (as depicted in view 9a-c1) then image analysis in hub 26 can use this to determine a "front-to-back" versus "side-to-side" orientation. The present inventors anticipate that other information detectable from extracted foreground blocks 10es of players 10 will provide adequate information to determine the player's 10 orientation without relying upon information from the helmet sticker 9a. Hence, while sticker 9a could be encoded so as to have a "front" versus "back" direction, it is preferable to simply use the sticker 9a to determine the identity of player 10. If tones are selected from chart 9a-3t, then each circle such as 9a-c1 can represent one of three distinct values, therefore providing a maximum of 3*3*3*3=81 total combinations of tones. If tones are selected from chart 9a-4t, then each circle such as 9a-c1 can represent up to 256 distinct values. Under those conditions where it would be preferable to also determine the player 10's orientation using the helmet sticker 9a, then the present inventors prefer limiting circle 9a-c1 to either black or white. In this case, circle 9a-c4 should be limited to any gray tone, (or color) but that chosen for 9a-c1. Therefore, the maximum number of unique encodings would equal 1 (for 9a-c1)*3 (for 9a-c4)*4 (for 9a-c2)*4 (for 9a-c3)=48 possible combinations. With this encoding, helmet sticker 9a, using the four quarter-tones of chart 9a-4t, would provide front-to-back orientation as well as the identification of up to 48 participants.

Referring next to FIGS. 7a, 7b, 7c and 7d, there is depicted the simultaneous capture and extraction of foreground blocks within a "four-square" grid of adjacent overhead camera assemblies, such as 20c-1, 20c-2, 20c-3 and 20c-4, each with a partially overlapping views, 20v-1, 20v-2, 20v-3 and 20v-4 respectively, of their neighbors. Within the combined view of the grid, there are players 10-1, 10-2 and 10-3 as well as puck 3. For the ease of description, it will be assumed that all of the cameras assemblies, such as 20c-1, 20c-2, 20c-3 and 20c-4 are connected to a single hub, such as 26-1. This of course is not necessary as each of the cameras could just as well be processed by a different hub 26, sharing other camera assemblies, such as 20c-5, 20c-6, etc., or even a single hub 26 per each of cameras 20c-1, 20c-2, 20c-3 and 20c-4. Specifically referring to FIG. 7a, player 10-1 is seen to be in the lower right hand corner of field-of-view 20v1. After processing the Steps as described in FIG. 6, hub 26 returns extracted block 10e1 with corners at (r1, c1) and (r2, c2). Hub 26 is preferably programmed to include Step 8 of searching the extracted blocks, e.g. in this case 10e1, for player identification stickers such as 9a-1 on helmet 9-1. Note that because of the minimally overlapping fields-of-view such as 20v1, 20v2, 20v3 and 20v4, players such as 10-1, 10-2 and 10-3 can be expected to "split" across these fields-of-view on a regular basis.

Referring next to FIG. 7b, player 10-1 and 10-2 form a single contiguous extracted block 10e2 while a portion of player 10-3 forms block 10e3. Note that when more than one players, such as 10-1 and 10-2 are is overlapping from the camera's viewpoint, it is treated as a single foreground block; regardless of the number of players in the contiguous group (i.e. 1, 2, 3, 4, etc.). Hence, hub 26 is not trying to separate individual players, such as 10-1 and 10-2, but rather trying to efficiently extract contiguous foreground objects. Further note that helmet sticker 9a-3 of player 10-3 is only partially within view 20v-2. In upcoming FIG. 7d, it will be shown that sticker 9a-3 is in full view of 20v-4. Thus, by ensuring that fields-of-view such as 20v-2 and 20v-3 always overlap by at least the size of the identifying sticker, such as 9a-3, it will always be the case that some hub, such as 26-1, will be able to determine the total number and identities of all players in a foreground block, even if that block is split. Of course, this assumes that the sticker, such as 9a-3, is sufficiently oriented to camera 25 so as to be accurately detected. While this is not always expected to be the case, it is not required that the sticker be viewed in every frame in order to track individual players.

Referring next to FIG. 7c, player 10-1 is seen to be in the upper right hand corner of field-of-view 20v3. After processing, hub 26 transmits extracted block 10e4. Referring next to FIG. 7d, a portion of player 10-1 is extracted as foreground block 10e5 while puck 3 is extracted as block 10e6. Player 10-3 is also fully in view and extracted as block 10e7. Note that puck 3 can form its own extracted block 10e6, either completely or partially overlapping the minimum bounding box 2r-Bb of any other extracted block, e.g. 10e7.

Referring next to FIG. 7e, the final compilation and analysis of the stream of extracted foreground blocks such as 10e1, 10e2, 10e3, 10e4, 10e5, 10e6 and 10e7 from hubs such as 26 is depicted. As previously stated, there is significant benefit to ensuring that for some the statistical maximum percentage, each extracted block as created by hubs such as 26-1, include either "whole players" or "whole groups of players." First, this allows hubs such as 26-1 to create an accurate symbolic representation 10y-1 of a "whole player" or 10y-2&3 of a "whole group of players," residing completely within a single extracted block such as 10e-1 or 10e-2&3, respectively. Without this benefit, then tracking analysis computer 100c must first receive and then recompile stream 10es so that it can then re-extract "whole players" and "whole groups." Thus, by reducing the number of "splits," it is possible to eliminate the need for tracking analysis computer 100c to receive, let alone process, stream 10es. Note that the few instances where a block split will occur, is expected to cause minimal degradation of the symbolic stream 10ys and the ensuing performance analysis.

The second benefit of ensuring a statistical maximum of "whole" extracted blocks such as 10e-1 and 10e-2&3 is that the resulting stream 10es is simpler to process for the automatic content assembly & compression system 900. For example, if "splitting" exceeds a necessary minimum in order to ensure quality images, then after receiving extracted stream 10e-s, each with identical time stamps, system 900 must first "re-join" any detected "split" blocks into new joined boxes. System 900 would then proceed to follow Steps exactly similar to 1 through 6 of FIG. 6b. In order to do this, such as 26-1 would then be required to additionally transmit the portions of background image 2r that corresponded to the exact pixels in the extracted blocks, such as 10e, for any detected "split blocks." Thus, "splitting" will cause additional processing load on hubs such as 26-1 and the content assembly system 900 as well as data transmission loads through multiplexing hubs such as 28. All of this can be avoided by choosing the correct layout of overhead camera assemblies 20c such that subsequent current images 10c sufficiently overlap to ensure statistical maximums of "whole" extracted blocks 10e.

In either case, weather splitting is expected and prepared for, or whether increasing the overlap of assemblies such as 20c statistically eliminates it, at least the content assembly & compression system 900, will perform the following steps on the incoming stream 10es.

Step 1 involves identifying each block such as 10e1 through 10e7 as belonging to the same time captured instance, regardless of the capturing camera assemblies, such as 20c-1 or the portions of the tracking surface 2 the block is associated with. Note that every hub, such as 26-1 and 26-2, will be in synchronization with every assembly, such as 20c-1, through 20c-4 etc., that are all in further synchronization with power curve 25p such that all current images 10c are for the concurrent instants in time.

Step 2 involves mapping each block into a virtual single view, such as 20v-a, made up of the entire multiplicity of actual views 20v, the size of the tracking area including surface 2 and any adjoining areas such as 2e, 2f, 2g and 2h. Hence, coordinates (r1, c1) and (r2, c2) associated with each extracted block 10e are translated through a camera-to-tracking-surface relationship table such that they now yield a unique set of virtual coordinates such as (f[r1], f[c1]) and (f[r2], f[c2]). Since camera assemblies 20c have overlapping fields-of-view 20v, some extracted blocks, such as 10e-1 may "overlay" other blocks, such as 10e-2 in the single virtual view 20v-a as it is constructed. After adjustments for image registration due to partial off-axis alignment between adjacent image sensors 26b, the "overlaid" potions of one block, such as 10e-1 on top of another block, such as 10e-2, will represent the same information. Hence, after piecing each of the blocks such as 10e1 through 10e7 onto single view 20v-a, system 900 will have created a single virtual image as depicted in FIG. 7e.

As previously mentioned, if the extracted block stream 10es is not sufficiently free of "split" blocks, then both tracking analysis computer 100c and content assembly & compression system 900 must now perform Steps similar to 1 through 6 as discussed for FIG. 6a, which were already performed once by hubs such as 26-1. Again, in order to perform such Steps at least including image subtraction Step 3 or gradient Step 4, hubs such as 26-1 must additionally transmit the portion of the background image 2r that matches the location of the minimum bounding boxes, such as 2r-Bb, of each extracted foreground block 10e for those blocks determined to be "split." (This determination by hubs such as 26-1 can be made by simply marking an extracted block, such as 10e, as "split" if any of its bounding edges touch the outer edge of the field-of-view, such as 20v-1 of a particular camera assembly, such as 20c-1.)

As shown, the amount of regular "splitting" of players 10 is directly related to the percentage overlap of adjacent camera assemblies 20c as depicted in FIGS. 2, 3 and 5a. When the overlap is restricted to minimally include the size of helmet sticker 9a, and thereby requiring the fewest overall assemblies 20c, then the splitting rate is statistically near maximum. In this case, image analysis computer 100c may only expect to know the identity of every player within an extracted block, such as 10e1, 10e2, 10e3, etc., assuming the sticker is appropriately visible in the current frame 10c. Individually extracted blocks cannot be expected to nearly always contain "whole players" or "whole groups of players." This particular design of the maximum spread of camera assemblies 20c and therefore minimal overlapping of fields-of-view 20v thus requires that tracking analysis computer 100c to first join all adjacent blocks such as 10e1 and 10e2 before players such as 10-1 and 10-2 can be fully outlined as shown in Steps 3a and 4a of FIG. 6a. Later in the present specification during the especially during the discussion of FIGS. 10a through 10h, two different overhead layouts will be addressed that teach how to increase the overlap between adjacent assemblies 20c. While these alternate layouts increase the total required assemblies, such as 20c-1, 20c-2, etc. to view tracking surface 2, they will inversely decrease the statistical rate of player 10 "splitting," thereby reducing the work required by tracking analysis computer 100c.

Referring next to FIG. 8, there is shown the progression of information from current image 10c1 and 10c2, to gradient image 10g1 and 10g2, to symbolic data 10s1 and 10s2 to graphic overlay 10v1 and 10v2. Prior paragraphs of the present specification have discussed the steps necessary to go from a current image, such as 10c1, to a gradient image such as 10g1; regardless of whether this is done completely in hubs 26, or first in hubs 26 and again in content assembly & compression system 900 after reforming all extracted blocks in stream 10e s. As shown in FIG. 6f, helmet sticker 9a preferably comprises four circular shapes, each taking on one of an allowed four distinct grayscale values, thereby forming 81 possible identity codes, as previously discussed. Depending upon the gray tone of its interior 9a-ci, each circle is surrounded by outer circle 9a-co whose gray tone is chosen to create the highest contrast according to the 0 to 250 detectable shades, thereby ensuring maximum shape recognition. When image 10c is processed to first get gradient 10g, these circles in sticker 9a will be detected since the difference between the surrounding grayscale and the interior grayscale for each circle will, by design, always exceed the gradient threshold. Once the individual circles are detected, the close, preset configuration of the four circles will be an indication of a helmet sticker 9a and can be found by normal image analysis techniques. The centroid (rx, cx) of the four detected circles will be used to designate the center of player 10's head 10s H. Sticker 9a is constructed to include a detectable forward orientation and therefore can be used to determine the direction a player's 10 head is facing. This orientation information is potentially helpful during later analysis by performance measurement system 700 as a means of helping to determine what play options may have been visible to any given player 10 or referee.

Assuming that there is only a single helmet sticker 9a found within the complete foreground object, such as 10e, after the location of player 10's head 10sH is determined an oval 10sB will be optimally fit around the remaining portion of the foreground object's gradient outline. In the case where multiple helmet stickers 9a are found within a single foreground object 10e, the assumption is that multiple players 10 are in contact and therefore are forming a contiguous potion of image 10c. In this case, the edge of the determined body ovals 10sB will be roughly midpoint between any two detected stickers 9a. In many cases, simply by following the outline of the gradient image towards the line segment formed by two neighboring players' helmet stickers, the limits of body circles 10s B will be evident. Similar to the orientation of the player's 10 head, using image analysis the body oval 10sB can be analyzed to determine the orientation of the player's 10 shoulders. Specifically, oval 10$s$B will approach an elliptical shape as the player stands upright. As is known, the sum of the distances of any point on an ellipse to the foci is constant. This information can be used in combination with the fact that the front of player's 10 body, and therefore the "front" of any representative ellipse, is oriented in the direction of the front of the helmet sticker 9$a$. (Hence, the front of the body is always in the forward direction of the player's 10 head that can be determined by the orientation of the sticker 9$a$.) By selecting multiple points along the "front" edge of the player's 10 gradient 10$g$ outline and for each point determining the sum of the distances to either side of the base of the player's neck (assumed to be a fixed distance from the center of the helmet sticker 9$a$) an average sum can be calculated providing the necessary equation for a shoulder ellipse. It should be noted that this ellipse will tend to be equal to or less than the larger oval that encompasses the player's 10 body. Again, it will be more equal when the player is standing upright and be less as the player is bent over. For this reason, the calculation of the ellipse should be made using "font" edge points off the player outline. The difference between the edge of the ellipse and the oval, facing the backside of player 10, can be used by performance measurement system 700 to determine valuable information concerning player stance. Again referring to FIG. 8, the symbolic data 10$s$1 and 10$s$2 will also include the stick 10$s$S. The configuration of pixels forming an extended, narrow straight line can be detected and interpreted as a player's stick 10$s$S. Both end points of the detected stick 10$s$S can be used to define its location. Referring next to FIG. 9$a$, there is shown three players, 10-5, 10-6 and 10-7 each on tracking surface 2 within view of overhead tracking assembly 20$c$. When equipped with the proper lens, an assembly such as 20$c$ affixed at twenty-five feet above the tracking surface 2, will have a field-of-view 20$v$ of approximately eighteen feet, at roughly six feet off the ice surface. At the level of the tracking surface 2, the same field-of-view 20-$v$ is approximately twenty-four feet wide. This distortion, created by the widening of field-of-view 20$v$ based upon the distance from the assembly 20$c$, limits the hub 26's ability to determine the exact (X, Y) location of a detected foreground object such as helmet sticker 9$a$-5 on player 10-5. This is further illustrated by the path of example ray 25$r$ as it transverses from helmet sticker 9$a$-6 on player 10-6 straight through helmet sticker 9$a$-5 on player 10-5. As is depicted in the inset top view, image analysis would locate the helmet stickers 9$a$-6 and 9$a$-5 at the same X+n coordinate along the image frame. As will be shown first in FIG. 9$b$ and later in FIGS. 10$a$ through 10$h$, it will be necessary that each helmet sticker, such as 9$a$-5 and 9$a$-6, be in view of at least two overhead assemblies such as 20$c$ at all times. Since the relative locations between all overhead assemblies 20$c$ will be preset, hubs 26 will be able to use standard triangulation techniques to exactly locate any foreground object as long as it is seen in two separate camera assemblies 20$c$ fields-of-view 20$v$. This is especially helpful for foreground objects such as a helmet sticker 9$a$ or puck 3, for which the triangulation technique essentially provides three-dimensional information that can be used for additional critical measurements.

Also depicted in FIG. 9$a$ is standing player 10-7 wearing helmet sticker 9$a$-7. Player 10-7 is shown to be just on the edge of field-of-view 20$v$. In this position, any images 10$c$ captured by assembly 20$c$ will not have a fall view of helmet sticker 9$a$-7. As will be taught in the specification for FIGS. 10$a$ through 10$h$, this will require that at certain field-of-view intersections, three overhead assemblies such as 20$c$ must be present since at least one view will only partially include either the player 10-7 or their helmet sticker 9$a$-7. Referring next to FIG. 9$b$, there is shown two adjacent overhead camera assemblies 20$c$-A and 20$c$-B. When assemblies 20$c$-A and 20$c$-B are in Position 1, their respective fields-of-view 20$v$-A1 and 20$v$-B1 overlap at a point 20$v$-P1. Since overlap point 20$v$-P1 is less than player height, it will be possible that a given player such as 10-1 can stand at certain locations on the tracking surface 2, such as blind spot 20$v$-H, and be essentially out of view of both adjacent assemblies' fields-of-view, such as 20$v$-A1 and 20$v$-B1. These out-of-view locations will tend to be centered mid-way between adjacent assemblies 20$c$. In order to eliminate this possibility, adjacent assemblies such as 20$c$-A and 20$c$-B can be closer in proximity as would be accomplished by moving 20$c$-B to depicted Position 2. By so doing, the new overlap point 20$v$-P2 is raised to just include the expected maximum player height thereby assuring that at least the player's helmet sticker such as 9$a$-1 will always be in view of one of the two adjacent assemblies' fields-of-view, 20$v$-A1 or 20$v$-B2.

However, as was previously taught, it is beneficial that the extracted foreground blocks 10$e$ created from the current images 10$c$ as captured by assemblies such as 20$v$-A and 20$v$-B include the entire player, such as 10-1. By so doing, there is less subsequent "stitching" work for the content assembly & compression system 900. This is because system 900 will no longer be required to join extracted blocks 10$e$ of partial images of the same player such as 10-1, who was essentially straddling two adjacent fields-of-view, such as 20$v$-A1 and 20$v$-B2. By further moving assembly 20$c$-B to Position 3, the new overlap point is now set at 20$v$-P3 that is high enough so that a single player such as 10-1 will always be completely within one adjacent assembly's field-of-view, such as 20$v$-A1 or 20$v$-B3. The present inventors prefer an even higher overlap point such as 20$v$-P4, created by moving assemblies 20$c$-A and 20$c$-B still closer together. For instance, with assembly 20$c$-A at Position 2, the resulting overlapping views 20$v$-A2 and 20$v$-B3 will be sufficient to always include a small group of players such as 10-1 and 10-2.

As was previously stated, it is preferable that each player 10, or at least their helmet sticker 9$a$, be constantly in view of at least two overhead assemblies such as 20$c$. As shown in FIG. 9$b$, there are arrangements between two adjacent cameras that ensure that either the entire player 10, or at least their helmet sticker 9$a$, are in view of at least one adjacent assembly, such as 20$v$, at all times. In the ensuing paragraphs, it will be shown that it is necessary to add an "additional second layer" of assemblies with offset fields-of-view in order to ensure that this same player 10, or their helmet sticker 9$a$, is always in view of at least two assemblies, such as 20$c$.

Referring next to FIG. 9$c$, there is shown a perspective view of two overhead assemblies 20$c$-A and 20$c$-B whose fields-of-view 20$v$-A and 20$v$-B, respectively, overlap on tracking surface 2. Specifically, once the entire matrix of overhead assemblies such as 20$c$-A and 20$c$-B have been installed and calibrated, together they will break the entire tracking surface into a grid 2-$g$ of fixed locations, such as 2-L74394. Each location, such as 2-L74394, represents the smallest recognizable area detectable by any individual assembly such as 20$c$-A or 20$c$-B. The size of each location will be based primarily upon the chosen distance between tracking surface 2 and assemblies 20$c$, optics 25$a$ and image sensor 25$c$, as will be understood to those skilled in the art. The present inventors foresee a location size equal to approximately ½ inches squared that is equivalent to the minimal area covered by a pixel for the preferred configuration of tracking system 100. What is most important is the additional information available to hubs such as 26 for the execution of foreground extraction steps such as depicted in FIG. 6a. Hence, with only a single view 20v of any given area of tracking surface 2, hub 26 can compare prior images of the background 2r with current images 10c to help extract foreground objects 10e. However, with multiple views, such as 20v-A and 20v-B of the same area of tracking surface 2, hub 26 can know additionally compare portions of the current image, such as 10c-A from assembly 20c-A with portions of the current image, such as 10c-B from assembly 20c-B.

Still referring to FIG. 9e, grid 2-g location 2L-74394 appears in four separate images as follows. First, is appears as pixel location 10c-Ap54 in current image 10c-A of assembly 20c-A. Second, it appears as pixel location 2r-Ap54 in background image 2r-A associated with assembly 20c-A. Third, it also appears as pixel location 10c-Bp104 in current image 10c-B of assembly 20c-B. And forth, it appears as pixel location 2r-B104 in background image 2r-B associated with assembly 20c-B. (It should be noted that the present inventors will teach the benefit of a triple overlapping view of the tracking surface during the discussion of FIGS. 10a through 10g. In this case a single grid location such as 2L-74394 would appear a in a third current and a third background image further supporting foreground extraction.) The benefit of using this additional information beyond the background 2r to current image 10c comparison discussed in association with FIG. 6a will be taught in this FIG. 9c as well as FIG. 9d and 9e.

With respect to this benefit, and still referring to FIG. 9c, there is also depicted lighting source 23 that casts rays 23r towards and upon tracking surface 2. As will be shown in the ensuing discussions of FIGS. 9d and 9e, rays 23r in combination with moving foreground objects will cause shadows to fall upon individual locations such as 2L-74394. These shadows may cause individual locations such as 2L-74394 to differ from their stored background equivalents, such as 2r-Ap54 and 2r-Bp104. However, as will be shown, as long as rays 2s-rA and 2s-rB reflecting off location 2L-74394 are not blocked on their path to assemblies 20c-A and 20c-B respectively, then location 2L-74394 will always be the same as represented by its current image equivalents, such as 10c-Ap54 and 10c-Bp104. Hence, if for any given time instant, the comparison of 10c-Ap54 and 10c-Bp104 results in equality within a specified minimum threshold, then the likelihood that both assemblies 20c-A and 20c-B are viewing the same tracking surface location 2L-74394 is sufficiently high. Therefore, these given pixels 10c-Ap54 and 10c-Bp104 can be set to null values with or without confirming comparisons to respective background pixels such as 2r-Ap54 and 2r-Bp104.

Referring next to FIG. 9d, there is shown the same elements of FIG. 9c with the addition of players 10-1 and 10-2. Players 10-1 and 10-2 are situated so as not to block the path of rays 2s-rA and 2s-rB as they reflect off spot 2L-74394 into assemblies 20c-A and 20c-B. However, especially player 10-1 is situated so as to block illuminating rays 23r emitted by lamp 23 causing shadow 2s on tracking surface 2.

Furthermore, shadow 2s encompasses surface location 2L-74394 and as such causes current image pixel 10c-Ap54 to differ from stored equivalent background pixel 2r-Ap54. Likewise, current image pixel 10c-Bp104 is caused to differ from stored equivalent background pixel 2r-Bp104. By using methods similar to those described in FIG. 6a, the subtraction of current image 10c-A from background image 2r-A is expected to occasionally result in the extraction of portions of shadow 2s, depending upon its intensity, as depicted by extracted block 10e-A1. Notice that as depicted in FIG. 9d, there are no actual foreground objects, such as player 10-1, that are currently in view of assembly 20c-A. Hence, the analysis of current image 10c-A and stored background image 2r-A should ideally produce no extracted block 10e-A1. Similarly, the subtraction of current image 10c-B from background image 2r-B is expected to occasionally result in the extraction of portions of shadow 2s, depending upon its intensity, as depicted by extracted block 10e-B1. In the case of assembly 20c-B as depicted, players 10-1 and 10-2 are in current view 10c-B and would therefore ideally be expected to show up in extracted block 10e-B1. However, block 10e-B1 should not also include any portions of shadow 2s.

Still referring to FIG. 9d, by augmenting the methods first taught in FIG. 6a to additionally include the step of comparing any given current pixel, such as 10c-Ap54 with its corresponding current pixel in any adjacent assemblies, such as pixel 10c-Bp104 in assembly 20c-B, it is possible to reduce the detection of shadow 2s as a foreground object. Hence, if the result of any such comparison yields equality within a minimal tolerance, then that pixel(s), such as 10c-Ap54 and 10c-Bp104, can be assumed to be a portion of the background, such as 2L-73494 and therefore set to null. Therefore, the methods and steps first taught in FIG. 6a are here further taught to include the step of making the additional comparison of current image 10c-A, captured by assembly 20c-A, to current image 10c-B, from any adjacent overlapping assembly such as 20c-B. Hence, the creation of extracted block 10e-A2 (which is empty or all null,) is based upon current image 10c-A, background image 2r-A and adjacent current image 10c-B. Likewise, the creation of image 10e-B2 (which only contains portions of players 10-1 and 10-2,) is based upon current image 10c-B, background image 2r-B and adjacent current image 10c-A. (Note, in the case of a third adjacent overlapping assembly, similar to 20c-A and 20c-B, then its current image would also be made available for comparison.) The combination of all of this information increases the likelihood that any extracted blocks contain only true foreground objects such as player 10-1 or puck 3, regardless of temporal lighting fluctuations. For outdoor sports such as football, the shadows 2s formed on the tracking surface 2 are expected to be potentially much more intense than the shadows created by indoor lighting such as depicted. Hence, by using the calibrated foreknowledge of which current pixels, such as 10c-Ap54 and 10c-Bp104, correspond to the same tracking location 2L-74394, the present invention teaches that these associated current image pixels will track together throughout changing lighting conditions and will only be different if one or more of their reflected rays is blocked by a foreground object such as player 10-1 or 10-2 or even puck 3.

Referring next to FIG. 9e, there is shown the same elements of FIG. 9d except that players 10-1 and 10-2 are now situated so as to block assembly 20c-B's view of grid location 2L-74394 on tracking surface 2. In so doing, it is significantly less likely that current pixel 10c-Bp104, now viewing a portion of player 10-1, will identically match current pixel 10c-Ap54, still viewing tracking surface location 2L-74394.

Furthermore, when taken in total, hub 26 will have a substantially increased ability to detect foreground pixels by comparing any single current pixel such as 10c-Bp104 to its associated background equivalent, 2r-Bp104, its associated current image equivalent 10c-Ap54, and that associated equivalent's background pixel 2r-Ap54. (Again, as will be taught in upcoming FIGS. 10a through 10h, with triple overlapping views of all individual tracking surface locations such as 2L-74394, at least one other current pixel and equivalent background pixel would be available to comparison.)

Still referring to FIG. 9e, there is also depicted recent average images 2r-At and 2r-Bt. Recent average image 2r-At is associated with background image 2r-A and current image 10c-A. As was previously taught in association with FIG. 6a, during Step 8 processing hub 26 "refreshes" background images, such as 2r-A and 2r-B, with the most recent detected pixel values of all determined background locations such as 2L-74394. This "refreshing" is simply the updating of the particular corresponding background pixel, such as 2r-Ap54 with the most recent value of 10c-Ap54. (Note that in FIG. 9e, background pixel 2r-Bp104 would not be similarly updated with the value of current pixel 10c-Bp104, since this pixel would be determined to be representative of a foreground object.) This resetting of value allowed the background image to "evolve" throughout the sporting contest, as would be the case for an ice surface that becomes progressively scratched as the game is played. This same purpose is beneficial for outdoor sports played on natural turf that will have a tendency to become torn up as the game proceeds. In fact, many football games are played in mud or on snow and consequently can create a constantly changing background.

However, in addition to the resetting of background images such as 2r-A with the most recently determined value of an given tracking surface location, the present inventors teach the use of maintaining a "moving average," as well as total "dynamic range" for any given location, such as 2L-74394. The "moving average" represents the average value of the last "n" values of any given surface location such as 2L-74394. For instance, if the game is outdoors and the ambient lighting is slowly changing, then this average could be taken over the last five minutes of play, amounting to an average over the last 300 values when filming at 60 frames per second. The averages themselves can be compared to form an overall trend. This trend will indicate if the lighting is slowly "dimming" or "brightening" or simply fluctuating. Along with the average value taken over some increment, as well as the trend of averages, the present inventors prefer storing a "dynamic range" of the min and max detected values that can serve to limit the minimum threshold used to distinguish a background pixel, such as 10c-Ap54 from a foreground pixel, such as 10c-Bp104. Specifically, when the current pixel such as 10c-Ap54 is compared to the background pixel 2r-Ap54, it will be considered identical if it matches within the determined dynamic range unless the recent trend and last moving average value constrain the possibilities to a narrow portion of the dynamic range. For example, even if the current pixel value, such as 10c-Bp104, for a given location such as 2L-74394, is within the total min-max determined over the course of a game, since the outdoor lighting has been steadily decreasing this value may be too bright to be consistent with the recent averages and trend of averages. Hence, in order to provide maximum information for the extraction of foreground objects such as players 10-1 and 10-2 from the background of the tracking surface 2, even when that background is changing due to either surface degradation or changes in ambient lighting, the present invention teaches the use of: 1) the current pixel from the current image and all overlapping images, 2) the associated "refreshed" background pixel from the current image and all overlapping images, and 3) the "moving average" pixel, along with its trend and "dynamic range."

Finally, and still referring to FIG. 9e, there is shown extracted block 10e-A1, that is a result of comparisons between the aforementioned current pixel information, such as 10c-Ap54 and 10c-Bp104, the background information, such as 2r-Ap54, and moving average/dynamic range information such as 2r-Ap54t.

Likewise, there is shown extracted block 10e-B2, that is a result of comparisons between the aforementioned current pixel information, such as 10c-Bp104 and 10c-Ap54, the background information, such as 2r-Bp104, and moving average/dynamic range information such as 2r-Bp104t.

Referring next to FIG. 10a, there is shown a top view diagram of the combined view 22a covered by the fields-of-view 20v-1 through 20v-9 of nine neighboring cameras assemblies, such as 20c, laid out in a three by three grid. This layout is designed to maximize coverage of the tracking surface while using the minimal required assemblies 20c. This is accomplished by having each assembly's 20c field-of-view, such as 20v-1 through 20v-9, line up to each adjacent field-of-view with minimal overlap as depicted.

As was taught in the prior paragraphs referring to FIGS. 9a and 9b, it is mandatory that the fields-of-view, such as 20v-1 and 20v-2, at least overlap enough so that their overlap point, such as 20v-P2 in FIG. 9b, is no less than the maximum expected player height. In FIG. 10a, the edge-to-edge configuration of fields-of-view 20v-1 through 20v-9 are assumed to be at the expected maximum player height, for instance 6'11" off tracking surface 2, resulting in overlap point 20v-P2, rather than at some lesser height resulting in an overlap point such as 20v-P1. If FIG. 10a were depicted at tracking surface 2 levels, the same three-by-three grid of fields-of-view 20v-1 through 20v-9 would be overlapping rather than edge-to-edge.

Referring next to FIG. 10b, fields-of-view 20v-1, 20v-4 and 20v-7 have been moved so that they now overlap views 20v-2, 20v-5 and 20v-8 by area 20v-O1, representing an overlap point similar to 20v-P3 shown in FIG. 9b. The present inventors prefer this as the minimal overlap approach to ensuring that the helmet stickers 9a on all players 10 are always in view of at least one field-of-view such as 20v-1 through 20v-9 in combined viewing area 22b.

Referring back to FIG. 10a, each edge between adjacent fields-of-view 20v-1 through 20v-9 have been marked by stitch line indicator ("X"), such as 20v-S. If a player such as 10 is straddling anywhere along an edge denoted with indicator 20v-s, then their image will be split between neighboring fields-of-view, such as 20v-1 and 20v-2, thereby requiring more assembly by content assembly & compression system 900 as previously explained. To reduce this occurrence, one solution is to further increase the overlap area as depicted by the movement of fields-of-view 20v-3, 20v-6 and 20v-9 to overlap 20v-2, 20v-5 and 20v-8 by area 20v-O2. This corresponds to overlap point 20v-P4, as shown in FIG. 9b, and increases the total number of assemblies 20c required to cover the entire tracking surface 2. This is the preferable approach if only a "single layer" of assemblies 20c is to be employed. In the ensuing paragraphs, the present inventors will teach the benefits of adding additional "layers" of offset, overlapping camera assemblies 20c. As will be discussed, while these approaches add significantly more assemblies 20c, they also provide significant benefits not possible with the "single layer" approach. For instance, they allow for three-dimensional imaging of the foreground objects such as helmet sticker 9a and puck 3. Furthermore, by overlapping "layers," each individual layer can remain further spread out. Hence, overlap areas such as 20v-O1 will be shown to be adequate over overlap areas 20v-O2.

This "second layer" approach is preferred and will ensure that each player 10's helmet sticker 9a will be in view of at least two fields-of-view 20v at all times. By ensuring two views at all times, tracking analysis system 100c will be able to more precisely determine sticker 9a's (X, Y) coordinates, as discussed in FIG. 9a, essentially because it will be able to triangulate between the views 20v of two adjacent assemblies 20c.

Furthermore, system 100c, will also be able to determine the height (Z) of sticker 9a; thereby providing an indication of a players upright stance. The third (Z) dimension enabled by the "second layer" is also extremely valuable for tracking the movement of puck 3 and stick 4. The following explanation of FIGS. 10c, 10d, 10e and 10f teach the addition of the "second layer."

Referring next to FIG. 10c, there is shown combined view 22c comprising a grid of four-by-four fields-of-view 20v, each separated by overlap 20v-O1. This combined view 22c can be thought of as the "first layer." Note that the overlap areas 20v-O1 between adjacent assemblies 20c are only in the vertical direction. Referring next to FIG. 10d, the same combined view 22c is depicted slightly differently as four elongated views such as 20v-G created by each group of four horizontally adjacent overlapping fields-of-view 20v. This depiction better isolates the remaining problem areas where extracted image 10e "stitching" will be required as players 10 move along the edges of each horizontally adjacent group, such as 20v-G. These edges, such as 20v-SL, are denoted by the squiggle lines ("~") crossing them out. However, as will be shown in FIG. 10e, rather than moving each of these groups, such as 20v-G, to overlap in the horizontal direction similar to vertical overlap 20v-O1, a "second layer" of assemblies 20c will be added to reduce or eliminate the stated problems.

Referring next to FIG. 10e, there is shown underlying first layer 22c, as depicted in FIG. 10d, with overlapping second layer 22d. Second layer 22d comprises a grid of three-by-three fields-of-view 20v similar to combined view 22a in FIG. 10b. By adding second layer 22d, such that each field-of-view 20v in layer 22d is exactly straddling the fields-of-view in underlying layer 22c, then problems pursuant to horizontal stitching lines such as 20v-SL are eliminated. The result is that only remaining problem areas are vertical stitching lines such as 20v-SL shown in FIG. 10f. However, the underlying first layer 22c is also offset from second layer 22d in the vertical direction, thereby always providing overlapping fields-of-view 20v along vertical stitching lines such as 20v-SL. Thus, the remaining problem spots using this double layer approach is now reduced to the single stitching points, such as 20v-SP, that can be found at the intersection of the horizontal edges of fields-of-view 20v in first layer 22c with the vertical edges of fields-of-view 20v in second layer 22d.

Referring next to FIG. 10g, underlying first layer 22c remains unchanged while overlapping second layer 22d has now become layer 22e. Fields-of-view in layer 22e have been vertically overlapped similar to the change made from combined view 22a in FIG. 10a to view 22b in FIG. 10b, assuming the vertical overlap of 20v-O1. This final change to second layer 22e then removes the only remaining problems associated with single stitching points such as 20v-SP. Referring next to FIG. 10h, underlying first layer 22c and overlapping second layer 22e are depicted as single fields-of-view as if they represented one camera assembly 20c for each layer. Note that the viewing area encompassed by overlapping layer 22e is now considered to be available for tracking, whereas outlying areas outside the combined view of layer 22e are not ideal for tracking even though they are still within view 22c. It is anticipated that these outlying areas will be sufficient for tracking players such as 10 in team bench areas such as 2f and 2g or in penalty areas such as 2h. Especially for redundancy principals, the present inventors prefer adding a third layer of overhead tracking cameras overlapping first layer 22c and second layer 22e. This will ensure that if a single camera assembly 20c malfunctions, whether on any layer such as 22c, 22e or the third layer not shown, that any given area of the tracking surface will still have at least two other assemblies 20c in proper viewing order, thereby enabling three-dimensional imaging.

So as to avoid any confusion, since camera assemblies 20c in first layer 22c and second layer 22e are physically offset, in practice they are preferable kept on the same horizontal plane. In this regard, the camera assemblies themselves are not forming actual "physical layers," but rather their resulting fields-of-view are forming "virtual layers."

Referring next to FIG. 11a, there is shown automatic game filming system 200, that accepts streaming player 10, referee 12 and puck 3 location information from tracking database 101 (not depicted) into center-of-view database 201. As it receives this continuous stream of individual foreground object locations and orientations, system 200 dynamically determines what game actions to follow on the tracking surface 2, such as the current location of the puck 3. System 200 then performs calculations on the tracking data as it is received to determine which of its controlled filming stations, such as 40c, will have the best view of the current and anticipated game action. (Hence, the present inventors anticipate that multiple controlled filming cameras, such as 40c, will be placed around the sports venue to offer different vantage points for filming; each of them controlled by the game filming system 200.) The calculations concerning each station 40c's field-of-view are enabled by an initial calibration process that determines the (X,Y, Z) coordinates of the fixed axis of rotation of each filming camera 45f within station 40c. These (X, Y, Z) coordinates are expressed in the same local positioning system being used to calibrate the image analysis and object tracking of system 100.

As previously discussed, system 100 is able to determine the location, such as (rx, cx) of the center of the player's helmet sticker 9a, that serves as an acceptable approximation of the current location of the player 10. Furthermore, system 100 could also determine the orientation of sticker 9a and body shape 10sB, and therefore "front" and "back" exposure of player 10. This information is valuable to system 200 as it dynamically determines which of its controlled filming stations, such as 40c, is best located to film the on-coming view of the player currently carrying the puck. Also valuable to system 200 are the identities of the players, such as 10-1 and 10-2&3 currently on the tracking surface 2. These identities can be matched against pre-stored information characterizing each player's 10 popularity and relative importance to the game action as well as tendencies to effect play by carrying the puck 3, shooting or checking. Given this combination of detailed player 10 locations and orientation as well as identities and therefore game importance and tendencies, system 200 can work to predict likely exciting action. Hence, while system 200 may always keep selected filming stations, such as 40c, strictly centered on puck movement, it may also dedicate other stations similar to 40c to following key players 10 or "developing situations." For example, system 200 could be programmed to follow two known "hitters" on opposing teams when they are detected by the tracking system 100 to potentially be on a collision course.

In any event, and for whatever reason, once system 200 has processed tracking data from system 100 and determined its desired centers-of-views 201, it will then automatically transmit these directives to the appropriate filming stations, such as 40c, located throughout the playing venue. Referring still to FIG. 11a, processing element 45a, of station 40c, receives directives from system 200 and controls the automatic functioning of pan motor 45*b*, tilt motor 45*c* and zoom motor 45*d*. Motors 45*b*, 45*c* and 45*d* effectively control the center of view of camera 45*f-cv*. Element 45*a* also provides signals to shutter control 45*e* that directs camera 45*f* when to capture images 10*c*. Note that it is typical for cameras capturing images for video streams to take pictures at the constant rate of 29.97 frames per second, the NTSC broadcast standard. However, the present invention calls for cameras that first synchronize their frames to the power curve 25*p*, shown in FIG. 5*b*, and then additionally synchronize to the controlled camera movement. Hence, stations 40*c* only capture images 10*c* when power curve pulse 25*s* occurs, ensuring sufficient, consistent lighting, in synchronization with controlled movement of motors 45*b*, 45*c* and 45*d*, such that the camera center-of-view 45*f-cv* is at a repeatable, allowed angle/depth. This tight control of image 10*c* capture based upon maximum lighting and repeatable allowed viewing angles and depths allows for important streaming video compression techniques as will be first taught in the present invention. Since element 45*a* is controlling the rate of panning, tilting and zooming, it can effectively control the movement of camera 45*f*, thereby ensuring that field-of-view 45*f-cv* is at an allowed viewing angle and depth at roughly the desired image capture rate. As previously discussed, this rate is ideally an even multiple of thirty (30) frames-per-second, such as 30, 60, 90, 120 or 240.

As camera 45*f* is controllably panned, tilted, zoomed and shuttered to follow the desired game action images such as 10*e*L, 10*c*, 10*c*R and 10*c*Z are captured of players, such as 10-1 and 10-2&3, and are preferably passed to image analysis element 45*g*. Note that analysis element 45*g*, in stations 40*c*, is similar to digital signal processor (DSP) 26*b* in image extraction hub 26 and may be itself a DSP. Also, background image memory 45*h*, in stations 40*c* is similar to memory 26*c* in hub 26. For each current image 10*c* captured by camera 45*f*, image analysis element 45*g* will first lookup the predetermined background image of the playing venue, similar to 2*r* in FIGS. 5*a* and 6, at the same precise pan and tilt angles, as well as zoom depth, of the current center-of-view 45*f-cv*. In so doing, analysis element 45*g*, will perform foreground image extraction similar to Steps 3 through 6, of FIG. 6, in order to create extracted blocks similar to 10*e* of FIG. 6. Note that the pre-stored background images, similar to 2*r* in FIGS. 5*a* and 6, are first created by running system 200 prior to the presence of any moving foreground objects. In this calibration phase, system 200 will automatically direct each camera 45*f*, in each station 40*c*, throughout all of its allowed angles and zoom depths. At each allowed angle and depth, a background image will be captured and stored in the background image memory 45*h*; that could be either computer memory or a hard drive.

During this calibration phase, it is best that the venue lighting be substantially similar to that used during actual game play. Preferably, each camera 45*f* is also equipped with a standard light intensity sensor that will capture the intensity of the ambient light of each current image 10*c*. This information is then passed along with the current image, angles, and zoom depth to analysis element 45*g*. The light intensity information can then be used to automatically scale the hue and saturation, or brightness and contrast, of either the appropriately stored background image, such as 2*r*, or the currently captured image 10*c*. In this way, if any of the venue lighting malfunctions or fluctuates for any reason during live filming, than current image 10*c* can be automatically scaled to approximate the light intensity of the background image, such as 2*r*, taken during the calibration phase.

Still referring to FIG. 11*a*, automatic filming stations such as 40*cm* ay optionally include compression element 45*i*. This element may take on the form of a dedicated chip or a microprocessor, memory and software. In any case, element 45*i* is responsible for converting either captured image stream 10*c*, or foreground extracted blocks 10*e*, into a further compressed format for both efficient transmission and storage. It is anticipated that the implemented compression of game film as stored in databases 102 and 202 could either follow the industry standard, such as the MPEG, or be implemented in custom techniques as will be disclosed in the present and upcoming patent applications of the present inventors. Note that the present inventors also anticipate that the overhead tracking system 100 may operate its camera assemblies, such as 20*c*, at or about one hundred and twenty (120) frames-per-second. In synchronization with assemblies 20*c*, the automatic game filming system 200 may then operate its camera stations, such as 40*c*, at the reduced rate of sixty (60) frames-per-second. Such a technique allows the overhead tracking system 100 to effectively gather symbolic data stream boys in advance of filming camera movements, as directed by game filming system 200. Furthermore, it is anticipated that while hubs 26 of tracking system 100 will create symbolic stream 10*ys* at the higher frame rate, they may also discard every other extracted block from stream 10*e s*, thereby reducing stream 10*es* 's effective capture rate to sixty (60) frames-per-second, matching the filming rate. This approach allows for a finer resolution of tracking database 101, which is relatively small data storage requirements, while providing a video rate for storage in overhead image database 102 and game film database 202 that is still twice the normal viewing rate of thirty (30) frames-per-second. This doubling of video frames in databases 102 and 202 allows for smoother slow-motion replays. And finally, the present inventors also anticipate that automatic game filming system 200 will have the dynamic ability to increase the capture rate of filming camera stations 40*c* to match the overhead assemblies 20*c*. Thus, as performance measurement & analysis system 700 determines that an event of greater interest is either currently occurring, or likely to occur, then appropriate notification signals will be passed to automatic game filming system 200. System 200 will then increase the frame rate from sixty (60) to one hundred and twenty (120) frames-per-second for each appropriate filming station 40*c*. Thus, automatic game film database 202 will contain captured film at a variable rate, dynamically depending upon the detected performance of the sporting contest. This will automatically provide extra video frames for slow and super-slow motion replays of anticipated important events in balance with the need to maintain smaller storage requirements for film databases 102 and 202. This concept is applicable regardless of the chosen frame rates. For example, the overhead assemblies 20*c* could be operated at sixty (60) frames-per-second, rather than one hundred and twenty (120), while the filming assemblies 40*c*, would be operated at thirty (30) frames rather than sixty (60). Or, conversely, the frames rates used for example in this paragraph could have been doubled rather than halved, as stated in the previous sentence. Referring next to FIG. 11*b*, there is shown the same elements as FIG. 11*a* with the additional depiction of two overhead tracking assemblies 20*c*-A and 20*c*-B simultaneously viewing the same area of the tracking surface 2 as the perspective view game filming camera 40*c*. As previously discussed, automatic game filming system 200 maintains continuous control and orientation tracking for each filming station 40*c*.

Hence, the current center-of-view 45*f-cv*, for any given station 40*c*, is constantly known with respect to the local three-dimensional (X, Y, Z) coordinate system used within a given venue by the present invention. Based upon the center-of-view 45*f-cv* (X, Y, Z) coordinates, associated tracking system 100 can continuously determine which overhead tracking assemblies, such as 20c-A and 20c-B are filming in the tracking area overlapping the game filming assemblies 40c's current and entire view. Furthermore, tracking system 100 can use the current images, such as 10c-A and 10c-B, the background images, such as 2r-A and 2r-B, as well as the moving average/dynamic range image 2r-At and 2r-Bt of assemblies 20c-A and 20c-B respectively, in order to create a three-dimensional topological profile 10tp of any foreground objects within the current view of station 40c. As discussed previously and to be discussed further, especially in association with FIG. 14, tracking system 100 is able to effectively determine the player, e.g. 10-1, location and orientation. For instance, starting with the helmet sticker 9a on player 10-1, as located by both assemblies 20c-A and 20e-B, the tracking system 100 is able to calculate the three-dimensional (X, Y, Z) location of the sticker 9a's centroid. Furthermore, from the downward view, system 100 is able to determine the helmet 9 shape outline 10sH as well as the body shape outline 10sB and the stick outline 10sS, as taught with FIG. 8. Using stereoscopic techniques well known to those skilled in the art, system 100 can effectively create a topological profile 10tp of a player, such as 10-1, currently in view of a filming station, such as 40c.

Referring next to FIG. 11c, there is shown the same elements as FIG. 11b with the additional depiction of topological projection 10tp placed in perspective as 10tp1 and 10tp2 aligned with filming station 40c's center-of-view 45fc. As will be understood by those skilled in the art, tracking system 100 as well as all other networked systems as shown in FIG. 1 are capable of accepting by manual input and sharing a three-dimensional model 2b-3dm1 of the tracking venue. Model 2b-3dm1 preferably includes at least tracking surface 2 and surrounding structure dimensions (e.g. with hockey the boards and glass 2b.) Furthermore, the relative coverage locations of overhead views, such as 20v-A and 20v-B, as well as locations of all perspective filming cameras such as 40c and their associated current centers-of-view 45f-cv, are calibrated to this same three-dimensional model 2b-3dm1. Thus, the entire calibrated dataset as taught by the present inventors provides the necessary information to determine exactly what is in the view of any and all filming cameras, such as 20c and 40c, at all times.

For the perspective filming cameras 40c, the current perspective view, such as 10c1, will only every contain one of two types of visual background information. First, it will be of a fixed background such as Area F as depicted in corresponding projection 10c2 of current view 10c1. (For the sport of ice hockey, Area F will typically be the boards 2b.) Or, second the visual information will be of a potentially moving background, such as Area M in corresponding projection 10c2 of current view 10c1. FIG. 11c addresses the method by which the information collected and maintained in this calibrated database that associates exact venue locations to camera views, such as 20v-A, 20v-B and 10c1, can be used to effectively determine when a perspective filming station, such as 40c, is currently viewing some or all of a potentially moving background area, such as Area M. This is important since a background area such as Area M may potentially include moving spectators and is therefore more difficult to separate from moving foreground of players, such as 10-1 and 10-2&2, using only the methods taught in association with FIG. 6a.

Furthermore, FIG. 11c addresses how this same information can be used to create projections, such as 10tp1, of a foreground object such as player 10-1 that partially overlaps a moving background such as Area M that is referred to as Area O and should not be discarded.

Still referring to FIG. 11c, once the three-dimensional topological projection 10tp is created using information from two or more overlapping overhead camera assemblies, such as 20c-A and 20c-B, current view 10c1 may be broken into one of three possible visual information areas. As depicted in projection 10c2 of current view 10c1, these three visual information areas are either Area O, Area F or Area M. Area O represents that portion(s) of the current image 10c1 in which the topological projection(s) 10tp predicts the presence of a foreground object such as player 10-1. Area F represents that portion of the current image 10c1 that is pre-know to overlap the fixed background areas already identified to the tracking system 100 and filming system 200 in three-dimensional model 2b-3dm1. The extraction of foreground objects, such as player 10-1 from these areas exactly follows the teachings specifically associated with FIG. 6a as well as FIGS. 9c, 9d and 9e. Area M represents that portion of the current image 10c1 that is pre-known to overlap the potentially moving background areas already identified to the tracking system 100 and filming system 200 in three-dimensional model 2b-3dm1.

The extraction of foreground objects, such as player 10-1, performed by image analysis element 45g of station 40c from the portions of image 10c1 corresponding to Area M, includes a first step of simply setting to null, or excluding, all pixels contained outside of the intersection of Areas M and O. The degree to which the profile exactly casts the a foreground object's outline, such as player 10-1, onto the projected current image, such as 10c2, is effected by the amount of processing time available for the necessary stereo-scopic calculations. A processing power continues to increase, hubs such as 26 will have capability in real-time to create a smooth profile. However, hub 26 will always be limited to the two dimensional view of each overhead assembly, such as 20c-A and 20c-B. For at least this reason, image analysis element 45g, will have an additional to perform after effectively discarding Area M. Specifically, those portions of Area O that overlap the entire possible range of Area M must be additionally processed in order to eliminate likely moving background pixels that have been included in Area O and is depicted as Region OM. The method for the removal of moving background pixels from Region OM includes a first step of eliminating any pixels that are outside of the pre-known base color tones 10ct as previously defined in association with FIG. 6b. Once these pixels have been removed, all remaining pixels in Region OM are assured to be the in the possible color range for the anticipated foreground objects. The identity of the participant such as player 10-1 is ideally available to analysis element 45g during this first step so that the color tones 10ct are further restricted to the appropriate team or referee colors.

After this initial removal of pixels outside of the participant(s) color tone table 10ct, all pixels in the Region OM are assumed to be a part of the foreground object and by design will appear to the observer to match the appropriate colors. A second step may also be performed in which pre-captured and stored images of Area M, exactly similar to stored images of Area F are compared to Region OM. This is helpful in the case that Area M may be either empty, or only partially filled with potentially moving objects, such as spectators 13.

Referring next to FIG. 11d there is shown a top view diagram depicting the view of perspective filming station 40c as shown in FIGS. 11a, 11b and 11c as it captures an image of a player 10-1. Also shown is topological projection 10tp in relation to top view of player 10-1 whose orientation is measured with respect to the center of view 45*f-cv*. As taught in FIG. 11*a*, filming station 40*c* ultimately receives images onto sensor 45*s*. In FIG. 11*d*, a pixel grid representing sensor 45*s* is shown with current image 10*c*2. (Note that current image 10*c*2 as shown is meant to exactly match the perspective view 10*c*1 captured by 40*c* as shown in FIG. 11*c*.)

Calculated projection 10*tp* has been overlaid onto current image 10*c*2 and is referred to as 10*tp*2. As previously discussed and as will be understood by those skilled in the art, once the locations of the fixed overhead assemblies, such as 20*c*-A and 20*c*-B as shown in particular in FIG. 11*c*, are calibrated to the fixed rotational axis of all perspective assemblies, such as 40*c*, then the calculated profile 10*tp*2 of foreground objects such as 10-1, in simultaneous view of both the overhead and perspective assemblies can be assigned pixel-by-pixel to the current images, such as 10*c*2. This of course requires an understanding of the exact pan and tilt angles of rotation of perspective assemblies, such as 40*c*, about their calibrated fixed rotational axis, along with the assemblies current zoom depth (as discussed especially in association with FIG. 11*a*.)

Still referring to FIG. 11*d*, current captured image 10*c*2 can be broken into two distinct portions referred to as Area F and Area M. As discussed in relation to FIG. 11*e*, Area F corresponds to that portion of the image whose background is known to be fixed (and generally considered to be within the "field-of-play." Conversely, Area M corresponds to that portion of the image whose background is potentially moving (and generally considered to be outside of the "field-of-play.) The movement within Area M is typically expected to be due to the presence of spectators 13 (as depicted in FIG. 11*e*.) The knowledge of the boundary lines between Area F and Area M is contained within three-dimensional model 2*b*-3*dm*2. As will be understood by those skilled in the art, model 2*b*-3*dm*2 can be determined through exact measurements and pre-established with tracking system 100 and made available view network connections to filming system 200 and all associated systems depicted in FIG. 1.

Referring next to FIG. 11*e*, there is shown the same overhead view of filming station 40*c* as it views player 10-1 that was first shown in FIGS. 11*a* through 11*c*. Now added to this top view is boards 2*b* just behind player 10-1. Shown further behind boards 2*b* are three spectators 13. Note that in hockey, the lower portion of the boards 2*b* are typically made of wood or composite materials and is opaque, and are therefore a part of fixed background Area F. However, the upper portion of boards 2*b* are typically formed using glass panels held in place by vertical metal channels. Since it is possible that stations such as 40*c* will be filming players such as 10-1 while they are within view of this upper glass portion of the boards 2*b*, then nearby spectators such as 13 may show up within the current view 10*c*2. As previously taught, it is greatly beneficial to the overall compression of images, such as 10*c*2, that the foreground objects be extracted from any and all background image portions including visible spectators 13. FIG. 11*e* shows that the side to side edges of player 10-1, which are contained in profile 10*tp*2, can delineate that portion of Area M that is expected to contain a foreground object, such as player 10-1. This foreground region is labeled as 10*c*-OM. Conversely, no foreground objects are expected to be found in that portion of Area M known to be outside of profile 10*tp*2 and is labeled as 10*c*-Mx. Hence, all pixels determined by use of pre-known three-dimensional venue model 2*b*-3*dm*2 to be within potentially moving background Area M and further determined to be outside of foreground region 10*c*-OM can be set to null value and effectively ignored during analysis (as will be further illustrated in FIG. 11*f*.)

Referring next to FIG. 11*f*, this concept is illustrated in greater detail. Specifically, image 10*c*2 as portrayed in FIG. 11*e* is first enlarged for discussion. Next, image 10*c*2 is broken into two portions based upon all pixels known to be in Area F, shown below 10*c*2 as 10*c*2-F, versus Area M, shown above 10*c*2 as 10*c*2-M. Any foreground objects may be extracted from image portion 10*c*2-F using techniques previously taught especially in relation to FIG. 6*a*. For image portion 10*c*2-M, the first step as first discussed in relation to FIG. 11*c* is to separate that portion of the image that overlaps the topological profile 10*tp*2. This separation yields region OM labeled as 10*c*2-OM and shown separately above image portion 10*c*2-M. That portion of Area M not contained in region 10*c*2-OM is not expected to contain any foreground objects and is labeled as 10*c*-Mx and its pixels may be set to null value. And finally, after separating out region 10*c*2-OM, the second step is to use the color tone table, such as 10*ct* shown in FIG. 6*b*, to examine each pixel in the region. Player 10-1 in region 10*c*2-OM is depicted to comprise four color tones C1, C2, C3 and C4. Any pixels not matching these pre-known color tones are discarded by setting them to null. Thus only foreground pixels, along with a minimal amount of moving background pixels, will be extracted. These minimal amount of moving background pixels are expected to come from image segments such as 10*c*-OMx and represent colors on spectators 13 that match the color tone table 10*ct*. Using edge detection methods well known to those skilled in the arts, it is possible to remove some of the background pixels belonging to spectators 13 and matching color tone table 10*ct*, especially if they come off of player 10-1 in a discontinuous manner. Whether or not these particular background pixels are fully removed, the present inventors anticipate that their presence will represent relatively minor image artifacts that will go largely unnoticed as game movement continues.

Referring next to FIG. 11*g*, there is shown the same overhead view of filming station 40*c* as it views player 10-1 in front of boards 2*b* and spectators 13 that was shown in FIG. 11*e*. Filming station 40*c* is now referred to as 40*c*-A. Added to its right-side is stereoscopic perspective filming assembly 40*c*-B that functions exactly similar to any station 40*c* as previously described. Station 40*c*-A and 40*c*-B are jointly mounted onto rack 40*c*-R. As will be appreciated by those skilled in the art, the pan and tilt motions of assemblies 40*c*-A and 40*c*-B can either be integrated via rack 40*c*-R or remain separately controlled while rack 40*c*-R remains fixed. The present inventors prefer a fixed rack 40*c*-R with separately controlled pan and tilt of assemblies 40*c*-A and 40*c*-B. In either case, both assemblies 40*c*-A and 40*c*-B are operated to continually follow the center-of-play as predetermined based upon overhead tracking information contained in tracking database 101. Each assembly 40*c*-A and 40*c*-B, as previously described for all assemblies 40*c*, will have synchronized its image captures to a limited number of allowed pan and tilt angles as well as zoom depths. Theoretically, since assemblies 40*c*-A and 40*c*-B are under separate operation and their movements, while similar, will necessarily not be identical it is possible that they will not be capturing images as the exact same moment in time. The present inventors prefer an approach that favors controlling the pan, tilt and zoom motions of 40*c*-A and 40*c*-B to ensure simultaneous capture. This will necessitate instances when both cameras are not identically directed towards the predetermined center-of-play. However, as will be well understood by those skilled in the art, these relatively minor "non-overlaps" will only affect the edges of the resultant images 10*c*2-A and 10*c*2-B that for other reasons such as perspective and inclusions were already less ideal for stereoscopic analysis.

Still referring to FIG. 11g, assemblies 40c-A and 40c-B capture simultaneous, overlapping images 10c2-A and 10c2-B respectively. Based upon pre-calibrated information available in three-dimensional model 2b-3dm2, each current image 10c2-A and 10c2-B is first broken into Area F, containing the know fixed background, and Area M, containing the potential moving background as previously taught. Inside of Area M can be seen visible portions of spectators 13. Working in tandem with the fixed overhead assemblies such as 20c-A and 20c-B, each current image 10c2-A and 10c2-B is also overlaid with topological projections 10p2-A and 10p2-B respectively. Each topological projection 10p2-A and 10p2-B defines Area O within images 10c2-A and 10c2-B respectively. Within each Area O are images 10-1A and 10-1B of player 10-1 and small visually adjoining portions of background spectators 13. Selected visible portions of player 10-1, such as exterior edge point 10-1Ee are simultaneously detected by stereoscopic assemblies 40c-A and 40c-B as depicted as points 10-1Ee-A and 10-1Ee-B in images 10c2-A and 10c2-B respectively. As is well known in the art, stereoscopic imaging can be used for instance to determine the distance between each assembly 40c-A and 40c-B and exterior edge point 10-1Ee. For that matter, and distinctly recognizable feature found in both images 10c2-A and 10c2-B that resides on a foreground object such as 10-1, can be used to determine the distance to that feature and therefore player 10-1. The present inventors are aware of other systems attempting to use stereoscopic imaging as a primary means for locating and tracking the positioning of players, such as 10-1. As is taught is this and prior related applications, the present inventors prefer using the overhead tracking system to determine player location. The main purpose for the addition of stereoscopic assembly 40c-B as shown in FIG. 11g is to provide additional information for edge detection along the perspective view of all foreground objects such as 10-1 in the primary image 10c2-A, especially as they are extracted out of moving backgrounds with spectators such as 13. This additional information is depicted as moving background points 13-Ee-A and 13-Ee-B. Specifically, background point 13-Ee-A will show up just to the left of point 10-1Fe-A within image 10c2-A. Similarly, point 13-Ea-B will show up just to the left of point 10-1Fe-B within image 10c2-B. Since these points are physically different, upon comparison, there is a probability that they will be different, especially when taken along the entire edge of foreground objects such as 10-1. Since point 10-1Ee within images 10c2-A and 10c2-B will show up with highly similar color tone and grayscale components, this dissimilarity between 13-Ee-A and 13-Ee-B will be a strong indication of a non-foreground pixel, especially if either background pixels color tone is not in the list of pre-known tones as discussed in relation to FIG. 6b. Furthermore, either of these points 13-Ee-A and 13-Ee-B may match their respective pre-known background image pixels associated the current pan, tilt and zoom coordinates of their respective assemblies 40c-A and 40c-B. This will also be a strong indication that the point is not a foreground pixel. Hence, in combination with the pre-known backgrounds associated with images 10c2-A and 10c2-B as taught especially with respect to FIG. 11a, this second offset stereoscopic image 10c2-B is anticipated to further help identify and remove moving background points such as 13-Ee-A from main image 10c2-A.

Referring next to FIG. 11h, the present inventors depict in review the use of topological profile 10p2-A to remove the portion of Area M outside the profile 10p2-A. Those pixels outside of Area O as defined by profile 10p2-A are set to null and ignored. Also depicted in FIG. 11h are exterior edge point 10-1Ee-A and interior region edge point 10-1Re-A. While interior region point 10-1ReA is along the edge of the foreground object such as player 10-1, it differs from exterior edge point 10-1Ee-A this portion of the edge of player 10-1 not viewable or easily view from the overhead assemblies such as 20c. Essentially, within Area M, within topological profile 10p2-A, the edges including points such as 10-1Re-A cannot rely upon information from the overhead image analysis of tracking system 100 in order to help separate foreground from moving background pixels.

Referring next to FIG. 11i, there is shown in review Region OM, a subset of Area M as enclosed by topological projection 10p2-A. Within Region OM that contains primarily foreground objects such as 10-1, there is anticipated to be a small area along the edges of the captured image of player 10-1 that will spatially adjoin portions of the background spectators 13 that have not been removed via the profile 10p2-A; for instance, to the left of point 10-1Ee-A. Since the topological profiles such as 10p2-A are calculated based upon the overhead view of the upper surfaces of players such as 10-1, it is possible that there will be sizable portions of Region OM that will contain background spectator 13 pixels. For instance, if from the perspective view of an assembly such as 40c-A, a player 10-1's arm is outstretched in Region OM, then the upper surface will limit the depth to which the calculated topological profile such as 10p2-A extends down towards Area F. This situation is expected to occur frequently and will create larger portions of Region OM, shown as internal region 10-1-Ir-A, where moving background pixels may be visible in image 10c2-A. In the example of FIG. 11i, portions of spectators 13 can be viewed in image 10c2-A directly under the player 10-I's outstretched arm but still above the top of Area F. These moving background pixels of spectators 13 ideally need to be separated from foreground image of 10-1 in an efficient manner. As will be understood by those skilled in the art, the capturing of stereoscopic image 10c2-B will provide slightly skewed views of the moving background such as spectators 13 behind foreground player 10-1. This skewing increases the probability that the same spatially located pixel in images 10c2-A and 10c2-B will contain different portions of the actual moving background, such as spectators 13 or pre-known background. The present inventors anticipate that the comparison of companion stereoscopic pixels in image 10c2-B against those of 10c2-A during the standard edge detection will result in higher accuracy in less computing time.

Referring next to FIG. 11j, there is shown a top view drawing of tracking surface 2 surrounded by boards 2b. Inside the playing area defined by tracking surface 2 can be seen player 10-1 while outside are spectators 13. Perspective filming assemblies rack 40c-R as first shown in FIG. 11g has been augmented to include third filming assembly 40c-C. Similar to assembly 40c-B, assembly 40c-C collects stereoscopic images simultaneous to main filming assembly 40c-A. As was discussed in relation to FIG. 11g through FIG. 11i, the use of additional stereoscopic assemblies 40c-C and 40c-B provides additional comparison pixels such as would represent spectator 13 points 13-Ee-C and 13-Ee-B, respectively. This additional moving background information, especially in combination with pre-captured background images corresponding to assemblies 40c-A, 40c-B and 40c-C's current pan, tilt and zoom coordinates, helps to remove unwanted moving background pixels.

Also depicted in FIG. 11j are additional angled overhead assemblies 51c-A through 51c-J that are oriented so as to capture fixed images of any potential moving background just over the edge of playing surface 2 and in the case of ice hockey boards 2b. Specifically, each angled overhead assembly such as 51c-B is fixed such that its perspective view 51v-B overlaps each adjacent angled overhead assembly such as 51c-A and 51c-C's perspective views as shown. Thus all angled overhead assemblies such as 51c-B for a single contiguous view of the boundary region just outside of the tracking surface 2. Preferably, each view such as 51c-B is large enough to cover at least some portion of tracking surface 2 or in the case of ice hockey boards 2b. Furthermore, each view should encompass enough of the background so as to include any portions of the background any filming assembly such as 40c-A might potentially view as it pan, tilts and zooms. Therefore, assemblies such as 51c-B are set at an angle somewhere between that of the perspective filming assemblies such as 40c-A and a directly overhead tracking assembly such as 20c.

Similar to techniques taught by the present inventors for overhead tracking assemblies such as 20c, each angled overhead assembly such as 51c-B is capable of first capturing a background image corresponding to its fixed angled viewing area 51v-B prior to the entrance of any moving background objects such as spectators 13. During the ongoing game, as moving background objects such as 13 pass through the view of a given overhead assembly such as 51c-B, using image subtraction techniques such as taught in relation to FIG. 6a, the tracking system can determine which background image pixels now represent a moving background versus a fixed background. As will be understood by those skilled in the art, with proper calibration, overhead assemblies such as 51c-B can be mapped to the specific background images pre-captured by filming assemblies such as 40c-A that correspond to the same portions of the playing venue. In practice, any given filming assembly such as 40c-A will have a limited panning range such that it effectively will not film 360 degrees around the tracking surface. For instance, filming assemblies 40c-A, 40c-B and 40c-C may only be capable of panning through backgrounds viewed by angled overhead assemblies 51c-A through 51c-G. Regardless of the exact mappings, what is important is that the angled overhead assemblies such as 51c-B provide key additional information concerning the potential moving background area that may at times be in view of one or more filming assemblies such as 40c-A.

By capturing this information continuously, a mapped database can be maintained between the angled images such as encompassed by view 51c-B and the stored pre-captured background images for the corresponding pan, tilt and zoom coordinates appropriate to each filming assembly such as 40c-A that is capable of viewing the identical area. In some instances, as players such as 10-1 approach the edge of the tracking surface, or in the case of ice hockey come up against boards 2b, the views of angled overhead assemblies such as 51c-B will be partially blocked. However, due to their higher placement angles, fixed assemblies 51c-B will always detect more of the moving background that perspective assemblies such as 40c-A. Furthermore, as will be understood by those skilled in the art, since the fixed assemblies are constantly filming the same area as encompassed by views such as 51c-B, they can form a model of the spectators 13 including their colors and shading. As will be understood by those skilled in the art, by using motion estimation techniques and preset determinations concerning the range of possible motion between image frames, blocked view of spectators can be adequately predicted thereby facilitating moving background pixel removal in Region OM.

Referring next to FIG. 12, there is shown an interface to manual game filming 300, that senses filming orientation and zoom depth information from fixed manual filming camera assembly 41c and maintains camera location & orientation database 301. Interface 300 further accepts streaming video from fixed assembly 41c for storage in manual game film database 302. During calibration, camera location & orientation database 301 is first updated to include the measured (x, y, z) coordinates of the pan/tilt pivot axis of each fixed filming assembly 41c to be interfaced. Next, the line-of-sight 46f-c v of fixed camera 46f is determined with respect to the pan/tilt pivot axis. It is possible for the pivot axis to be the origin of the line of sight, which is the preferred case for the automatic filming stations 40c discussed in FIG. 1a. Once confirmed, this information is recorded in database 301. During a game, it is expected that fixed camera 46f will be forcibly panned, tilted and zoom by an operator in order to re-orient line of sight 46f-c v and therefore current image 10c. As camera 46f is panned, optical sensors, typically in the form of shaft encoders, can be used to determine the angle of rotation. Likewise, as fixed camera 46f is tilted, optical sensors can be used to determine the angle of elevation. Such techniques are common and well understood in the art. International patent PCT/US96/11122, assigned to Fox Sports Productions, Inc., specifies a similar approach for determining the current view of manual filming cameras at a sporting event. By adding additional electronics to the zoom controls 46t on camera 46f, the zoom depth of the current image 10cm ay also be detected. Processing element 46a is responsible for taking the current pan and tilt readings along with the current zoom depth and updating image analysis element 46g that is constantly receiving current images 10c from fixed camera 46f via splice 46x. The first goal, as is similar to that purposed by Fox Sports in the aforementioned patent, is to simply record the detected viewing angle and depth for each acquired image 10c. This information becomes useful when attempting to determine what potential players and game objects were in the view of each individual manual-filming camera similar to 46f. The system described in the Fox patent was only capable of tracking the movement of the game object, such as puck 3, and did not specify a solution for tracking players, such as 10. As such, it was primarily concerned with understanding where the tracked game object, such as puck 3, was in the current manually captured image 10c. The present invention further specifies the necessary apparatus and methods for tracking and identifying individual players, such as 10, and referees, such as 12. It is anticipated that as manual game film is collected, database 302 not only stores the individual frames 10c but also the corresponding orientation and depth of the camera 46f field-of-view 46f-cv. Using this stored camera orientation and depth information, the tracking system 100 can determine which players and referees where in which camera views at any given moment. System 100 is further able to determine of the visible players 10 and referees 12, what is their orientation with respect to each fixed camera, such as 46f, and therefore whether or not the current view 46f-cv is desirable. Automatic content assembly & compression system 900 will use this information to help automatically select the best camera angles to be blended into its encoded broadcast 904. This mimics the current human based practice in which a producer views continuous feeds from multiple manual filming cameras and then determines which views contain the most interesting players and camera angles for the currently unfolding game play.

Also referring to FIG. 12, the present inventors anticipate modifying the typical manually operated filming assembly, such as 41c, so that it is panned, tilted and zoomed via an electronic control system as opposed to a manual force system. This concept is similar to the flight controls of a major aircraft whereby the pilot manually operates the yoke but is not physically connected to the plane's rudders and flaps. This "fly-by-wire" approach uses the yoke as a convenient and familiar form of "data input" for the pilot. As the pilot adjusts the yoke, the motions are sensed and converted into a set of control signals that are subsequently used to automatically adjust the plane's flying control mechanisms. In a similar view, the present invention anticipates implementing a "film-by-wire" system for manually controlled assemblies, such as 41c. This approach will allow for the operator to, for instance, move a joystick and view the camera film through a monitor or similar screen. As movements are input through the joystick, the processing element sends the necessary signals to automatically adjust the camera's position via panning and tilting motors as well as electronic zoom control. This is similar to the automatically controlled stations 40c specified in FIG. 11a. With this approach, the manual filming camera is also modified to only capture images 10c at allowed pan/tilt angles and zoom depths, again similar to automatic filming stations 40c. Image analysis element 46g is then able to recall pre-captured and stored background images from memory 46h corresponding to the current camera orientation and depth. As was taught for automatic filming stations 40c, this technique of limiting current images 10c to those with matching background images provides a means for greater video compression by compressor 46i that uses the backgrounds to extract minimal foreground information as discussed in FIG. 6a.

Referring next to FIG. 13, there is shown an interface to manual game filming 300, that senses filming orientation and zoom depth information from roving manual filming camera assembly 42c and maintains camera location & orientation database 301. Interface 300 further accepts streaming video from roving assembly 42c for storage in manual game film database 302. Camera location & orientation database 301 is first updated during calibration to include the measure (x, y, z) coordinates of predetermined line-of-sight 47f-cv of each roving filming camera 47f to be interfaced. Each cameras line-of-sight 47f-cv will be predetermined and associated with at least two transponders 47p-1 and 47p-2 that are attached to roving camera 47f. As will be understood by those skilled in the art, various technologies are either available or coming available that allow for accurate local positioning systems (LPS.) For instance, radio frequency tags can be used for triangulating position over short distances in the range of twenty feet. Newer technologies, such as Time Domain Corporation's ultra-wide band devices currently track transponders up to a range of approximately three hundred feet. Furthermore, companies such as Trakus, Inc. have been working on microwave based transmitters to be placed in a player's helmet that could alternatively be used to tracking the roving camera assemblies 42c. Regardless of the LPS technology chosen, transponders 47p-1 and 47p-2 are in communication with a multiplicity of tracking receivers, such as 43a, 43b, 43c and 43d, that have been placed throughout the area designated for movement of the roving camera assembly 42c. Tracking receivers such as 43a through 43d are in communication with transponder tracking system (LPS) 900 that calculates individual transponder coordinates based upon feedback from receivers, such as 43a through 43d. Once each transponder 47p-1 and 47p-2 has been individually located in the local (x, y, z) space, than the two together will form a line segment parallel to the line-of-sight 47f-cv within camera 47f. Coincident with this determination of line-of-sight 47f-cv, the electronic zoom of camera 47f will be augmented to read out the currently selected zoom depth. This information can then either be transmitted through one or both transponders 47p-1 and 47p-2 or be transmitted to via any typical wireless or wired means. Together with the line-of-sight 47f-cv, the current zoom setting on camera 47f will yield the expected field-of-view of current image 10c.

Also depicted in FIG. 13, there is shown two overhead tracking assemblies 20c-A and 20c-B each with fields-of-view 20v-A and 20v-B, respectively. Using the combination of information derived by tracking system 100, namely the relative locations and orientation of players, such as 10-1 and 10-2, as well as the determined field-of-view 47f-ev of roving camera 42c, system 900 can ultimately determine which players, such as 10-1, are presently in view of which roving cameras assemblies, such as 42c. This information aids system 900 as it automatically chooses the best camera feeds for blending into encoded broadcast 904.

Referring next to FIG. 14, there is shown a combination block diagram depicting the player & referee identification system (using Jersey numbers) 500 and a perspective drawing of a single player 10. Player 10 is within view of multiple ID camera assemblies, such as 50c-1, 50c-2, 50c-3 and 50c-4, preferably spread throughout the perimeter of the tracking area. Also depicted is a single representative overhead tracking assembly 20c with overhead view 20v of player 10. Using overhead views such as 20v, tracking system 100 is able to determine player 10's current location 10loc and orientation 10or with respect to a preset local coordinate system. Location 10loc and orientation 10or are then stored in tracking database 101. Using this and similar information from database 101, ID camera selection module 500a of identification system 500 is able to select an individual ID camera assembly, such as 50c-1, that is best positioned for a clear line-of-sight of the back of a player's 10's jersey. Selection module 500a maintains a database 501 of the current camera location & orientation for each ID assembly such as 50c-1 through 50c-4. Each assembly, such as 50c-1, comprises an ID camera similar to 55f under direct pan, tilt and zoom motor control as well a shutter control from a processing element 55a, similar to automatic filming stations 40c. This element 55a ensures that the shutter of camera 55f is only activated when both the lamps providing ambient light are discharging and the camera 55f is at an allowed pan, tilt and zoom setting. Using pre-known information regarding typical helmet 9 dimensions and player 10 sizes, the captured images 55c are automatically cropped by image analysis element 55g to form a minimal image 503x in which the player's jersey number and name are expected to reside. This minimal image 503x is transmitted back to pattern matching and identification module 500b for pattern matching with the pre-known set of jersey backs stored in database 502. Similar to automatic filming assemblies 40c, id assemblies, such as 50c-1, are capable of pre-capturing and saving backgrounds, similar to 2r, shown in FIGS. 5a and 6, from allowed limited pan and tilt angles as well as zoom depths for ID camera 55f. Hence, minimal image 503x can be further limited to only foreground image pixels after elimination of the background using techniques similar those shown in FIG. 6a.

Pattern matching and identification module 500b uses pre-known jersey images & (associated) players database 502 in order to conduct standard pattern matching techniques, as are well known in the art. Note that the player & referee identification system 500 is only necessary if the helmet stickers such as 9a are not being used for any reason (such as would be the case in a sport like basketball where players, such as 10, are not wearing helmets, such as 9.) When used, system 500 is expected to receive images such as 503x off of selected players, such as 10, at the maximum capture rate designed for id camera assemblies, such as 50c-1. For example, this may yield between 30 to 60 minimal images 503x per second. In practice, the present invention is expected to only perform jersey identification of a player, such as 10, when that player either first enters the view of tracking system 100 or merges views with another player. Furthermore, it is expected that simple bumping into other players, such as 10, or even players clumping together, such as 10-2&3 (shown in previous figures,) will still not cause tracking system 100 to loose the identity of any given player. Hence, once identified by this jersey pattern match method, the player 10's identity is then fed back to the tracking database 101 by identification module 500b thus allowing tracking system 100 to simply follow the identified player 10 as a means for continuing to track identities. When tracking system 100 encounters a situation where two or more players, such as 10-2 and 10-3, momentarily merge such that they are no longer individually discernable, then when these same players are determined to have separated, system 100 will request that identification system 500 reconfirm their identities. In such as case, tracking system 100 will provide a list of the players in question so that identification module 500b can limit its pattern matching to only those jersey's worn by the unidentified players.

Referring next to FIG. 15, there is show two Quantum Efficiency Charts for a typical CMOS sensor available in the commercial marketplace. Specifically, the upper chart is for the part number????, a Monochrome sensor sold by the Fill Factory of Belgium; while the lower chart is for their Color sensor, part number???. With respect to the Monochrome Chart 25q-M, it is important to note that the sensor is primarily designed to absorb frequencies in the visible spectrum ranging from 400 nm to 700 nm, where its quantum efficiency peaks between 500 nm and 650 nm. However, as is evident by reading Chart 25q-M, this sensor is also capable of significant absorption in the near IR range from 700 nm to 800 nm and beyond. In this near IR region, the efficiency is still roughly 60% of the peak. Although not depicted in Chart 25q-M, the monochrome sensor is also responsive to the WVA frequencies below 400 nm with at least 40% to 50% of peak efficiency. As will be discussed in more detail with reference to FIGS. 16a, 16b and 16c, the Color sensor as depicted in Chart 25q-C is identical to the monochrome sensor excepting that various pixels have been covered with filters that only allow restricted frequency ranges to be passed. The range of frequencies passed by the filter are then absorbed by the pixel below and determine that individual pixel's color sensitivity. Hence, pixels filtered to absorb only "blue light" are depicted by the leftmost peak in Chart 25q-C that ranges from approximately 425 nm to 500 nm. Similarly, pixels filtered to absorb only "green light" are shown as the middle peak ranging from 500 nm to 600 nm. And finally, the rightmost peak is for "red light" and ranges from 600 nm to roughly 800 nm. The present inventors taught in prior applications, of which the present application is a continuation, that it is beneficial to match non-visible tracking energies emitted by surrounding light sources with special non-visible, or non-visually apparent coatings, marking important locations on players and equipment, along with the absorption curves of the tracking cameras. This matching of emitted non-visible light, with non-visible reflecting marks and non-visible absorbing sensors provided a means for tracking specific locations on moving objects without creating observable distractions for the participants and spectators. The present invention will expound upon these teachings by showing the ways in which these non-visible tracking energies can be effectively intermeshed with the visible energies used for filming. In this way, a single view, such as 20v or 40f-cv, of the movement of multiple objects can be received and effectively separated into its visible filming and non-visible tracking components.

Referring next to FIG. 16a, there is depicted a typical, unmodified 16 pixel Monochrome Sensor 25b-M. Each pixel, such as 25p-Ml, is capable of absorbing light frequencies at least between 400 nm to 900 nm as depicted in Chart 25q-M. Referring next to FIG. 16b, there is depicted a typical, unmodified 16 pixel Color Sensor 25b-C. Each "blue" pixel, such as 25p-B, is capable of absorbing light frequencies primarily between 400 nm to 500 nm. Each "green" pixel, such as 25p-G, is capable of absorbing light frequencies primarily between 500 nm to 600 nm while each "red" pixel, such as 25p-R, absorbs primarily between 600 nm to 800 nm. Referring next to FIG. 16c, there is show a novel arrangement of pixels as proposed by the present inventors. In this new Monochrome/IR Sensor 25b-MIR, every other pixel, such as 25p-M, is filtered to absorb frequencies primarily between 400 nm to 700 nm (rather than to 800 nm), while the remaining pixels, such as 25p-IR are filtered to absorb primarily between 700 nm to 800 nm. The resulting sensor 25b-MIR, is then capable of alternately being processed as a visible light monochrome image that has advantages for image analysis as taught especially in FIG. 6a, and a non-visible light IR image that will yield information concerning specially placed non-visible markings on either the players or their equipment. The resulting intermeshed monochrome/IR image offers significant advantages for image analysis as will be further discussed in the specification of FIG. 17.

Referring next to FIG. 16d, there is depicted a standard RGB double prism that is typically used to separate the red, green and blue frequencies of light so that they can then be directed to three distinct imaging sensors. This configuration is often found in commercially available 3-CCD cameras. In the present configuration, light ray 25r passes through lens 24L and is first refracted by prism 24P-1. This refraction is designed to separate the frequencies ranging from 400 nm to 500 nm away from ray 25r, thereby forming ray 25r-B (blue light) that is then reflected off the back of lens 24L, through sensor lens 24L-1 onto monochrome sensor 25b-M1. The remaining portion of ray 25r passes through prism 24P-1 and is then further refracted by prism 24P-2. This second refraction is designed to pass the frequencies from 500 nm to 600 nm through as 25r-G (green light) while separating the frequencies from 600 nm through 800 nm off as 25r-R (red and near-IR light). Ray 25r-G continues through sensor lens 24L-2 onto monochrome sensor 25b-M2. Ray 25r-R is subsequently reflected off the back of prism 24P-1, through sensor lens 24L-3 onto monochrome-IR sensor 25b-MIR. This configuration provides many benefits including; 1—the ability to process the image in full color, with maximum pixels per red, green and blue, 2—the ability to precisely overlay and interpolate the color images in order to form a monochrome image, and 3—the ability to detect reflections of the non-visible IR tracking energy due to the unique construction of the monochrome-IR sensor 25b-MIR. The benefits of this arrangement will be further described in the specification of FIG. 17.

Referring next to FIG. 16e, a variation of the typical two-prism lens system commercially available for separating red, green and blue frequencies. Specifically, this second prism is removed and the angles and reflective properties of the first prism are adjusted, as is understood by those skilled in the art, so that the frequencies of 400 nm to 700 nm, represented as ray 25r-VIS (visible light), are separated from the frequencies of 700 nm and higher, represented as ray 25r-IR (near IR). In this configuration, visible light ray 25r-VIS passes through prism 24P and continues through sensor lens 24L-2 onto color sensor 24b-C. Near IR ray 25r-IR is subsequently reflected off the back of lens 24L and through sensor lens 24L-1 onto monochrome sensor 25b-M. This resulting configuration requires one less sensor than the arrangement taught in FIG. 16d while still providing both a color image (also monochrome via interpolation,) and an IR image for detecting reflections of the non-visible IR tracking energy. This arrangement will exhibit less color fidelity since the visible light frequencies for 400 nm through 700 nm are detected by a single sensor, rather than the three sensors specified FIG. 16d. The present inventors prefer using a commercially available product referred to as a "hot mirror" as the single prism 24P. These "hot mirrors," as sold by companies such as Edmund Optics, are specifically designed to reflect away the IR frequencies above 700 nm when aligned at a 45° angle to the oncoming light energy. Their traditional purpose is to reduce the heat buildup in an optical system by not allowing the IR frequencies to enter pass through into the electronics. This non-traditional use of the "hot mirror" as the prism in a two lens system will provide the novel benefit of creating a color image of the subject matter with a simultaneous, overlapped IR image in which "non-visible" markings can be discerned.

Referring next to FIG. 16f, there is depicted the same lens, prism sensor arrangement as described in FIG. 16e except that visible ray 25e-VIS passes through sensor lens 24L-2 onto a monochrome sensor 25b-M rather than a color sensor 25b-C. This configuration offers the advantage of directly providing a monochrome image, that is often preferred for machine vision applications, without the processing requirements associated with interpolating a color image to get the monochrome equivalent, thereby allowing for faster image processing. Note that the image is still alternately available in the overlapped IR view via the monochrome sensor that receives ray 25r-IR through lens 24L-1. Furthermore, the "hot mirror" discussed in FIG. 16e is also equally applicable to FIG. 16f.

Referring next to FIG. 17, there is shown the three fundamental steps being taught in the present invention for: first, extracting foreground objects such as players 10-1 and 10-2&3; second, searching extracting objects in the intermeshed non-visible frequencies such as IR, in order to best locate any specially placed markings similar to 5; and third, creating a motion point model as taught in prior applications by the present inventors. Specifically, referring to Step 1 in FIG. 17, there is shown the extracted player images 10-1 and 10-2&3. The preferred extraction process is exactly similar to that described in FIG. 6a which is readily performed using fixed cameras such as overhead tracking assemblies 20c as depicted in FIG. 5a.

For perspective filming, the present invention teaches the use of automatically controlled filming assemblies such as 40c in FIG. 11a. These assemblies 40c are built to facilitate foreground extraction by limiting image capture to allowed angles of pan and tilt as well as zoom depths for which prior background images may be pre-captured, as previously described. Whether using overhead assemblies 20c or filming assemblies 40c, after the completion of Step 1, those pixels determined to contain the foreground object such as 10-1 and 10-2&3, will have been isolated.

In Step 2, the equivalent extracted foreground pixels are re-examined in the non-visible frequency range (e.g. IR,) such as would be available, for instance, by using sensor 16c directly, or multi-sensor cameras such as depicted in 16d, 16e and 16f. As the equivalent IR image pixels are examined, those areas on the foreground object where a non-visibly apparent, tracking energy reflecting surface coating 5 has been affixed are more easily identified. As shown in Step 3, the located tracking energy reflective marks 5r can then be translated into a set of body and equipment points 5p that themselves can be later used to regenerate an animated version of the players and equipment as taught in prior related applications.

Referring next to FIG. 18, there is shown a single player 10 within the view of four camera assemblies, each with its own distinct purpose as previously taught and herein now summarized. First, there is overhead tracking camera assembly 20c, whose purpose is to locate all foreground objects, such as 10, within its overhead or substantially overhead view 20v. Once located, images collected by assemblies 20c will be analyzed to determine player 10 identity through the recognition of special markings such as helmet sticker 9a on helmet 9. Images from assemblies, such as 20c are also used to locate the game object, such as a puck 3 for ice hockey. The combination of player 10 and game object 3 location information determined by analysis of the overhead images is subsequently used to automatically direct filming camera assemblies, such as 40c. Filming assemblies, such as 40c, are controlled so that they will only capture their images at allowed pan & tilt angles as well as zoom depths. This control allows for the "pre-capture" of images of the background at all possible angles and depths thus forming a database of tracking surface and area backgrounds that are used to facilitate the efficient extraction of player 10 images from the filming images. In addition to location information, the images from the tracking assemblies such as 20c, also provide the orientation of individual players 10. This orientation information, along with the player 10's location, are then used by jersey identification assemblies 50c to zoom in on the appropriate portion of the player 10 where their identifying markings, such as a jersey number and player name, is expected to be found. This process results in jersey id pattern images 503x that can then be matched against a predetermined database of pattern images in order to identify a given player within an acceptable confidence level.

And finally, the orientation and location of player 10 is used to direct three-dimensional model filming assemblies 19c (shown in FIG. 18 for the first time.) There are several options for the specific construction of assemblies 19c whose purpose is to collect visible light images, such as 10c-M of player 10 intermeshed or concurrent overlapping with non-visible images, such as 10c-IR. Note that assembly 19c may include its own additional tracking energy source, such as IR ring light 19r1, that emits non-visible tracking energy for the better illumination of non-visible player markings, such as 5 on player 10. As intermeshed or concurrent overlapping images such as 10c-M and 10c-IR are continuously analyzed, the process of locating important player 10 body-points, which are indicated by markings such as 5, it is greatly facilitated since the search may be limited to only those pixels determined to be in the foreground. As previously taught, this is enabled through the control of pan & tilt angles as well as zoom depth on model filming assemblies 19c, similar to game filming assemblies 40c. This control facilitates gaining pre-knowledge concerning the background that leads to efficient image foreground extraction. Knowing the player 10's orientation, also help analysis of non-visible markings in image 1 c-IR since it provides logical inferences as to which body-points are likely to be in view thereby limiting the determination steps.

All assemblies, 20c, 40c, 50c and 19c are synchronized to the environment lighting via the power lines that drive this lighting. This synchronization ensures maximum and consistent ambient lighting with images are captured. Assemblies 19c are also similarly synchronized to any added tracking energy emitting lamps. Referring next to FIG. 19, there is depicted a typical youth ice hockey rink that is being used to teach the gathering of spectator audio and video database 402 that can then be combined with the overhead images 102, automatic game film 202 and manual game film 302 in order to create a more complete encoded broadcast 904, as shown in FIG. 1. Spectators to be filmed, such as parent 13-1 and 13-2 as well as coach 11, are first provided with transponders 410-1, 410-2 and 410-3 respectively. As will be understood by those skilled in the art, various technologies are either available or coming available that allow for accurate local positioning systems (LPS.) For instance, radio frequency tags can be used for triangulating position over short distances in the range of twenty feet. Newer technologies, such as Time Domain Corporation's ultra-wide band devices currently track transponders up to a range of approximately three hundred feet.

Furthermore, companies such as Trakus, Inc. have been working on microwave based transmitters, such as 9t to be placed in a player's, such as 10-6, helmet. Any of these various types of transmitters could also be used to track key spectators such as team coaches 11 or the parents 13-1 and 13-2. Regardless of the technology chosen, transponder tracking system 900 will gather location information from receivers such as 43a, 43b, 43c, 43d, 43e and 43f strategically placed throughout the surrounding tracking area. Receives such as 43a through 43f will receive signals from transponders such as 410-1, 410-2, 410-3 and even 9t thereby providing data supporting the triangulation and location of each transponders. This location information will typically be calculated from ten to thirty times per second and stored in the spectator tracking database 401.

Spectator tracking and filming system 400 then uses spectator location information from database 401 to automatically direct movable, controllable spectator filming cameras such as 60-1, 60-2 and 60-3. Spectator filming cameras are attached to individual or continuous rail 62 thereby facilitating controlled side-to-side movement of cameras such as 60-1. Camera 60-1 is attached to rail 62 via motorized swivel and extension arm 61 that is capable of panning and tilting, as well as raising and lowering camera 60-1. Movement instructions are provided by system 400 via wireless link 60L. While the bandwidth required to transmit movement instructions is anticipated to be minimal, the subsequent download of video from the camera 60-1 to system 400 will require higher bandwidths. Given these increased bandwidth requirements, the present inventors prefer implementing the link 60L in a technology such as Time Domain Corporation's ultra-wide band (UWB.) It is also possible that camera 60-1 communicates with system 400 via traditional network cable. In addition to spectator video information, it is also desirable to collect ambient sound recordings. These audio recordings can be used by content assembly & compression system 900 to blend directly with the captured game and spectator film. Alternatively, system 900 may use at least the decibel and pitch levels derived from the recorded ambient audio to drive the overlay of synthetic crowd noise. Hence, the overlaid synthetic crowd noise would ideally be a function and multiple of the actual captured spectator noise, thereby maintaining accuracy while added excitement. Audio capture devices 72 accept sound through microphones 73 and then transmit this information to system 400 for storage in the spectator A/V database 402. Additionally, spectator filming cameras such as 60-3, that are anticipated to be focused on either coach 11 or players such as 10-8 in the team bench, may optionally be outfitted with zoom microphone 60m. Such microphones are capable of detecting sound waves generated within a small area from a long distance, as will be understood by those skilled in the art.

Also depicted in FIG. 19 is coach's event clicker 420. This wireless device at a minimum includes a single button that may be depressed any time throughout the ensuing game. Each of many possible clickers, such as 420, is uniquely encoded and pre-matched to each team coach, such as 11. This allows each individual coach to create time markers associated with their name to be used time segment the captured game film along with the events objectively measured and determined by performance measurement & analysis system 700. Hence, each time a coach, such as 11, depresses the appropriate button on the event clicker 11, then clicker 11 generates a unique signal combining an electronic indication of the button(s) depressed and that clicker's 11 identifying code. Receivers such as 43a through 43f are capable of detecting these transmitted signals from clicker 11 after which they are passed onto performance measurement & analysis system 700 that automatically includes each transmission as a detected game event. In this way, a coach such as 11, may instantly recall game film from either the overhead or perspective angles as stored in databases 102 and 202 respectively, simply by selecting their designated marker based upon its recorded time code. And finally, FIG. 19 also shows an additional placement of automatic filming assemblies, such as 40c discussed in relation to FIG. 11a. This placement of filming assembly 40c essentially "within the boards," allows for various "interest shots" of the game as opposed to more traditional game film views. For example, assemblies 40c placed at lower filming levels can be used to capture the movement of player's feet as they enter the ice or to make "ice level" film of activity in front of the goal-tender. The point of such film, similar to the reason for capturing spectator film, is to add to the story line of the encoded broadcast 904 by mixing in novel film shots.

Referring next to FIG. 20, there is depicted a typical scoreboard 650 that would be found in a youth ice hockey rink. A parent or rink employee 613 usually controls scoreboard 650 via scoreboard input device 630. For the present invention, it is desirable to capture official game start and stop times as well as referee indications of penalties and game scoring. U.S. Pat. No. 5,293,354, for a Remotely Actuated Sports Timing System, teaches "a remotely actuatable sports timing system (that) automatically responds to a whistle blown by the sports official to generate a frequency modulated radio signal which is utilized to provide an instantaneous switching signal to actuate the game clock." This system is predicated on the ability of a microphone, worn to the referee, to pick up the sound of a blown whistle that is typically generated in a pre-known frequency such as 3150 hertz. Upon proper detection, a radio transmitter connected to the microphone transmits a radio signal that is picked up by a receiver, electronically verified and then used to stop the official game clock.

The present inventors suggest an alternative approach that includes airflow detecting whistle 601, with pinwheel detector/transmitter 601a. As referee 12 blows into whistle 601 creating airflow through the inner chamber and out the exit hole, pinwheel 601a is caused to spin. As pinwheel 601a spins, a current flow is induced by the rotation of the pinwheel shaft as will be understood by those skilled in the arts. This current is then detected and used to initiate the transmission of stop signal 605 that is picked up by receiver 640. Receiver 640 then transmits signals to scoreboard control system 600 that is connected to scoreboard 650 and automatically stops the game clock. Since each pinwheel 601a resides inside of an individual referee's whistle, it is capable of positively detecting only one referee's airflow, and therefore the indication of the activating referee such as 12. Hence, with the presently taught whistle 601, by encoding each pinwheel 601a with a unique electronic signature, control system 600 can determine the exact referee that initiated the clock stoppage providing additional valuable information over the aforementioned external microphone detector approach.

Note that with the aforementioned Remotely Actuated Sports Timing System, it is possible for one referee to blow his whistle causing sound waves at the pre-known frequency that are then picked up by more than one radio transmitter worn by one or more other game officials. Therefore, this system is not reliable for uniquely identifying which referee initiated the clock stoppage by blowing their whistle. A further difficulty of this unique frequency/sound approach is that referees are not always consistent in the airflow that they generate through their whistle. For the present inventors, pinwheel 601a will be calibrated to detect a wide range of airflow strengths, each of which could generate a slightly, or significantly different sound frequency. This difference will be immaterial to the present invention but may be problematic to detection by remote radio transmitters.

An additional advantage taught by the present inventors occurs for the sport of ice hockey that designates the starting time of the game clock when the referee 12 drops the game puck 3. In order to automatically detect the dropping of the game puck 3, pressure sensing band 602 is designed to be worn by referee 12; for instance over his first two fingers as depicted. Band 602 includes on its underside, pressure sensing area 602b that is capable of detecting sustained force, or pressure, as would be caused by the grasping of puck 3 by referee 12. Sensing area 602b is connected to electronics and transmitter 602c that first sends "on" signal to LED 602a when sufficient pressure is detected, thereby allowing referee 12 to visually confirm that the puck is "engaged" and "ready-to-drop." Once puck 3 is released, sensing area 602b changes its state causing electronics and transmitter 602c to emit start signal 606 that is picked up by receiver 640. Receiver 640 then transmits signals to scoreboard control system 600 that is connected to scoreboard 650 and automatically starts the game clock. Since each pressure sensing band 602 is worn by an individual referee, it is only capable of detecting the "engage/puck drop" of that referee thereby providing unique identification. By encoding each band 602 with a unique electronic signature, control system 600 can determine the exact referee that initiated the clock start.

In FIG. 20, whistle 601 and band 602 are shown as a single integrated device. The present inventors anticipate that these may be separate devices, as would be the case if they were worn in different hands. Furthermore, it is possible to use band 602 with the existing whistle technology that already exists in the marketplace without departing from the teachings concerning the detection of clock start time. Other additional uses exist for control system 600 including the ability to accept information from a game official during a clock stoppage such as but not limited too: 1) player(s), such as 10, involved in scoring, 2) type of game infraction, and 3) player(s), such as 10, involved in game infraction and their penalties. System 600 is connected via a traditional network to tracking system 100 such that the exact start and stop clock times as well as other official information can be provide and synchronized with the collected game film and performance measurements, all of which is eventually incorporated into encoded broadcast 904.

Furthermore, tracking system 100 is able to detect the exact time of any goal scoring event such as a puck 3 entering the net area, a basketball going through a hope or a football crossing a goal line. In all cases, the event that was detected by image capture and determined through image analysis will be stored in the performance measurement and analysis database 701 along with its time of occurrence. In the case of ice hockey and football, these detected events will be used to initiate a game clock stoppage by sending the appropriate signals to system 600. For at least the sport of ice hockey, after receiving such signals, system 600 will not only stop the game clock on scoreboard 650, but it will also automatically update the score and initiate appropriate visual and audible cues for the spectators. Such cues are expected to include turning on the goal lamp and initiating a selected sound such as a scoring horn through a connected sound system.

Referring next to FIG. 21, there is depicted a block diagram showing the overall flow of information, originating with the actual game 2-g, splitting into subjective and objective sensory systems and ultimately ending up in a result comparison feedback loop. Starting with the events of the actual game 2-g, subjective information is traditionally determined by coaching staff 11s. Staff 11s will retain mental observations made during the contest 2-g, and depending upon the organization, will potentially write down or create a database of game assessments 11ga. This recording of observations by staff 11s is typically done some time after the conclusion of game 2-g. Such assessments my typically be communicated to database 11ga through a computing device such as a coach's laptop or PDA. It is often the case that game film, such as databases 102 and 202 is taken of game 2-g so that staff 11s can review this film at a later point to provide additional assurance as to their assessments 11ga. (Currently, game film is only available via manually operated filming systems that, at a youth level, are typically a made by parent with a video recorder.) The present invention specifies a tracking system 100 that both films and simultaneously measures game 2-g. Tracking system 100 further automatically directs automatic game filming system 200 that is capable of collecting game film such as 102 and 202. Symbolic tracking data determined by tracking system 100 is analyzed by performance measurement & analysis system 700 to create objective performance measurements 701a. Performance assessment module 700a then applies an expert system of game interpretation rules to create objective game assessments 701b from objective performance measurements 701a. Data from subjective assessments 11ga and objective assessments 701b may then be electronically compared, creating for example difference report 710. Report 710 may then be reviewed by coaching staff 11s as a means of refining their game perception and analysis. Furthermore, the electronic equivalent of report 710 may also provide feedback to the performance assessment module 700a that may then use this information to reassign weighting values to its expert systems rules. It is further anticipated that comparison information such as provided in report 710 will be invaluable for the process of further developing meaningful objective measurements 701a and game interpretation rules.

Referring next to FIG. 22, there is shown a series of perspective view representations of the overall method embodied in the present application for the capturing of current images such as 10c, the extraction of the foreground objects such as 10e s, and the transmission of these minimal objects 10es to be later placed on top of new backgrounds with potentially inserted advertising such as 2r-c3-1016a. Specifically, Step 1 depicts the capturing of current image 10c by perspective filming station 40c. Current image 10c includes a background made up of tracking surface 2 and boards and glass 2b as well as multiple foreground objects such as puck 3, player 10-1 and players 10-2&3. In Step 2, the current pan and tilt angles as well as zoom depth coordinates 40c-ptz-1016 of the station 40c at the time image 10c was taken, are used to select a matching target background, such as 2r-c3-1016 through 2r-c3-1019. In Step 3, the target background, such as 2r-c3-1016 is used to isolate any foreground objects such as puck 3, player 10-1 and players 10-2&3. The specific methods for this extraction were taught primarily with respect to FIGS. 6a and 11a through 11j. The teachings surrounding FIG. 6a primarily cover the subtraction of backgrounds especially from fixed overhead assemblies such as 20c and 51c while the teaching of FIG. 11a through 11j additionally show how to handle the separation of potentially moving backgrounds, e.g. spectators from perspective assemblies such as 40c. In either case, the end result of Step 3 is the creation of extracted foreground data blocks 10es that are the minimum portions of image 10c required to represent a valid broadcast of a sporting event.

Referring still to FIG. 22, in the next Step 4, extracted foreground data blocks 10es are transmitted along with pan/tilt/zoom coordinates 40c-ptz-1016 identifying the particular "perspective" of the filming station 40c when this extracted data 10es was captured. This information is then transferred, for instance over the Internet, to a remote system for reconstruction. The present inventors anticipate that due to the significant reductions in the original dataset, i.e. 10c, as taught in the present and related inventions, multiple views will be transmittable in real-time over traditional high-speed connections such as a cable modem or DSL. These views include a complete overhead view created by combining the extracted blocks 10es from each and every overhead assembly, such as 20c. Also included are perspective views such as those taken by station 40c. Furthermore, the present inventors anticipate significant benefit to alternatively transmitting the gradient image, such as is shown as 10g in FIG. 6b as opposed to the actual image shown as extracted block 10e. The gradient 10g will serve very well for the overhead view and will take up significantly less room than the actual image 10e. Furthermore, this gradient image may then be "colorized" by adding team colors based upon the known identities of the transmitted player images. In any case, Step 5 includes the use of the transmitted pan/tilt/zoom coordinates 40c-ptz-1016, i.e. "1016," to select the appropriately oriented target background image such as 2r-c3-1016a from the total group of potential target backgrounds such as 2r-c3-1016a through 2r-c3-1019a. Note that this set of target backgrounds to select from, e.g. 2r-c3-1016a through 2r-c3-1019a, is ideally transmitted from the automatic broadcast system 1 to the remote viewing system 1000 (as depicted in FIG. 1) prior to the commencement of the sporting contest. Many possibilities exist in this regard. First, these target backgrounds can be supplied for many various professional rinks on a transportable medium such as CD or DVD. Hence, a youth game filmed at a local rink would then be extracted and reconstructed to look as if it was being played in a professional rink of the viewer's choice. Of course, these target background images 2r-c3 could be transmitted via Internet download. What is important is that they will reside on the remote viewing system 1000 prior to the receiving of the continuous flow of extract foreground object 10es movement from one or more angles. This will result in significant savings in terms of the total bandwidth required to broadcast a game which will be especially beneficial for live broadcasts. Furthermore, the present inventors anticipate using existing graphics animation technology, such as that used with current electronic sports games such as EA Sports NHL 2004. This animation could automatically recreate any desired background to match transmitted pan/tilt/zoom coordinates 40c-ptz-1016 for each received extracted foreground block 10es, thereby eliminating the need to pre-store "real" background images such as the set of target backgrounds 2r-c3-1016a through 2r-c3-1019a.

Still referring to FIG. 22, it is a further anticipated benefit of the present invention that advertisements may be either overlaid onto the target background images 2r-c3 prior to their transmission to the remote viewing system 1000, or they may be automatically synthesized and overlaid by programs running on the viewing system 1000 that are also responsible for subsequently overlaying the extracted foreground stream 10es. This approach significantly improves upon current techniques that do not first separate the foreground and background and therefore must overlay advertisements directly onto a current image such as 10c. Furthermore, the current state of the art therefore also transmits the entire current image including background and overlaid advertisements, if any.

And finally, after the appropriate target background image such as 2r-c3-1016a is either selected from a pre-stored database or fully or partially synthesized via traditional computer animation techniques, the foreground stream 10es is placed onto the selected/recreated background in accordance with the transmitted minimum bounding box corner coordinates 10es-bc. Within the overlaid extracted blocks 10e s, any null or similarly denoted "non-foreground" pixels are replaced with the value of the associated pixel with selected target background image 2r-c3-1016a. The resulting image 11c is then presented to the viewer.

Referring next to FIG. 23, there is shown on the left Stream A 10c-db. This first Stream A 10c-db depicts eights individual full-frames, such as 10c-F01, 10c-F06, 10c-F11 through 10c-F36, that are from a series of thirty-six original current images 10c. These images 10c were either captured by an assembly such as 20c or 40c or constructed from the multiple views of the overhead assembly matrix 20cm (depicted in FIG. 3) as taught in the present application. Current state of the art systems work with full frame series such as Stream A 10c-db when providing their sports broadcast. Such streams are typically first reduced in size using the industry standard MPEG compression methods. As is known by those skilled in the art, MPEG and similar techniques are faced with having to compress full-frame images such as 10c-F06 as a function of the pixel information contained at least in the full-frames proceeding 10c-F06, such as 10c-F01 through 10c-F05 (not depicted.) This process of frame-to-frame cross comparison and encoding is time consuming and not as effective as the present invention for reducing the final transmitted image size.

Still referring to FIG. 23, next to full-frame Stream A 10c-db is shown sub-frame Stream B 10es-db. Each sub-frame, such as 10c-es01, 10c-es06, 10c-es11 through 10c-es36 represents just those portions of a given full-frame current image 10c that contain one or more foreground objects. Note that in any given current image 10c, zero or more distinct sub-frames such as 10c-es01 may be present. (In FIG. 23, each current image contained exactly one sub-frame although this is neither a restriction nor requirement.) Each sub-frame comes encoded with the coordinates, such as (r1, c1) and (r2, c2) defining its appropriate location in the original current frame 10c. These coordinates are one way of designating the location of the minimum bounding box, such as 10e-1 shown in FIG. 7a. Other encoding methods are possible as will be understood by those skilled in the art. What is important is that the present inventors teach an apparatus and method for extracting moving foreground objects from either fixed or moving backgrounds and transmitting this minimal sub-frame dataset, for instance 10c-es01 through 10c-es36, along with coordinate information such as corner locators (r1, c1) and (r2, c2) necessary to place the sub-frame into a pre-transmitted target background as previously discussed in Step 6 of FIG. 22.

And finally, also depicted in FIG. 23 is a third series of tracked motion vectors 10*v-db* corresponding to successive image sub-frames. For instance, after first sub-frame 10*c-es*01, the path of the detected foreground object follows the vector 10-*mv*06. These vectors are meant to represent either some or the entire larger database of tracking information 101 as first shown in FIG. 1. Hence, the present inventors not only teach the transmission of a minimized data Stream B 10*es-db* of extracted foreground object blocks, such as 10-*es*06, they also teach the simultaneous transmission of motion vector 10-*mv*-06 and related digital measurement information. Such digital measurement information, as taught in the present invention, provides significant potential for quantifying and qualifying participant performance providing statistics, analysis and is a basis for automatically generated "synthesized audio" commentary.

Referring next to FIG. 24, there is shown the same two Streams A and B of full frames 10*c-db* and sub-frames 10*es-db*, respectively, as depicted in FIG. 23. In this figure, both full-frame Steam A 10*c-db* and sub-frame Stream B 10*es-db* are shown in a perspective view meant to visualize a data transmission flow. As stated with reference to FIG. 23, Stream A 10*c-db* is most often first compressed using methods such as those taught in association with industry standard MPEG. As can be seen by the portrayal of Stream A 10*c-db*, its overall size prior to compression is both the maximum and significantly greater than sub-frame Stream B 10*c-db*. As will be discussed later in relation to FIG. 25, there is no limitation restricting sub-frame Stream B 10*es-db* from also being similarly compressed by traditional methods such as MPEG.

However, before any such compression takes place, the present inventors prefer altering Stream B 10*es-db* so that it is no longer in its original variable bandwidth format as shown in FIG. 24. Specifically, each sub-frame such as 10*c-es*01, 10*c-es*06, 10*c-es*11 through 10*c-es*36 may take up any full or partial portion of original corresponding images, such as 10*c*-F01, 10*c*-F06, 10*c*-F11 through 10*c*-F36, respectively. Hence, while each transmitted full-frame in Stream A 10*c-db* is originally of the same size and therefore easily registered to one another for compression, each transmitted sub-frame in Stream B 10*es-db* is neither of the same size nor easily registered. This transformation from variable bandwidth sub-frame Stream B 10*es-db* into rotated and centered fixed bandwidth sub-frame Stream B1 10*es-db*1 is discussed in relation to upcoming FIG. 25 and was first taught in relation to FIGS. 6*d* and 6*e*.

Referring next to FIG. 25, there is shown first the same variable bandwidth sub-frame Stream B1 10*es-db* as depicted in FIG. 24 next to a corresponding rotated and centered fixed bandwidth sub-frame Stream B1 10*es-db*1. Specifically, each sub-frame of Stream B 10*es-db* is first evaluated to determine if it contains one or more identified participants such as a player 10. In the simplest case, where each sub-frame contains a single identified player 10 based upon helmet sticker 9*a*, that sub-frame may be rotated for instance such that the player's helmet sticker 9*a* is always pointing in a pre-designated direction; depicted as Step 1. In general, this will tend to orient the player 10's body in a similar direction from sub-frame to sub-frame. It is anticipated that this similar orientation will facilitate known frame-to-frame compression techniques such as MPEG or the XYZ method, both well known in the art. Note that this rotation facilitates compression and requires the transmission of the rotation angle to the viewing system, such as 1000, so that the decompressed sub-frames can be rotated back to their original orientations.

Furthermore, this rotation concept is most easily understood with respect to extracted foreground blocks such as 10*c-es*01 taken from overhead images 10*c* as captured from assemblies such as 20*c*. However, similar concepts are possible with respect to foreground object blocks extracted from perspective view images 10*c* as captured from assemblies such as 40*c*. Hence, players 10 viewed from the perspective can still be aligned facing forwards and standing up based upon the orientation information gathered by the tracking system 100. For instance, if a series of perspective-view sub-frames show a given player skating back towards his own goal, than these images could be flipped vertically making the player appear to be facing the opponent's goal. The present inventors anticipate that such alignment may facilitate greater compression when processed by existing methods especially those like XYZ that favor "slower moving," highly aligned objects.

Referring still to FIG. 25, in order to make a fast moving object such as a hockey player 10 skating a full speed appear to be a slow moving object (i.e. with respect to the background and image frame center, such as a person standing in a teleconference,) the present inventors teach the method of centering each original sub-frame, such as 10*c-es*01 into a carrier frame 10*c-es*CF. This is shown as Step 2. In this way, a highly regular succession of video frames is created for compression by traditional methods, again such as MPEG or preferably XYZ, as will be understood by those skilled in the art. The resultant minimum "motion" between frames off of the centered axis 10*es-db*Ax provides a highly compressible image file. As was taught first in relation to FIGS. 6*d* and 6*e*, it is also desirable to zoom or expand individual extracted sub-frames such as 10*c-es*01 so that the overall pixel area of each aligned player remains roughly the same from frame-to-frame, thereby facilitating traditional compression methods. This will require that zoom setting also be transmitted per sub-frame.

Referring next to FIG. 26, there is shown first the same rotated and centered fixed bandwidth sub-frame Stream B1 10*es-db*1 as depicted in FIG. 25 next to a corresponding Stream B2 10*es-db*2 whose individual sub-frames have been "scrubbed" to remove all detected background pixels. As previously discussed especially in relation to Step 6 of FIG. 6*a*, after the extraction of foreground blocks such as 10*c-es*01, 10*c-es*06, 10*c-es*11 and 10*c-es*36, these blocks are then examined by hub 26 to remove any pixels determined to match the pre-stored background image. The result is scrubbed extracted blocks such as 10*c-es*01*s*, 10*c-es*06*s*, 10*c-es*11*s* and 10*c-es*36*s* respectively. These "scrubbed" sub-frames are more highly compressible using traditional techniques such as MPEG and XYZ.

With respect to FIG. 22 through FIG. 26, the present inventors are teaching general concepts for the reduction in the video stream to be broadcast. By reducing the original content via foreground extraction and then by rotating, centering, zooming and scrubbing the extracted blocks as they are placed into carrier frames, the resulting stream B2 10*es-db*2 as shown in FIG. 26 is significantly smaller in original size and more compressible in format using traditional methods well known in the art. These techniques require the embedding of operating information into the video stream such as the rotation angle and zoom factor as well as the image offset to carrier frame 10*c-es*CF axis 10*es-db*Ax. When combined with the pan and tilt angles as well as zoom depths of perspective filming assemblies such as 40*c* and the location of fixed overhead assemblies such as 20*c*, all with respect to three-dimensional venue model 2b-3dm1, the present invention teaches new methods of video stream compression that goes beyond the state of the art.

Furthermore, embedded information can include indicators defining the sub-frames as either containing video or gradient image information. In a dynamic compression environment, the automatic broadcast system 1 is anticipated to switch between the total number of video feeds transmitted as well as the basis for representation, i.e. video or gradient, on a frame by frame basis as the available transmission bandwidth fluctuates. Additional techniques as taught with respect to FIG. 6b allow further compression beyond traditional methods by recognizing the limited number of colors expected to be present in a foreground only video stream. Hence, rather than encoding a potential 256 shades of red, blue and green for each pixel so as to be able to represent any possible color, the present invention teaches the use of a smaller 4, 16 or 32 combination code where each code represents a single possible color tone as known prior to the sporting contest.

Several exception situations to these methods are anticipated by the present inventors. For instance, a given sub-frame will often contain more than one participant or player such as 10. Depending upon the detected overlap as determinable for both the overhead and perspective views based upon the player orientation in the tracking database 101, the present inventors prefer automatically "cutting" the sub-frame along a calculated line best separating the known centers of the two or more visually conjoined players. Each time a sub-frame is split, it simply becomes a smaller sub-frame with its own bounding box corners (r1, c1) and (r2, c2). It is material if any given sub-frame contains only portions of a main player 10 along with sub-portions of visually overlapping players since ultimately all of the sub-frames will be reset to their original locations within the final viewing frame 11c shown in FIG. 22.

Also, there are anticipated advantages for creating a carrier frame 10c-esCF of preset dimensions. One preferred size would be one-quarter the size of a normal full-frame. The presetting of the carrier frame 10c-esCF dimension could be beneficial for the application of traditional image compression methods such as MPEG and XYZ. In this case, the present inventors anticipate that the sub-frames will not always "fit" within the carrier frame 10c-esCF and must therefore be split. Again, this less frequent need for splitting larger sub-frames to fit smaller carrier frames will not effect the ultimate reconstruction of final viewing frame 11c. It is further anticipated that the size of the carrier frame 10c-esCF can be dynamically changed to fit the zoom depth and therefore the expected pixel area size of foreground objects, such as player 10.

Hence, since the overhead assemblies 20c have fixed lenses, individual players 10 will always take up roughly the same number of image frame 10c pixels. In this case, the present inventors prefer a carrier frame that would always include some multiple of the expected size. For the perspective filming assemblies such as 40c, the size of a player 10 is anticipated to vary directly proportional to the known zoom depth. Therefore, the present inventors anticipate dynamically varying the size of the carrier frame 10c-esCF as a function of the current zoom value. Note that in a single broadcast that includes multiple game feeds such as Stream B2 10es-db2, it is anticipated that each feed will have its own dynamically set variables such as the carrier frame 10c-esCF size.

The present inventors anticipate significant benefit with the transmission of the gradient image 10g first shown in FIG. 6a after it has been translated into some form of a either a vector or boundary encoded description. Hence, the gradient images 10g, like the full color extracted foreground images 10es can either be represented in their original bitmap form, or they can be converted to other forms of encoding well known in the art. Two tone, or "line art" images, such as the gradient image log are ideal for representation as a set of curves, or b-splines, located in the image space. The gradient images 10g could also be represented using what is know in the art as a chain code, essentially tracing the pixel-by-pixel path around each line of the gradient image. At least the conversion to b-splines and the representation of a bitmap, or raster image, as a vector image is well known in the art and especially used in both JPEG and MJPEG standards. The present inventors anticipate the these spatial compression methods way prove more advantageous to the compression of both the gradient image 10g and extracted foreground images 10es that more traditional temporal compression methods such as motion estimated specified for MPEG and XYZ. More specifically, the present inventors teach the extraction of foreground objects and their conversion into separate color tone regions, were each separated region is therefore more like a gradient image 10g. Each region can either be defined by a linked list of pixel locations, or a chain code, or by a set of b-splines. Regardless of the method for describing the exterior boundary of the region, its interior can be represented by a single code denoting the color tone contained with that region. Depending upon the pixel area contained within the region as compared to the length of the perimeter boundary describing the region, this conversion to vector or coded method can offer significant bandwidth savings. The final stream of region locations and contained color tones can then be automatically reconstructed into video-like images for placement onto the properly selected or recreated backgrounds as summarized in FIG. 22. Referring next to FIG. 27, there is shown a perspective view of a filming assembly 40c as it captures background images 2r (first depicted in FIG. 6a) from the venue prior to filming a live event with a moving foreground such as players 10, or moving background such as spectators 13. As was previously taught, especially in FIGS. 11a though 11j and summarized in FIG. 22, these background images 2r are associated with the capturing assemblies current pan, tilt and zoom coordinates 40c-ptz and stored separately in a single database per assembly 40c. FIG. 27 illustrates the concept of storing the net combination of each of these individual background images 2r, that may highly overlap, into a single background panoramic database 2r-pdb associated with a given assembly 40c and that assemblies fixed view center 40c-XYZ. As will be understood by those skilled in the art, the determination of the three dimensional (X, Y, Z) coordinates of the axis of rotation of sensor 45s within assembly 40c, provides a method of calibrating each pixel of each image 10s captured. This calibration will relate not only to the venue's three-dimensional model 2b-3dbm2 but also to the overhead tracking assemblies such as 20c. For reasons that will be explained in association with upcoming FIG. 28, the zoom depth of assembly 40x is preferably set to the maximum when collecting this panoramic database 2r-pdb, and as such the only variables depicted in FIG. 27 are for the pan and tilt angles.

Specifically, each assembly 40c will be controllably panned and tilted throughout a predetermined maximum range of motion that can be expressed as angular degrees. In practice, the present inventors anticipate that the maximum pan range will be less than 180° while the maximum tilt range will be less than 90°. Regardless, as was previously taught, sensor 45s (shown as a grid in expanded view) will be restricted to capturing images at increments of a minimum pan angle □p and minimum tilt angle □t. Therefore, every background image 2r captured by sensor 45s will have a unique pan coordinate of □p=n *□p, where n is an integer between 1 and Xp such that □p>0° and typically <180°. Similarly, every background image 2r captured by sensor 45s will have a unique tilt coordinate of □t=m*□t, where m is an integer between 1 and Xt such that □t>0° and typically <90°.

Still referring to FIG. 27, at any given set of (m, n) pan/tilt coordinates, sensor 45s will be exposed to some portion of the fixed background that me be at any depth from the assembly 40c, such as surfaces 2r-s1, 2r-s2 and 2r-s3. Typically, these surfaces are expected to be in the range from 5' to 300' away from assembly 45s. (For the purposes of maintaining a single maximum zoom during this step of collecting background images 2r for the construction of panoramic background database 2r-pdb, it is preferable that the all potential surfaces be in focus throughout the entire range from the nearest to farthest distance. This requirement will at least dictate the ultimate position of assembly 40c so as to fix the distance to the closest surface to be greater than some minimum as determined by the assembly camera lens options, as will be understood by those skilled in the art.) The varying distance to each surface, 2r-s1, 2r-s2 and 2r-s3 will result in a differing surface area captured onto any one given pixel of sensor 45s. Hence, the further away the surface, such as 2r-s3 versus 2r-s1, the larger a surface area each single pixel such as 45sPx will represent; e.g. 45sP3 versus 45sP1 respectively. It is anticipated that the fixed background in the venue will not change in any significant way between initial calibration and the filming of multiple games over time. However, if the fixed background is expected to change, than the creation of panoramic database 2r-pdb may need to be updated accordingly.

Regardless of the actual background surface area viewed, for each single pixel 45sPx captured by sensor 45s and for all allowed pan □t and tilt angles □t of assembly 40c, preferably pixel 45sPx's RGB or YUV value is stored in panoramic database 2r-pdb. Within database 2r-pdb, each pixel such as 45sPx is addressable by its (m, n) coordinates, e.g. (m=angle 447*□t and n=angle 786*□t as shown.) As previously stated, each captured pixel 45sPx will represent a given surface area such as 45sP1, 45sP2 or 45sP3 on depth varied surfaces 2r-s1, 2r-s2 and 2r-' respectively. As will be understood by those skilled in the art, depending upon the repeatability of the pan and tilt control mechanisms with respect to the minimum pan and tilt angles 40-pzt, each time that assembly 40c returns to the same coordinates 40-pzt, pixel 45sPx will capture the same physical area 45sP1, 45sP2 or 45sP3. In practice, the present inventors anticipate that, especially when using maximum zoom depth, or when considering the surfaces farthest away such as 2r-s3 giving area 45sP3, the repeated pixel information will not be exact. This is further expected to be the case as the venue undergoes small "imperceptible" physical changes and or experiences different lighting conditions during a game versus the initial calibration. However, within a tolerance, as will be understood in the art, these small changes can be characterized as background image noise and dealt with via techniques such as interpolation with neighboring pixels to always yield an average pixel for 45sP1, 45sP2 or 45sP3 which can be stored as 45sPv rather than the actual captured value 45sPx.

Furthermore, especially when working in the YUV color domain, fluctuations in venue lighting can be addressed with a larger tolerance range than is necessary for the UV (hue saturation, or color.) Still referring to FIG. 27, as assembly 40c sweeps in any direction, a single pixel such as 45sPx will move across the sensor array 45s. As will be understood by those skilled in the art, due to image distortion caused by the optics of the chosen lens, the actual background image area, such as 45sP3, 45sP2 and 45sP1 may not be identically captured for all successive increments of movement. Hence, at any given depth such as 2r-s2, due to image distortion the actual surface area such as 45sP2 captured per each pixel of sensor 45s, such as 45sPx versus 45sPy versus 45spz, will not be identical. It will be understood that pixels radiating outward from the middle of sensor 45s will tend to capture progressively larger potions of the image surface. Therefore, pixel 45sPx will have less distortion and will capture less actual surface area such as 45sP2 than will pixel 45sPy. In turn, pixel 45sPy will have less distortion and will capture less actual surface area such as 45sP2 than will pixel 45sPz. This distortion will limit the number of captured pixels such as 45sPx from sensor 45s that can reliable be used to build initial panoramic database 2r-pdb. This is because during live filming via assemblies 40c, although each current image 10c (previously depicted) will be captured only at allowed minimum increments of pan and tilt angles □p and □p, it is unlikely that any given captured image will be at exactly the same pan tilt (and zoom) coordinates 40c-pzt for which a single original background image was centered. Therefore, as the pre-stored background is extracted from the panoramic database 2r-pdb for subtraction from the current image 10c, the individual background pixels such as 45sPv may represent slightly varying portions of the venue background. This would be especially true where the current image 10c pixel is towards the outermost portion of the image sensor 45s, such as 45sPz, whereas its corresponding pixel such as 45sPV in database 2r-pdb was an innermost pixel such as 45sPx.

The present inventors prefer using three main approaches to handling this background image distortion beyond choosing appropriate optics configurations for minimum distortions, as will be understood by those skilled in the art. First, each captured background image 2r, whose individual pixels will contribute to pre-stored background panoramic 2r-pdb, can be transformed via a matrix calculation to remove image distortion as is well known in the art. Hence, by use of standard lens distortion correction algorithms, the background image captured by sensor 45s can better approximate a fixed surface area per pixels such as 45sPx, 45sPy and 45sPz. Note that when the background image 2r is extracted from panoramic database 2r-pdb for subtraction from a current image 10c, the transformation matrix can be reapplied so as to better match the effective distortion in the current image 10c pixels. The second approach can be used either alternatively, or in combination with the use of a transformation matrix as just described. What is preferred is that the actual pixels used from sensor 45s for each initial background image 2r captured to build database 2r-pdb, are limited to those with acceptable distortion. Hence, only the "interior" pixels such as those clustered near the center of sensor 45s, for instance 45sPx be used to build database 2r-pdb. Obviously, the fewer the pixels used, all the way down to only a single central pixel, the geometrically proportionately more total background images 2r must be captured to create panoramic database 2r-pdb. The third approach preferred by the present inventors for minimizing image distortion in the panoramic background database 2r-pdb, is to capture this original database in a zoom setting at least one multiple higher than the highest setting allowed for game filming. As will be understood by those skilled in the art, this is essentially over-sampling the venue background, where over-sampling is a common technique for removing signal noise, in this case representing by pixel distortion. For instance, ideally each captured and stored pixel, such as 45sPv in database 2r-pdb, will be at least $\frac{1}{5}^{th}$ of the size of any pixel captured in a current image, as will be depicted in the upcoming FIG. 28.

Referring next to FIG. 28, there is shown a similar depiction of a perspective view of filming assembly 40c capturing images of background surfaces such as 2r-s1, 2r-s2 and 2r-s3. What is different in FIG. 28, is that these image captures are meant to represent the live filming stage rather than the calibration step of building the panoramic background database 2r-pdb. Furthermore, what is shown is the effect of zooming on the correlation between and given pixel in the current image captured on sensor 45s, such as 45sPx, and the corresponding pixels in the panoramic database 2r-pdb. Essentially, for a given surface depth such as 2r-s3, an original background pixel representing surface area 45sP3 was captured and saved as 45sPV in database 2r-pdb. When filming, the maximum zoom depth is preferably limited to □Z==3*□t in the vertical direction and □Z=3*□p in the horizontal direction. Hence, during filming, assembly 40c will never be directed to zoom in closer than nine times the area of the originally captured background pixels; as would represented by the area of 45sP3. Obviously, it is preferable to use an image sensor 45s with square pixels and one-hundred percent fill factor, as will be understood by those skilled in the art. Note that by choosing the maximum zoom depth to yield captured surface areas nine times the size of an originally captured background pixel such as represented by area 45sP3, the image distortion noise is minimized by the averaging of nine samples, shown as 45z1, to create a comparison for a single sensor pixel such as 45sPx. Furthermore, the practical mathematic equations are simplified because the simulated or average pixel created from the nine samples 45z1 are exactly centered on the target current image pixel 45sPx.

Still referring to FIG. 28, after the initial maximum zoom setting of 3□p/3□t, decreasing zoom settings are shown to preferably change in both the horizontal and vertical directions by two increments of the minimum pan and tilt angles, □p and □t respectively. In other words, if the maximum allowed filming zoom causes pixel 45sPx to image the area of 45sP3-9 that is effectively nine times the area constrained by the minimum pan and tilt angles, □p and □t respectively, than the next lowest zoom setting will cover the area of 45sP3-25 that is effectively twenty-five times the minimum area of 45sP3, with a setting equivalent to 5□p/5□t. Again, note that filming camera 40c's image sensor 45s is ideally always aligned to capture images at pan and tilt angles that ensure that each of its pixels, such as 45sPx, are centered around a single pixel, such as 45sPv in panoramic database 2r-pdb. In this way, depending upon the particular zoom setting, each single pixel of the currently captured image 10c will always correspond to a whole multiple of total background pixels, such as the nine pixels in square 45z1 or the twenty-five in square 45z 2. As previously discussed with relation to FIG. 27, each individually stored pixel, such as 45sPv, in panoramic database 2r-pdb has ideally been limited or transformed in some way to minimize its distortion. This may take the form of only storing the "innermost" sensor pixels, applying a transformation matrix to remove distortion or interpolation with neighboring cells. Regardless, when stored pixels such as those contained in database square 45z1 or 45z1 are themselves interpolated to form individual comparison pixels, the present inventors anticipate applying a transformation matrix scaled to the zoom setting to effectively warp the resulting comparison to match the expected distortion in the current image 10c.

There are three major anticipated benefits to creating a panoramic background database 2r-pbd versus creating a database of individually stored background images, for instance 2r-c3-1016 through 2r-c3-1019 as depicted in FIG. 22. Both benefits are related to the significant reduction in storage requirements for the panoramic versus individual image approach. The first major benefit to the reduced storage requirements is that it becomes easier to build the storage media, i.e. disk or even memory, directly into the filming assemblies such as 40c. The second major benefit is the greatly reduced transmission bandwidth requirements making it at least feasible to send panoramic database 2r-pdb via network connections to remote 1000 whereas it would be prohibitive to transmit individual frames such as 2r-c3-1016 through 2r-c3-1019. And finally, the overall storage requirements on remote system 1000 are also significantly reduced, especially when considering that ideally several panoramic databases 2r-pdb are resident so as to support six or more preferred filming assemblies 40c.

Referring next to FIG. 29a, there is depicted the flow of data after it is originally captured by the overhead tracking assemblies 20cm which film and track game 2-g, where it finally ends up being assembled into a broadcast by encoder 904. Specifically, all of the overhead film and tracking information begins as streams of current images 102a as output by overhead assemblies 20cm. As previously discussed, for each camera in the overhead assemblies 20cm, there are associated background image(s) 103 that are pre-stored and optionally updated to reflect continual background changes. After applying background images 103 to the stream of current images 102a, a new dataset of subtracted & gradient images 102b is created. From this dataset image analysis methods as previously discussed create symbolic dataset 102c as well as streams of extracted blocks 102d. Information from the symbolic database 102c and extracted blocks 102d is then used to create tracking database 101, which records the movement of all participants and game objects in game 2-g. Also available by the use of well known stereoscopic image analysis, extracted block taken of the same participants from different overhead cameras provides topological profiles 105. As tracking database 101 accumulates in real-time, a performance measurements & analysis database 701 is constructed to create meaningful quantifications and qualifications of the game 2-g. Based upon the tracked movement of participants and the game objects in database 101 as well as the determined performance measurements & analysis 701, a series of performance descriptors 702 is created in real-time to act as input to a speech synthesis module in order to create an audio description of the ensuing game 2-g.

Still referring to FIG. 29a, streams of extracted blocks 102d are first sorted in the temporal domain based upon the known participants contained in any given image, the information of which comes from the tracking database 101. As previously taught, using either information from a helmet sticker 9a or as read off a participant's jersey, the overhead system 20cm will first separate its extracted blocks 10e according to player 10 and/or game object, such as 3. In those cases where multiple participants form a contiguous shape and are therefore together in a single extracted block 10e, they are first arbitrarily separated based upon calculations of a best dividing line(s) or curves(s). Regardless, extracted blocks 10e with multiple players 10 can still form a single sub-stream for the given number of consecutive frames in which they remain "joined" in contiguous pixel-space. The present inventors are referring to this process of sorting extracted blocks by their known contents as "localization." Once localized, extracted blocks 10e are then "normalized" whereby they may be rotated to meet a predetermined orientation as previously taught. Also as taught, for each extracted block 10e in streams 102d there are associated corner coordinates that are used to indicate where the given block is located with respect to the current image 10c. These corner coordinates are contained in extracted block database 102d and are carried into any derivative databases, the description of which is forthcoming. Note that in the case that an originally extracted block 10e contains more than one player 10 and is therefore forcibly split as discussed; the resulting divided extracted blocks may not necessarily be rectangular. In this case, the appropriate mathematical description of their exterior bounding shape, similar to two opposite corner coordinates defining a rectangle, is stored in database 102d instead.

Once the localized, normalized sub-stream database 102e has been formed, it is then optionally transformed into separated face regions 102f and non-face regions 102g. As previously taught, this process relies upon overhead tracking information from database 101 that provides the location of the helmet(s) 9 within the detected player(s) 10 shape. This location is ideally determined by first detecting the location of the helmet sticker 9a and then working with the color tone table 104a to "grow" outwards until the helmet color tone is completed encompassed. The color tone table 104a also provides information on which of the limited set of color tones are "uniform" versus "skin." This information can be used independently to search the interior of shapes seen from the overhead when players 10 are not wearing helmets 9, such as in the sports of basketball or soccer. Regardless, once the face region 10cm-a is encompassed, it can be extracted into a separate stream 102f while its pixels are set to an ideal value, such as either null or that of the surrounding pixels in the remaining non-face region stream 102g.

Still referring to FIG. 29a, as will be appreciated by those familiar with sporting activities, there are a limited number of basic positions, or poses, that any individual player 10 may take during a contest. For instance, they may be walking, running, bending over, jumping, etc. Each of these actions can themselves be broken into a set of basic poses. When viewed from above, as opposed to the perspective view, these poses will be even further limited. The present inventors anticipate creating a database of such standard poses 104b prior to any contest. Ideally, each pose is for a single player in the same uniform that they will be using in the present contest. With each pose there will be a set orientation and zoom that can be used to translate any current pose as captured in database 102d and optionally subsequently translated into databases 102e, 102g and 102f. As is well known in the art, during the temporal compression of motion video, individual frames are compared to either or both their prior frame and the upcoming frame. It is understood that there will be minimal movement between these prior and next frames and the current frame. The present inventors anticipate the opportunity of additionally comparing the normalized current extracted blocks 10e found in sub-streams 102e (or any of its derivatives,) with the database of standard poses 104b. This will become especially beneficial when creating what is known as the "I" or independent frames in a typically compressed video stream. These "I" frames, as will be understood by those skilled in the art, are purposefully unrelated to any other frames so that they may serve as a "restarting" point in the encoded video stream (such as MPEG2.) However, the fact that they are unrelated also means that they must carry the entire pertinent spatial information, or entropy, necessary to describe their contents. The present inventors teach that at least these "I" frames may be first compared to their expected matches in the standard pose database 104b based upon the translated and normalized extracted block 10e in stream 102e. This comparison will provide a "best-fit" approximation to the current block 10e that can serve as a predictor frame, thereby allowing for greater compression of the "r" frame as will be understood by those skilled in the art. Since the decoder will have reference to an exactly similar standard pose database 104b on the local system, reconstruction of the original streams "I" frames can be accomplished via reference to the "pose number" of the predictor in database 104b after which the "difference" frame may be applied yielding the original "I" frame.

The present inventors further anticipate that it may be unrealistic to have established a standard pose database 104b prior to any given contest. However, it is possible that as each new pose that is detected for a given player 10 during the herein discussed processing of streams 102e or 102g and 102f, can be added to a historical pose database 104c1. For instance, supposing that there was no standard pose database 104b available, then as game 2-g transpires, each player 10 will be transferring through a significant number of poses. Essentially, each captured frame resulting in an extracted block 10e which is then localized and normalized, can be first searched for in the historical pose database 104c1. If it is found, this pose can be compared to the current pose in block 10e. This comparison will yield a match percentage that if sufficient will indicate that the historical pose will serve as a good predictor of the current pose. In this case it is used, and otherwise it is optionally added to the historical pose database 104c1 with the idea that it may eventually prove useful. For each current pose from localized and normalized extracted block toe determined not to be within historical pose database 104c1, but marked to be added to database 104c1, an indication is encoded into the ensuing broadcast indicting that this same extracted block Doe once decoded should be added to the parallel historical pose database 104c2 on the remote viewing system (show in FIG. 29d.) In this way, both standard pose database 104b and historical pose database 104c1 will have matching equivalents on the decoder system, thus reducing overall transmission bandwidth requirements via the use of references as will be understood by those skilled in the art.

Still referring to FIG. 29a, and specifically to the creation of separated face regions database 102f, the present inventors anticipate that there will be minimal participant face regions 10cm-a within streams of extracted blocks 102d as captured from the overhead tracking system 20cm. Furthermore, the main purpose for separating the face regions 10cm-a is so that they may be encoded with a different technique such as available and well known in the art for image compression than that chosen for the body regions which may not require the same clarity. From the overhead view, this additional clarity is not anticipated to be as important as from the perspective views to be reviewed in FIG. 29b. For these reasons, face regions 102f may not be separated from non-face regions 102g. In this case, localized, normalized sub-streams 102e will be processed similarly to those ways about to be reviewed for separated non-face regions 102g. Regardless, separated non-face regions 102g are then optionally further separated into color underlay images 102i and grayscale overlay images 102h, by use of the color tone table 104a, as previously taught.

Furthermore, as previously taught color underlay images 102i can either be represented as compressed bitmap images or converted to single-color regions defined by outlines such as would be similar to the use of b-splines in vector images.

And finally, still referring to FIG. 29a, the present inventors teach that broadcast encoder 904 may optionally include various levels of segmented streams of current images 102a in its video stream 904v such as: subtracted & gradient images 102b, symbolic database 102c, streams of extracted blocks 102d, localized, normalized sub-streams 102e, separated face regions 102f, separated non-face regions 102g, color underlay images 102*i*, grayscale overlay images 102*h* and/or color tone regions 102*j*. The present inventors prefer creating a video stream 904*v* starting at least at the segmented level of the localized, normalized sub-streams 102*e*. In this case, for each sub-stream 102*e*, the encoded video stream 904*v* will ideally include localization data such as the sub-streams object identification and normalization data such as the extracted block location relative to the entire tracking surface as well as the objects rotation and zoom (i.e. expansion factor.) When optionally used, video stream 904*v* ideally includes codes referencing the predictive pose from either the standard pose database 104*b* or historical pose database 104*c*1. All of this type of "image external" information provides examples of data that is not currently either available or included in an encoded broadcast which essentially works with the information intrinsically contained with the original captured images such as 10*c* included in streams 102*a*. Encoder 904 also receives performance measurement & analysis database 701 to be encoded into its metrics stream 904m and performance descriptors 702 to be included into is audio stream 904*a*.

Referring next to FIG. 29*b*, there is depicted the flow of data after it is originally captured by the perspective filming assemblies 40*c*, which film the game from perspective view 2-*pv*, where it finally ends up being assembled into a broadcast by encoder 904. Specifically, all of the perspective film begins as streams of current images 202*a* as output by perspective filming assemblies 40*c*. As previously discussed, the capturing of current image 10*c* for database 202*a* by assemblies 40*c* is intentionally controlled to occur at a limited number of allowed pan and tilt angles as well as zoom depths. For each image captured and stored in database 202*a*, its associated pan, tilt and zoom settings are simultaneously stored in database 202*s*. As previously taught, background panoramic database 203 can be pre-captured for each distinct filming assembly 40*c*, for each possible allowed pan, tilt and zoom setting. Also as previously taught, background database 203 can optionally include an individual captured image of the background at each of the allowed P/T/Z settings whereby the individual images are stored separately rather than being blended into a panoramic. Exactly similar to the method taught for keeping the background images 2*r* from the overhead assemblies 20*c* "refreshed" with small evolving changes as contained within remainder image 10*x*, such as scratches on the ice surface from skates, the background database 203 is likewise evolved. As current images 10*c* are added to the stream 202*a* their associated P/T/Z Settings as stored in database 202*s* are used to recall the overlapping pre-stored background image from database 203. After applying background images 203 to the stream of current images 202*a*, a new dataset of subtracted & gradient images 202*b* is created. From this dataset image analysis methods as previously discussed create streams of extracted blocks 202*d*.

As previously taught, the extraction of the foreground from perspective view current images 10*c* is more problematic than the extraction from the overhead views. By using the topological profiles 105 and tracking database 101 created by the overhead tracking system as reviewed in FIG. 29*a*, image analysis can separate foreground from fixed as well as potentially moving background such as spectators 13. Aiding in the extraction process is the pre-determined 3-D venue model database 901 that at least helps define the fixed versus potentially moving background areas for each and every possible perspective view given the allowed P/T/Z settings. Also as taught, for each extracted block 10*e* in streams 202*d* there are associated corner coordinates that are used to indicate where the given block is located with respect to the current image that is framed according to the current P/T/Z setting. These corner coordinates are contained in extracted block database 202*d* and are carried into any derivative databases, the description of which is forthcoming.

Still referring to FIG. 29*b*, and exactly similar to the method steps reviewed in FIG. 29*a*, streams of extracted blocks 202*d* are first sorted in the temporal domain based upon the known participants contained in any given image, the information of which comes from the tracking database 101. As previously taught, using either information from a helmet sticker 9*a* or as read off a participant's jersey, information from the overhead system 20*cm* will be used to first separate the extracted blocks 10*e* according to player 10 and/or game object, such as 3. In those cases where multiple participants form a contiguous shape and are therefore together in a single extracted block 10*e*, they are first arbitrarily separated based upon calculations of a best dividing line(s) or curves(s). Regardless, extracted blocks 10*e* with multiple players 10 can still form a single sub-stream for the given number of consecutive frames in which they remain "joined" in contiguous pixel-space. The present inventors are referring to this process of sorting extracted blocks by their known contents as "localization." Once localized, extracted blocks 10*e* are then "normalized" whereby they may be rotated and/or expanded to meet a predetermined orientation or zoom setting as previously taught. (The present inventors prefer to always expand extracted blocks to the greatest known, and controllable zoom setting but do not rule out the potential benefit of occasionally reducing extracted blocks in size during "normalization.")

Once the localized, normalized sub-stream database 202*e* has been formed, it is then optionally transformed into separated face regions 202*f* and non-face regions 202*g*. As previously taught, and using a related set of method steps as reviewed in FIG. 29*a*, this process relies upon overhead tracking information from database 101 that provides the location of the helmet(s) 9 within the detected player(s) 10 shape. This location is ideally determined by first detecting the location of the helmet sticker 9*a* and then working with the color tone table 104*a* to "grow" outwards until the helmet color tone is completed encompassed. Once the outside perimeter dimensions of the helmet are determined, as will be understood by those skilled in the art, this information can be used to determine the upper topology of each player 10's helmet 9 that is determined to be within the view of any given perspective filming assembly 40*c*'s current image 10*c*.

Within this restricted pixel area, the player 10's face region can easily be identified, especially with reference to color tone table 104*a*. Hence, the color tone table 104*a* provides information on which of the limited set of color tones are "uniform" versus "skin." This information can also be used independently to search the interior of shapes seen from the perspective view when players 10 are not wearing helmets 9, such as in the sports of basketball or soccer. Regardless, once the face region 10*cm-a* is encompassed, it can be extracted into a separate stream 202*f* while its pixels are set to an ideal value, such as either null or that of the surrounding pixels in the remaining non-face region stream 202*g*.

Still referring to FIG. 29*b*, and exactly similar to the discussions of FIG. 29*a*, there are a limited number of basic positions, or poses, that any individual player 10 may take during a contest. For instance, they may be walking, running, bending over, jumping, etc. Each of these actions can themselves be broken into a set of basic poses. The present inventors anticipate creating a database of such standard poses 104*b* prior to any contest. Ideally, each pose is for a single player in the same uniform that they will be using in the present contest. With each pose there will be a set orientation and zoom that can be used to translate any current pose as captured in database 202d and optionally subsequently translated into databases 202e, 202g and 202f. As is well known in the art, during the temporal compression of motion video, individual frames are compared to either or both their prior frame and the upcoming frame. It is understood that there will be minimal movement between these prior and next frames and the current frame. The present inventors anticipate the opportunity of additionally comparing the normalized current extracted blocks 10e found in sub-streams 202e (or any of its derivatives,) with the database of standard poses 104b. This will become especially beneficial when creating what is known as the "I" or independent frames in a typically compressed video stream. These "I" frames, as will be understood by those skilled in the art, are purposefully unrelated to any other frames so that they may serve as a "restarting" point in the encoded video stream (such as MPEG2.) However, the fact that they are unrelated also means that they must carry the entire pertinent spatial information, or entropy, necessary to describe their contents. The present inventors teach that at least these "I" frames may be first compared to their expected matches in the standard pose database 104b based upon the translated and normalized extracted block 10e in stream 102e. This comparison will provide a "best-fit" approximation to the current block 10e that can serve as a predictor frame, thereby allowing for greater compression of the "I" frame as will be understood by those skilled in the art. Since the decoder will have reference to an exactly similar standard pose database 104b on the local system, reconstruction of the original streams "I" frames can be accomplished via reference to the "pose number" of the predictor in database 104b after which the "difference" frame may be applied yielding the original "I" frame.

Still referring to FIG. 29b and as previously stated with respect to FIG. 29a, the present inventors further anticipate that it may be unrealistic to have established a standard pose database 104b prior to any given contest. However, it is possible that as each new pose that is detected for a given player 10 during the herein discussed processing of streams 202e or 202g and 202f, can be added to a historical pose database 204c1. For instance, supposing that there was no standard pose database 204b available, then as game 2-g transpires, each player 10 will be transferring through a significant number of poses. Essentially, each captured frame resulting in an extracted block 10e which is then localized and normalized, can be first searched for in the historical pose database 104c1. If it is found, this pose can be compared to the current pose in block 10e. This comparison will yield a match percentage that if sufficient will indicate that the historical pose will serve as a good predictor of the current pose. In this case it is used, and otherwise it is optionally added to the historical pose database 104c1 with the idea that it may eventually prove useful. For each current pose from localized and normalized extracted block 10e determined not to be within historical pose database 104c1, but marked to be added to database 104c1, an indication is encoded into the ensuing broadcast indicting that this same extracted block 10e once decoded should be added to the parallel historical pose database 104c2 on the remote viewing system (show in FIG. 29d.) In this way, both standard pose database 104b and historical pose database 104c1 will have matching equivalents on the decoder system, thus reducing overall transmission bandwidth requirements via the use of references as will be understood by those skilled in the art.

Still referring to FIG. 29b, and specifically to the creation of separated face regions database 202f, the present inventors anticipate that there may be circumstances where separating the face portion of an extracted block 10e is not beneficial to overall compression. For instance, when player's 10 take up a smaller portion of the current image 10c from perspective view 2-pv, the actual face region itself may be minor in comparison to the other "entropy" within the image. As will be understood by those skilled in the art, human perception of image detail is less effective for smaller faster moving objects. The present inventors anticipate that the tracking database 101 and 3-D venue model database 901, along with pre-calibration of all overhead assemblies 20c and filming assemblies 40c to the venue model 901, will result in a system capable of dynamically determining the amount of potential face area per player 10 in each perspective film current image 10c. This dynamic determination will for instance cause zoomed in shots of slower moving players to be separated into face regions 202f and non-face regions 202g. Conversely, zoomed out shots of faster moving players will not be separated. Furthermore, the main purpose for separating the face regions 10cm-a is so that they may be encoded with a different technique such as available and well known in the art for image compression than that chosen for the body regions which may not require the same clarity. If separated, they will be seamlessly reconstructed during the decode phase as summarized in FIG. 29d. Otherwise, the data in separated non-face region 202g will be equivalent to localized, normalized sub-streams 202e. Regardless, separated non-face regions 202g are then optionally further separated into color underlay images 202i and grayscale overlay images 202h, by use of the color tone table 204a, as previously taught. Furthermore, as previously taught color underlay images 202i can either be represented as compressed bitmap images or converted to single-color regions defined by outlines such as would be similar to the use of b-splines in vector images.

And finally, still referring to FIG. 29b, the present inventors teach that broadcast encoder 904 may optionally include various levels of segmented streams of current images 202a in its video stream 904v such as: subtracted & gradient images 202b, streams of extracted blocks 202d, localized, normalized sub-streams 202e, separated face regions 202f, separated non-face regions 202g, color underlay images 202i, grayscale overlay images 202h and/or color tone regions 202j. The present inventors prefer creating a video stream 904v starting at least at the segmented level of the localized, normalized sub-streams 202e. In this case, for each sub-stream 202e, the encoded video stream 904v will ideally include localization data such as the sub-streams object identification and normalization data such as the extracted block location relative to the entire tracking surface as well as the objects rotation and zoom (i.e. expansion factor.) Associated with this will be the P/T/Z settings 202s for each extracted/translated foreground image. When optionally used, video stream 904v ideally includes codes referencing the predictive pose from either the standard pose database 104b or historical pose database 104c1. All of this type of "image external" information provides examples of data that is not currently either available or included in an encoded broadcast which essentially works with the information intrinsically contained with the original captured images such as 10c included in streams 102a. Encoder 904 also receives ambient audio recordings 402a as well as their translation into volume and tonal maps 402b, as previously discussed.

Referring next to FIG. 29c, there is depicted five distinct combinations of video stream data 904v, metrics stream data 904m and audio stream data 904a that can optionally form the transmitted broadcast created by encoder 904. These combinations are representative and not intended by the present inventors to be exclusive. Other combinations can be formed based upon the data sets described specifically in FIGS. 29a and 29b and in general described herein and within all prior continued applications. Examples of other combinations not depicted within this FIG. 29c will be discussed after those shown are first described. The combinations shown have be classified as profile A 904pA, profile B 904pB, profile C1 904pC1, profile C2 904pC2 and profile C3 904pC3. Profile A 904pA is representative of the information contained in a traditional broadcast and is based upon video stream 904v comprising streams of current images such as 102a and 202a as well as ambient audio recordings 402a. (Note that the present inventors are saying that the format of the streams of current images, such as 102a and 202a, is similar to that provided to a traditional encoder for compression and transmission. The present inventors are not implying that the streams of current images from the overhead cameras 102a are themselves in any way traditional, or taught by the state of the art, and in fact must first be "stitched together" from a multiplicity of overhead images that in itself is considered a teaching of the present application.)

Profile B 904pB represents the first level of unique content as created by the apparatus and methods taught in the present application. Specifically, this profile 904pB comprises associated P/T/Z Settings 202s required for decoding streams of extracted blocks 102d and 202d as previously taught. Profile B 904pB further comprises new gradient images 102b and 202b that to the end-viewer appear to be moving "line-art." This "line-art" representation of the game activities can further be colorized to match the different teams especially by encoding color tone codes within the outlined region interiors are previously discussed. (This colorized version is essentially the same information encoded in the color tone regions 102j, where the grayscale information has been removed and the images are represented as line or curve bounded regions containing a single detected color tone.) The potential compression advantages of this representation are apparent to those skilled in the art. It is anticipated that a particular broadcast could contain traditional video perspective views of the game action along with a colorized "line-art" view of game from the overhead based upon gradient images 102b. It is also anticipated that during times of high network traffic or less stable communications, the encoder 904 may receive feedback from the decoder 950 that could automatically "downgrade" from perspective views generated from streams of extracted blocks 202d to colorized "line-art" based upon gradient images 202b. Or, for slower speed connections, the present inventors anticipate simply transmitting the gradient images 102b or 202b, or the color tone regions 102j as will be discussed with profile C3 904pC3, rather than sending the streams of extracted blocks 102d or 202d.

Still referring to FIG. 29c and profile B 904pB, the video stream optionally further comprises symbolic database 102c, based upon information determined by the overhead tracking system 100. As previously discussed, the anticipated symbols in database 102c include a inner oval for the location of the helmet sticker 9a, and first outer oval representing the surrounding limits of the player's helmet 9, a second outer oval representing the approximately shape of their player's body 10sB as well as a vector representing the player's associated sticker 10sS. The game object, such as puck 3, will also be represented as some form of an oval, typically a circle for the game of ice hockey. The present inventors anticipate that this symbolic representation will provide valuable information and may further be used to enjoy a depiction of the game via very low bandwidth connections that otherwise cannot support the live transmission of either the extracted blocks 102d or 202d, or the gradient images 102b or 202b. Further anticipated is the ability to colorize these symbols to help define the home and away teams and to identify each symbol by player number and/or name based upon tracking information embedded in the symbolic database 102d. Also present in profile B 904pB is the performance measurement & analysis database 701 containing important summations of the underlying tracking database 101. These summations as previously discussed are anticipated to include the detection of beginning and ending of certain events. For the sport of ice hockey, these events might include:

a player 10's entrance into or exit from official game play,
a scoring attempt determined when a defensive player 10 causes the puck 3 to enter a trajectory towards the goal,
a score where the puck 3 has entered the area of the goal and/or the game interface system has indicated a stoppage of play due to a scored goal, and
a power play/short handed situation where one team has at least one player 10 in game play less than the other team.

The proceeding examples are meant to be representative and will be the focus of a separate application by the present inventors. The examples are not meant to be limitations of the extent of the performance measurement & analysis database 701 that is considered by the present inventors to include significant performance and game status information. Many other possible interpretations and summations of the tracking database 101 are possible including player passing, hits, gap measurements, puck possession, team speed, etc. What is important is that the present inventors teach apparatus and methods capable of determining and broadcasting this information 701 in combination with cross-indexed video such as streams 102d or 202d or the derivatives of these streams such as gradients 102b or 202b or symbolic database 102c. And finally, within profile B 904pB there are also ambient audio recordings 402a as incorporated in the traditional profile A 904vA.

Referring still to FIG. 29c, and now specifically to profile C1 904pC1, it is shown to differ from profile B 904pB in that streams of extracted blocks 102d and 202d are replaced by localized, normalized sub-streams 102e and 202e. As was previously taught and will be understood by those skilled in the art, by sorting the extracted blocks into sub-groups based upon player and object identity, the likelihood of performing successful "block matching" between images in the temporal plane is greatly increased. This increase in likelihood will positively effect both computational requirements and compression levels. More specifically, traditional compression algorithms attempt of isolate moving foreground objects with a potentially moving background (due to a moving camera.) The process of finding foreground objects requires a "block matching" and "motion estimation" procedure between successive video frames as will be well understood by those skilled in the art. The present invention greatly reduces this computational effort by first isolating the moving foreground objects based upon information collected from the overhead tracking system that is directly relatable to the current image from each calibrated perspective view camera. Essentially, the compression algorithms no longer have to search for moving objects between successive frames since these objects are identifiable in real-time based upon apparatus and methods taught herein. Each moving foreground object transverses a contiguous path in the "real domain" of the tracking area that typically turns into a variant path across the succession of video frames. By first extracting, then dividing and finally sorting the moving foreground objects such as players 10 into sub-streams, it is possible to greatly limit the apparent movement in the temporal dimension as perceived by the traditional "motion estimation" algorithms. Hence, as they search for movement from frame to frame, they are progressively more likely to find less movement as they process localized sub-streams 102e and 202e, versus streams of extracted blocks 102d and 202d, versus the traditional streams of current images 102a and 202a. Furthermore, by first normalizing the localized sub-streams, so that the same player from frame to frame does not significantly change in either size or, as much as possible orientation, then the "block matching" algorithms are further aided. As will be appreciated by those skilled in the art, the net result of these teachings is the effect of taking the "motion" out of what is normally "high-motion" video. This net reduction in "motion" greatly increases compression opportunities. For instance, higher compression methods typically reserved for use with "minimal-motion" video conferencing (such as the XYZ technique) may now be usable with "high-motion" sports video.

Still referring to profile C1 904pC1 in FIG. 29c, the other difference versus the prior profile is the inclusion of performance descriptors 702 and volume and tonal maps 402b in the audio stream 904a. Performance descriptors 702 are derived primarily from performance measurement & analysis database 701 but may also be influenced by information in 3-D volume model database 901 and tracking database 101. Descriptors 702, as previously taught are anticipated to be a series of encoded tokens representing a description of the ongoing activities in the game matched to the transmitted video stream 904v, metrics stream 904m and ambient audio recordings 402a in audio stream 904a. For the sport of ice hockey, such descriptions may include:

the announcement of a player 10 entering the game, whereby such an announcement may be made as a decision local on the remotes system at the time of decoding, for instance in the case the local viewer is pre-known to be related to or interested in the player 10, or the player 10 themselves, the announcement of an attempted shot by a particular player 10 and its result such as blocked or goal, the announcement of a team's power play with references back to results from previous power play's in the present game, or the announcement of official scoring or penalty calls as gathered from the game interface system 600.

The proceeding examples are meant to be representative and will be the focus of a separate application by the present inventors. The examples are not meant to be limitations of the extent of the performance descriptors 702 that is considered by the present inventors to include significant performance description information. Many other possible translations of the performance measurement & analysis database 701 are possible including player passing, hits, gap measurements, puck possession, team speed, etc. Furthermore, many other possible translations of the tracking database 101, especially with respect to the 3-D venue model database 901 are also possible including descriptions of the location of the puck 3, a specific player 10 or the general action being in the "defensive zone," "neutral zone," or "attack zone." What is important is that the present inventors teach apparatus and methods capable of determining and broadcasting these descriptors 702 in combination with cross-indexed video stream 904v, metrics stream 904m and other information in audio stream 904a. As has been discussed and will be reviewed in association with FIG. 29d, these tokens may be used to automatically direct text-to-speech synthesis software modules with the net result of creating an automated game commentary audio track.

And finally, volume & tonal maps 402b represent encoded samplings of the ambient audio recordings 402a designed to create a significantly more compressed representation of the audio environment of the ongoing contest, as will be understood by those skilled in the art. The present inventors anticipate that the exact nature of the sounds present at a sporting contest are not as important, and are in fact not as noticed, as are the general nature of the ambient sounds. Hence, the fact that the crown noise is increasing or decreasing in volume at any given time carries a significant portion of the real audio "information" perceived by the end viewer and is much simpler to encode than an actual sound recording. The present inventors refer to this as a "tonal map" that is at it simplest a continuous stream of decibel levels and at its most complex a set of decibel levels per predetermined pitches, therefore referred to as "tonal maps." These maps may then be used during the decode phase to drive the synthetic recreation of the original game audio track. The present inventors further anticipate using information from the performance measurement & analysis database 701 to further augment the synthesized audio reproduction, for instance by the addition of a "whirling, police siren-like goal-scored" sound often found at a hockey game. Regardless, what is important is that the present inventors anticipate reducing the bandwidth requirements of the audio stream 904a portion of the encoded broadcast to minimally include tokens or other representations that are not in audio form but which can be translated into synthesized audible signals in order to add a realistic audio representation of the game's activity.

Referring still to FIG. 29c, and now specifically to profile C2 904pC2, it is shown to differ from profile C1 904pC1 in that localized, normalized sub-streams 102e and 202e are now further segmented into separated non-face regions 102g and 202g as well as separated face regions 102f and 202f. As was previously taught, such separation is possible based upon the apparatus and methods taught herein and specifically allowing for the efficient real-time location of the exact pixel area within a given current image 10c and its extracted blocks 10e, where the face region is expected to be found. Furthermore, use of the color tone table is an important method for isolating skin versus uniform, which is even more relevant after moving backgrounds of spectators have been removed, again based upon the teachings of the present application. As will be understood by those skilled in the art, different compression methods may be applied to non-face regions 102g and 202g verses face regions 102f and 202f based upon the desired clarity. Furthermore, as previously discussed, the decision to make this further segmentation can be dynamic. For instance, during close up filming of one or more players, it is anticipated to be beneficial to separate the face region for a "better" encoding method that retains further detail. Since the uniform is not expected to be as "noticed" by the viewer, the clarity of its encoding method is less significant. However, since the uniform encompasses a greater pixel area that the face region, using a more compressed method offers significant overall compression advantages, as will be understood by those skilled in the art.

Referring still to FIG. 29c, and now specifically to profile C3 904pC3, it is shown to differ from profile C2 904pC2 in that separated non-face regions 102g and 202g have themselves been segmented and transmitted as color underlay images 102i and 202i and grayscale overlay images 102h and 202h. As previously discussed, using pre-known color tone table 104a, the present invention teaches a method for first subtracting from each pixel identified to be a part of the foreground image the nearest associated color tone. The resulting difference value is too be assigned to the associated pixel in the grayscale overlay images 102h and 202h. As will be understood by those skilled in the art, what is left in the color underlay images are areas of contiguous pixels comprising the same nearest matching, or subtracted, color tone. As will also be understood, this process has removed the higher frequency pixel color/luminescence variations from the color underlay images 102*i* and 202*i* and placed them in the overlay images 102*h* and 202*h*. This inherently makes the underlay images 102*i* and 202*i* more compressible using traditional methods. The present inventor prefer an approach that first converts the RGB three byte encoding of each foreground pixel to its YUV equivalent as will be understood by those skilled in the art. This transformation in color representation methods results in a separation of the hue and saturation, referred to as UV and the luminescence, referred to as Y. In practice, this conversion should always provide a UV value very near one of the pre-known color tones in table 104*a*. Once the nearest matching color tone is identified from the table 104*a*, it is used to reset the UV value of the foreground pixel; hence locking it in to the color that it is determined to be most closely matching. (Note that the pre-known color tones in table 104*a* are preferably stored in the UV format for easier comparison.) The already converted luminescence value than becomes the pixel value for the grayscale overlay images 102*h* and 202*h*. Again, as will be understood by those skilled in the art, the process of removing the luminescence is a well known approach in image compression. What is further taught is the resetting the UV values to their nearest match in the color tone table 104*a* with the understanding that these are the only possible colors on the detected foreground objects. This "flattening" process removes minor variations due to different forms of noise and creates a much more compressible color underlay image 102*i* and 202*i*.

The present inventors further prefer limiting the Y or luminescence values to 64 variations as opposed to 256 possible encodings in the traditional 8 bit format. One reason for this is that studies have shown that the human eye is capable of detecting only about 100 distinct grayscales (versus 100,000 to 200,000 hue/saturation combinations.) Furthermore, for smaller faster moving objects the eye's ability to distinguish distinct values is even further limited. Therefore, for the sake of higher compression values, the present inventors prefer a 6 bit, rather than 8 bit, encoding of luminescence. This six bit encoding will effectively represent 1 to 64 possible brightness variations on top of each color tone in table 104*a*.

As will be understood by those skilled in the art, traditional methods of encoding Y and IN values have typically adopted a an approach that favors recoding the Y value for every pixel with 8 bits or 256 variations, while both the U and V values are recorded for every forth pixel with 8 bits or 256 variations. Thus, every four-square block of pixels requires 4*8=32 bits to encode luminescence and 1*8=8 bits to encode hue and 1*8=8 bits to encode saturation, for a total of 48 bits. This approach is satisfactory because human perception is more sensitive to variations in luminescence versus hue and saturation (color.) Note that this provided a 50% savings in bit rate over the RGB encoding which requires 8 bits for each color, red (R), blue (B) and green (G) and therefore a total of 4*3*8=96 bits. The present inventors prefer encoding the Y value with 6 bits (i.e. 64 grayscale variations) over ¾'s of the pixels, therefore yielding 3*6=18 bits. Furthermore, the U and V values are essentially encoded into the color tone table 104*a*. Thus, the present inventors prefer encoding the color tone for every forth pixel using 6 bits (i.e. 64 possible color tones,) therefore yielding 1*6=6 bits. This combination provides a total of 24 bits which is a 50% reduction again over traditional compression. Note that the approach adopted by the present teachings allows for the face regions 102*f* and 202*f* to be separated with the idea that the traditional 48 bit encoding could be used if necessary to provide greater clarity, at least under select circumstances such as close up shots of slow moving or stationary players where any loss of detail would be more evident. It should not be construed that this preferred encoding method is strictly related to the video stream 904*v* in profile c3 904*p*C3. The present inventors anticipate this encoding method will have benefits on each and every level from profile B 904*p*B through to that presently discussed. Furthermore, these profiles are meant to be exemplary and may themselves become variations of each other. For instance, it is entirely possible and of anticipated benefit to employ the color tone table 104*a* during the creation of the streams of extracted blocks 102*d* and 202*d*. In this case, encoding methods such as the 24 bit Y/Color Tone method just described may be implemented. What is important is that the individual opportunities for broadcast encoding that arise from the apparatus and methods of the present application may be optimally constructed into unique configurations without departing from the teachings herein as will be understood by those skilled in the art.

And finally, still with respect to FIG. 29*c* and profile C3 904*p*C3, it is possible to alternately encode and transmit color underlay images 102*i* and 202*i* as color tone regions 102*j* and 202*j*. As will be understood by those skilled in the art, color underlay images 102*i* and 202*i* have essentially been "flattened," thereby creating whole pixel areas or regions of the foreground object containing a single color tone. As will also be appreciated, as these regions grow in size, it may become more beneficial to simply encode the regions border or outline along with a code indicating the interior color tone rather than attempting to encode every "macro-block" within each region. The present inventors anticipate that this decision between the traditional "raster" approach that encodes pixels versus the "vector" approach that encodes shape outlines with interior region color descriptions can be made dynamically during the broadcast encoding. For instance, one particular player 10-1 may appear through a given sequence of image frames at a much closer distance than another player 10-2. Player 10-1 therefore is taking up more pixels relative to the entire current frame and is also more "visible" to the end viewer. In this case, after localization that breaks this player 10-*i*'s foreground information into its own localized and normalized sub-perspective view stream 202*e*, the encoder 904 may preferably choose to create separated face region 202*f* from non-face region 202*g* so that player 10-1's face may be encoded with more detail using traditional 48 bit YUV encoding. Conversely, player 10-2, who appears further away in the present image, is also first localized and normalized into stream 202*e*. After this, encoder 904 may preferably choose to create skip straight to color tone regions 202*j* with grayscale overlay images 202*h* using the aforementioned 24 bit Y/Color Tone encoding for the regions 202*j*.

The present inventors wish to emphasize the importance of the various teachings of new apparatus and methods within the present invention that provide critical information necessary to drive the aforementioned and anticipated dynamic broadcast encoding decisions. For instance, the information collected and created by the overhead tracking system 100 provides critical data that is necessary for encoder 904 to determine dynamic option parameters. Such examples of critical data being:

what player 10-1 is currently being viewed in the extracted foreground block 10*e*?;

what are the color tones that are expected to be found in this player 10-1?;

are there any other players such as 10-2 or 10-3 that are calculated to be obstructing view of player 10-1?;

if so, what color tones 10*ct* may be expected on obstructing player's 10-2 or 10-3?:

where is the helmet of player 10-1 in the current extracted block and therefore also, where is player 10's face region and how many pixels does it take up?:

what is the relative speed of player 10-1 taking into account the known P/T/Z movements of the filming camera assembly 40*c* capturing extracted block 10*e*?;

what is the pixel area taken up by player 10-1?, and how is all of this information anticipated to change in the directly ensuing image frames based upon known trajectory vectors of players 10-1, 10-2 and 10-3, etc.?

This list as provided is meant to summarize the effective value of the combination of the use of a tracking system with that of a filming system. The present inventors anticipate other critical information, some as previously taught and implied herein, and some as will be obvious to those skilled in the art that have not been expressly discussed. What is important is benefits to the encoding process based upon a controlled filming system that can be gained via the integration with an object tracking system.

Referring next to FIG. 29*d*, there is shown the four "non-traditional" profiles B through C3, 904*p*B through 904*p*C3 respectively, as first depicted in FIG. 29*c* being presented by broadcast encoder 904 to decoder 950 that ultimately creates a viewable broadcast 1000. With respect to the present FIG. 29*d*, the interpretation of the most segmented profile, namely C3 904*p*C3, will be discussed in detail. As will be understood by those skilled in the art, similar concepts are likewise applicable to the remaining less segmented profiles B 904*p*B through C2 904*p*C2. First, it is understood that any remote system receiving the broadcast from encoder 904 should already have access to the following pre-established databases:

the 3-D venue model database 901 describing the facility where the broadcasted game is being played;

the background panoramic database 203 for all perspective filming assemblies 40*c* contributing to the received broadcast as well as an overall background for the overhead views captured by assemblies 20*c*;

the 3-D ad model database 902 containing at least virtual advertisements in the form of floating and fixed billboards registered to the 3-D venue model database 901;

the color tone table 104*a* containing the UV (hue and saturation) equivalent values for between preferably 1 to 64 distinct uniform and skin color tones expected to be found on both home and away players;

the standard pose database 104*b* of pre-captured images in "extracted block" form that can be used as predictors at least for the "I" (independent) frames associated with a given video stream;

the description translation rules 703*a* that define how performance descriptors 702 should be converted into text and then synthesized into speech, the audio map translation rules 403*a* that define how the volume and tonal maps 402*b* should be converted into synthesized crowd noise, and the viewer profile & preferences 951 describing important marketing information describing the viewer(s) as well as there relationship to the game in addition to holding information concerning the actual configuration of the viewable broadcast 1000 that they would prefer.

The present inventors anticipate that these aforementioned databases will be made available via a data storage medium such as CD ROM or DVD to the user on the remote system. These files are then copied onto the remote system in such a way that they are available to decoder 950. It is further anticipated that either some or all of the files could either be downloaded or updated with changes or additions via the Internet, preferably using a high speed connection. What is important is the teachings of the present invention that show how the pre-establishment of this information on the remote decoding system can be used to ultimately reduce the required bandwidth of the broadcast created by encoder 904.

Still referring to FIG. 29*d*, in addition to the aforementioned pre-established databases, the present invention also teaches the use of a set of accumulated databases as follows:

the historical pose database 104*c*2 of saved poses from the recreated broadcast stream being received from encoder 904 that may be used in a similar fashion to any standard poses in database 104*b*;

the historical performance database 701*a* that is accumulated from the transmitted performance measurement & analysis database 701 and may include the current game as well as all other viewed games, thereby providing a background of measurements into which the current game may be contrasted, and the historical descriptor translations 703*b* that are accumulated from the actual translations of the performance descriptors 702 as they are operated upon using rules 703*a* and may include the current game as well as all other viewed games, thereby providing a background of phraseology that has been used previously into which the current games translations may be influenced.

As video stream 904*v*, metrics stream 904*m* and audio stream 904*a* are received from broadcast encoder 904 by decoder 950, the aforementioned pre-established and accumulated historical databases cooperate to translate the encoded information into broadcast 1000 under viewer directives as stored in profile & preferences database 951. Specifically, with reference to the decoding of profile C3 904*p*C3, decoder 905 may receive color underlay images 102*i* and 202*i* that are translated via color tone table 104*a* into their appropriate V (hue and saturation) values per pixel. As previously stated, the images themselves preferably include a single 6 bit code for every for bit block of pixels. Each 6 bit code represents 1 of 64 possible color tones 10*ct* that are then translated into an equivalent 8 bit U (hue) and 8 bit V (saturation) for use in the final display of images. Note that the equivalent 8 bit U and 8 bit V values do in fact represent one "color" or hue/saturation out of 256*256=65,536 possible choices. Hence, the video card on the end user's PC will use the resulting UV code to choose from amongst 65,536 displayable colors.

The present invention is simply taking advantage of the fact that it is pre-known up front that there are never more than a total of 64 of these possible 65,536 being used on any home or away team uniform or equipment or in any player's skin tone. The present inventors anticipate that should there be circumstances whereby there are more than 64 possible colors that may be present on a foreground object, some of these colors can be "dropped" and therefore included with the next closest color, especially since they may not appear on large spaces or very often and for all intensive purposes will not be noticed by the viewing audience.

Still referring to FIG. 29*d*, it is possible that the encoder 904 will alternatively have chosen to transmit color tone regions 102*j* and 202*j* versus color underlay images 102*i* and 202*i*. As previously stated, this is primarily a difference between vectors versus raster based encoding, respectively. In this case, regions 102*j* and 202*j* are first translated into equivalent bitmap representations as will be understood by those skilled in the art. These bitmap representations will then also be assigned UV values via the color tone table 104*a* as previously stated for the color underlay images 102*i* and 202*i*.

It is possible that either color underlay images 102*i* and 202*i* or color tone regions 102*j* and 202*j* will be referenced to, or "predicted from," a standard pose in database 104*b* or a historical pose in database 104*c*2. As will be understood by those skilled in the art, these standard or historical poses would then become the underlying pixel image to which the transmitted "difference" image, either in the form of color underlay images 102*i* and 202*i* or color tone regions 102*j* and 202*j*, would then be "added" in order to return to an original current player 10 pose. The end result of all of these possible decoding paths is the recreation of foreground overlays 102*d*R and 202*d*R. Note that once a foreground overlay 102*d*R and 202*d*R has been recreated, a directive may also be embedded in the transmitted data indicating the this particular pose should be stored in the historical pose database 104*c*2 for possible future reference. The present inventors anticipate flagging such poses on the encoding side due to information that indicates that, for instance, a player 10 is being viewed in isolation, they are relatively close-up in view, and that the orientation of their pose is significantly different from any other such previously saved poses in the uniform colors they are currently wearing. Also potentially adding to recreated foreground overlays 102*d*R and 202*d*R are translated separated face regions 102*f* and 202*f*. As previously stated, separated face regions 102*f* and 202*f* are optionally created by encoder 904 particularly under those circumstances when greater image clarity is desired as opposed to separated non-face regions 102*g* and 202*g*. There translation is exactly similar to that of color underlay images 102*i* and 202*i* in that the color tone table 104*a* will be used translate color tones 10*ct* into UV values and standard pose database 104*b* or historical pose database 104*c*2 will optionally be used as "predictors." After the translation of either color underlay images 102*i* and 202*i* or color tone regions 102*j* and 202*j*, and then optionally separated face regions 102*f* and 202*f*, grayscale overlay images 102*h* and 202*h* are themselves translated and added onto the current recreated foreground overlays 102*d*R and 202*d*R. Specifically, grayscale overlay images 102*h* and 202*h* are decoded in a traditional fashion as will be understood by those skilled in the art. This additional luminescence information will be used to augment the hue and saturation information already determined for the recreated foreground overlays 102*d*R and 202*d*R.

Still referring to FIG. 29*d*, after overlays 102*d*R and 202*d*R have been recreated, they are placed on top of recreated background underlays 203R, forming a single images in the streams of current images 102*a*R and 202*a*R, as will be understood by those skilled in the art. Background underlays 203R are recreated to match the transmitted associated P/T/Z settings 202*s*. Essentially, as was previously taught, for each current image 10*c* taken from a filming assembly 40*c*, the assemblies perspective, or view was fixed at a pre-determined orientation as expressed in pan, tilt and zoom settings. While the encoding process then removes and eliminates the background, the decoding process must first restore either an equivalent "natural" or "animated" background. As was previously taught, in order to recreate an equivalent "natural" background, the associated P/T/Z settings can be used to extract directly from the background panoramic database 203 approximately the same pixels that were originally removed from image 10*c*. When used as an underlay 203R, the resulting current image in streams 102*a*R and 202*a*R will look "realistic" and for all intensive purposes undistinguishable to the viewer.

The present inventors also anticipate that it will be highly beneficial to be able to insert realistic looking advertisements in between the recreated background 203R and the merged in foreground 102*d*R and 202*d*R making it seem as if the ad, or billboard, was actually in the stadium all along. As previously discussed, these advertisements can be drawn from a larger 3-D ad model database 902 on the decode side of the transmission, thereby not only saving in required bandwidth, but perhaps more importantly, allowing for customized insertion based upon the pre-known viewer profile & preferences 951.

Still referring to FIG. 29*d*, under certain circumstances such as in response to the viewer profile & preferences 951, an animated background will be used rather than the natural one just described. In this case, associated P/T/Z settings 202*s* are interpreted in light of the 3-D venue model database 901, thereby determining exactly which part of the stadium is within the current view. As this is know, the 3-D model 901 may contain information, such as background colors and texture, necessary to drive an animation program as will be understood by those skilled in the art. Similar to the natural background, advertisements from database 902 can be overlaid onto the animated background forming the background underlays 203R. Regardless, once streams of current images are available, the video portion(s) of broadcast 1000 can be controlled via the profile & preferences database 951 that is anticipated to be interactive with the viewer.

The present inventors further anticipate that as the viewer indicates changes in preference from a certain view to a different view or views, this information can be feed back to the encoder 904. In this way, encoder 904 does not have to transmit all possible streams from either the overhead assemblies 20*c* or perspective assemblies 40*c*. Furthermore, it is possible that in response to the viewer profile & preferences 951 only the gradient images 102*b* and 202*b* are transmitted, and/or only the symbolic data 102*c*, etc. Specifically, with respect to gradient images 102*b* and 202*b*, when present in video stream 904*v* they can be translated using traditional techniques as will be understood by those skilled in the art based upon either raster or vector encoding. Furthermore, using color tone table 104*a*, they can be colorized to better help the viewer distinguish teams and players. If symbolic database 102*c* is present in the video stream 904*v*, it can be overlaid onto a graphic background depicting the playing surface and colorized using color tone table 104*a*. Furthermore, the present inventors anticipate overlaying useful graphic information onto any of the created views being displayed within broadcast 1000 based upon either performance measurement & analysis database 701 or its historical database 701*a*. Such graphic overlays, as previously taught, may include at least a floating symbol providing a player 10's number or name, or it may show a continually evolving streak representing the path of a player 10 or the puck 3. These overlays may also take the form of the traditional or newly anticipated statistics and measurements. Rather than overlaying this information onto the continuing video portion of the broadcast 1000, the present inventors anticipate creating a "game metrics window" as a portion of the entire screen that will display information primarily is textual form directly from either the performance measurement & analysis database 701 or its historical database 701*a*. The decision on the types of information to display and their format is carried in the viewer profile & preferences database 951.

And finally, with respect to the audio portion of broadcast 1000, the present inventors prefer using the volume & tonal maps 402*b* as interpreted via the audio map translation rules 403*a* in order synthesize a recreation of the original stadium sounds. Again, viewer profile & preferences 951 are used to indicate whether the view wishes to hear the original sounds intact or a "filled-to-capacity" recreation. As previously discussed, game commentary can also be added to broadcast 1000 by processing performance descriptors 702 along with the historical database 703b via translation rules 703a. The present inventors anticipate that rules 703a in conjunction with the viewer profile & preferences 951 will at lest govern the choices and implementation of:
- the commentator's voice, that is effectively embedded in the text-to-speech engine, as will be understood by those skilled in the art,
- the expression styles, such as for children, youths or adults, and
- the level of detail in the commentary.

Historical descriptor database 703b is anticipated to very helpful in keeping the speech fresh by making sure that certain speech patterns are not overly repeated unless, for instance, they represent a specific commentator's style.

The end result of the entire decoding process discussed in detail for profile C3 904pC3 and implied in general for the remaining profiles and any other possible combinations of the datasets taught in the present application, is the creation of a broadcast 1000 representing video 904v, metrics 904m and audio 904a information.

Conclusion and Ramifications

The above stated objects and advantages are to be taught in cooperation in the present invention, thereby disclosing the elements of a complete Automatic Event Videoing, Tracking and Content Generation System. However, the present inventors recognize that specific elements are optional and either would not be required under certain circumstances or for particular sports. It is also noted that removal of these optional elements does not reduce the novel usefulness of the remaining aspects of the specification. Such optional elements include:

1. The automatic game filming system 200 if perspective view game film is not desired;
2. The interface to manual game filming 300 if manual game filming cameras will not be used:
3. The spectator tracking & filming system 400 if additional video and audio from the spectators is not desired to enhance the broadcast;
4. The player & referee identification system (using jersey numbers) 500 if other techniques such as helmet stickers 9a or helmet transponders 9t are used to identify participants;
5. The game clock and official scoring interface system 600 if it is preferred that operators 613 control the game clock and scoreboard;
6. The performance measurement & analysis system 700 if only time synchronized game film is desired;
7. The interface to performance commentators 800 if game commentators are not present or it is not desired that their comments be added to the broadcast;
8. The overhead image database 102 if overhead game film is not desired, and
9. The encoded broadcast 904 and broadcast decoder 950 if the broadcast is to be generated live and presented locally without need for compression and transmission to a remotely networked or connected system.

What is preferred and first claimed by the present inventors is the minimum configuration expected to be necessary to create a meaningful and enjoyable broadcast including:
1. The tracking system 100 with both the tracking database 101 and overhead image database 102;
2. The automatic game filming system 200;
3. The performance measurement & analysis system 700, and
4. The automatic content assembly & compression system 900 without encoded broadcast 904 and broadcast decoder 950.

The combined elements of this minimum configuration are anticipated to provide:
1. Game film taken from the overhead view including the adjacent team bench, penalty waiting and entrance/exit areas that, at least for the indoor sport of ice hockey, is currently only available at the professional level where the arena structure allows for ceiling cameras hundreds of feet above the playing surface;
2. Game film taken from at least one perspective view that is automatically adjusted to follow either the contest's center-of-play, or any center-of-interest, that is currently only available from systems that employ electronic transponders affixed to the game object or one or more participants;
3. Real-time digital measurements of key game activities including participant and game object locations and orientation, providing the basis for the automatic generation of statistics, the detection of specific events and the assessment of participant performance that is currently unavailable in full and only in partially available via location tracking based upon electronic transponders affixed to the game object or one or more participants, and
4. An integrated multi-media presentation of all game film synchronized at least by both time and detected game events that are currently only available through the use of film collection systems that accept operator based judgments to define game events.

The remaining optional elements add to the following provisions:
5. Game film taken by automatically controlled but manually directed filming cameras allow for operator choice of perspective views that can be combined with the automated system choices;
6. Video taken and audio recorded of the spectators including coaches, team benches and fans From the foregoing detailed description of the present invention, it will be apparent that the invention has a number of advantages, some of which have been described above and others that are inherent in the invention. Also, it will be apparent that modifications can be made to the present invention without departing from the teachings of the invention. Accordingly, the scope of the invention is only to be limited as necessitated by the accompanying claims.

Also depicted are perspective Z tracking cameras set behind each goal, as well as automatic pan, tilt and zoom perspective filming cameras.

Figure 1:
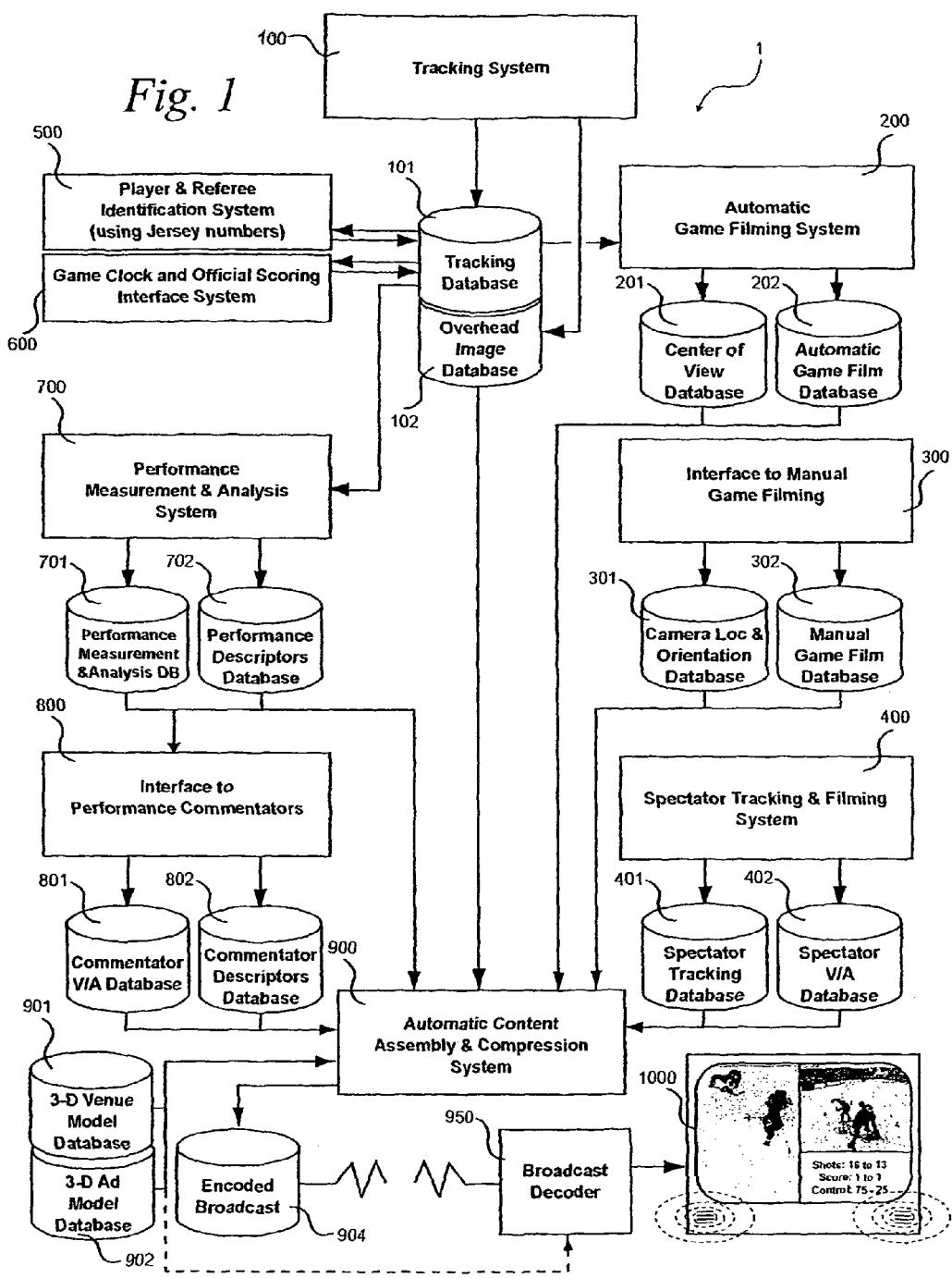
FIG. 1 is a block diagram depicting the major sub-systems of the Automatic Event Videoing, Tracking and Content Generation System, including: a tracking system, an automatic game filming system, an interface to manual game filming, an automatic spectator tracking & filming system, a player & referee identification system, a game clock interface system, and a performance measurement & analysis system, an interface to performance commentators, an automatic content assembly & compression system as well as a broadcast decoder.
Figure 2:
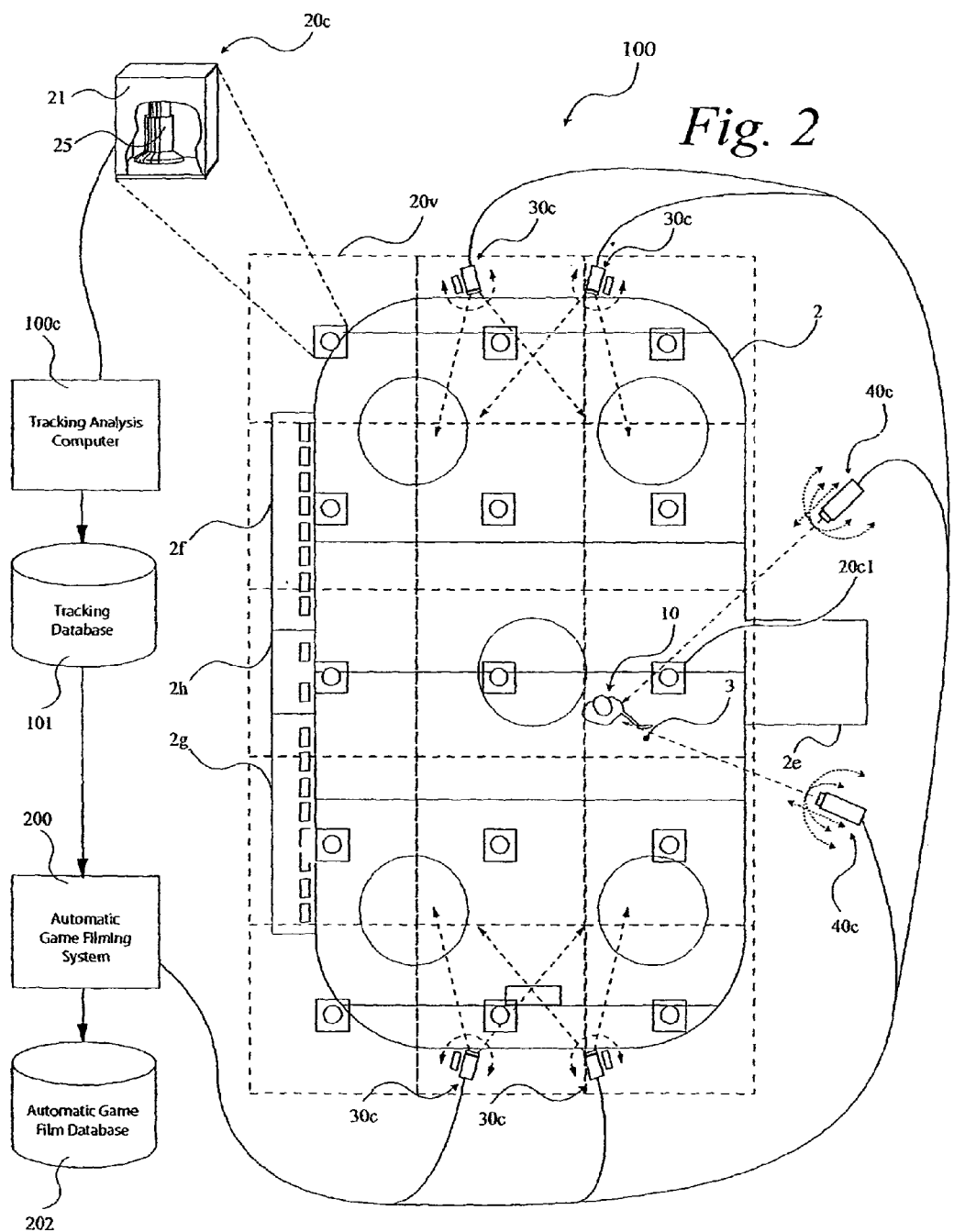
FIG. 2 is a top view drawing of the preferred embodiment of the tracking system in the example setting of an ice-hockey rink, depicting an array of overhead X-Y tracking/filming cameras that when taken together form a field of view encompassing the skating and bench area of a single ice surface.
Figure 3:
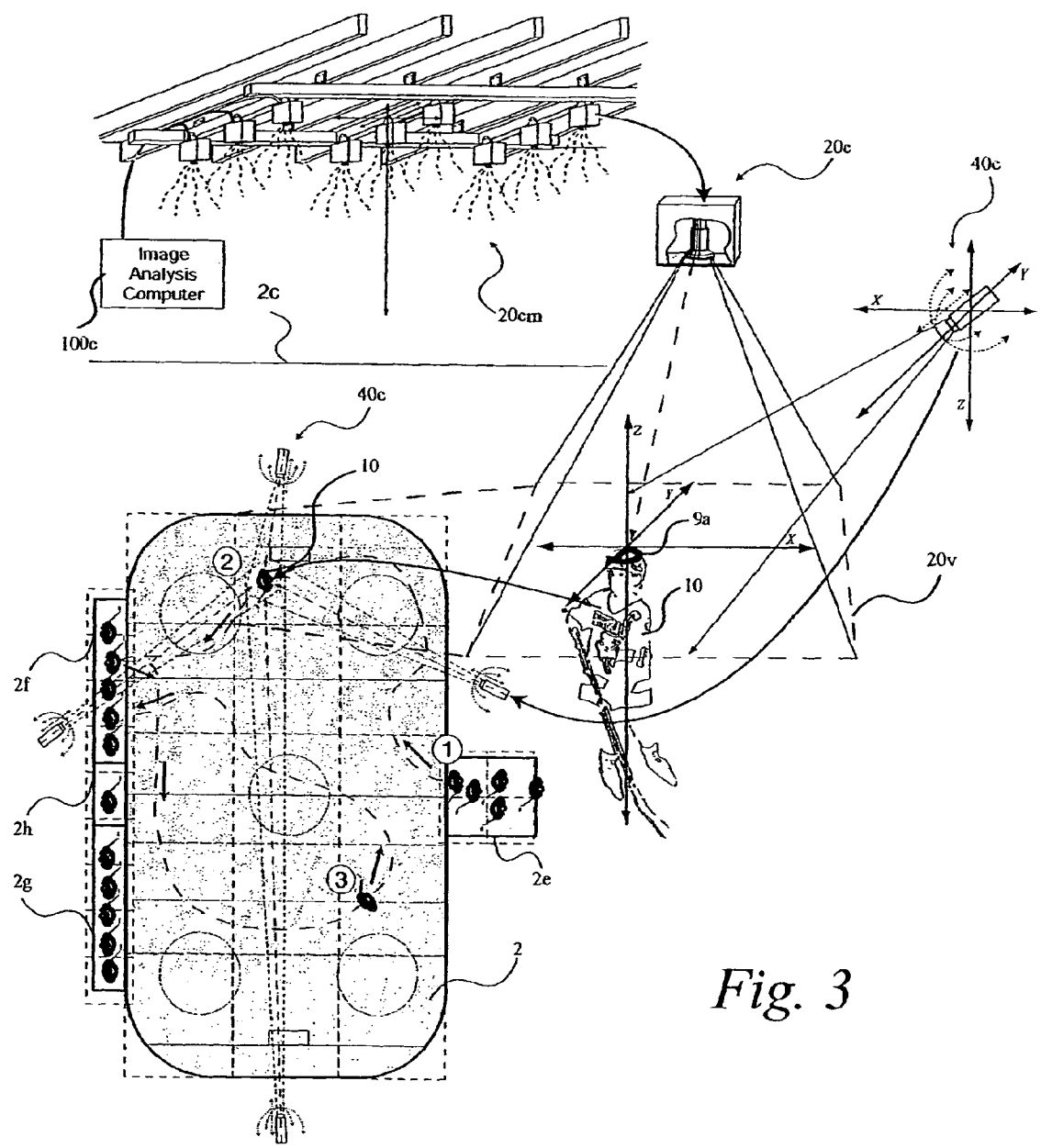

FIG. 3 is a combined drawing of a perspective view of the array of overhead X-Y tracking/filming cameras wherein a single camera has been broken out into a side view depicting a single tracking area in which a player is being tracked. Along with the depicted tracking camera is an associated filming camera that is automatically directed to follow the player based upon the tracking information collected by the overhead array. The player side view has then been added to a top view of a sheet of ice showing multiple players moving from the entrance area, on to and around the ice and then also onto and off the player's benches, all within the tracking area.

FIG. 4a is a perspective drawing depicting the preferred visible light camera that is capable of viewing a fixed area of the playing surface below and gathering video frames that when analyzed reveal the moving players, equipment, referees and puck.

FIG. 4b is a top view depiction of a key element of the process for efficiently extracting the foreground image of the player being tracked by tracing around the outline of the moving player that is formed during a process of comparing the current captured image to a pre-known background.

FIG. 4c is a top view of a portion of an ice arena showing a series of tracked and extracted motions of a typical hockey player, stick and puck by the overhead X-Y tracking/filming cameras depicted in FIG. 4a.

Figure 5A:
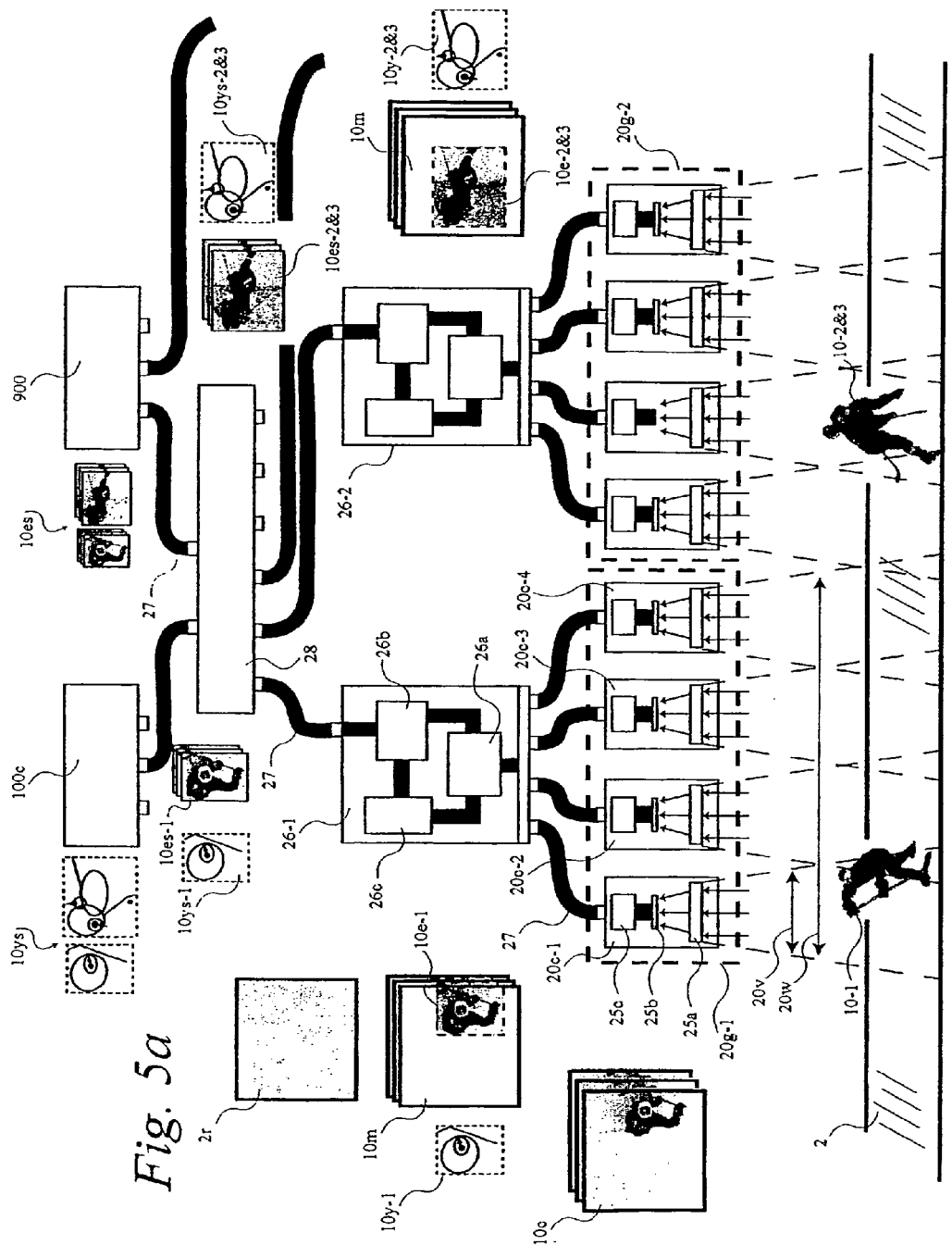

FIG. 5a is a block diagram depicting the preferred embodiment of the tracking system comprising a first layer of overhead tracking/filming cameras that capture motion on the tracking surface and feed full frame video to a second layer of intelligent hubs. By subtracting pre-know backgrounds, the hubs extract from the full frames just those portions containing foreground objects. Additionally, the hubs create a symbolic representation from the extracted foreground, after which the foreground object and symbolic representation are feed into an optional third layer of multiplexers. The multiplexers then create separate streams of foreground objects and their corresponding symbolic representations which are passed on to the automatic content assembly & compression system and the tracking system, respectively.

FIG. 5b is a graph depicting the sinusoidal waveform of a typical a 60 Hz power line as would be found in a normal building in North America such as a hockey rink. Also depicted are the lamp discharge moments that are driven by the rise and fall of the power curve. And finally, there is shown the moments when the camera shutter is ideally activated such that it is synchronized with the maximum acceptable range of ambient lighting corresponding to the lamp discharge moments.

FIG. 5c is a graph depicting the sinusoidal waveform of a typical 60 Hz power line that has been clipped on every other cycle as a typical way of cutting down on the integrated emission of the lighting over a given time period; essentially dimming the lights. Synchronized with the clipped waveform are the camera shutter pulses thereby ensuring that the cameras are filming under "full illumination," even when the ambient lighting appears to the human eye to have reduced.

FIG. 6a depicts a series of images representing the preferred method steps executed by the intelligent hubs in order to successfully extract a foreground object, such as a player and his stick, from a fixed background that itself undergoes slight changes over time.

FIG. 6b depicts the breakdown of a foreground image into its pre-known base colors and its remaining grayscale overlay. Both the pre-known base colors and the grayscale overlay can optionally be represented as a "patch-work" of individual single color or single grayscale areas.

Figure 6C:
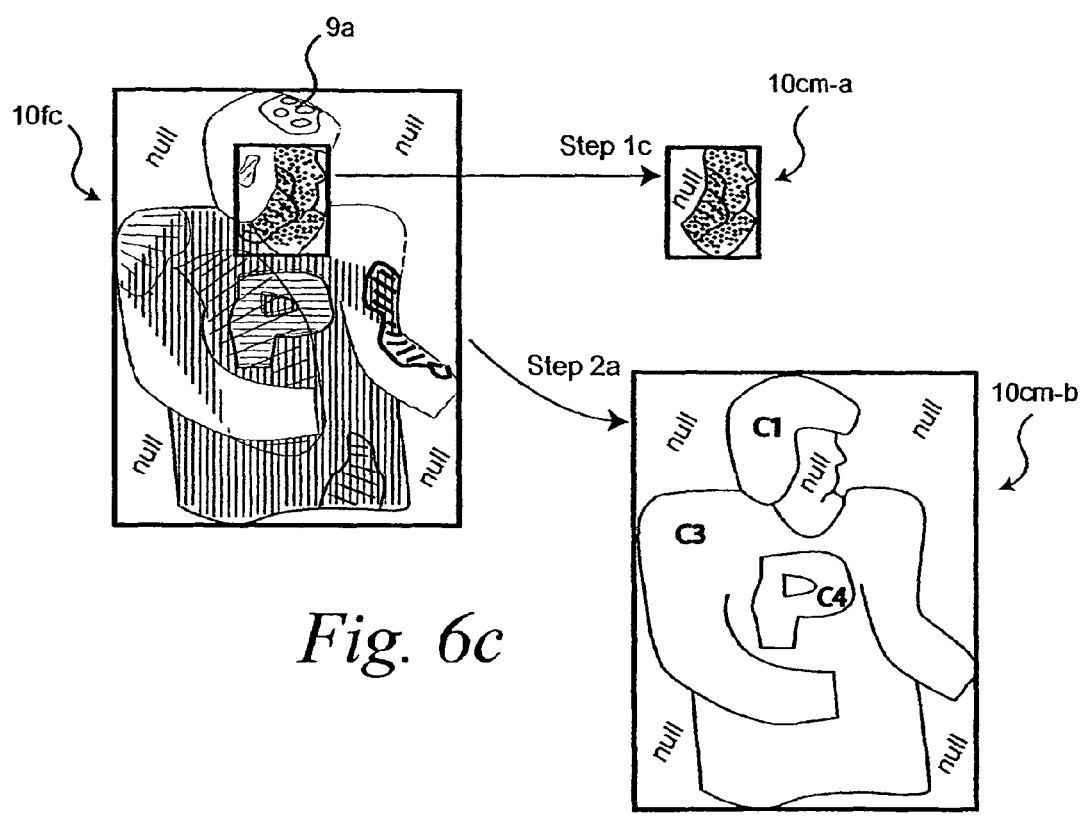

FIG. 6c depicts the same foreground image shown in FIG. 6b being first broken into distinct frames. The first frame represents the minimum area known to include the player's viewable face with all other pixels set to null. The second frame includes the entire foreground image as found in FIG. 6b except that the pixels associated with the players faces have been set to null.

Figure 6D:
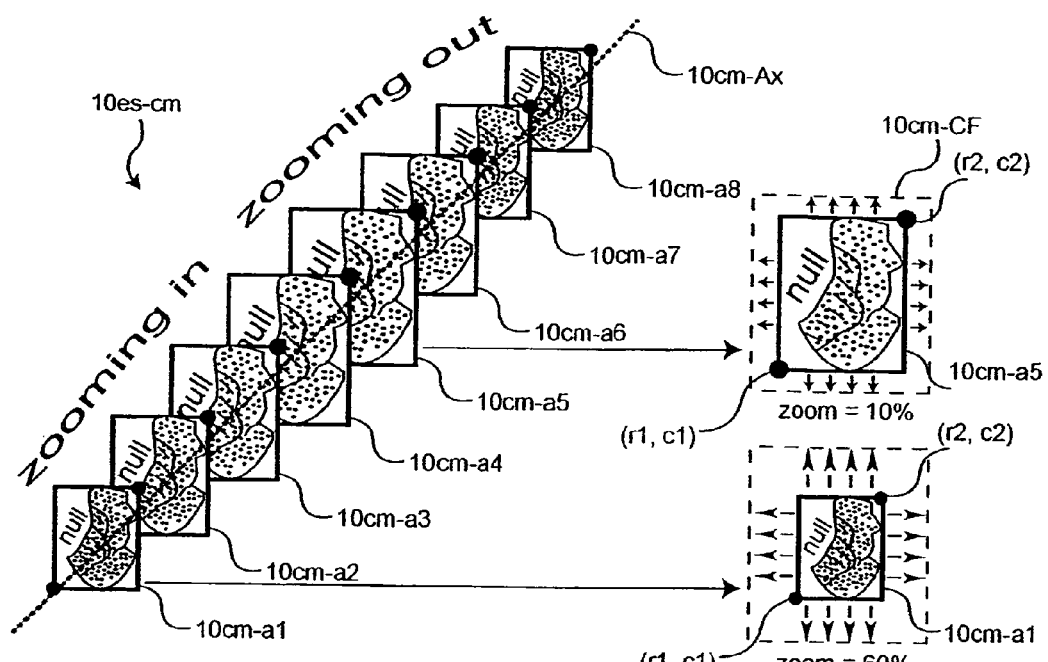

FIG. 6d depicts the same separated minimum area known to include the player's viewable face as a stream of successive frames show in FIG. 6c in which the filming camera happened to be first zooming in and then zooming out. Also shown is a carrier frame use to normalize in size via digital expansion all individual successive frames in the stream.

Figure 6E:
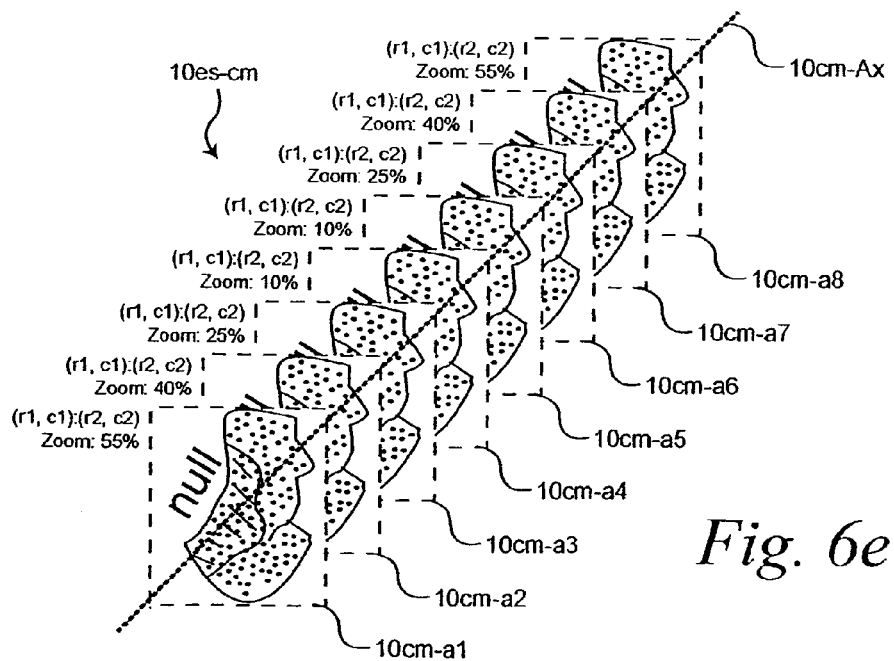

FIG. 6e depicts the same stream of successive frames show in FIG. 6d except that now each frame has been adjusted as necessary in order to fit the normalized carrier frame.

Figure 6F:
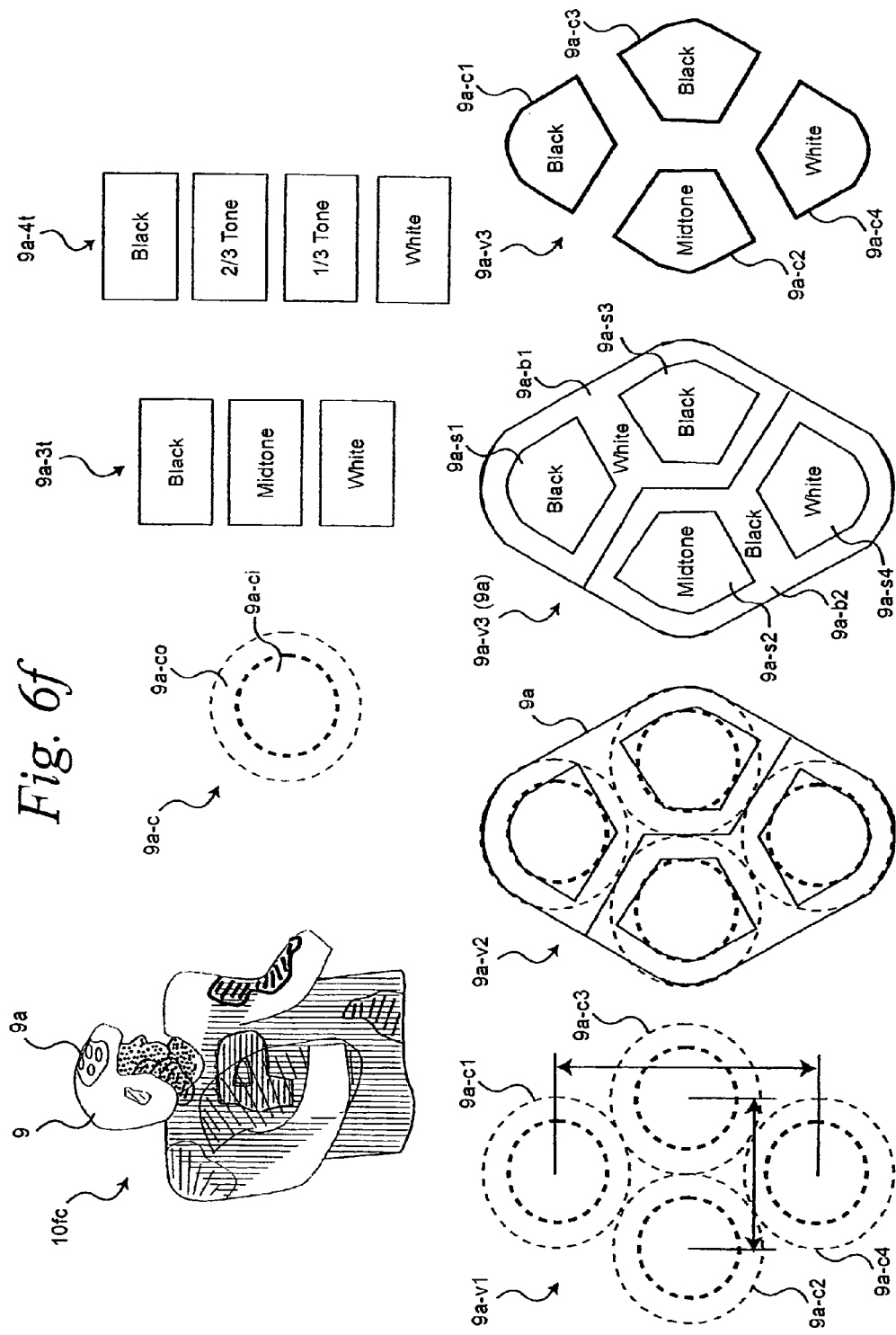

FIG. 6f depicts the preferred helmet sticker to be affixed to individual players providing both identity and head orientation information.

Figure 7C:
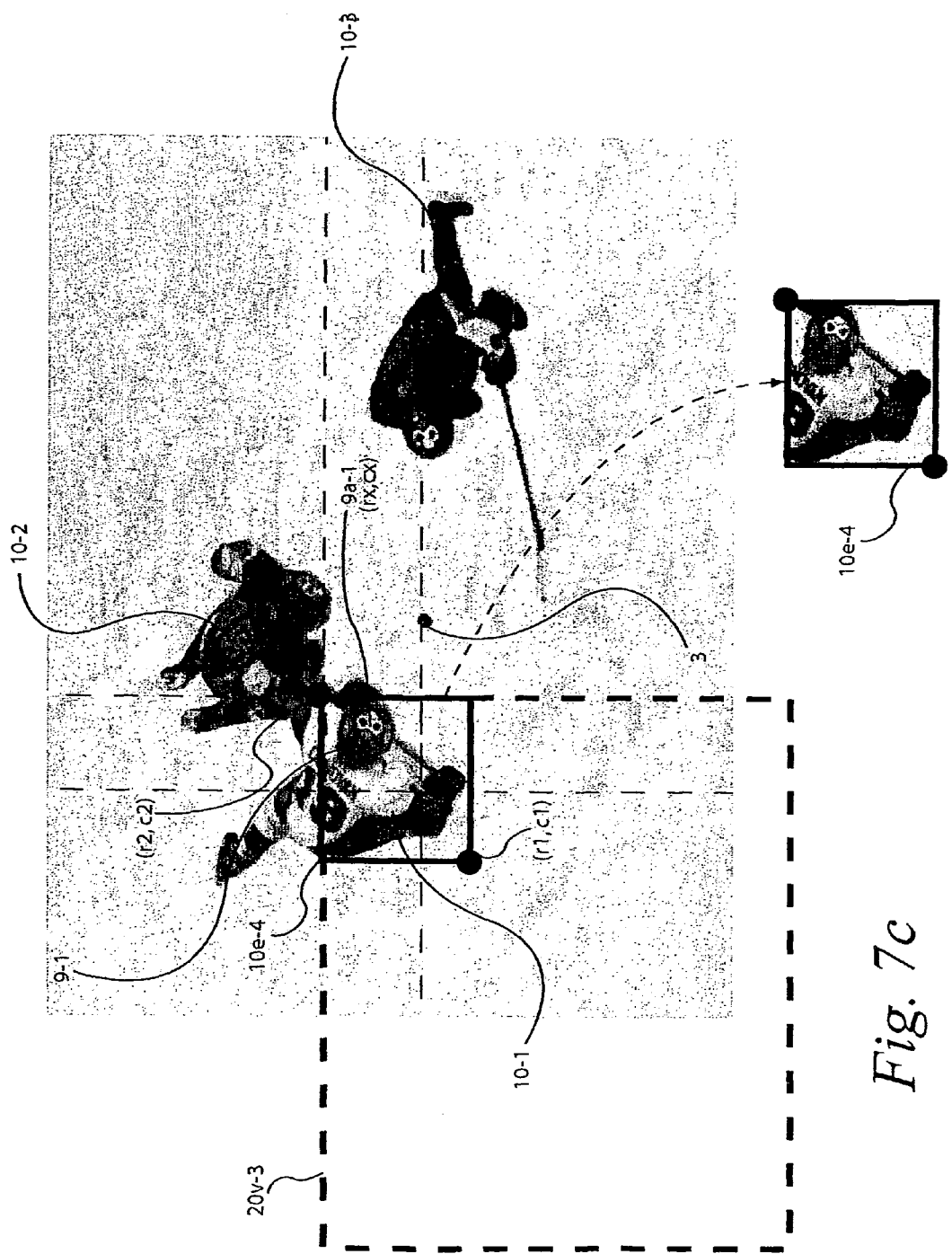

FIG. 7a-7d are the same top view depiction of three players skating within the field-of-view of four adjacent cameras. FIG. 7a shows the single extracted foreground block created from the view of the top left camera. FIG. 7b shows the two extracted foreground blocks created from the top right camera. FIG. 7c shows the single extracted foreground block created from the bottom left camera, and FIG. 7d shows the three extracted foreground blocks created from the bottom right camera.

FIG. 7e shows the same top view of three players as shown in FIG. 7a-7d, but now portrays them as a single combined view created by joining the seven extracted foreground blocks created from each of the respective four individual camera views.

Figure 8:
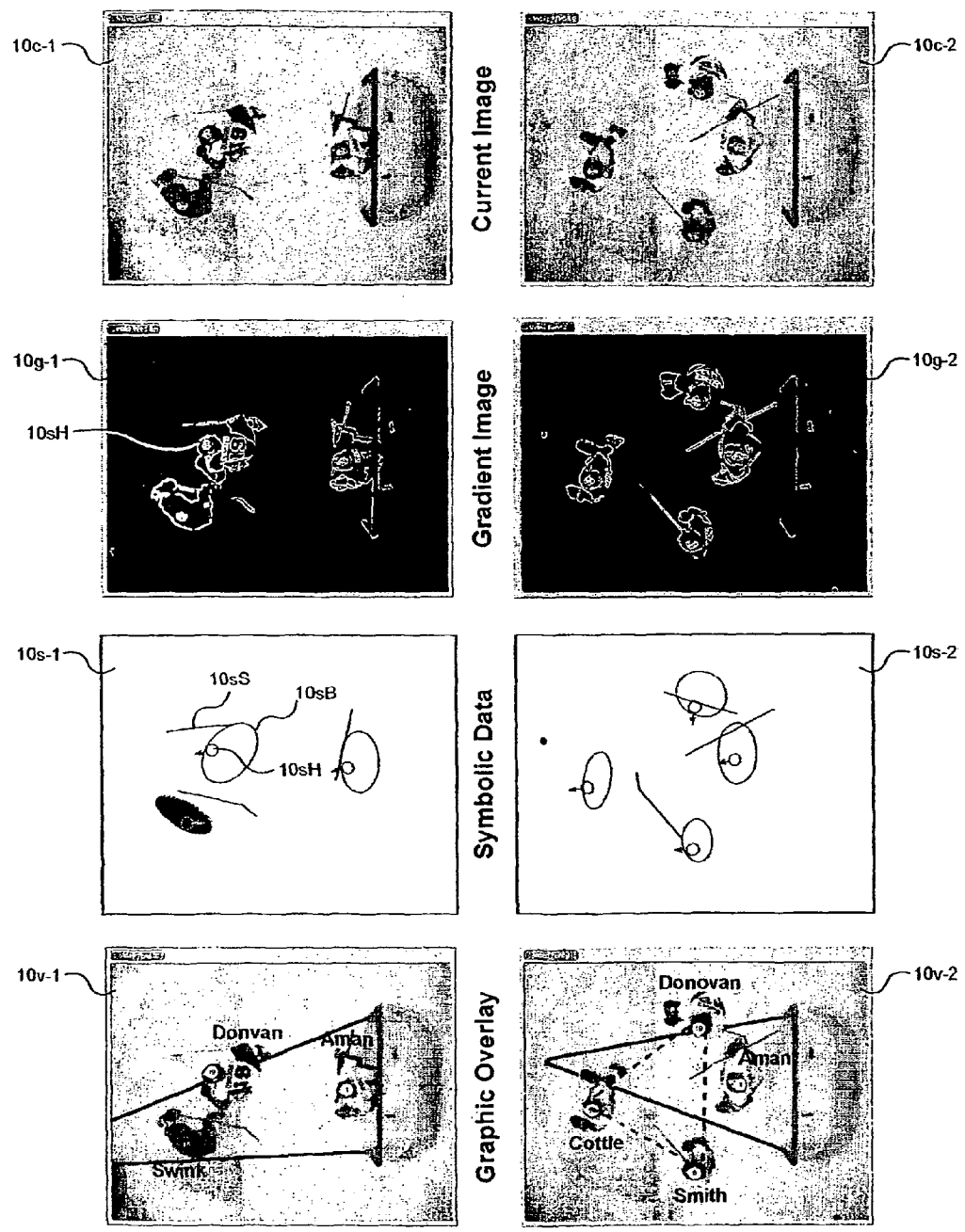

FIG. 8 shows two side-by-side series of example transformations of an original current image into a gradient image (player outlines) and then a symbolic data set that eventually provides information necessary to create meaningful graphic overlays on top of the original current image.

FIG. 9a is a side view drawing of a single overhead tracking camera looking down on a specific area of the tracking surface. On the leftmost portion of the surface there are two players; one standing and one lying on the ice surface. The helmet of both players appears to be at the same "X+n" location in the captured image due to the distortion related to the angled camera view. On the rightmost portion of the surface there is a single player whose helmet, and identifying helmet sticker, is just straddling the edge of the cameras field-of-view.

FIG. 9b is a side view drawing of two adjacent overhead tracking cameras A and B, each camera is shown in two to three separate locations, i.e. Position 1, 2 and 3, providing four distinct overlapping strategies for viewing the tracking surface below. Also depicted are two players, each wearing an identifying helmet sticker and standing just at the edge of each camera's field-of-view.

Figure 9C:
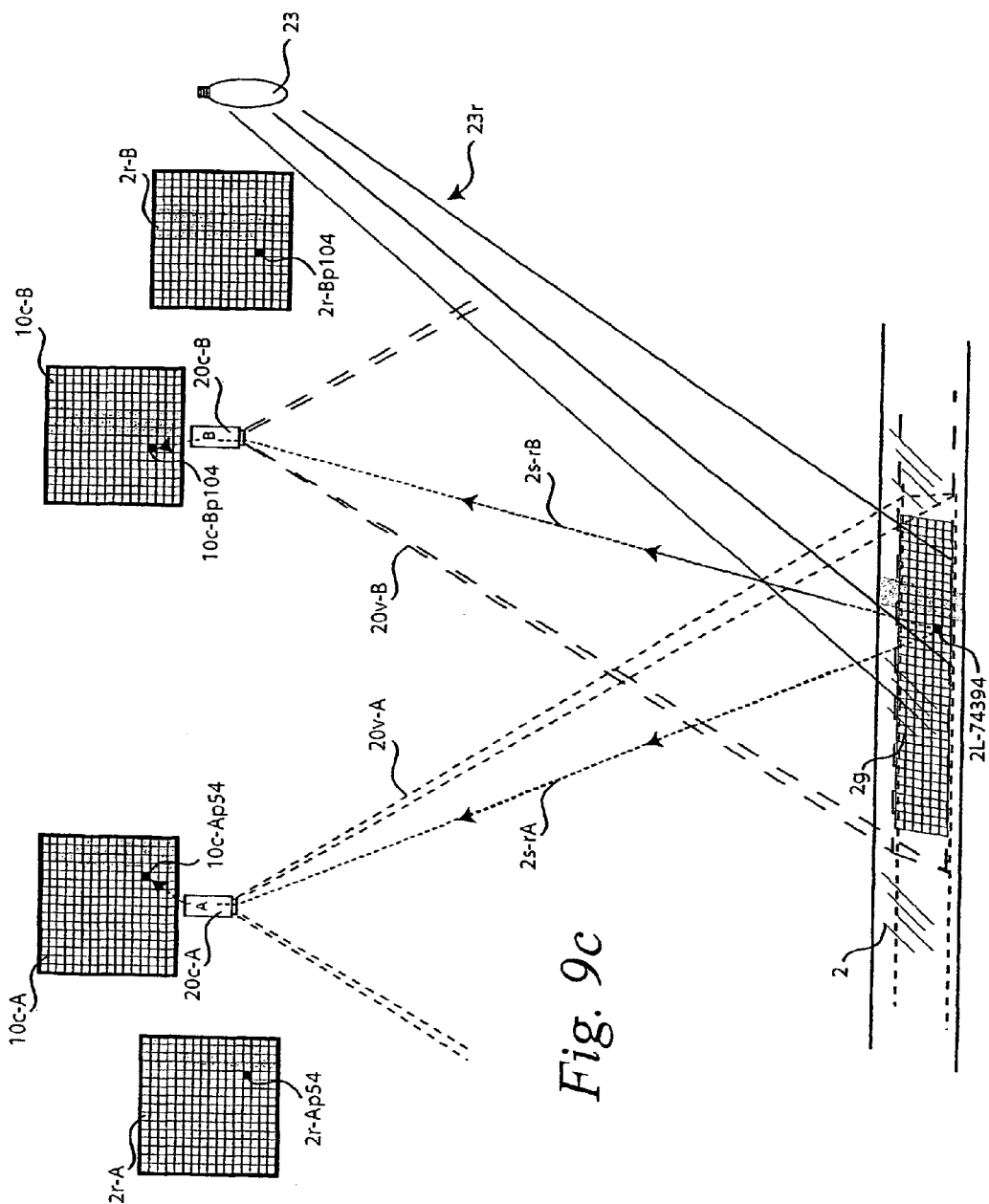

FIG. 9c is a side view drawing detailing a single area of tracking surface in simultaneous calibrated view of two adjacent overhead tracking cameras A and B. Associated with each camera is a current image of the camera's view as well as a stored image of the known background; all of which can be related to assist in the extraction of foreground objects.

Figure 9D:
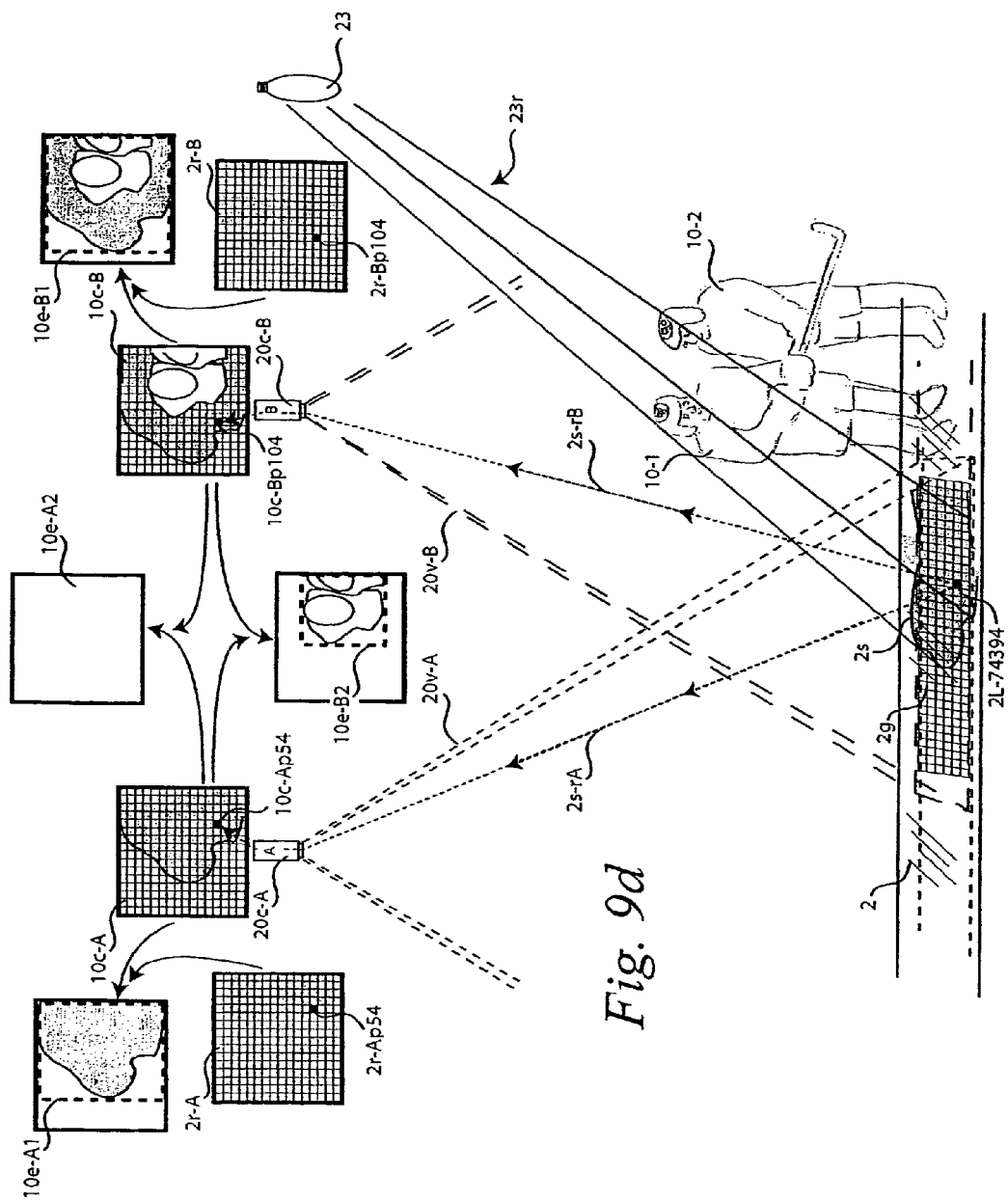

FIG. 9d is identical to FIG. 9c except that players have been added causing shadows on the tracking surface. These shadows are shown to be more easily determined as background information using the associated current images of overlapping cameras as opposed to the stored image of the known background.

Figure 9E:
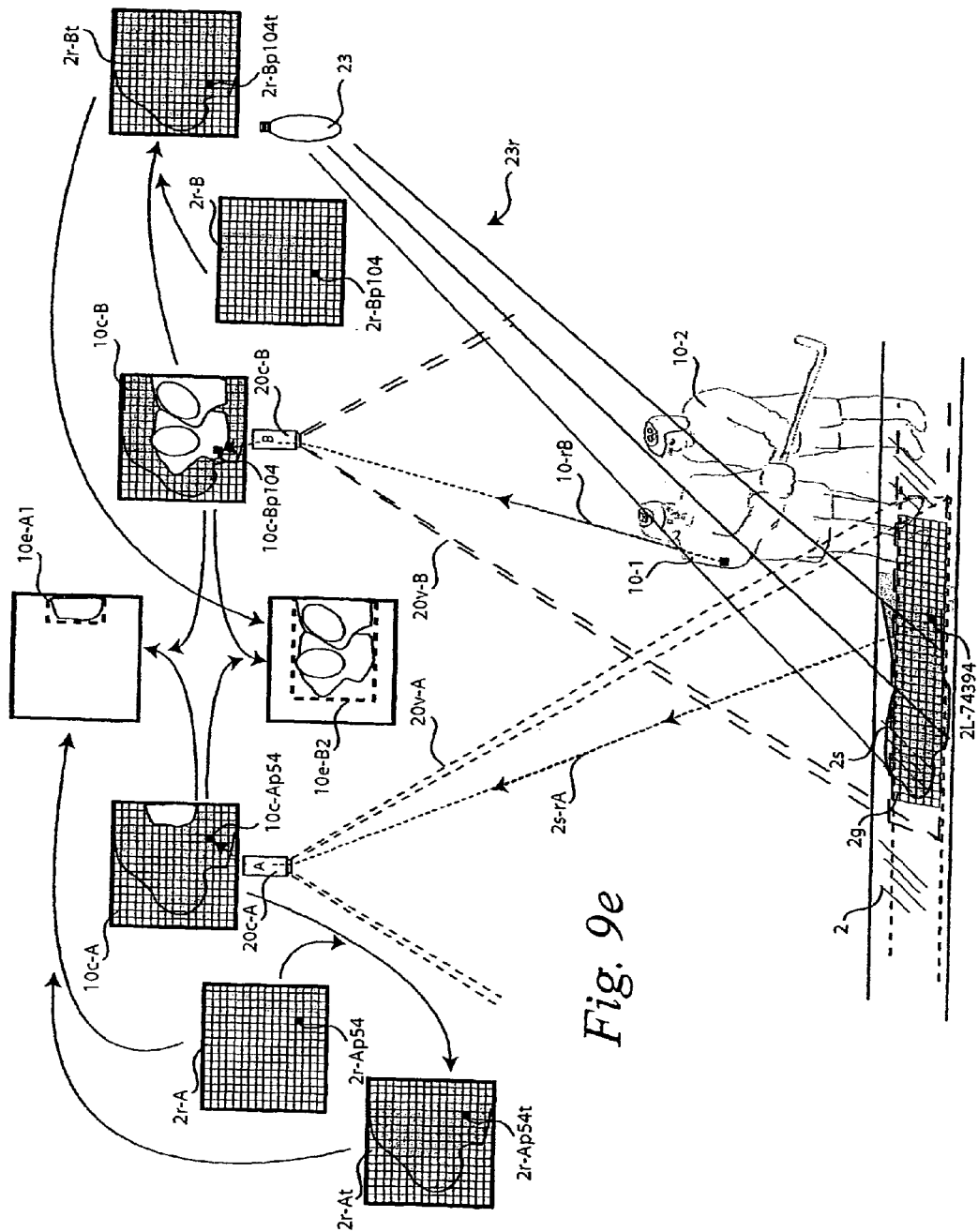

FIG. 9e is identical to FIG. 9d except that the players have been moved further into view of both cameras such that they block the view of a selected background location for camera B. Also, each camera now contains three associated images. Besides the current and stored background, a recent average image has been added that is dynamically set to the calculated range of luminescence values for any given background location.

Figure 9F:
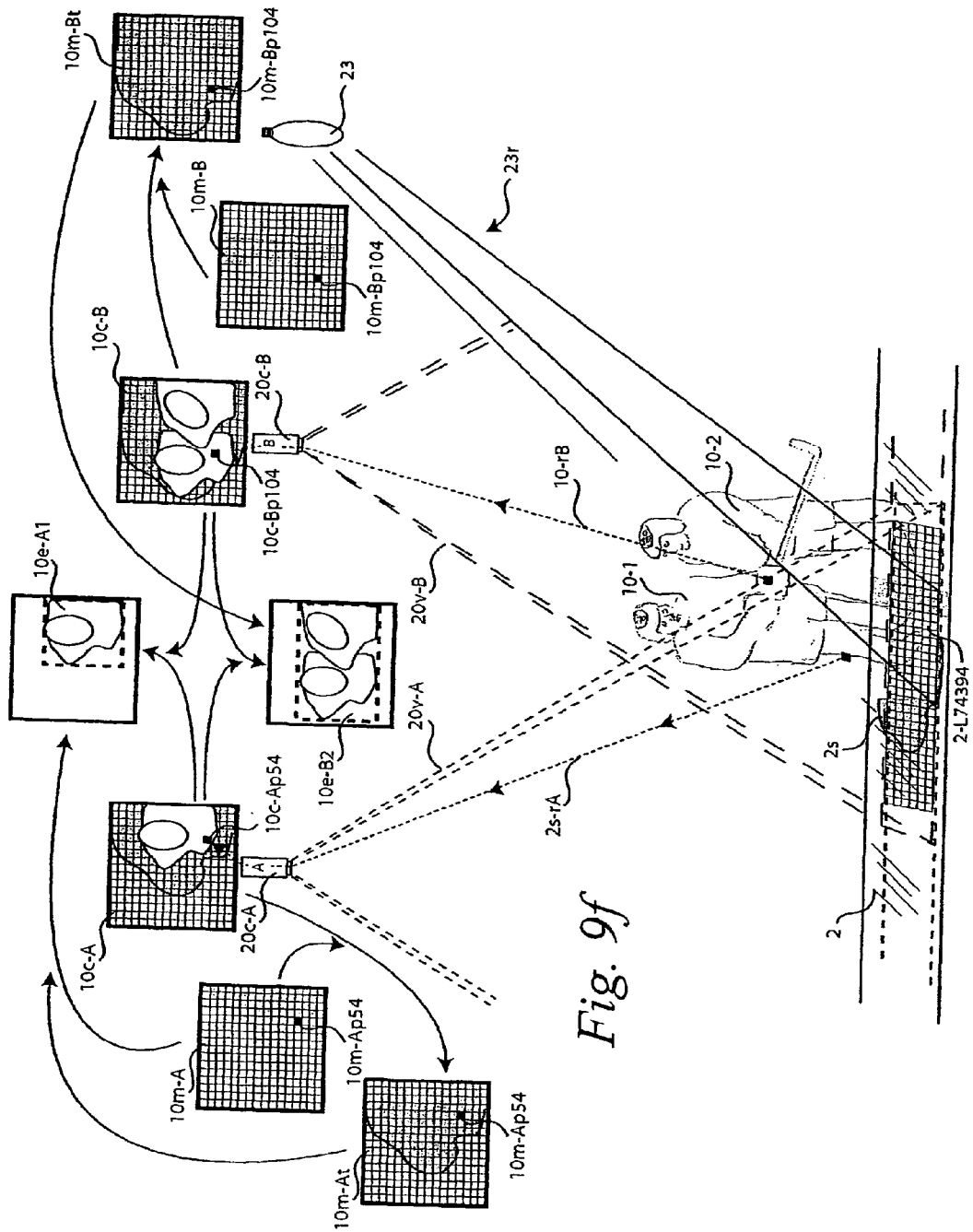
Figure 10A:
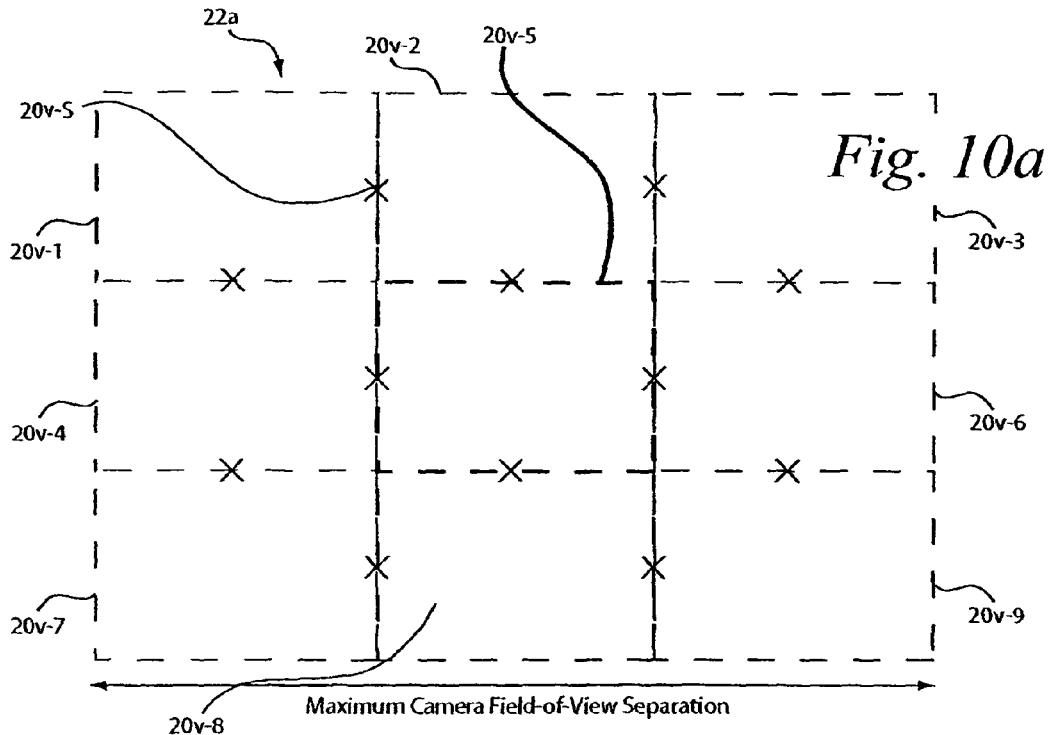
Figure 10B:
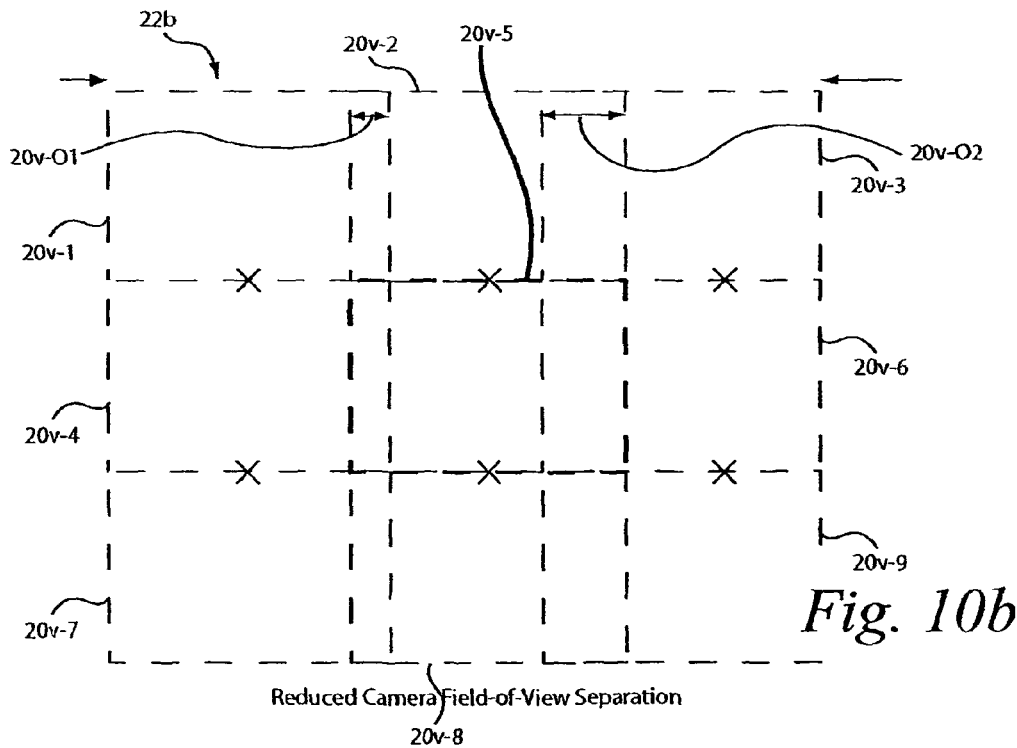
Figure 10C:
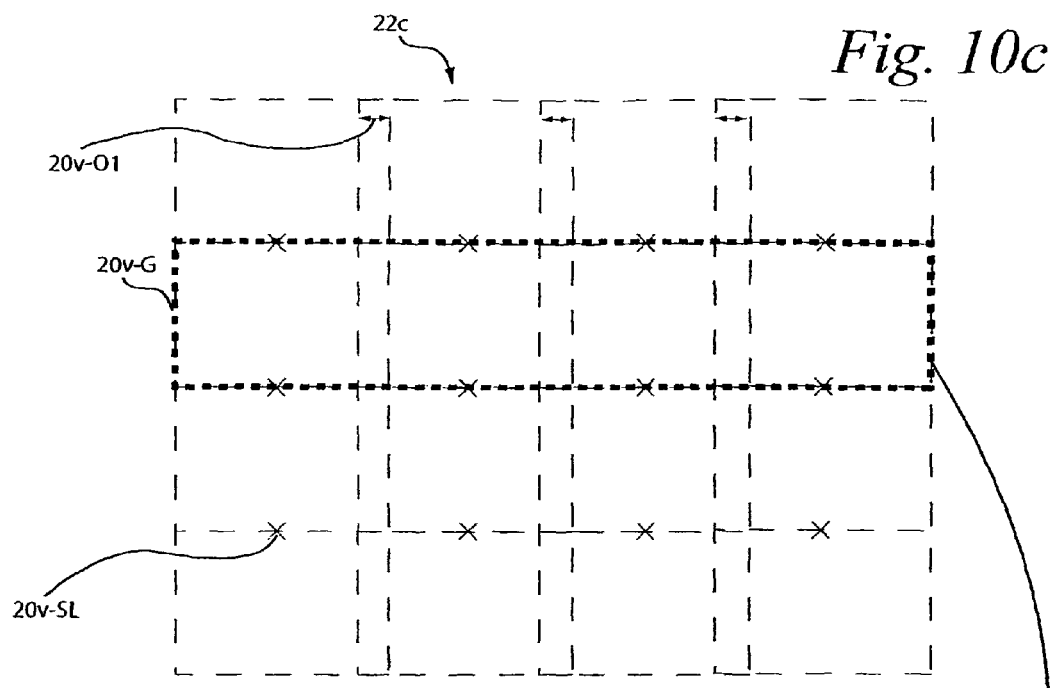
Figure 10D:
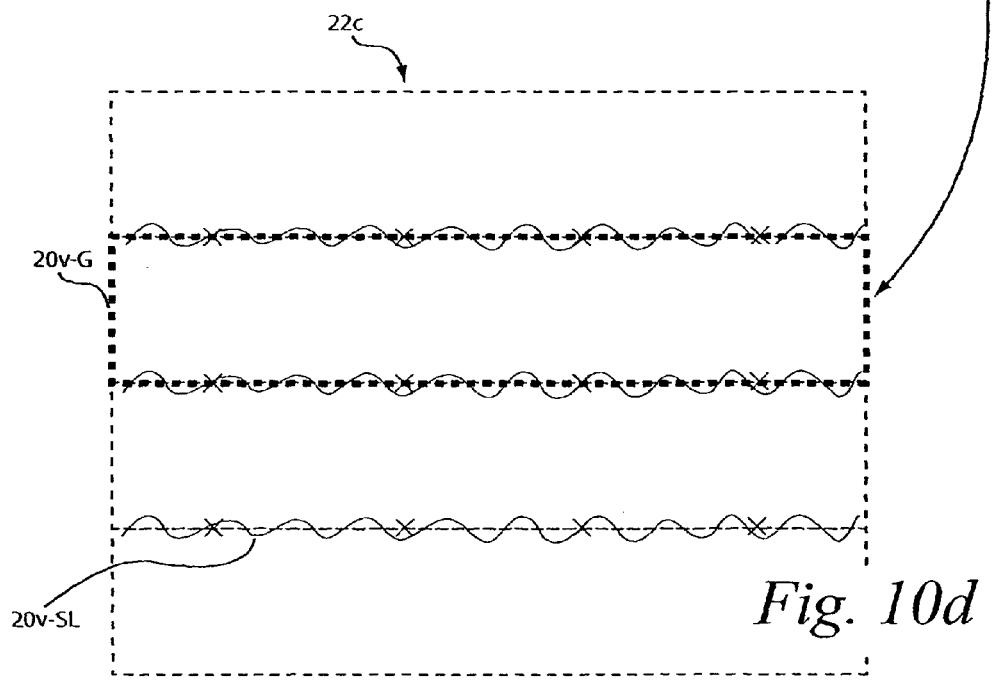
Figure 10E:
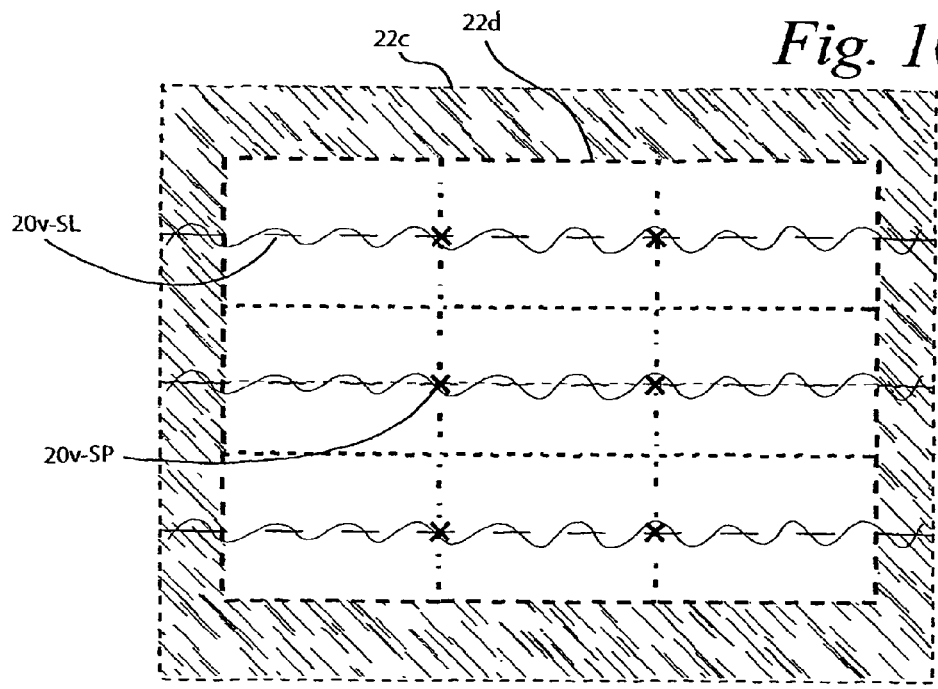
Figure 10F:
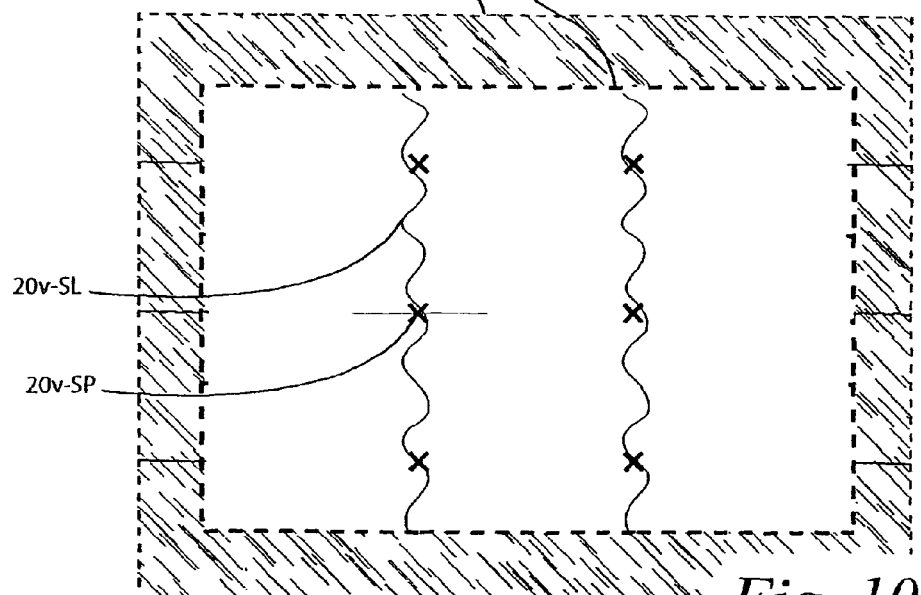
Figure 10G:
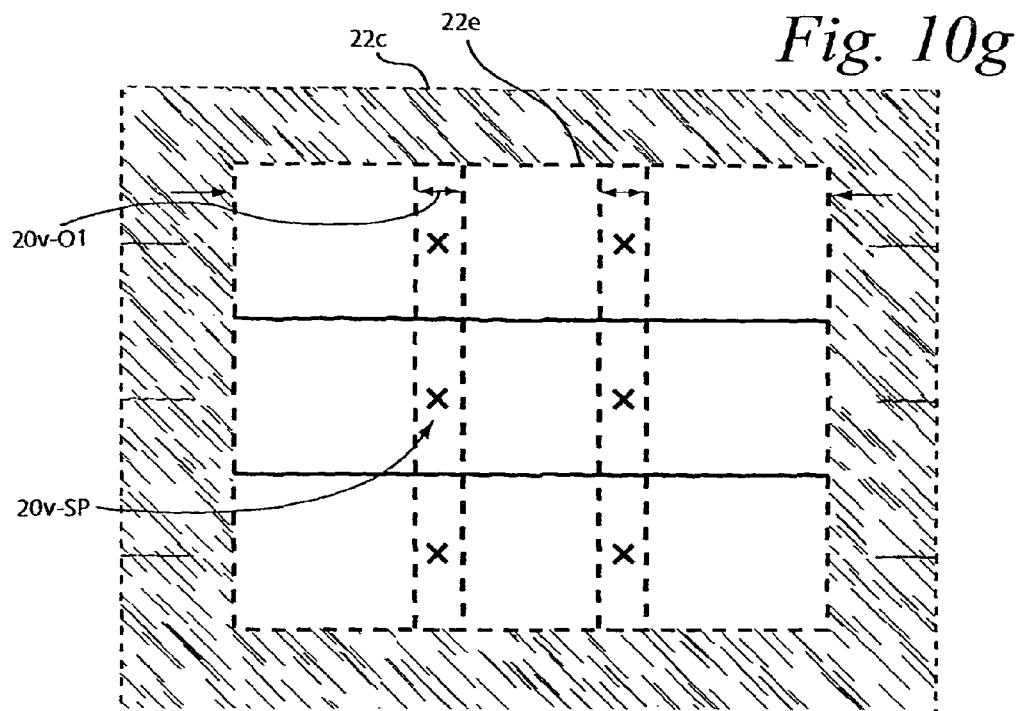
Figure 10H:
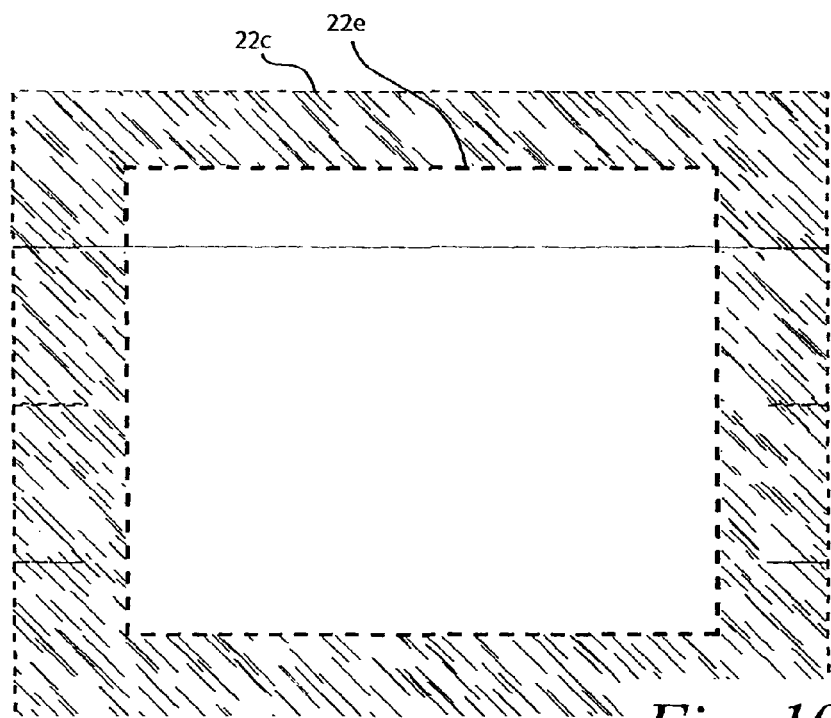

FIG. 9f is identical to FIG. 9e except that the players have been moved even further into view of both cameras such that they now block the view of selected background locations for both camera B and camera A.

FIGS. 10a through 10h in series depict the layout of overhead tracking camera assemblies. The series progresses from the simplest layout that minimizes the total number of cameras, to a more complex layout that includes two completely overlapping layers of cameras, wherein the cameras on each layer further partially overlap each other.

Figure 11A:
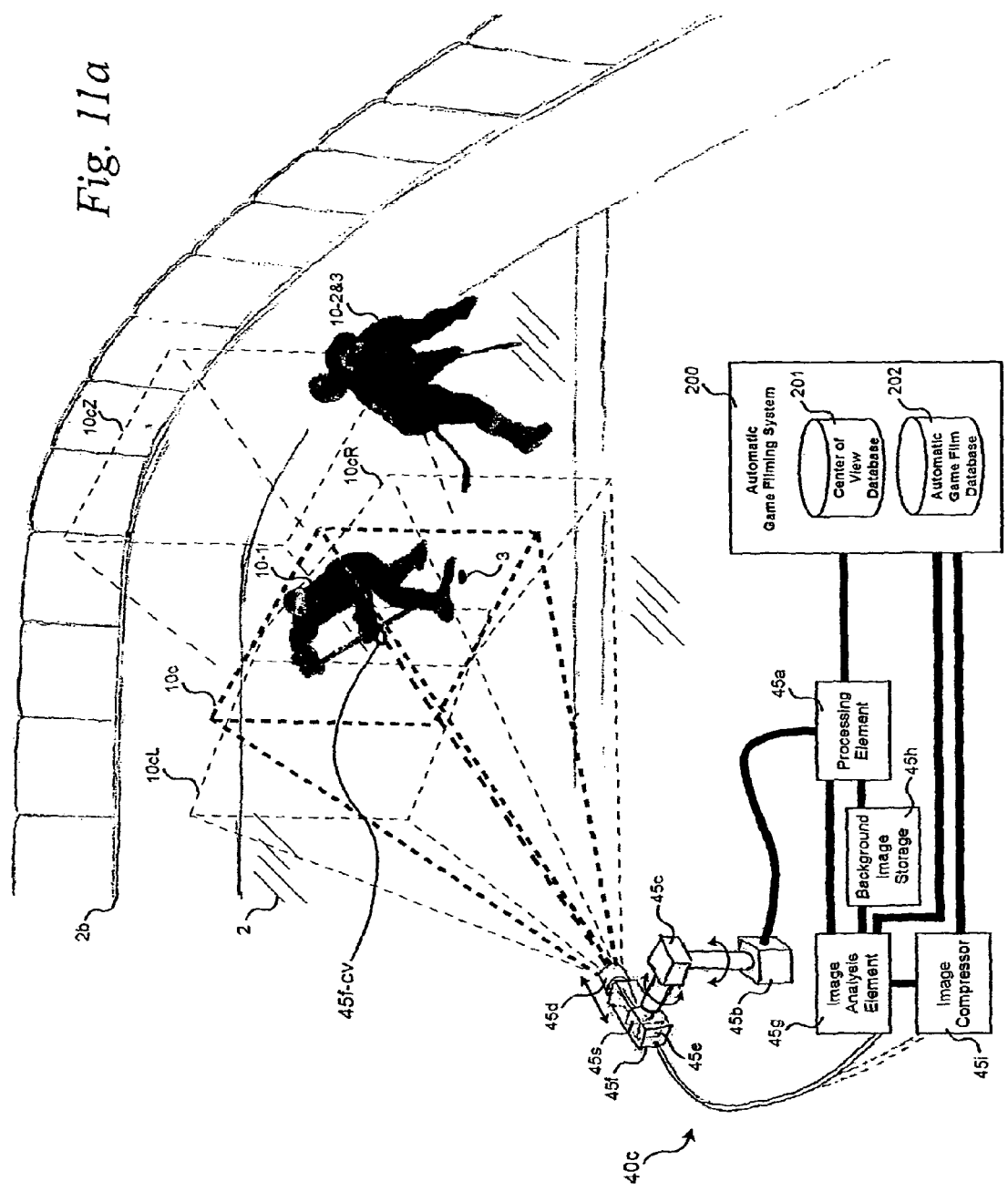

FIG. 11a is a combination block diagram depicting the automatic game filming system and one of the cameras it controls along with a perspective view of the camera and a portion of an ice hockey rink. The resulting apparatus is capable of controlled movement synchronized with the capturing of images, thereby limiting viewed angles to specific pan/tilt and zoom increments while still providing the desired frames per second image capture rate. Synchronized images captured at these controlled filming angles and depths may then be collected before a contest begins, thus forming a database of pre-known image backgrounds for every allowed camera angle/zoom setting.

Figure 11B:
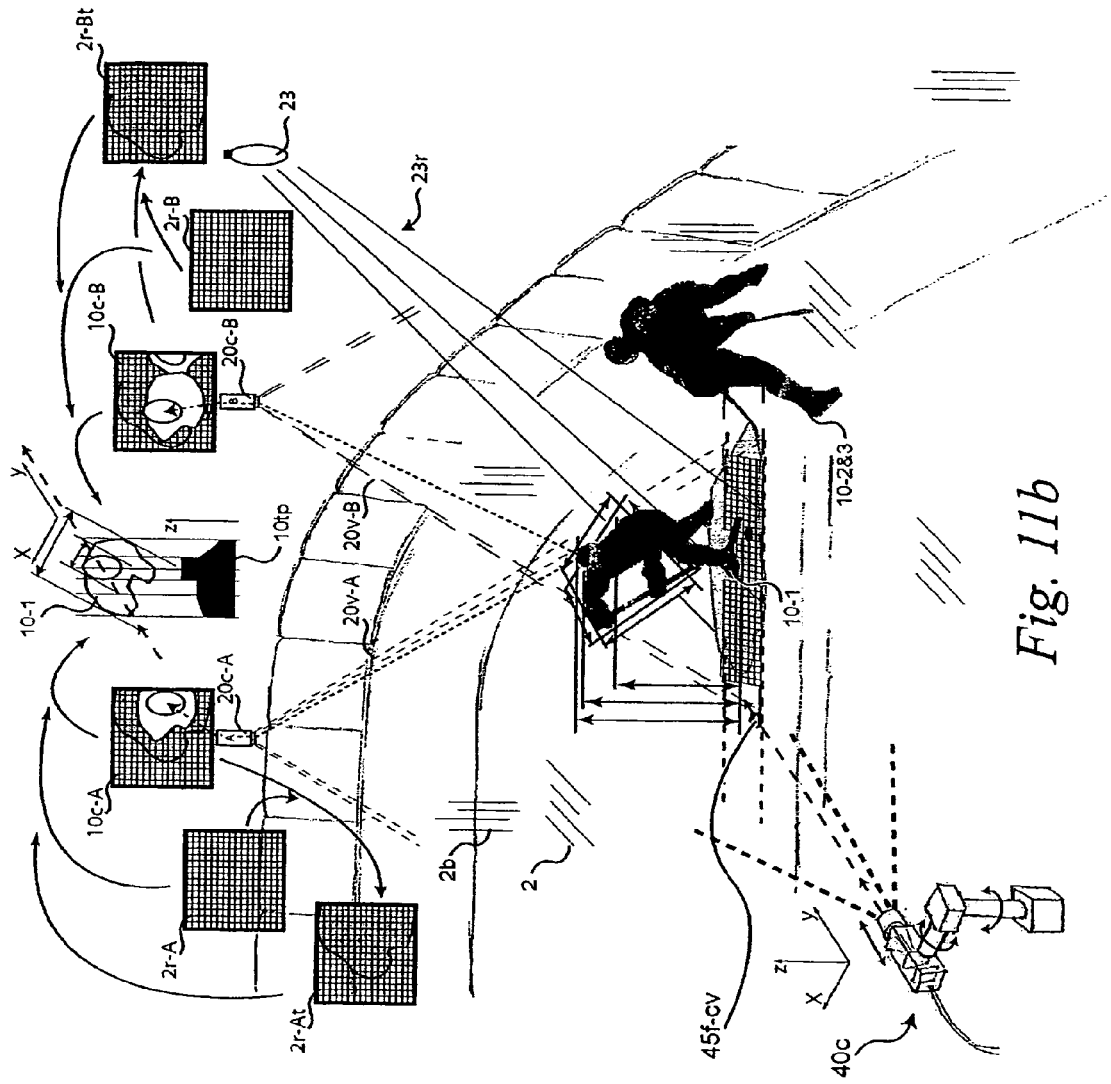

FIG. 11b is identical to FIG. 11a except that it further includes two overhead tracking cameras shown to be simultaneously viewing the same area of the tracking surface as the perspective view game filming camera. Also depicted are current images, background images and average images for each overhead camera as well as the resulting three-dimensional topological information created for one of the players in simultaneous view of both the overhead and perspective cameras.

Figure 11C:
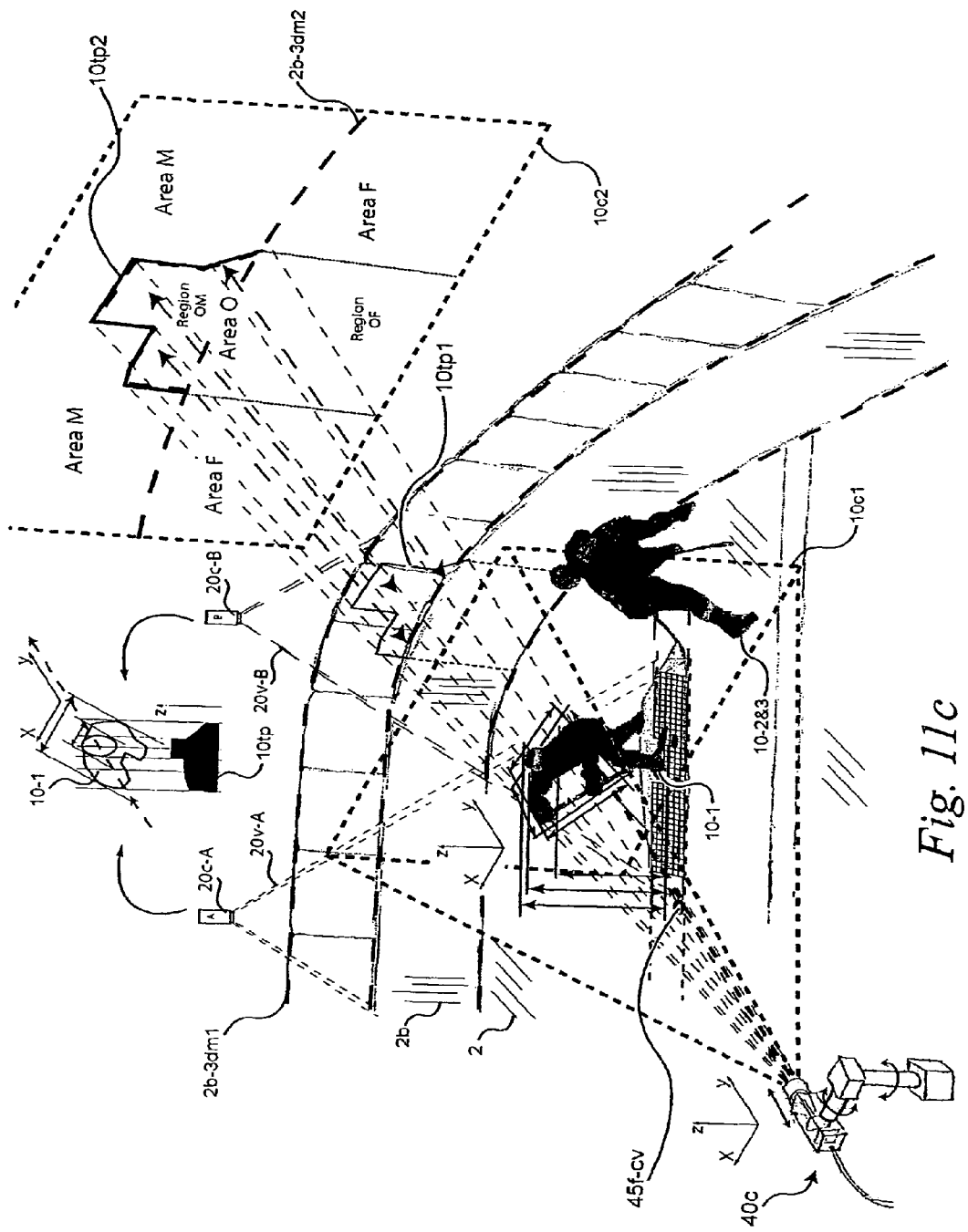

FIG. 11c is identical to FIG. 11b except that it further includes a projection onto the current view of the perspective filming camera of the three-dimensional topological information determined by the overhead cameras.

Figures 11D, 11E, 11F:
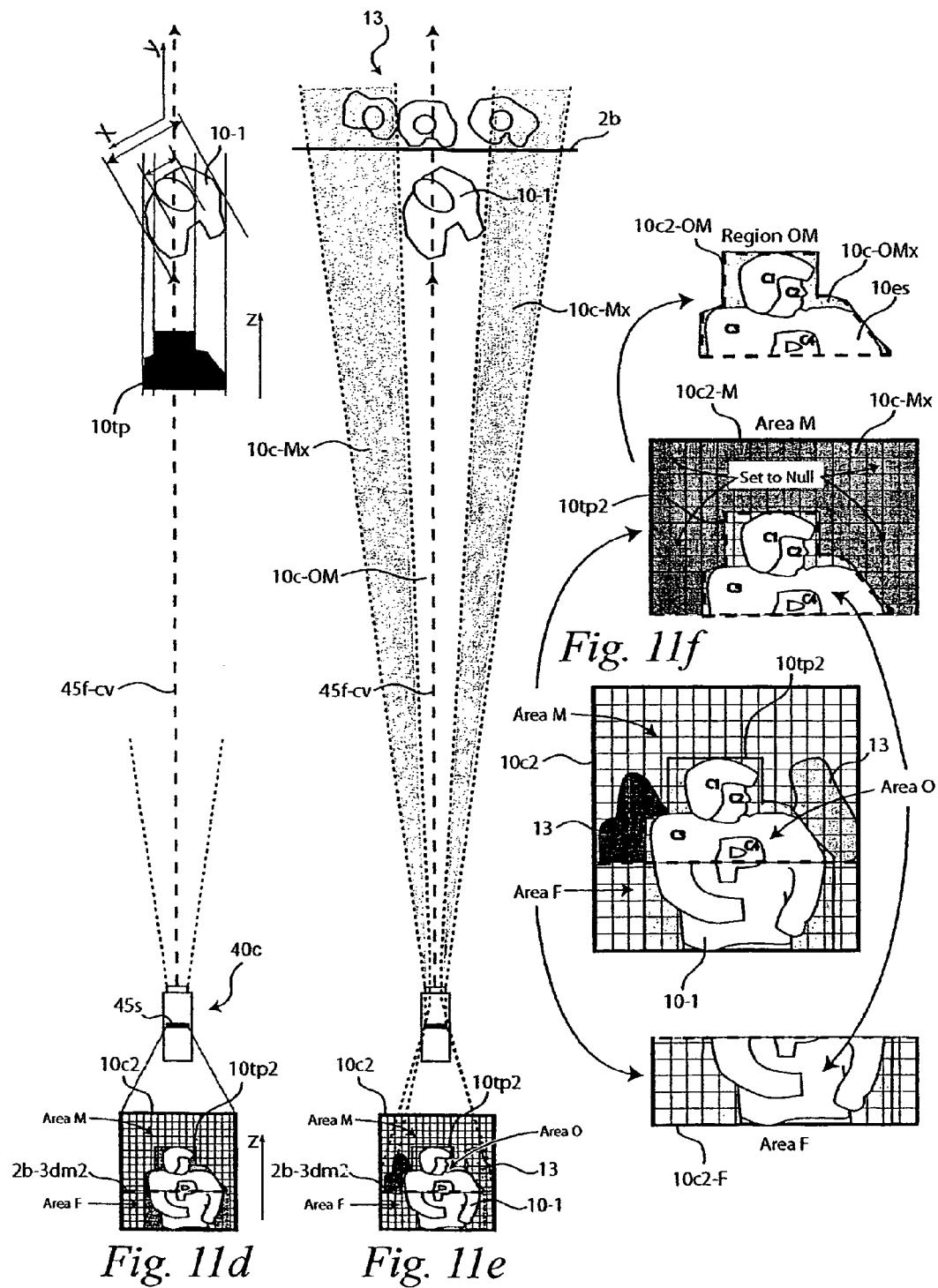

FIG. 11d is a top view diagram depicting the view of the perspective filming camera shown in FIGS. 11a, 11b and 11c as it captures an image of a player. The player's profile is also shown as would be calculable based upon image analysis from two or more overhead cameras. Also shown is a representation of the current image captured from the perspective filming camera with the calculated profile overlaid onto the calibrated pixels.

FIG. 11e is identical to FIG. 11d except that the boards are also depicted directly behind the player. Just beyond the boards, and in view of the perspective filming camera, are depicted three spectators that are out of the playing area and form the moving background. The image of the player has also been shown on top of the calculated profile within the current image.

FIG. 11f is an enlarged depiction of the current image of the perspective filming camera as shown in FIG. 11e. The image is shown to consist of two distinct areas, the fixed background called Area F representing for instance the boards, and the potentially moving background called Area M representing for instance the view of the crowd through the glass held by the boards. Overlaying these two areas is a third area created by the calculated player profile called Area O because it contains any detected foreground object(s) such as the player. Also shown is the separation of the current image into its two sections of Area M and Area F. In both separated images, Area O with a foreground object is present. Also shown is Region OM representing just that portion of Area M enclosed within the overlaying calculated player (foreground object) profile.

FIGS. 11g is similar to 11e except that a companion stereoscopic filming camera has been added to work in conjunction with the perspective filming camera. Also, the arm of the player in the view of the filming camera has been lifted so that it creates an area within region OM where a significant portion of the moving background spectators can be seen. The second stereoscopic filming camera is primarily used to help support edge detection between the player and the moving background spectators within region OM.

FIG. 11h is an enlarged depiction of Area M of the current image of the perspective filming camera as shown in FIG. 11g. Area M is depicted to have two distinct types of player edge points; one in view of the overhead assemblies and essentially "exterior" to the player's upper surfaces and the other blocked from the view of the overhead assemblies and essentially "interior" to the player's surfaces.

FIG. 11i is an enlarged depiction of Region OM with Area M as shown in FIG. 11h.

FIG. 11j expands upon the filming camera with second stereoscopic camera as shown in FIG. 11g. Also shown is a second companion stereoscopic camera such that the filming camera has one companion on each side. The main purpose for the stereoscopic cameras remains to help perform edge detection and separation of the foreground object players from the moving background object spectators. Also shown in this top view is a expanded portion of the tracking area which is this case is a hockey rink encircled by boards and glass, outside of which can be seen moving background spectators. An additional ring of fixed overhead perspective cameras has been added specifically to image the moving background areas just outside of the tracking area where spectators are able to enter the view of the perspective filming cameras. The purpose of these fixed overhead background filming cameras is to provide additional image information useful for the separation of foreground players from moving background spectators.

Figure 12:
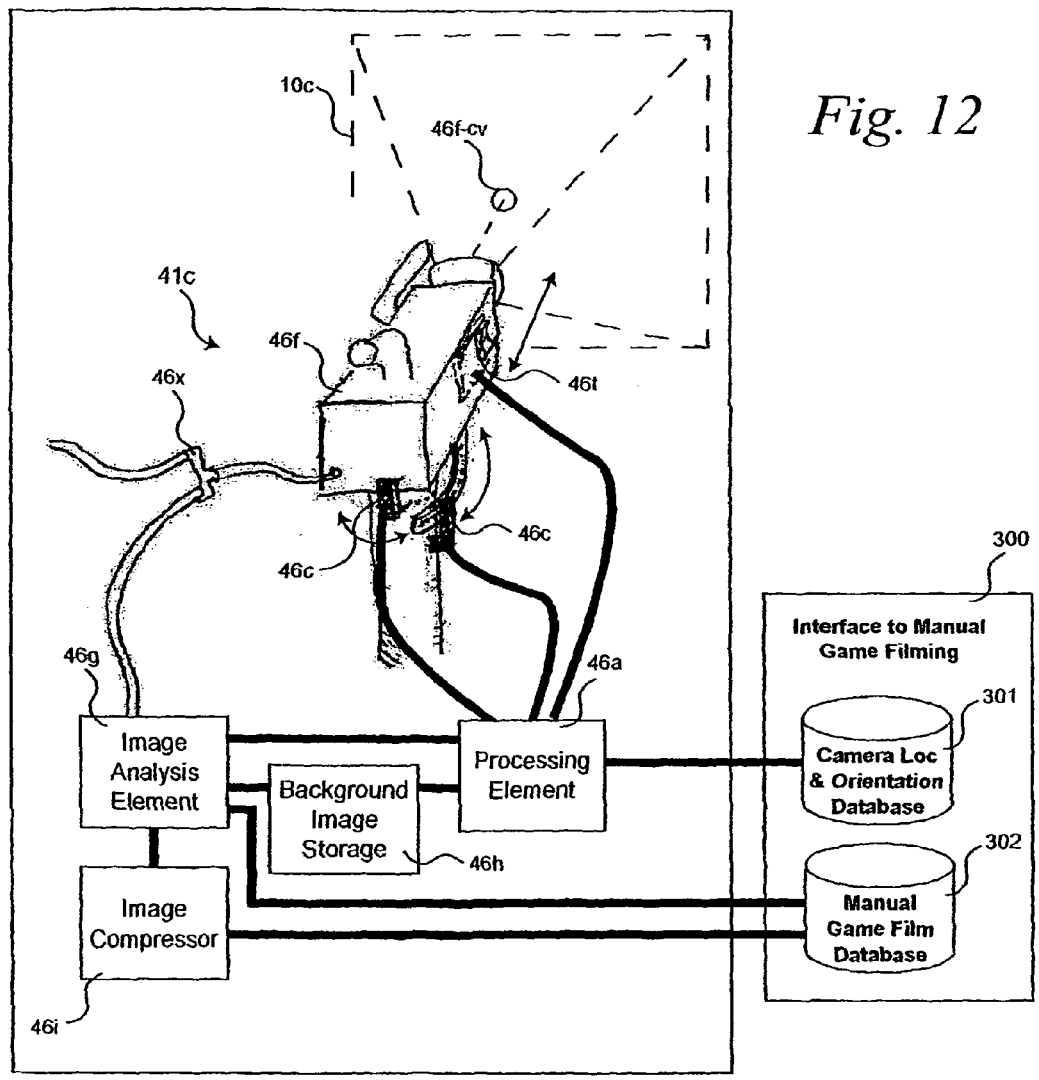

FIG. 12 is a combination block diagram depicting the interface to manual game filming system and one of the fixed manual game filming cameras along with a perspective view of the fixed camera as it captures images. The resulting apparatus is capable of either detecting the exact pan/tilt angles as well as zoom depths at the moment of image capture or limiting the moment of image capture to an exact pan/tilt angle as well as zoom depth. These sensed and captured angles and depths allow the automatic content assembly & compression system to coordinate the tracking information collected through the overhead X-Y tracking/filming cameras and processed by the performance measurement & analysis system with any film collected by manual effort. This coordination will result in the potential for overlaying graphic information onto the existing manual game broadcast as well as the ability to determine which additional viewing angles have been collected by the manual camera operator and may be of interest to mix with the automatically captured film.

Figure 13:
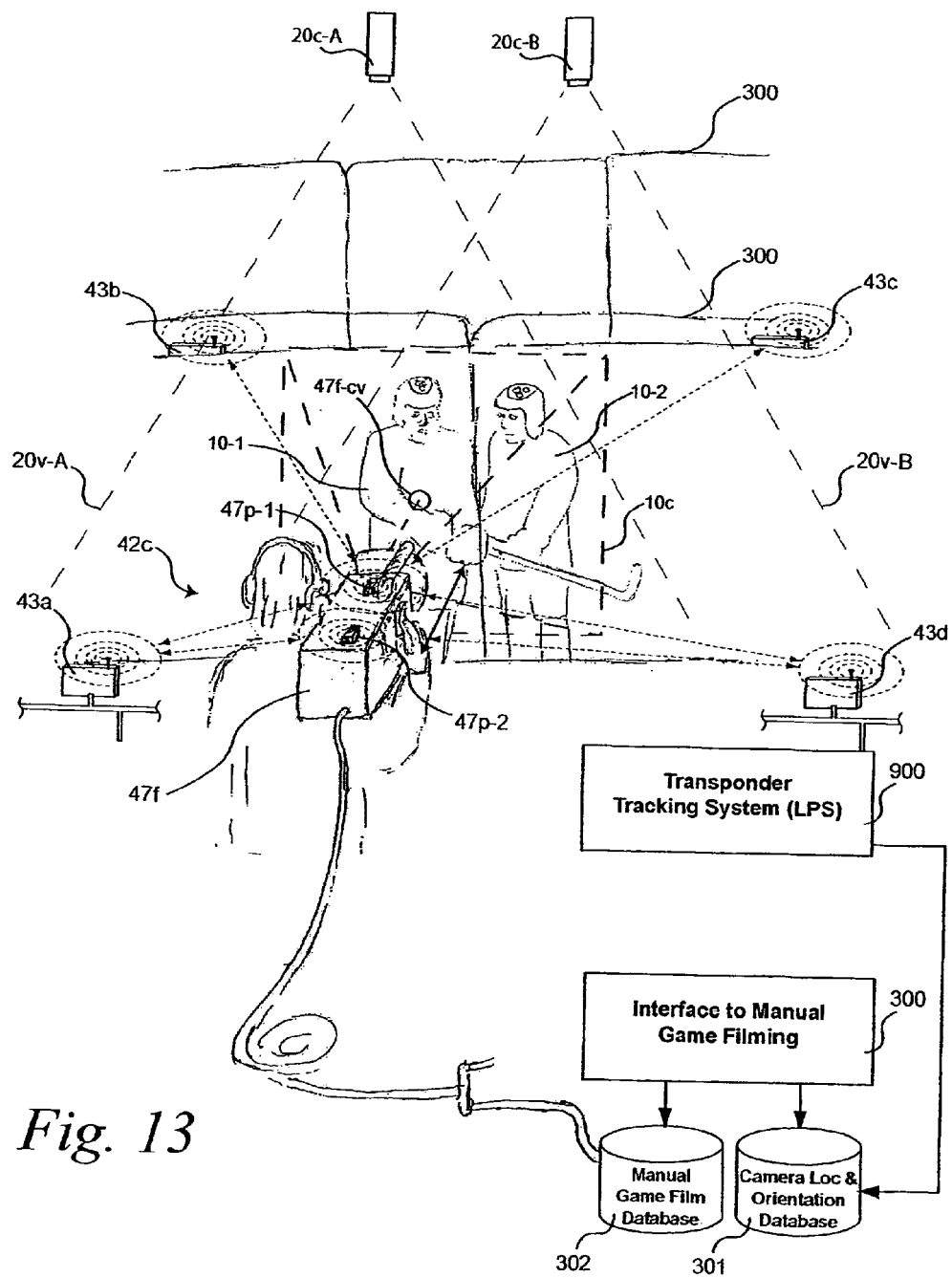

FIG. 13 is a combination block diagram depicting the interface to manual game filming system and one of the roving manual game filming cameras along with a perspective drawing of a cameraman holding a roving manual camera. The roving camera's current location and orientation is being tracked by local positioning system (LPS) transponders. This tracked location and orientation information allows the automatic content assembly & compression system to coordinate the tracking information collected through the overhead X-Y tracking/filming cameras and processed by the performance measurement & analysis system with any film collected by roving manual effort. This coordination will result in the potential for overlaying graphic information onto the existing manual game broadcast as well as the ability to determine which additional viewing angles have been collected by the manual camera operator and may be of interest to mix with the automatically captured film.

Figure 14:
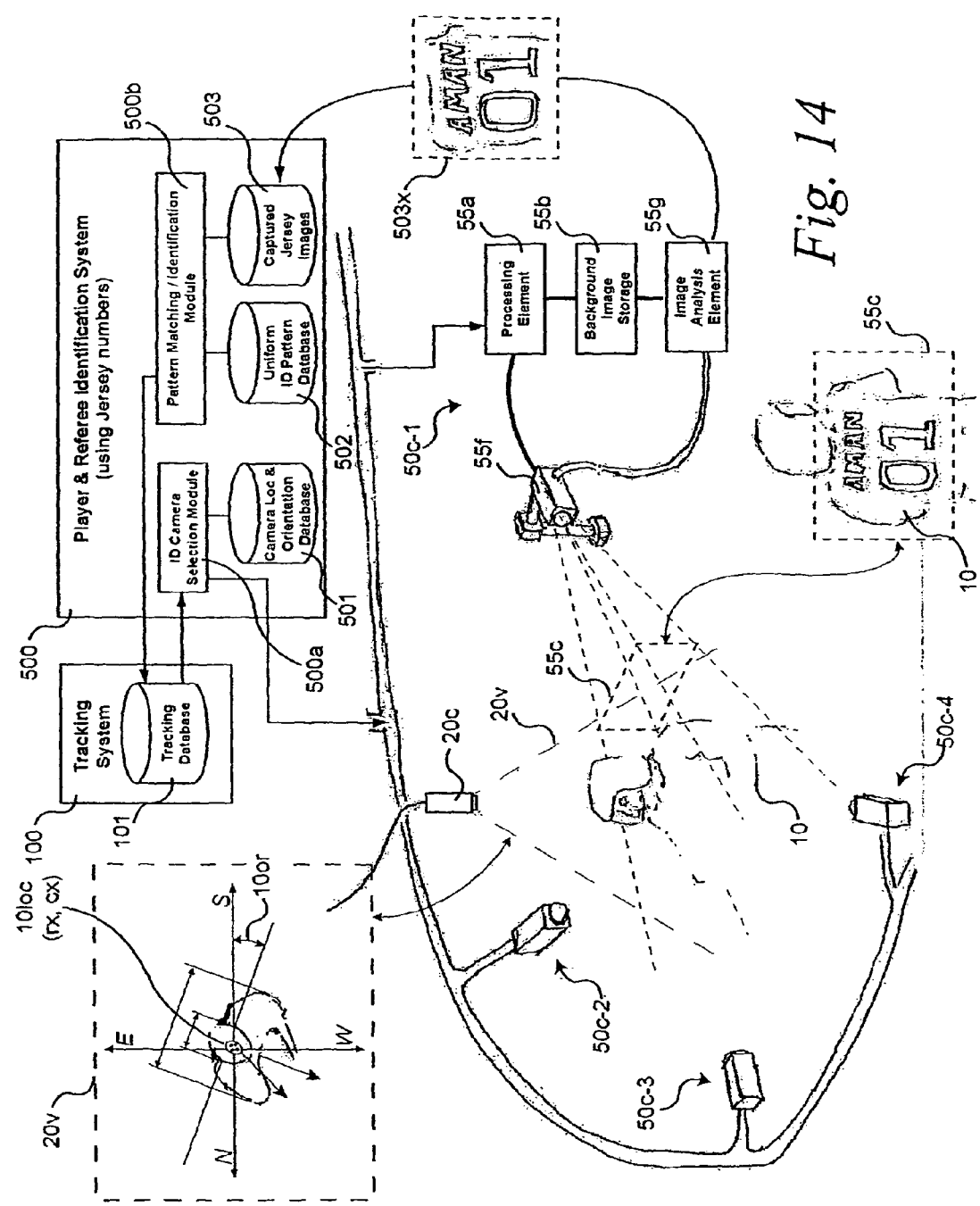

FIG. 14 is a combination block diagram depicting the player & referee identification system and one of the identification cameras along with a perspective drawing of a player on the tracking surface. The player's current location and orientation with respect to the hockey rink axis are being used to automatically direct at least one ID camera to capture images of the back of his jersey. These zoomed-in captures of the jersey numbers and names are then patterned match against the database of pre-known jerseys for the current game resulting in proper identification of players and referees.

FIG. 15 is the quantum efficiency curves for two commercially available CMOS image sensors. The top curve shows a monochrome (grayscale) sensor's ability to absorb light while the bottom curve shows a color sensor. Both sensors have significant ability to absorb non-visible frequencies at least in the near infrared region.

Figure 16A:
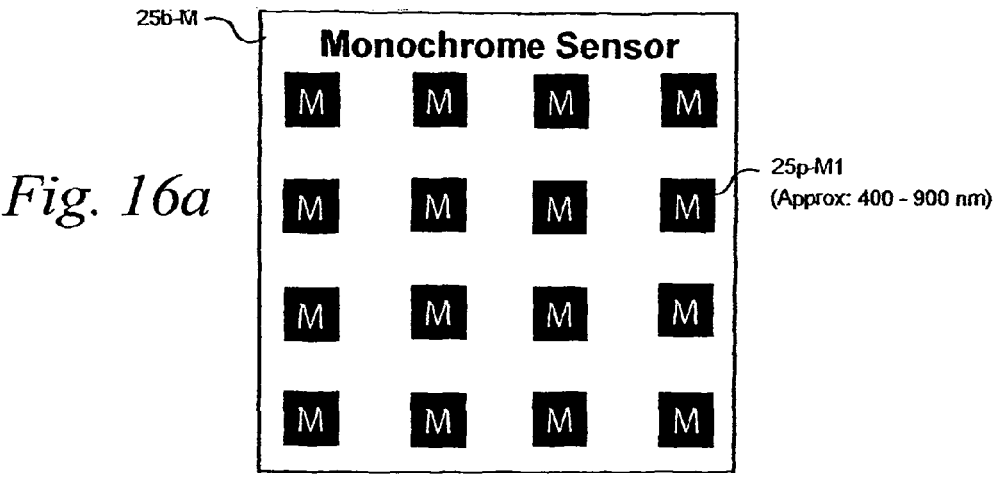
Figure 16B:
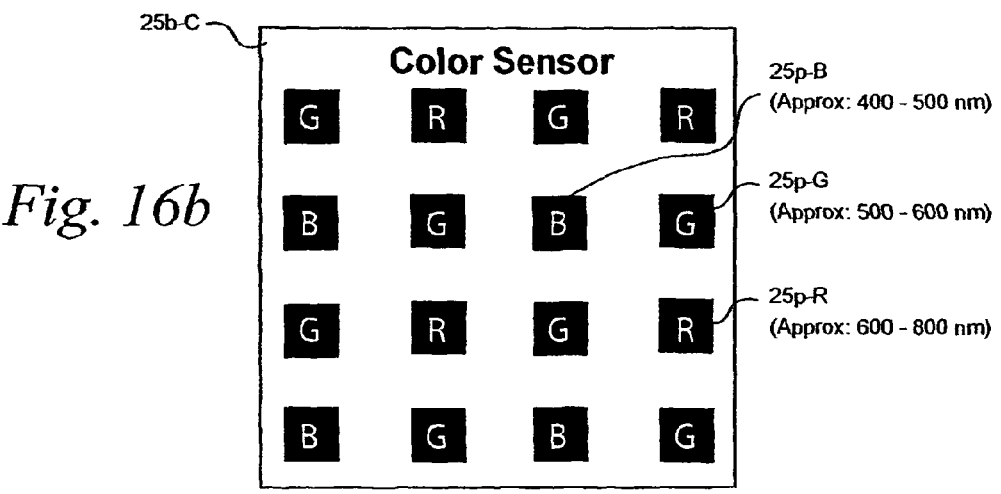
Figure 16C:
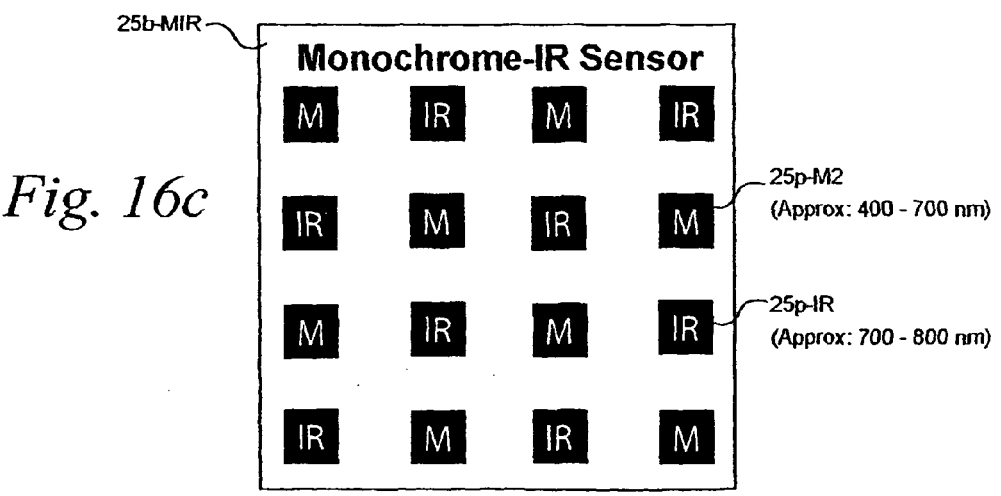

FIGS. 16a, 16b and 16c are various sensor arrangements and in particular FIG. 16a shows a typical monochrome sensor, FIG. 16b shows a typical color sensor and FIG. 16c shows an alternate monochrome/non-visible IR sensor.

Figure 16D:
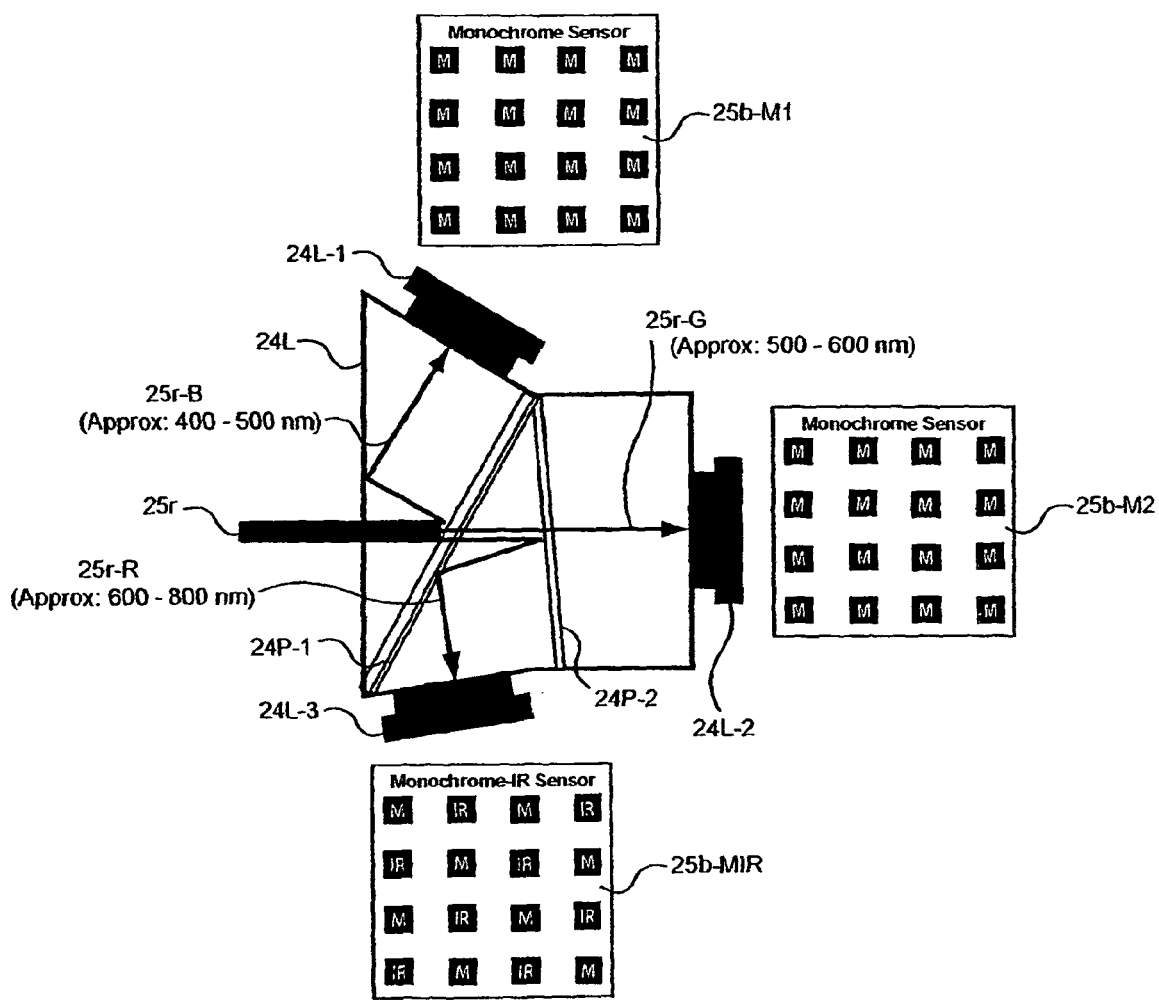

FIG. 16d shows a three element CMOS camera where the light entering through the lens is split into three directions simultaneously impacting two monochrome sensors and a combined monochrome/IR sensor. The visible frequencies of 400 to 500 nm (blue) are directed to the first monochrome sensor; the visible frequencies of 500 to 600 nm (green) are directed to the second monochrome sensor; and the visible and near IR frequencies of 600 to 1000 nm are directed to the monochrome/IR sensor. This solution effectively creates a color camera with IR imaging capability.

Figure 16E:
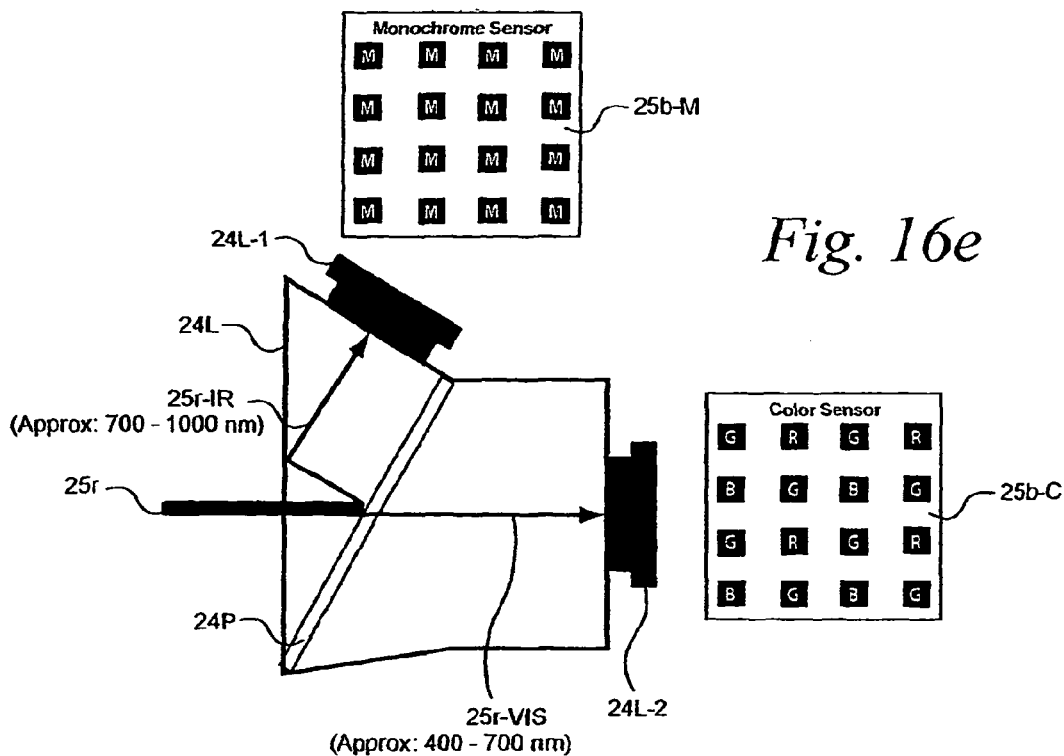

FIG. 16e shows a two element CMOS camera where the light entering through the lens is split into two directions simultaneously impacting both color and monochrome sensors. The visible frequencies of 400 to 700 nm are directed to the color sensor while the non-visible near IR frequencies of 700 to 1000 nm are directed to the monochrome sensor thereby creating two overlapping views of a single image in both the visible and non-visible regions.

Figure 16F:
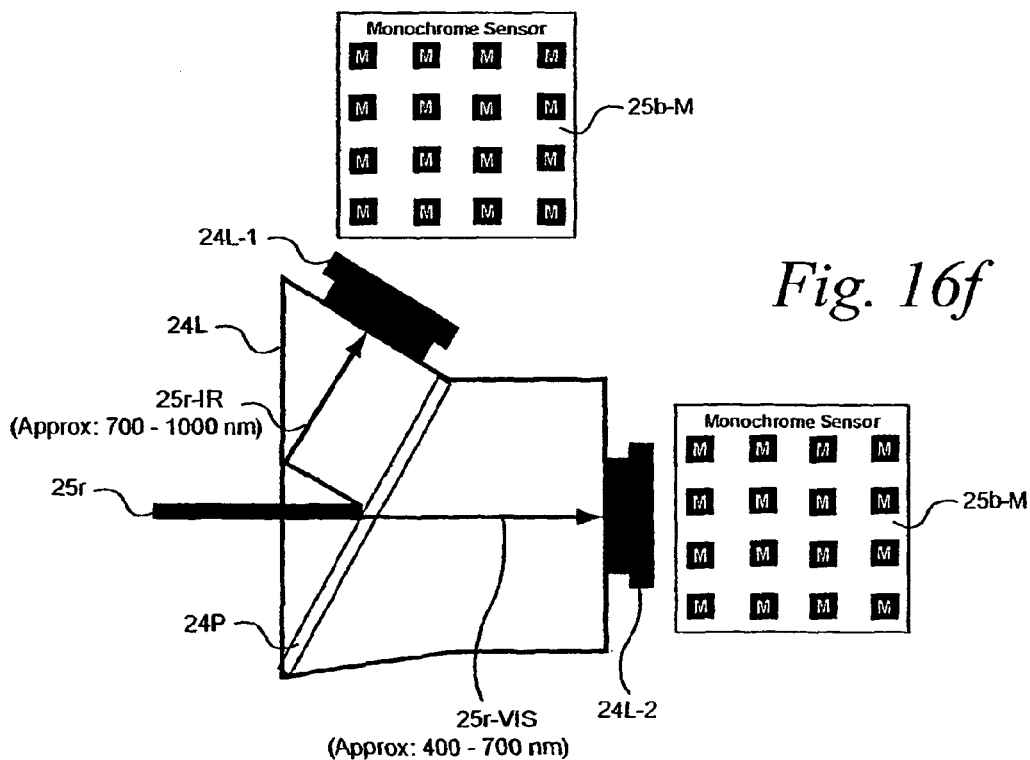

FIG. 16f is exactly similar to FIG. 16e except that both sensors are monochrome.

FIG. 17 depicts a series of three steps that process the combination visible image and non-visible image. In step one the current visible image is extracted from its background. In step two the extracted portion only is used to direct a search of the non-visible image pixels in order to locate contrast variations created in the non-visible IR frequencies due to the addition of either IR absorbing or IR reflecting or retro-reflecting marks on the foreground objects. In step three the determined high contrast markings are converted into centered points which may then be used to create a continuous point model of the body motion of all foreground objects.

Figure 18:
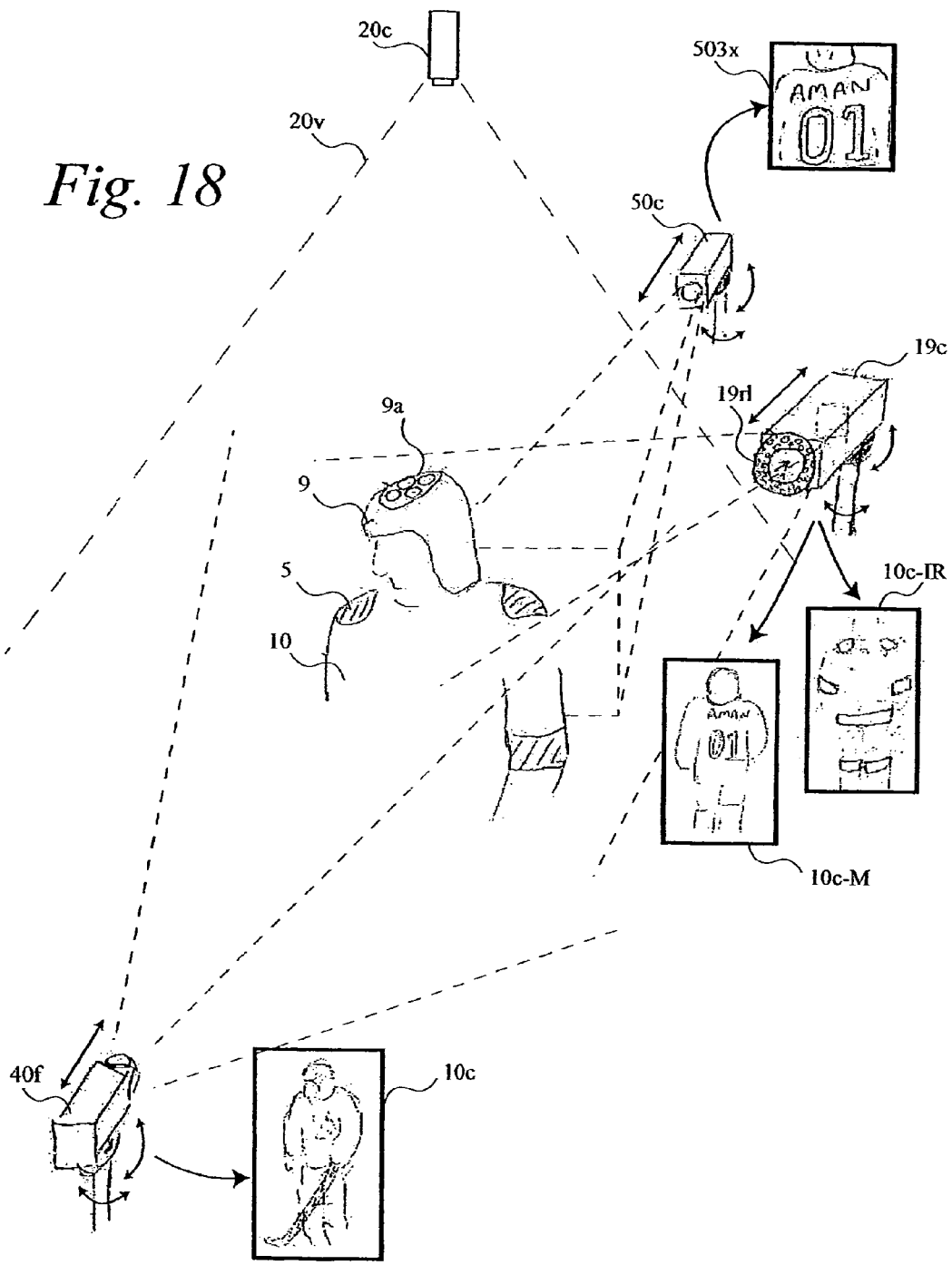

FIG. 18 depicts the various types of cameras used in the present invention including the overhead tracking cameras, the player identification cameras, the player filming cameras and the player filming and three-dimensional imaging cameras.

Figure 19:
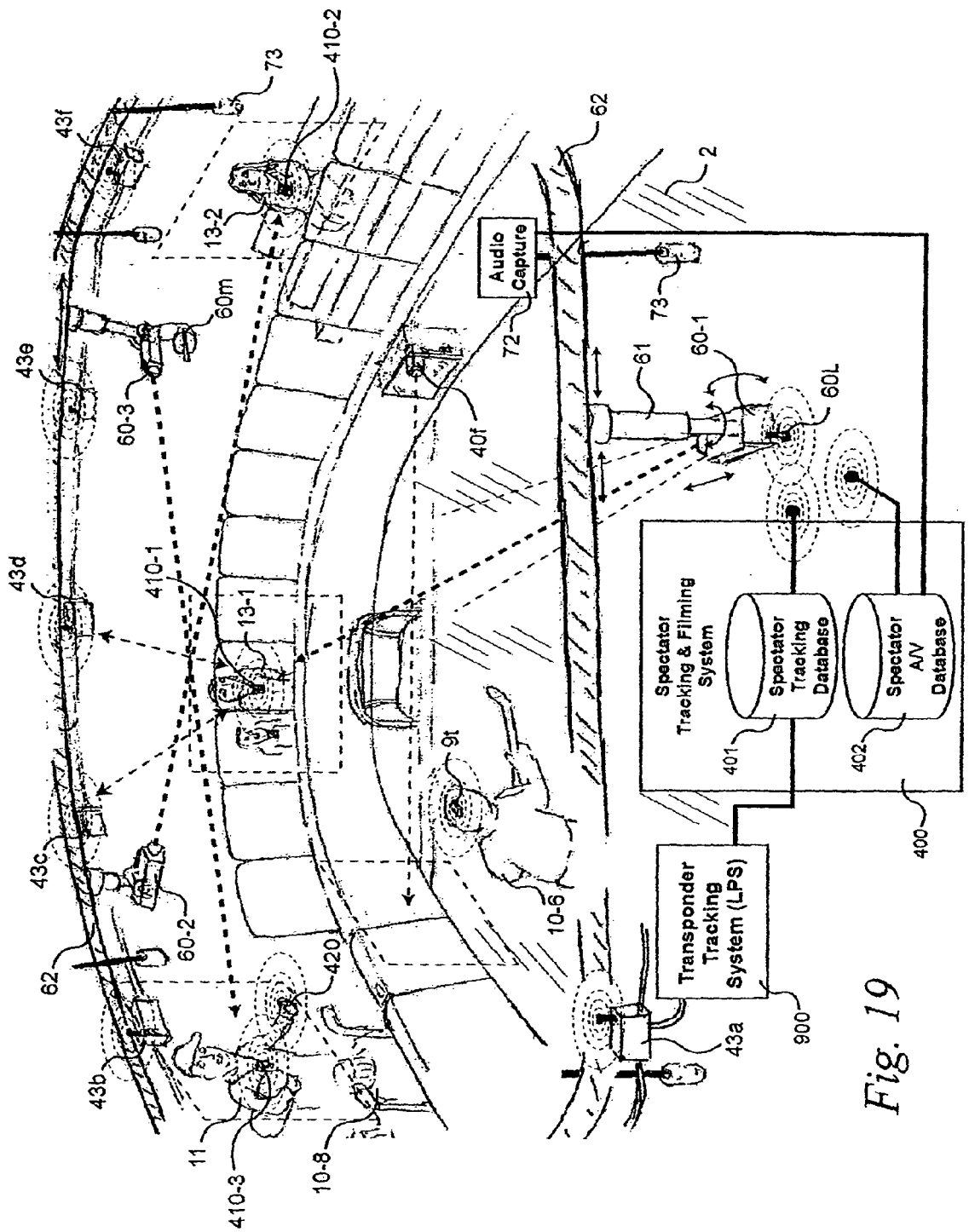

FIG. 19 is a combination block diagram depicting the spectator tracking & filming system along with a perspective drawing of a hockey rink and mainly of the spectators outside of the tracking surface such as other players, the coach and fans. Also depicted are the processing elements that control the tracking of the location of these spectators as well as their automatic filming. This part of the present invention is responsible for capturing the spectator audio/video database whose images and sounds may then be used by the automatic content assembly & compression system to combine into a more compete multi-media recreation of the game as a thematic story.

Figure 20:
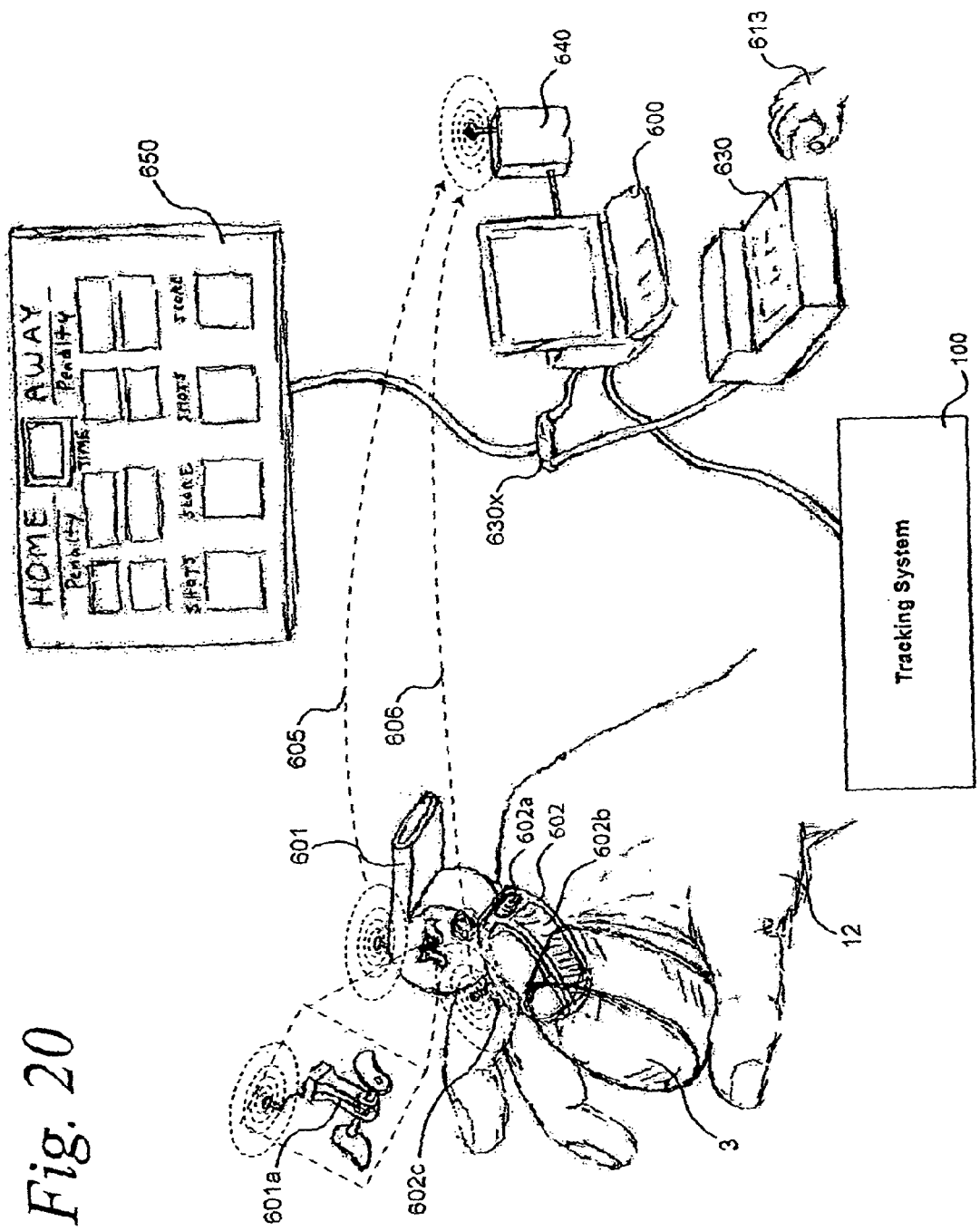

FIG. 20 is a combination perspective drawing of the hand of an ice hockey referee that has been outfitted with a combination puck-drop pressure sensor and whistle air-flow sensor along with the game control computer and/or game controller box that work to manually control the game scoreboard. By automatically sensing the puck-drop and therefore play start-time along with the whistle air-flow and therefore play stop-time, the game clock interface system is able to both automatically operate the game clock and indicate key timing information to the tracking and game filming systems.

Figure 21:
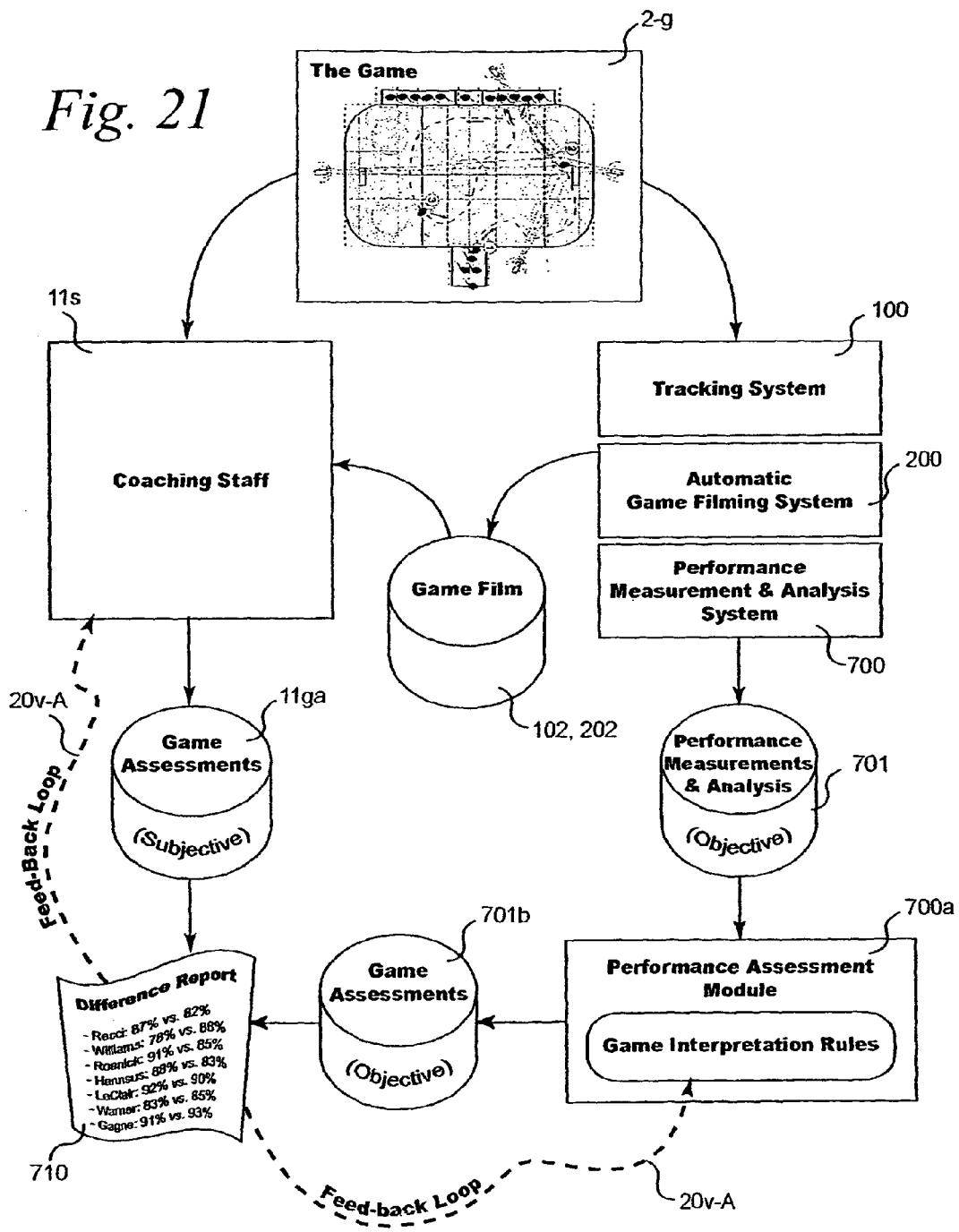

FIG. 21 is a block diagram depicting the side-by-side flow of information starting with the game itself as it is then subjectively assessed by the coaching staff and objectively assessed by the performance measurement and analysis system. This side-by-side flow results in the ultimate comparison of the subjective and objective assessments thereby creating a key feed-back loop for both the coaching staff and performance measurement and analysis system.

Figure 22:
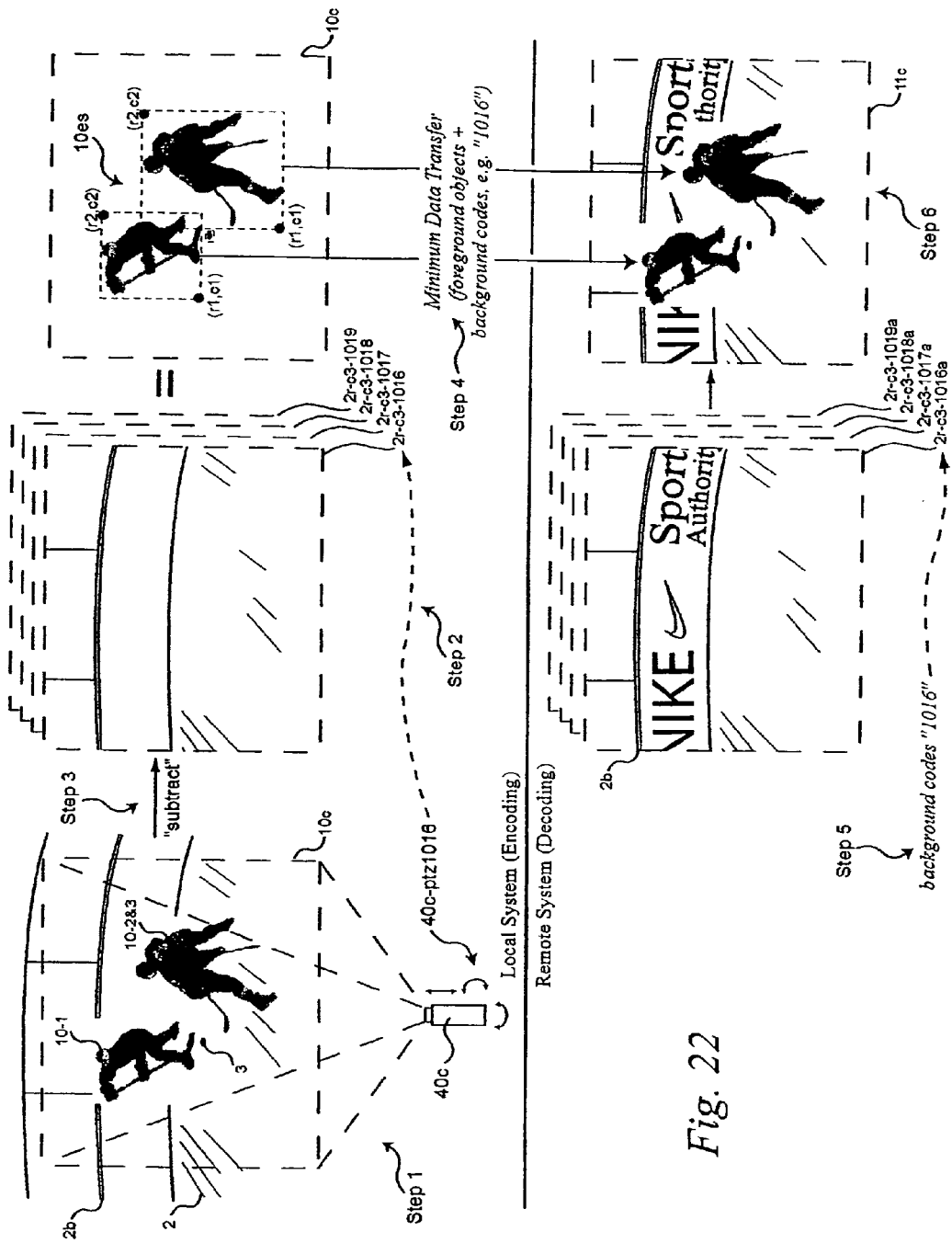

FIG. 22 is a series of perspective view representations of the overall method embodied in the present application for the capturing of current images, the extraction of the foreground objects, and the transmission of these minimal objects to be later placed on top of new backgrounds with potentially inserted advertising.

Figure 23:
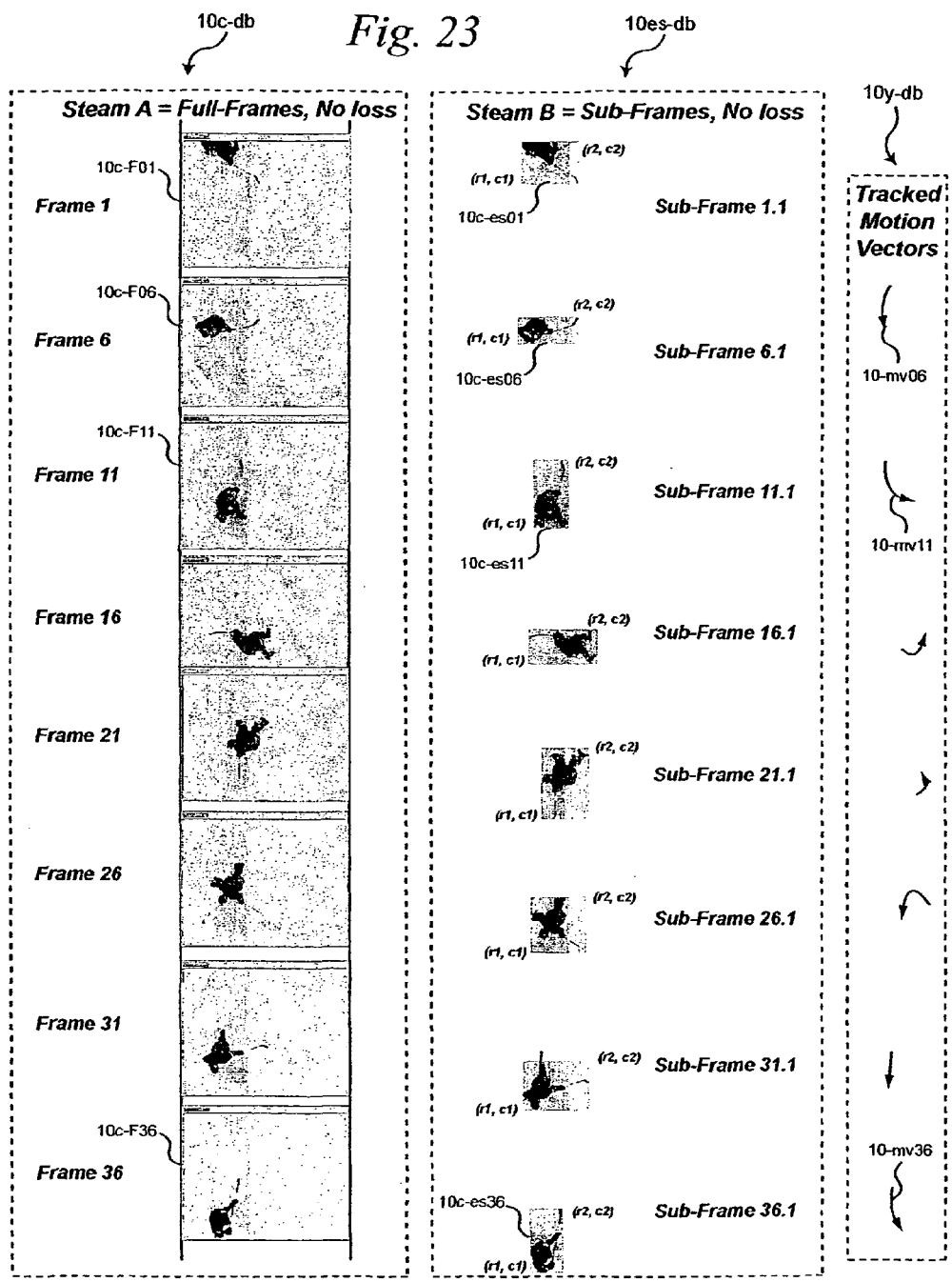

FIG. 23 is two side-by-side series of overhead images designed to illustrate the bandwidth savings taught in the present invention that is predicated on the extraction of foreground objects from the background of the current image. A third series is also shown that represent a symbolic dataset of extracted foreground object movement vectors and related measurements.

Figure 24:
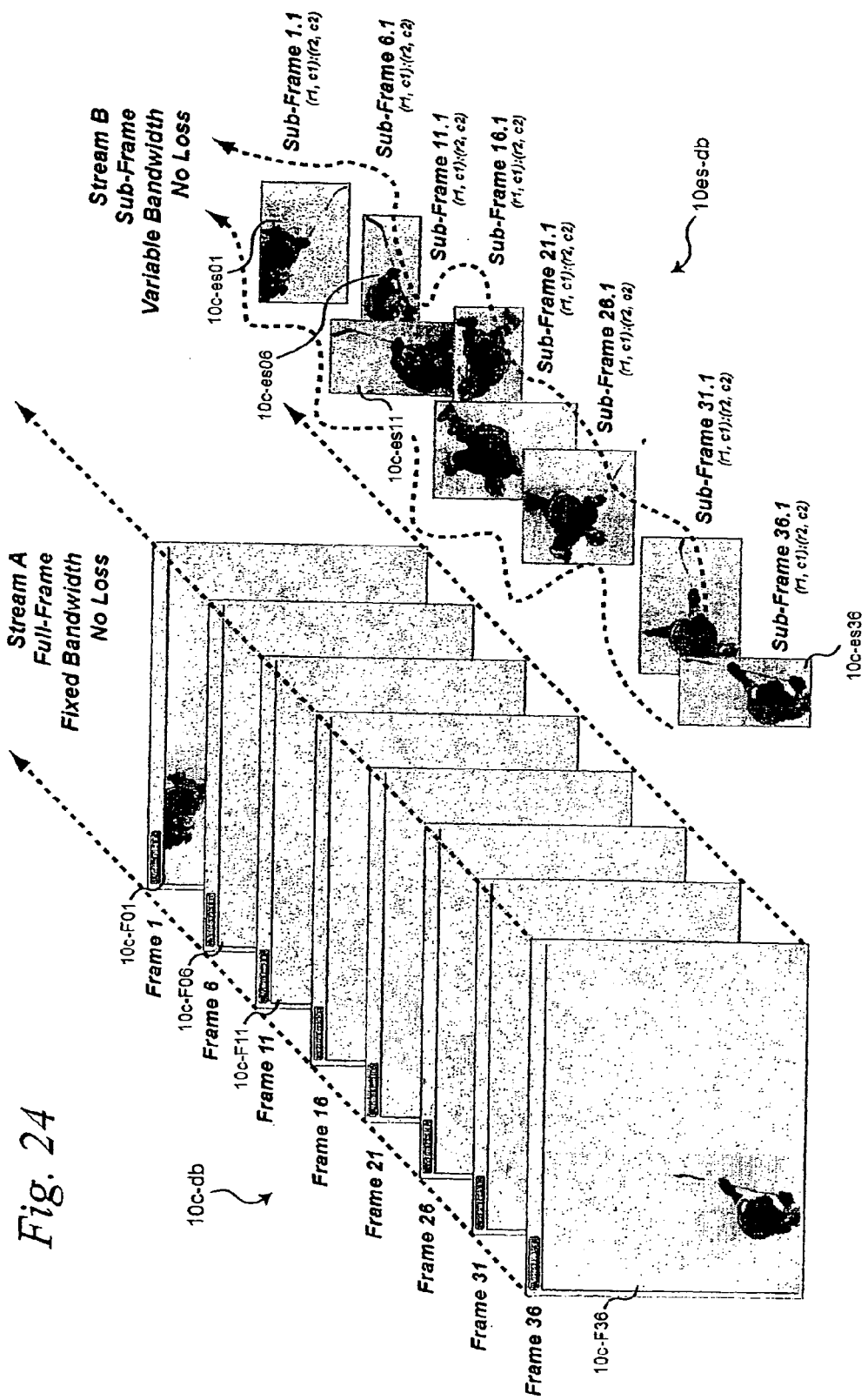

FIG. 24 shows the same two side-by-side series of overhead images found in FIG. 23 from a perspective view so as to accentuate both the reduction in transmitted information and the change from a fixed to variable transmission frame.

Figure 25:
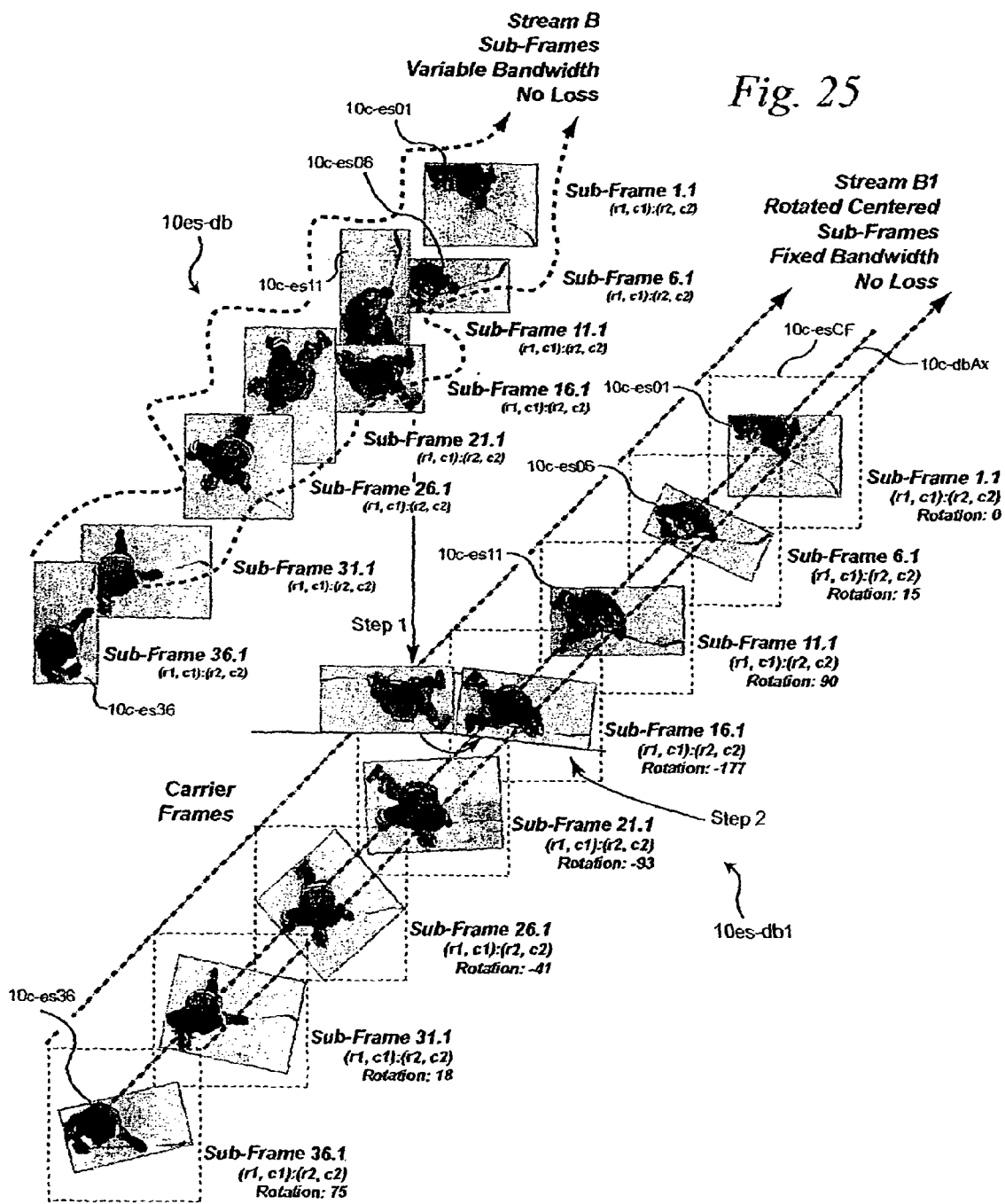

FIG. 25 shows the new condensed series of overhead images as portrayed in both FIG. 23 and FIG. 24 in both its original and converted formats. In the converted format, each sub-frame is rotated and centered within a carrier frame.

Figure 26:
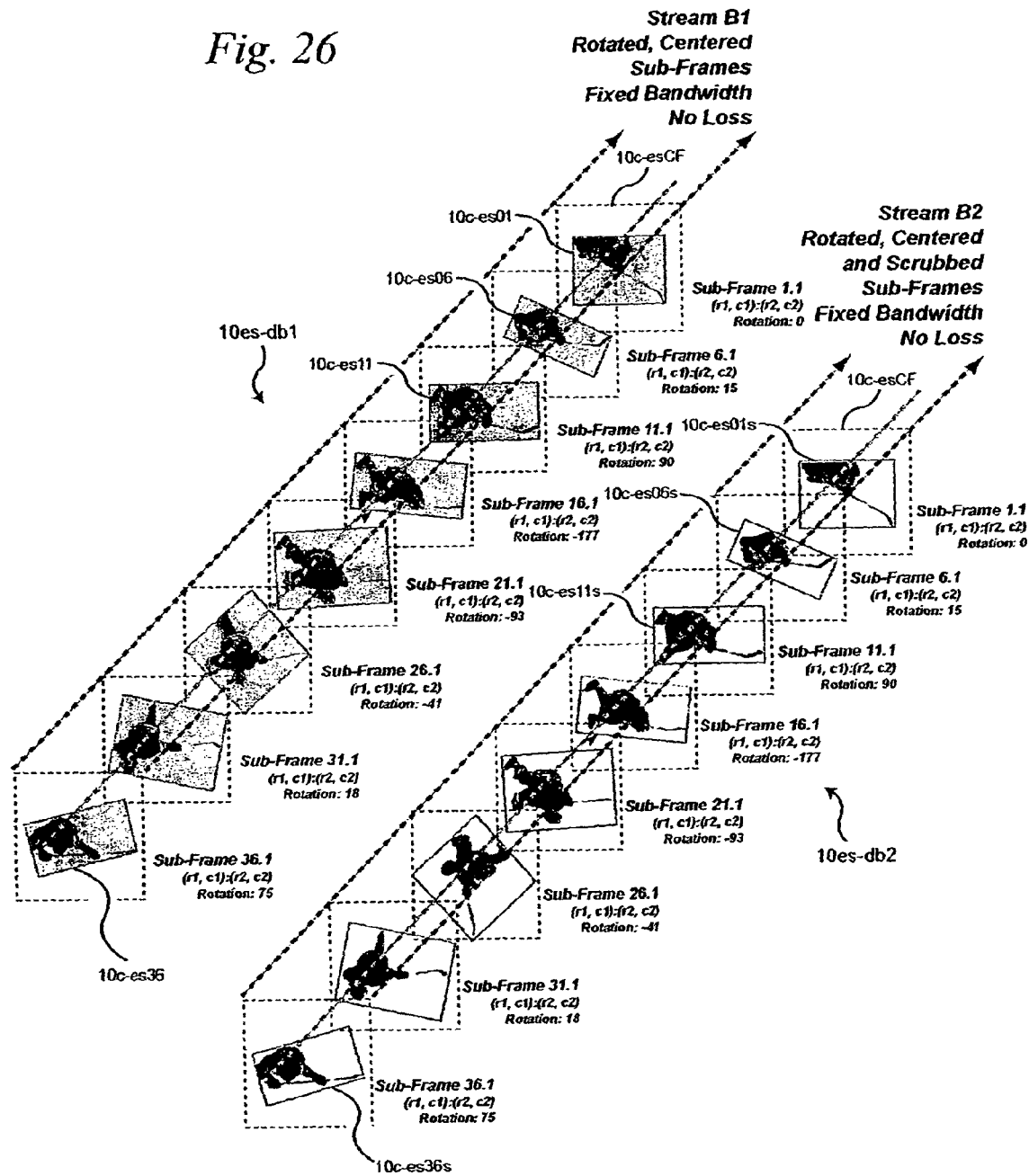

FIG. 26 shows the rotated and centered series of FIG. 25 where each sub-frame has been additional "scrubbed" of any detected background pixels thereby maximizing its compression potential.

Figure 27:
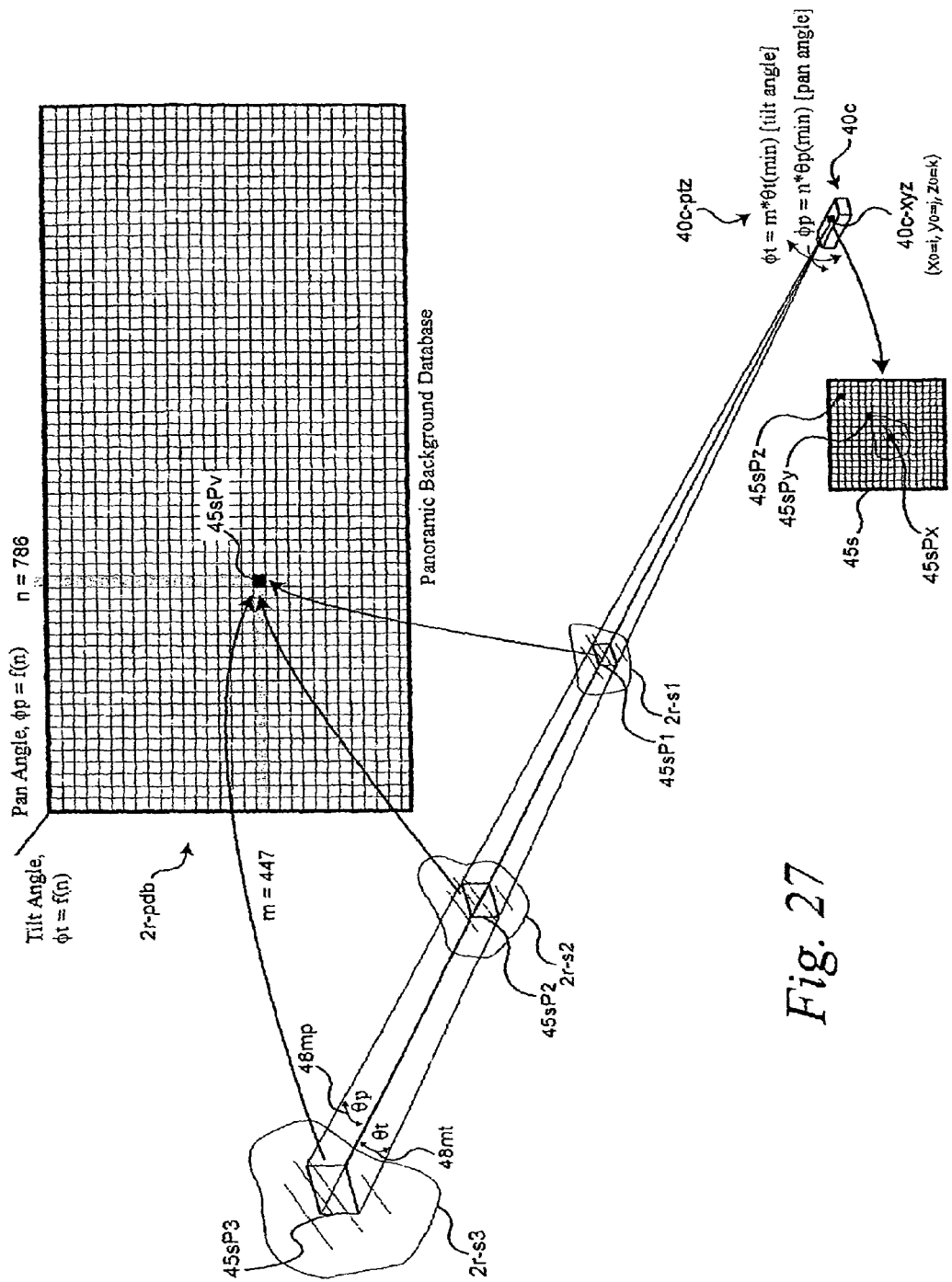

FIG. 27 is a perspective view of a filming camera as it captures background images prior to a game. These images are than appended into a larger panoramic background database as opposed to be stored individually. The database is keyed and accessible by the pan and tilt angles of the filming camera which are both set to be multiples of a minimum increment.

Figure 28:
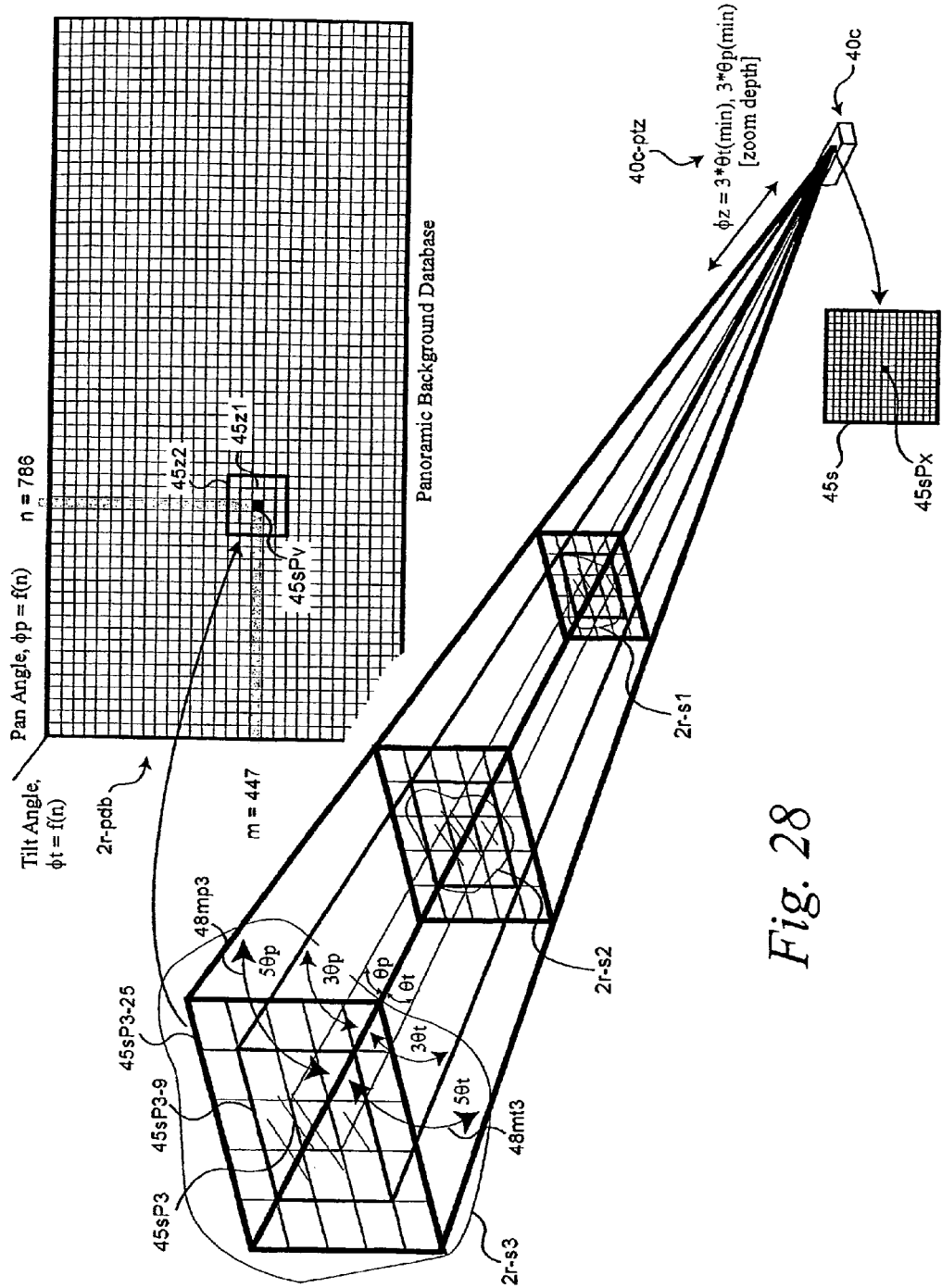

FIG. 28 is identical to FIG. 27 accept that it illustrates the impact of zooming the filming camera at any given pan and tilt angle. Zooming factors are purposely restricted in order to ensure that any individual pixel, for any given zoom setting, is always a whole multiple of the smallest pixel captured at the highest zoom setting. Furthermore, the movement of the filming camera is purposely restricted so that any individual pixel, for any given zoom setting, is also centered about a single pixel captured at the highest zoom setting.

Figure 29A:
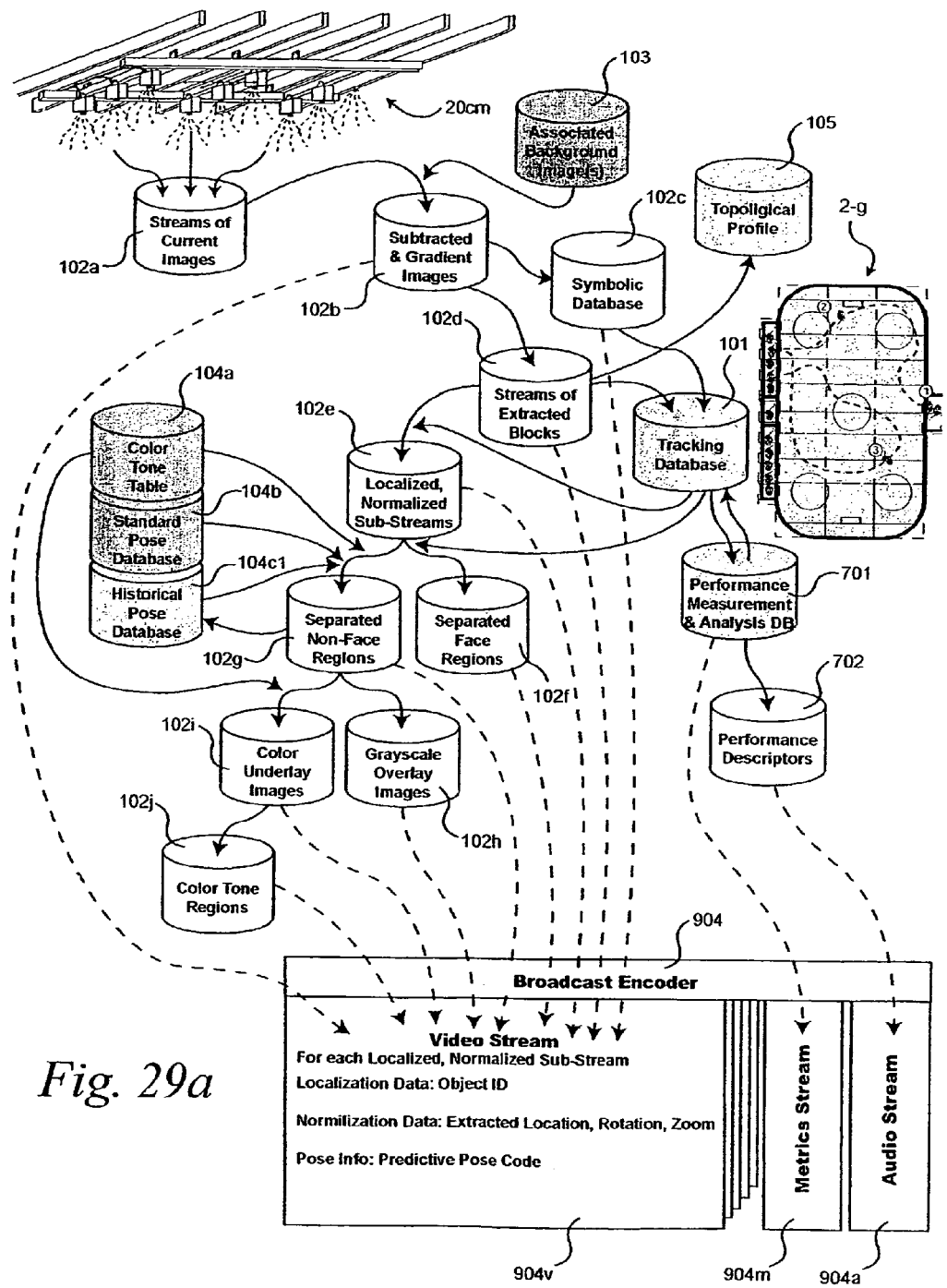

FIG. 29a depicts the flow of relevant video and tracking information from its origin in the overhead tracking system to its destination in the broadcast encoder. There are three types of datasets shown. First, there are a majority of datasets (shown as light cylinders) representing the evolution of the "current frame" from its raw state into it final segmented and analyzed form. Second, there are three datasets (shown as the darkest cylinders) representing "pre-known" or "per-determined" information that is critical for the process of segmenting the "current frame" into its desired parts. And finally, there are four datasets (shown as the medium toned cylinders) representing "accumulated frame and analysis" information that is also critical for the segmenting of the "current frame."

Figure 29B:
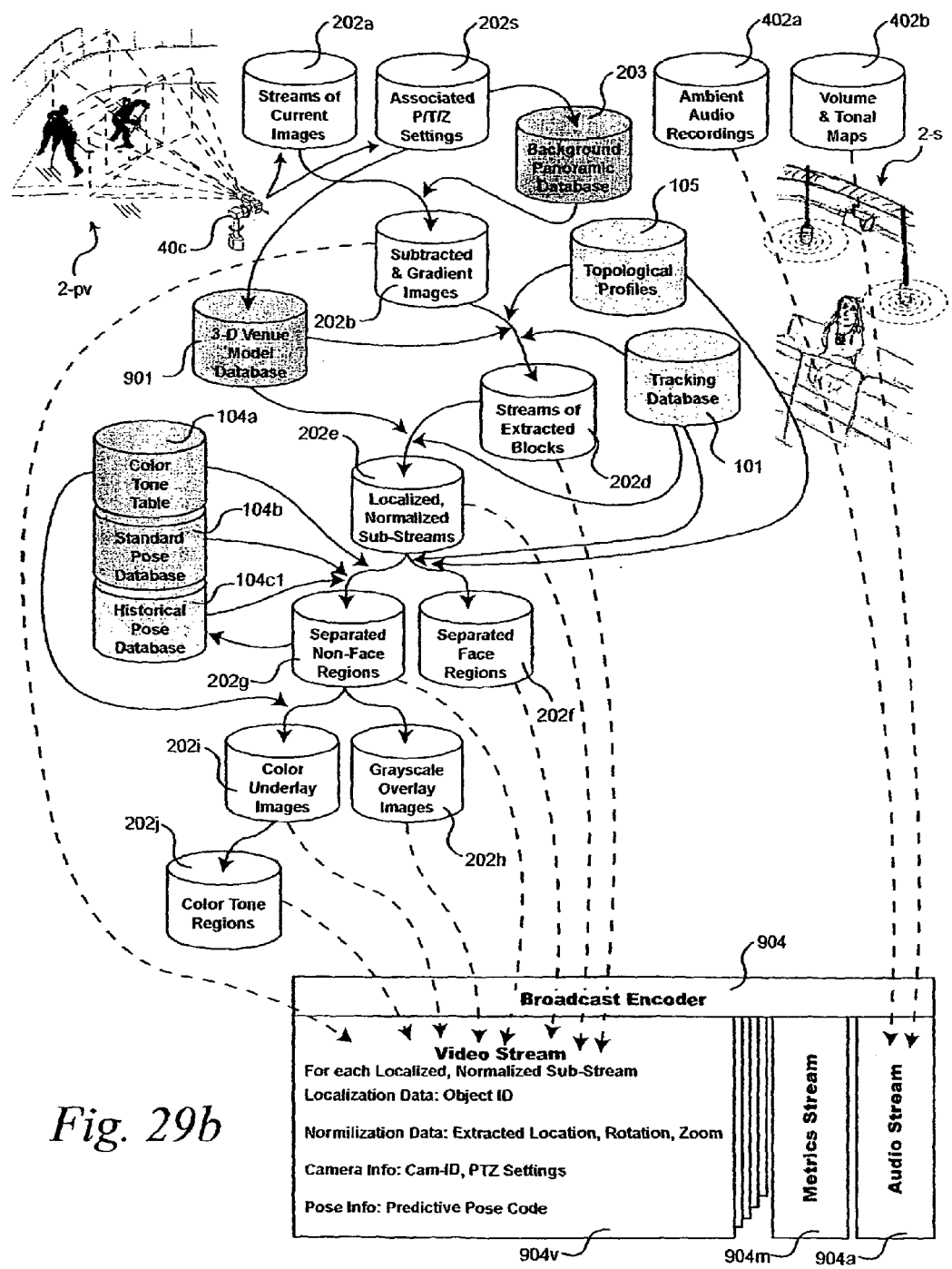

FIG. 29b depicts a similar flow of relevant video and audio information from its origin in the automatic filming and audio recording systems to its destination in the broadcast encoder. The light, dark and medium tone cylinders have similar meaning as in FIG. 29a.

Figure 29C:
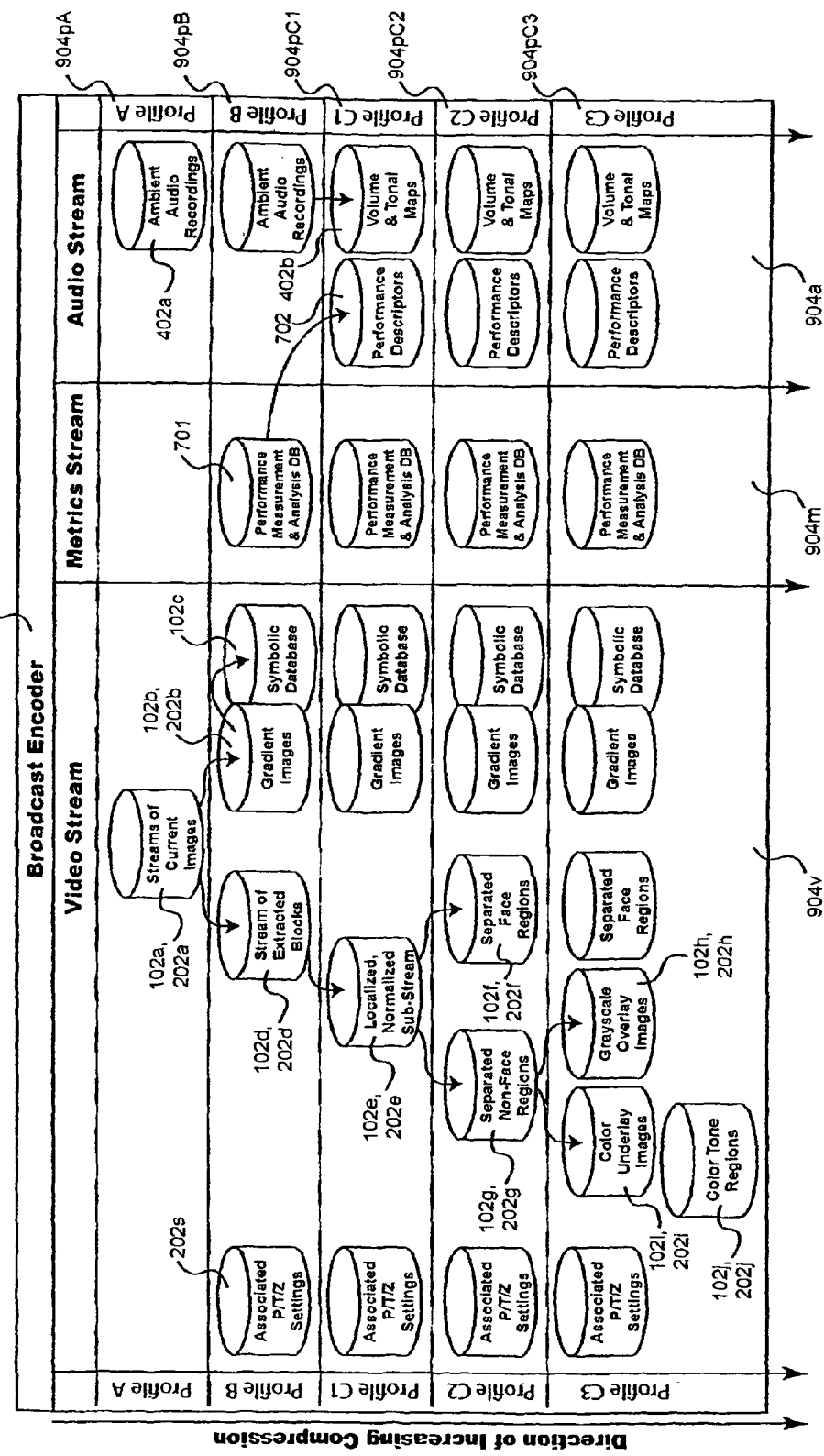

FIG. 29c depicts five distinct combinations of encoded datasets referred to as profiles. The datasets encompass video, metrics (tracking information,) and audio. The least segmented Profile A contains the unprocessed current stream of video information and audio recordings, similar to the input into today's current encoders, such as MPEG2, MPEG4, H.264, etc. The most segmented Profile C3 consists of various translated sub-portions of the current stream of video and audio as discussed in FIGS. 29a and 29b. The increase in the segmentation of the encoded data is anticipated to yield increased data compression over current methods working on the simplest first profile.

Figure 29D:
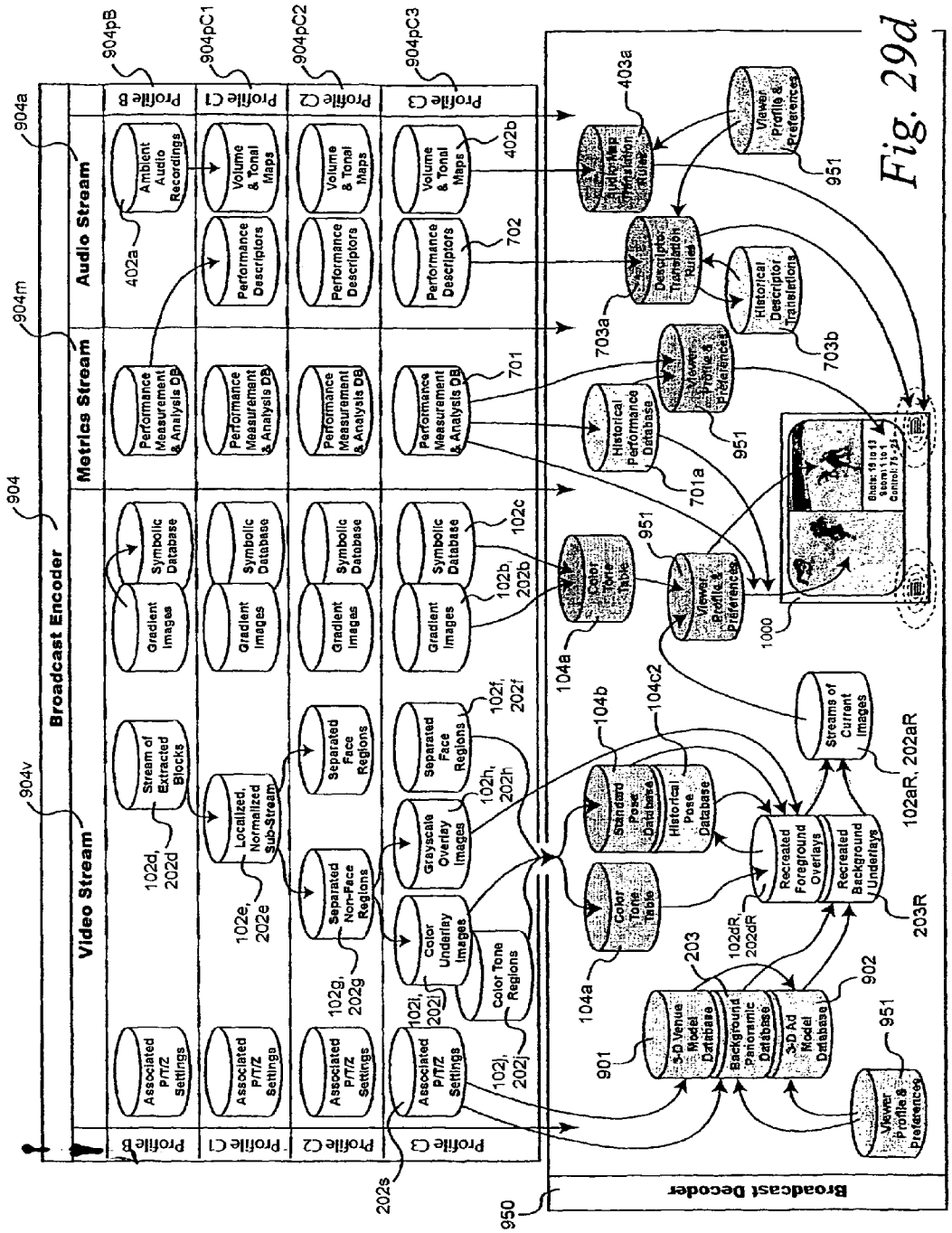

FIG. 29d depicts the four segmented, Profiles B through C3, out of the five possible shown in FIG. 29c. Each of these four is optionally accepted by the broadcast decoder in order to reverse into a current stream of images, associated audio and relevant metrics (tracking information.) Similar to FIGS. 29a and 29b, dark cylinders represent pre-known datasets, medium tone cylinders represent accumulated information while light cylinders represent current data being reassembled in order to create the final broadcast video.

The invention claimed is:

1. A system for creating blended content associated with an event, the system comprising:
a live-content recording apparatus including two or more cameras for recording video data throughout the entire duration of the event, where the video recordings are either of the event activities or event spectators, where each of the two or more cameras outputs original distinct streams of temporally sequential video frames as a multiple data source of event live-content, and where the two or more original streams form multi-camera video data;
an event activity tracking system for measuring in real-time the event activity of one or more event objects throughout the entire duration of the event, where event objects are either objects or one or more people associated with the event, where people are either participants in the event or spectators, and for outputting the tracking data as a multiple data source of event live-content; and
a content assembly system including a blending algorithm for creating new blended content in real time from the multiple data sources of event live-content, where the new blended content at least includes one or more new streams of video frames, where each new stream is unique in its composition of video frames with respect to any and all of the original video streams, where each new stream contains at least two video frames taken from different original streams, and where the content assembly system receives the multi-camera video data and tracking data and selects each of the at least two video frames taken from different original streams at least in part using the tracking data,
thereby creating a broadcast with undetectable delay to the human viewer of the on-going event.

2. The system of claim 1 where the content assembly system conditionally blends other non-live-content with the blended content, the system further comprising:
non-live-content, where the non-live-content includes any one of, or any combination of: (a) event replay content comprising one or more portions of prior-captured live-content of or relating to the event, as prior captured by any of the live-content recording apparatus, or (b) other content that was not captured by any of the live-content recording apparatus including advertising content, where advertising content includes any of video, audio, images, graphics, text or any other electronic representations of information,
where the blending algorithm is adapted to receive and blend any of the non-live-content with the blended content, where the blending algorithm performs any one of or any combination of: (a) selecting which non-live-content to insert into, or overlay onto, the blended content, or (b) selecting the time at which non-live-content is inserted into, or overlaid onto, the blended content.

3. The system of claim 1 wherein the live-content recording apparatus includes at least one calibrated camera for recording calibrated video data for inclusion in the multi-camera video data, where the calibrated camera is any of the following types including:
(i) cameras that are fixed and non-movable with respect to the event venue, where the fixed X, Y, Z location as well as the fixed pan, tilt, and zoom settings of the camera with respect to the event venue are known to the system;
(ii) cameras that are fixed and movable with respect to the event venue, where the fixed X, Y, Z location of the camera with respect to the event venue is known to the system, where any one of, or any combination of the movable pan, tilt, or zoom settings of the camera with respect to the event venue are electronically adjustable in response to control signals, and where the control signals emanate from the system, such that the current pan, tilt, and zoom settings are known to the system;
(iii) cameras that are fixed and movable with respect to the event venue, where the fixed X, Y, Z location of the camera with respect to the event venue is known to the system, where any one of, or any combination of the movable pan, tilt, or zoom settings of the camera with respect to the event venue are manually adjustable and determinable by the system, and where the current pan, tilt, and zoom settings are known to the system; or (iv) cameras that are free-floating and manually operable at the event venue, where the current movable X, Y, Z location, pan and tilt orientation, as well as zoom setting of the camera with respect to the event venue are determinable by and known by the system.

4. They system of claim 3 where the at least one calibrated camera is attached to any combination of movement apparatus controllable by the system for effecting the adjustment of any of the calibrated camera's settings, where the camera's settings include any one of, or any combination of the camera's: (i) X, Y, Z location with respect to the venue; (ii) pan or tilt angle with respect to the venue, or (iii) zoom settings with respect to the venue, the system further comprising:

the live-content recording apparatus including two or more cameras, where at least one camera is a calibrated camera, further comprising any one of, or any combination of a controllable movement apparatus attached to any of the calibrated cameras for: (a) adjusting the X or Y location of the attached calibrated camera with respect to the venue, where the movement apparatus includes continuous rail systems; (b) adjusting the Z location of the attached calibrated camera with respect to the venue, where the movement apparatus includes extendable arm systems;

(c) adjusting the pan or tilt angle setting of the attached calibrated camera with respect to the venue, where the movement apparatus includes swivel mounts, or (d) adjusting the zoom setting of the attached calibrated camera with respect to the venue; and a filming system for controlling the live-content recording apparatus and any of the attached movement apparatus, where the filming system receives the video data from the at least one calibrated camera, the tracking data, as well as the known current camera settings for the at least one calibrated camera, where the filming system uses the known and current X, Y, Z location as well as pan, tilt, or zoom settings of the calibrated camera with respect to the event venue in order to determine the spatial portion of the event venue that is currently being viewed within each distinct video frame captured by the calibrated camera, where the filming system uses any of the tracking data relating to any one or more event objects in order to determine adjustments to any one of or any combination of (a) the X or Y location of the calibrated camera with respect to the venue; (b) the Z location of the calibrated camera with respect to the venue; (c) the pan or tilt angle settings of the calibrated camera with respect to the venue; or (d) the zoom setting of the calibrated camera with respect to the venue, where the filming system sends electronic signals to the one or more movement apparatus controlling the calibrated camera to be adjusted, and where the controlling apparatus makes the adjustments to the attached calibrated camera responsive to the system's signal.

5. They system of claim 3 where the blending algorithm for creating blended video streams uses a mapping database that correlates the identity, location, or orientation of distinct event objects to distinct calibrated video frames captured by calibrated cameras, the system further comprising:

a filming system for controlling the live-content recording apparatus, where the filming system receives the video data from the at least one calibrated camera, the tracking data as well as the known current camera settings for the at least one calibrated camera, where the filming system uses the known and current X, Y, Z location as well as pan, tilt or zoom settings of the calibrated camera with respect to the event venue in order to determine the spatial portion of the event venue that is currently being viewed within each distinct calibrated video frame captured by the calibrated camera, where the filming system uses any of the tracking data relating to any one or more event objects in order to correlate any of the event object information including identity, location, or orientation to each of the distinct calibrated video frames, and where the filming system outputs the information correlating event objects to calibrated video frames in an objects-to-video mapped database as a multiple data source of event live-content, wherein the blending algorithm is adapted to receive the objects-to-video mapped database, where the blending algorithm selects which of the two or more video frame streams from the multi-camera video data to include in any of the one or more blended video streams using at least in part the objects-to-video mapped database.

6. The system of claim 5 where the event objects correlated with the calibrated video data are non-participants, the system further comprising:

one or more electronic devices that are worn by one or more event non-participants to be tracked, where non-participants includes spectators, where each electronic device is adapted to output electronic signals, wherein the tracking system measures in real-time the event activity, and is adapted to receive and analyze the electronic signals output from the one or more electronic devices in order to determine tracking data including the identities and locations of the event non-participants wearing the devices;

the filming system controls the live-content recording apparatus, where the filming system receives the video data from the at least one calibrated camera, the tracking data as well as the known current camera settings for the calibrated camera, where the filming system uses any of the tracking data relating to any one or more event non-participants in order to correlate any of the related tracking data including identity or location to each of the distinct video frames in which the tracked non-participants are determined to be in view, and where the filming system outputs this information correlating the event non-participants to calibrated video frames to the objects-to-video mapped database; and the blending algorithm of the content assembly system creates blended content from the multiple data sources of event live-content, and is adapted to receive the objects-to-video mapped database, where the blending algorithm selects which of the two or more video frame streams from the multi-camera video data to include in any of the one or more blended video streams using at least in part the objects-to-video mapped database including the correlations between the non-participants and calibrated video frames.

7. The system of claim 3, where the calibrated video data are segmented and associated with the event objects using a mapping database that correlates the identity, location, or orientation of distinct event objects to distinct video frames, the system further comprising:

a filming system for controlling the live-content recording apparatus, where the filming system receives the video data from the at least one calibrated camera, the tracking data, as well as the known current camera settings for the at least one calibrated camera, where the filming system uses the known and current X, Y, Z location as well as pan, tilt, or zoom settings of the calibrated camera with respect to the event venue in order to determine the spatial portion of the event venue that is currently being viewed within each distinct calibrated video frame captured by the calibrated camera, where the filming system uses any of the tracking data relating to any one or more event objects in order to correlate any of the event object information including identity, location, or orientation to each of the distinct calibrated video frames, and where the filming system outputs the information correlating event objects to calibrated video frames in an objects-to-video mapped database as a multiple data source of event live-content; and a segmenting algorithm for receiving the calibrated video data and the objects-to-video mapped database and for creating segmented video data associated with the event objects, where the segmenting algorithm operates upon the at least one calibrated video frame stream by analyzing each distinct calibrated video frame in order to determine which pixels of the calibrated video frame substantially represent any one of, or any combination of: (i) the foreground, comprising event objects; (ii) the background, comprising the event venue; or (iii) the moving background, comprising spectators, where the segmenting algorithm uses the objects-to-video mapped database to associate tracking information with the foreground pixels, where the associated tracking information includes any one of or any combination of the event object's type, identity, location, orientation, size or color, and where the segmenting algorithm outputs the segmented video data as a multiple data source of event live-content.

8. The system of claim 7 for further distinguishing the segmented foreground pixels from the segmented moving background pixels, the system further comprising:

a calibrated venue model describing the three-dimensional layout of the event venue including the locations of a performance area and spectator areas, where the event activities of the participants are expected to substantially occur within the performance area, where the event activities of the spectators are expected to substantially occur within the spectator areas, and where the coordinate system used in the calibrated venue model is relatable to the coordinate system used in the dataset of current calibrated camera settings, wherein the segmenting algorithm receives the calibrated video data and the objects-to-video mapped database and creates segmented video data associated with the event objects, and is adapted to receive the calibrated venue model, where the segmenting algorithm additionally uses the calibrated venue model to determine within each video frame which spatial pixel areas pertain to the performance area verses the spectator areas, and where the segmenting algorithm uses the determined spatial pixel areas in order to at least distinguish (i) foreground pixels including event objects from (ii) moving background including spectators.

9. The system of claim 3 where event participants are identified using a participant identification system, the system further comprising:

one or more identification marks placed on at least one participant;

one or more electronically adjustable calibrated cameras for capturing images of any participant; and an identification system for videoing participants in order to identify a participant based upon their identification marks, where the identification system receives the tracking data from the tracking system relating to the current location of one or more event participants to be identified, where the identification system is adapted to determine one or more adjustments to the pan, tilt, or zoom settings of any one or more of the electronically adjustable calibrated cameras using at least the combination of: (a) the known fixed X, Y, Z location of the calibrated camera with respect to the venue; (b) the current combination of the pan, tilt, and zoom settings of the calibrated camera with respect to the venue; and (c) the tracking data related to a participant, where the identification system transmits one or more control signals comprising the one or more adjustments to the calibrated camera during the event so that the electronically adjustable calibrated camera captures one or more images of a participant to be identified, where the identification system analyzes each image to determine if any identification mark is present, where any marks determined to be present are further analyzed to determine the participant's identity, and where the identification system communicates the identity of the participant to the tracking system for storage in the tracking database concurrent with the participant's tracking information.

10. The system of claim 9 where the event is a sporting event and where the event participants are any one of, or any combination of players or game officials, and the identification marks are symbols including either numbers or letters placed anywhere on the participant's clothing or equipment.

11. The system of claim 3, where the calibrated video data is segmented, the system further comprising:

a segmenting algorithm for receiving the calibrated video data and creating segmented video data, where the segmenting algorithm operates upon at least one calibrated video frame stream captured from at least one calibrated camera, where for each calibrated video frame stream to be segmented, the segmenting algorithm analyzes the calibrated video frames within the stream in order to determine which pixels of the calibrated video frames substantially represent any one of, or any combination of segment types including: (i) the foreground, comprising event objects; (ii) the background, comprising the event venue; or (iii) the moving background, comprising spectators, where the segmenting algorithm outputs the segmented video data as a multiple data source of event live-content.

12. The system of claim 11, wherein the segmenting algorithm creates the segmented video data in any format including: (i) the original calibrated video data with additional segmenting information at least indicating which pixels comprise the foreground, background, or moving background segments; or (ii) segmented foreground, background, or moving background video data with additional segmenting information indicating the spatial relationship of the segmented video data to the original calibrated video data.

13. The system of claim 11, wherein the segmented foreground video data are represented as either: (i) the original foreground pixel data; or (ii) a translation of the original foreground pixel data into graphic line art using an edge detection process.

14. The system of claim 11 wherein the segmenting algorithm for receiving calibrated video data and creating segmented video data is executed on any one of, or any combination of (i) the system camera capturing the original video frame stream; or (ii) a hub connected to one or more of the system cameras.

15. The system of claim 11 wherein the segmented video data are usable as a substitute for the video data.

16. The system of claim 11 where the content assembly system conditionally blends other non-live-content overlaid onto or in between any of the segmented video data segments while creating blended content, the system further comprising:

non-live-content, where the non-live-content includes any one of, or any combination of: (a) event replay content comprising one or more portions of prior-captured live-content of or relating to the event, as prior captured by any of the live-content recording apparatus, or (b) other content that was not captured by any of the live-content recording apparatus including advertising content, where advertising content includes any of video, audio, images, graphics, text or any other electronic representations of information, where the blending algorithm is adapted to receive and blend any of the non-live-content with the blended content, where the blending algorithm performs anyone of or any combination of: (a) selecting which non-live-content to insert into, or overlay onto, the blended content, or (b) selecting the time at which non-live-content is inserted into, or overlaid onto, the blended content, and where the blending algorithm receives and blends the segmented video such that any of the non-live-content is overlaid onto or in between any of the segments.

17. The system of claim 11, where the blended content is encoded and where the content assembly system includes an encoder, where during or after the content assembly and compression system selectively assembles any one of, or any combination of event live-content including video data, tracking data, or segmented video data into blended content, the content assembly system encodes the blended content.

18. The system of claim 17, wherein the encoder uses a selective encoding algorithm for processing the segmented video such that the encoding algorithm encodes the segment types of either (i) the foreground pixels, comprising event objects; or (ii) the moving background pixels, comprising spectators, differently from (iii) the background pixels, comprising the event venue.

19. The system of claim 18, wherein the encoding algorithm further uses any of, or any combination of the tracking data to alter the encoding of at least the segment type of the foreground pixels.

20. The system of claim 18, adapted to decode the encoded blended content including segment types of segmented video that have been encoded differently, the system further comprising:
a decoder for decoding the encoded blended content, where the decoder receives and decodes the encoded blended content using a selective decoding algorithm for processing any of the blended segmented video included within the encoded blended content such that the decoding algorithm decodes the segment types of either (i) the foreground pixels, comprising event objects; or (ii) the moving background pixels, comprising spectators, differently from (iii) the background pixels, comprising the event venue.

21. The system of claim 20 where the decoder conditionally blends other non-live-content with the decoded blended content, the system further comprising:
non-live-content, where the non-live-content includes any one of, or any combination of: (a) event replay content comprising one or more portions of prior-captured live-content of or relating to the event, as prior captured by any of the live-content recording apparatus, or (b) other content that was not captured by any of the live-content recording apparatus including advertising content, where advertising content includes any of video, audio, images, graphics, text or any other electronic representations of information,
where the decoder includes a second blending algorithm adapted to receive and blend any of the non-live-content with the decoded blended content, where the second blending algorithm performs any one of, or any combination of: (a) selecting which non-live-content to insert into, or overlay onto, the decoded blended content, or (b) selecting the time at which non-live-content is inserted into, or overlaid onto, the decoded blended content.

22. The system of claim 21 wherein the encoded blended content includes segmented video data and where the second blending algorithm included within the decoder conditionally overlays onto, or in between any of the decoded segmented video data segments, any of the non-live-content.

23. The system of claim 11, adapted to analyze at least the video segment type of foreground pixels comprising event objects in order to generate tracking data,
where the event activity tracking system includes a video analyzer, where the video analyzer is adapted to receive and analyze the segmented video data at least including the video segment type of foreground pixels comprising event objects in order to generate at least one datum of tracking data regarding the event objects.

24. The system of claim 23 where the at least one datum of tracking data regarding the event objects includes any one of, or any combination of an event object's type, identity, location, orientation, size, or color.

25. The system of claim 23 where the video data comprise information about markings attached to event objects, where the markings are either visible or non-visible, where the segmented video data retain the marking information, and where the marking information is used by the tracking system's video analyzer to determine at least any of the object's type, identity, location, orientation, or size.

26. The system of claim 23 wherein the segmenting algorithm and the tracking system's video analyzer are located on any one of, or any combination of:
(i) the system camera capturing the original video frame stream; or (ii) a hub connected to one or more of the system cameras.

27. The system of claim 11 for extracting sub-frames from the segmenting calibrated video data, the system further comprising:
a dataset of current calibrated camera settings for all calibrated cameras, where the settings at least include the calibrated camera's X, Y, Z location and orientation including pan and tilt angles with respect to the event venue, and where the settings are available for each captured frame within each calibrated camera's video frame stream; and
a background image database for retrieving or determining a background image for each calibrated camera based at least upon the calibrated camera's location and orientation,
where the segmenting algorithm is adapted to receive the dataset of current calibrated camera settings for any calibrated camera, where the segmenting algorithm uses the current settings associated with each calibrated video frame to retrieve an associated background frame, where at least in part the associated background is used to determine which video pixels in each calibrated video frame belong substantially to the (i) foreground or (ii) moving background versus the (iii) background, and where the segmented video data are then output as any one of, or any combination of: (a) zero or more extracted sub-frames, where the extracted sub-frames comprise fewer pixels than the original video frame, where the fewer pixels substantially represent (i) the foreground comprising event objects, or (ii) the moving background comprising spectators, and where associated with each extracted sub-frame are the extraction coordinates relating the sub-frame to the original calibrated video frame from which it was derived; or (b) the original calibrated video frame with associated segmenting information, were the segmenting information at least includes spatial indications of zero or more (i) foreground or (ii) moving background pixels contained within the original calibrated video frame.

28. The system of claim 27 where at least one of the calibrated cameras is fixed and non-movable with respect to the event venue, where the fixed X, Y, Z location as well as the fixed pan, tilt, and zoom settings of the calibrated camera with respect to the event venue are known to the system, where the associated background image database holds at least a background image of the calibrated camera's fixed and non-movable view for use by the segmenting algorithm.

29. The system of claim 28 comprising two or more tracking cameras for capturing calibrated video data that are fixed and non-movable with respect to the event venue, where the tracking cameras are arranged in a grid such that the combination of the fields-of-views of all of the tracking cameras in the grid forms a contiguous view of an event performance area, where the event activities of the participants are expected to substantially occur within the performance area, and where the venue coordinates of the performance area are known to the system in relation to the coordinate system used in the dataset of calibrated camera settings for each of the tracking cameras.

30. The system of claim 29, wherein the tracking cameras comprising the grid are fixed such that the optical axis of each tracking camera's view is substantially above and perpendicular to the performance area, such that each tracking camera's view is substantially looking down at the performance area.

31. The system of claim 29 where the calibrated video data captured by the grid of tracking cameras is segmented by the segmenting algorithm, where the segmenting algorithm combines all of the zero or more extracted sub-frames from each of the calibrated video frame streams output by each of the tracking cameras into a single database of extracted tracking sub-frames, where the segmenting algorithm uses the calibrated tracking camera information in order to determine and associate with each sub-frame the coordinates of the portion of the performance area represented by each sub-frame, where the single database includes only the extracted sub-frames and otherwise no other non-extracted portions of the original video frame from any of the tracking camera's video frame streams, where the non-extracted portions of the original tracking video frames represent background pixels, and where the segmenting algorithm outputs the single database of tracking sub-frames as a multiple data source of event live-content.

32. The system of claim 31, wherein the segmenting algorithm minimizes the information content within the extracted tracking video sub-frames by scrubbing each tracking sub-frame of background information, where scrubbing includes setting the pixel information relating to any background pixels to minimum values, where pixel information at least includes color or intensity, and where minimal values include the null value.

33. The system of claim 32, for analyzing the foreground pixels found in the single database of tracking sub-frames in order to generate tracking data, where the event activity tracking system includes a video analyzer adapted to receive and analyze the single database of tracking sub-frames including the video segment type of foreground pixels comprising event objects in order to generate at least one datum of tracking data regarding the event objects.

34. The system of claim 33, where the at least one datum of tracking data regarding the event objects includes any one of, or any combination of an event object's type, identity, location, orientation, size, or color.

35. The system of claim 31, where the single database of extracted tracking sub-frames is used in combination with a background image of the performance area to recreate a single combined video of the entire performance area, the system further comprising:
a performance area background database of one or more background images representative of the entire performance area from the viewing perspective of the grid of tracking cameras, where each of the one or more background images are either a natural or animated image of the performance area, where a natural image is equivalent or substantially similar to an image captured from the combined grid of tracking cameras, where an animated image is generated by a computer animation algorithm, and where the content assembly and compression system assembles at least the foreground information from the single database of tracking sub-frames into the blended content such that the event activities of the event objects as viewed by the tracking cameras are represented in the blended content, where the event objects at least include the event participants; and
a viewing system for receiving blended content and for presenting a representation of the blended content to a viewer, where the blended content includes the foreground information from the single database of tracking sub-frames, where the viewing system has access to the performance area background database for retrieving any of the one or more background images of the performance area, and where the viewing system overlays the foreground information from the single database of tracking sub-frames onto a retrieved performance area background image that-such that the event activities of the event objects as viewed by the grid of tracking cameras are presented to the viewer.

36. The system of claim 27 where at least one calibrated camera is mounted in a fixed X, Y, Z location and has an adjustable range of combinations of pan, tilt, or zoom settings throughout the duration of the event such that the camera's current view covers an adjustable range of views, where the associated background image database holds either (i) two or more stored background images, where each stored background image covers one combination of pan, tilt, or zoom settings substantially matching a potential view of the adjustable calibrated camera, or (ii) a panoramic background image covering two or more potential combinations of pan, tilt, or zoom settings, where from the panoramic image a derived background image representing a single pan, tilt, or zoom combination can be created to substantially match a potential view of the adjustable calibrated camera, and where the stored or derived background image corresponding to the adjustable calibrated camera's current settings is used by the segmenting algorithm.

37. The system of claim 27, wherein the segmenting algorithm minimizes the information content within an extracted sub-frame by scrubbing the sub-frames of background information, where scrubbing includes setting the pixel information relating to any background pixels to minimum values, where pixel information at least includes color or intensity, and where minimal values include the null value.

38. The system of claim 27, wherein for each distinct calibrated video frame stream to be segmented, the stream is received throughout the entire duration of the event and comprises a continuous series of temporally distinct original video frames, where the segmenting algorithm analyzes each current original video frame in order to determine if the original video frame comprises one or more non-background pixels, where non-background pixels are either (i) foreground pixels representing an event object, or (ii) moving background pixels representing spectators, where for any spatially contiguous group of non-background pixels found within the current original video frame, the segmenting algorithm creates an extracted current sub-frame such that each current original video frame comprises zero or more current extracted sub-frames of non-background pixels, where the segmenting algorithm associates with each current extracted sub-frame: (a) the extraction coordinates relating the sub-frame to the original video frame; and (b) camera calibration information including any one or, or any combination of camera identification code and camera settings including the X, Y, Z camera location, pan angle setting, tilt angle setting, or zoom setting, and where the extracted sub-frames are output by the segmenting algorithm as a multiple data source of event-live content.

39. The system of claim 38, wherein for each current extracted sub-frame the segmenting algorithm either (a) forms a new sub-stream, or (b) appends the current sub-frame to an existing sub-stream based upon the decision of a temporal blending algorithm, where the temporal blending algorithm bases the decision to append a sub-frame to an existing sub-stream at least in part upon the determination if the current sub-frame shares at least one non-background pixel with the temporally prior sub-frame in the existing sub-stream, where the segmenting algorithm terminates any existing sub-stream that is not appended with a current sub-frame, and where any and all sub-streams are output by the segmenting algorithm as a multiple data source of event-live content.

40. The system of claim 38, for correlating the extracted sub-frames with the tracking data, the system further comprising:
a mapping device for receiving one or more sub-streams of extracted sub-frames and for correlating each sub-frame within each stream with the tracking data, where the tracking data and the camera calibration information associated with each sub-frame are either expressed in, or translatable into, a common local coordinate system, where the mapping device uses the tracking data that are at least related to the event objects that are participants in order to determine which participants are viewed as foreground pixels within which sub-frames, and where the mapping device associates with each sub-frame any of the tracking data pertaining to any of the event objects viewed within the sub-frame, where the associated tracking data include any of the event object's type, identity, location, orientation, size, or color.

41. The system of claim 40, wherein for each current extracted sub-frame the segmenting algorithm either (a) forms a new sub-stream, or (b) appends the current sub-frame to an existing sub-stream based upon the decision of a temporal blending algorithm, where the temporal blending algorithm bases the decision to append a sub-frame to an existing sub-stream at least in part upon the determination if the current sub-frame either: (i) shares at least one non-background pixel with the temporally prior sub-frame in the existing sub-stream, or (ii) shares at least one event object based upon the associated tracking data with the temporally prior sub-frame in the existing sub-stream, where the segmenting algorithm terminates any existing sub-stream that is not appended with a current sub-frame, and where any and all sub-streams are output by the segmenting algorithm as a multiple data source of event-live content.

42. The system of claim 41, further comprising segmented video from two or more calibrated cameras wherein the segmenting algorithm creates at least one sub-stream from sub-frames that were extracted from the calibrated video captured by the two or more calibrated cameras, where the two or more extracted sub-frames from different cameras are either: (i) temporally concurrent, or (ii) temporally successive.

43. The system of claim 42, where any two temporally concurrent extracted sub-frames are combined into a new sub-frame representative of the same one or more event objects, and where the new combined sub-frame is used to replace the existing sub-frames from which the new combined sub-frame was created.

44. The system of claim 41, where the blended content including segmented video data in the form of sub-streams of sub-frames is encoded, the system further comprising:
an encoder for encoding the blended content, where during or after the content assembly system selectively assembles any one of, or any combination of event live-content including video data, tracking data, or segmented video data into blended content, the encoder encodes the blended content, where the blended content at least includes segmented video data of one or more sub-streams of extracted sub-frames, and where the encoder uses a selective encoding algorithm for processing the sub-frames such that the encoding algorithm encodes the segment types of either (i) the foreground pixels, comprising event objects; or (ii) the moving background pixels, comprising spectators, differently from (iii) the background pixels, comprising the event venue.

45. The system of claim 44, wherein the encoder minimizes the information content within an extracted sub-frame by scrubbing the sub-frame of background information, where scrubbing includes setting the pixel information relating to any background pixels to minimum values, where pixel information at least includes color or intensity, and where minimal values include the null value.

46. The system of claim 44, wherein the encoding algorithm further uses any of the tracking data associated with any of the sub-frames within a stream to at least alter the encoding of any one of, or any combination of the segment types of (i) foreground pixels;
(ii) background pixels; or (iii) moving background pixels.

47. The system of claim 44, wherein prior to encoding any given sub-frame the encoder performs a centering operation on the pixels in the given sub-frame in order to best orient the given sub-frame relative to either or both the prior or subsequent sub-frames within the sub-stream such that the overall displacement of the foreground pixels between successive sub-frames is minimized, where the encoder centers information associated with the given sub-frame sufficient for reversing the centering operation upon decoding, and where the centered information is encoded along with the sub-frame.

48. The system of claim 47, wherein the encoder uses any of the tracking data associated with any of the event objects represented by the foreground pixels contained within the given sub-frame in order to determine the best center of the given sub-frame for use during the centering operation, where any of the tracking data includes the event object's type, identity, location, orientation, size, or color.

49. The system of claim 44, wherein prior to encoding any given sub-frame the encoder performs a rotation operation on the pixels in the given sub-frame in order to best orient the given sub-frame relative to either or both the prior or subsequent sub-frames within the sub-stream such that the overall displacement of the foreground pixels between successive sub-frames is minimized, where the encoder includes rotation information associated with the given sub-frame sufficient for reversing the rotation operation upon decoding, and where the rotation information is encoded along with the sub-frame.

50. The system of claim 49, wherein the encoder uses any of the tracking data associated with any of the event objects represented by the foreground pixels contained within the given sub-frame in order to determine the best rotation angle of the given sub-frame for use during the rotation operation, where any of the tracking data includes the event object's type, identity, location, orientation, size, or color.

51. The system of claim 44, wherein prior to encoding any given sub-frame the encoder performs a zooming operation on the pixels in the given sub-frame in order to best orient the given sub-frame relative to either or both the prior or subsequent sub-frames within the sub-stream such that the overall displacement of the foreground pixels between successive sub-frames is minimized, where the encoder includes zooming information associated with the given sub-frame sufficient for reversing the zooming operation upon decoding, and where the zooming information is encoded along with the sub-frame.

52. The system of claim 51, wherein the encoder uses any of the tracking data associated with any of the event objects represented by the foreground pixels contained within the given sub-frame in order to determine the best zoom setting of the given sub-frame for use during the zooming operation, where any of the tracking data includes the event object's type, identity, location, orientation, size, or color.

53. The system of claim 44, wherein prior to encoding any given sub-frame the encoder performs a split-join operation on the pixels in the given sub-frame in order to best match the foreground pixels to like event objects within the given sub-frame relative to either or both the prior or subsequent sub-frames within the sub-stream such that the overall synchronization of event object representation between successive sub-frames is maximized, and where the split-join operation includes either or both of: (a) splitting a portion of the sub-frame away from the given sub-frame into a new sub-frame, where the split portion of the given sub-frame includes at least one foreground pixel, or (b) joining a different sub-frame into the given sub-frame such that the given sub-frame subsequently contains at least one new foreground pixel.

54. The system of claim 53, wherein the encoder uses any of the tracking data associated with any of the event objects represented by the foreground pixels contained within the given sub-frame in order to effect the split-join operation of the given sub-frame, where any of the tracking data includes the event object's type, identity, location, orientation, size, or color.

55. The system of claim 44, wherein a given sub-frame within a sub-stream comprises a total number of pixels that is different from any other given sub-frame in the same sub-stream, and where prior to encoding the encoder either expands or contracts the total number of pixels in the given sub-frame so that its total pixels better match the total pixels of any other one or more sub-frames in the same sub-stream.

56. The system of claim 44, where during the encoding of the sub-frames, the encoded representation of color and saturation is limited to a table of color codes representing a set of known possible color-saturation values corresponding to either the event object's type or identity, the system further comprising:
a color tone table of color codes for encoding the color and saturation values for at least any given foreground pixel representing either: (i) a distinct event object type, or (ii) a distinct event object, where each code is associated with a set of values expressed in a traditional method for representing color and saturation, and where the traditional methods include RGB or UV,
where for any sub-frames within the blended content the encoder is adapted to access the color tone table for at least any foreground pixel found within the sub-frame, where the encoder accesses the table using the tracking data associated with the pixel, where the associated tracking data include either the event object type or the event object identity, where the encoder represents the color and saturation of the pixel within the encoded blended content using the color code retrieved from the table as a replacement for any other traditional pixel color and saturation encoding method, and where upon decoding the encoded color code is reversible back into the color and saturation values expressed in a traditional method for use as the color and saturation values of the pixel.

57. The system of claim 56, where the event is a sporting event and the event objects are participants that include at least players or referees wearing uniforms, where uniforms include equipment, where the color and saturation values to be encoded using a color code are any of the limited set of color and saturation values known to exist on the form of the participant, and where the form of the participant includes the participant's uniform, equipment, and skin.

58. The system of claim 44, wherein the encoder performs one or more reversible transformations on any of the sub-frames to be encoded, and where the encoder includes the transformation parameters controlling the sub-frame transformation in the encoded blended content associated with the transformed sub-frame such that the transformation is then reversible upon decoding.

59. The system of claim 58, for presenting the encoded blended content to a viewer, the system further comprising:
a viewing system for receiving encoded blended content and for presenting a representation of the encoded blended content to a viewer, where the viewing system includes a decoder for decoding the encoded blended content, where the blended content includes at least one sub-stream of sub-frames, where the decoder reverses any transformations applied to any sub-frames during encoding, where the process of reversing any transformation uses transformation parameters found within the encoded blended content.

60. The system of claim 59, where for any one or more decoded background pixels either included or scrubbed within in the encoded sub-streams, the decoder performs any of: (a) replacing the decoded background pixel with a pixel from a pre-known background image of the event venue that corresponds to the portion of the event venue represented within the sub-frame, or (b) replacing the decoded background pixel with an animated pixel from an animation background image of the event venue that corresponds to the portion of the event venue represented within the sub-frame.

61. The system of claim 60, where the decoder uses any of:
(a) the encoded extraction coordinates relating the sub-frame to the original video frame, or (b) the encoded camera calibration information including any one or any combination of a camera identification code and the camera settings including the X, Y, Z camera location, pan angle setting, tilt angle setting, or zoom setting, in order to determine a background image from which the replacement background pixel is derived for replacing the decoded background pixel.

62. The system of claim 61, where the decoder retrieves the background image containing the replacement background pixel from either: (a) a database of background images, where individual background images correspond to the encoded camera calibration information, or (b) a background panoramic image from which a background image corresponding to the encoded camera calibration information is derived.

63. The system of claim 60, where the decoder uses an animated three-dimensional model of the event venue in order to derive the replacement background pixel, the system further comprising:
  a calibrated venue animation model describing the three-dimensional layout of the event venue including an animation of the event venue, where the coordinate system used in the calibrated venue animation model is relatable to the coordinate system used in the encoded camera calibration information,
  where the viewing system is adapted to access the calibrated venue animation model, where the decoder uses at least the combination of the venue animation model and the encoded camera calibration information in order to determine one or more animated pixels for replacing decoded background pixels.

64. The system of claim 59, where the decoder recreates a current background video frame onto which the decoded sub-frames are overlaid in order to create a representation of the original video frame from which the zero or more sub-frames were originally derived, where the recreated current background video frame is either a natural or animated image of the event venue, where a natural image is equivalent or substantially similar to an image captured from a system camera, and where an animated image is generated by a computer animation algorithm.

65. The system of claim 64, where the decoder retrieves the natural background image from either: (a) a database of background images corresponding to the encoded camera calibration information, or (b) a background panoramic image from which a background image corresponding to the encoded camera calibration information is derived, and where the decoder uses the retrieved natural background image as the recreated current background video frame.

66. The system of claim 64, where the decoder uses an animated three-dimensional model of the event venue in order to derive the animated background image for use as the recreated current background video frame, the system further comprising:
  a calibrated venue animation model describing the three-dimensional layout of the event venue including an animation of the event venue, where the coordinate system used in the calibrated venue animation model is relatable to the coordinate system used in the encoded camera calibration information,
  where the decoder is adapted to access the calibrated venue animation model, where the decoder process uses at least the combination of the venue animation model and the encoded camera calibration information in order to determine an animation image for use as the recreated current background video frame.

67. The system of claim 64, where the decoder replaces recreated or decoded pixels with advertisement pixels such that an advertisement is added to the visual presentation to the viewer during the decoding process, the system further comprising:
  a calibrated venue advertisement model describing the three-dimensional layout of the event venue including advertisements, where the coordinate system used in the calibrated venue advertisement model is relatable to the coordinate system used in the encoded camera calibration information, and where the advertisements are registered to the calibrated venue advertisement model such that the placement of the advertisement pixels in relation to the decoded pixels can be determined using the encoded camera calibration information,
  where the viewing system is adapted to access the calibrated venue advertisement model, where the decoder uses at least the combination of the calibrated venue advertisement model and the encoded camera calibration information in order to determine one or more advertisements to add to the visual presentation to the viewer, and where advertisements are added to the visual presentation by overlaying one or more advertisement pixels onto the current background video frame either before or after decoded foreground pixels are added to the current background video frame.

68. The system of claim 67, where the advertisements contained within the calibrated venue advertisement model are either fixed or floating, where the decoder places the advertisement pixels of a fixed advertisement in relation to fixed venue locations, and where the decoder places the advertisement pixels of a floating advertisement in relation to either the current background video frame or the current location of an event object.

69. The system of claim 67, where the decoder selectively replaces recreated or decoded pixels with advertisement pixels such that an advertisement is added to the visual presentation to the viewer during the decoding process based upon a viewer profile and preferences database, the system further comprising:
  a viewer profile and preferences database comprising viewer-related information, where viewer-related information includes any of the viewer's name, age, address, relationship to the event, or other demographic information,
  where the viewing system is adapted to access the viewer profile and preferences database for retrieving information usable by the decoder for selecting advertisements from the calibrated venue advertisement model to add to the visual presentation to the viewer during the decoding process.

70. The system of claim 64, where the decoder replaces recreated or decoded pixels with graphic overlay pixels such that graphic overlay content is added to the visual presentation to the viewer during the decoding process, where graphic overlays are either fixed or floating, where the decoder places the graphic overlay pixels of a fixed overlay in relation to fixed venue locations, where the decoder places the graphic overlay pixels of a floating overlay in relation to either the current background video frame or the current location of an event object, and where graphic overlays include any one of, or any combination of: (a) changes to any one of, or any combination of the color, saturation, or intensity values of a recreated or decoded pixel, or (b) information contained within or derived from the encoded blended content, where information includes any event live-content from any of the system's multiple data sources.

71. The system of claim 70, where the decoder selectively replaces recreated or decoded pixels with graphic overlay pixels such that a graphic overlay is added to the visual presentation to the viewer during the decoding process based upon a viewer profile and preferences database, the system further comprising:
  a viewer profile and preferences database comprising viewer related information, where viewer related information includes any of the viewer's name, age, address, relationship to the event, or other demographic information, where the viewing system is adapted to access the viewer profile and preferences database for retrieving information usable by the decoder for selecting graphic overlay content from any of the decoded event live-content to add to the visual presentation to the viewer during the decoding process.

72. The system of claim 70, where tracking data are included in the encoded blended content, and where the decoder uses the decoded tracking data for any one of, or any combination of (a) using the tracking data for graphic overlay content, or (b) using the tracking data to determine at least in part the location of a floating graphic overlay.

73. The system of claim 70, where the event is a sporting event, and where scoreboard data are accepted or determined for inclusion in the encoded blended live content for use as a source of graphic overlay content during the decoding process, the system further comprising:
   a scoring interface system for accepting or determining scoreboard data, where scoreboard data include any of the official scoring information required by the type of sport being played or information that would be displayed on a scoreboard associated with the event, and where
   the scoring interface system outputs the scoreboard data as a multiple data source of event live-content,
   where the content assembly system receives and assembles any of the scoreboard data into the blended content such that scoreboard data are included in the encoded blended content received by the viewing system; and
   where the encoded blended content includes scoreboard data, and where any of the scoreboard data decoded from the encoded blended content is used as graphic overlay content.

74. The system of claim 40, wherein for each extracted sub-frame determined to represent two or more event objects, the segmenting algorithm divides the contiguous set of non-background pixels to best represent the two or more event objects, where each of the two or more divisions become distinct sub-frames replacing the original extracted sub-frame and where the associated tracking data are updated to reflect the division.

75. The system of claim 38, for analyzing the pixels within the extracted sub-frames to determine at least the video segment type of foreground pixels comprising event objects in order to generate tracking data,
   where the event activity tracking system includes a video analyzer, where the video analyzer is adapted to receive and analyze the extracted sub-frames at least including the video segment type of the foreground pixels comprising event objects in order to generate at least one datum of tracking data regarding the event objects, and where the tracking system associates with each sub-frame any of the tracking data derived from and pertaining to any of the event objects viewed within the sub-frame.

76. The system of claim 75 where the at least one datum of tracking data regarding the event objects includes any one of, or any combination of an event object's type, identity, location, orientation, size, or color.

77. The system of claim 76 wherein the tracking system creates a stream of symbolic data representative of the event objects and their activities, where geometric symbols are created to best fit selected event object shapes determined by the video analyzer, where geometric symbols at least include circles, ovals, and vectors, and where the tracking system outputs the stream of symbolic data as a multiple data source of event live-content.

78. The system of claim 75 where the video data comprise information about markings attached to event objects, where the markings are either visible or non-visible, where the extracted sub-frames retain the marking information, and where the marking information is used by the tracking system's video analyzer in order to determine at least any of the object's type, identity, location, orientation, or size.

79. The system of claim 75 for further distinguishing the segmented foreground pixels from the segmented moving background pixels within each sub-frame, the system further comprising:
   a calibrated venue model describing the three-dimensional layout of the event venue including the locations of a performance area and spectator areas, where the event activities of the participants are expected to substantially occur within the performance area, where the event activities of the spectators are expected to substantially occur within the spectator areas, and where the coordinate system used in the calibrated venue model is relatable to the coordinate system used in the dataset of current calibrated camera settings,
   where the segmenting algorithm is adapted to receive the calibrated venue model, where the segmenting algorithm additionally uses the calibrated venue model in comparison to the camera calibration information associated with each sub-frame in order to determine within each sub-frame which spatial pixel areas pertain to the performance area verses the spectator areas, and where the segmenting algorithm uses the determined spatial pixel areas in order to at least distinguish (i) foreground pixels including event objects from (ii) moving background including spectators.

80. The system of claim 1 where one or more of the cameras for recording the event are synchronized with event venue lighting, the system further comprising:
   an electronic device for receiving a power waveform used to drive event venue lighting, for converting the waveform into synchronized digital trigger signals, and for providing the digital trigger signals to the one or more cameras; and
   an external trigger included on each of the one or more cameras to be synchronized, where the external trigger receives the digital trigger signals for controlling the camera's video frame capture time, and where the camera captures video frames timed in response to the signals.

81. The system of claim 1 where the content assembly system further converts the frame rate of the received video data, and where the frame rate of any one or more of the video frame streams forming the multi-camera video data is different from the desired frame rate of any one or more of the created blended video, and where the content assembly system further alters any one of, or any combination of the total number of frames or the frame time information of the received and different video frame stream in order to create the blended video with the desired frame rate.

82. The system of claim 81, where the frame rate of the video frame stream to be altered is either an asynchronous or synchronous rate that does not match the desired frame rate of the blended video, and where the desired frame rate of the blended video is a broadcasting standard rate.

83. The system of claim 82, where the desired frame rate of the blended video is the NTSC broadcasting standard rate.

84. The system of claim 1 where the content assembly system additionally blends either natural or synthesized ambient audio data with the blended content, and where:

the live-content recording apparatus further includes one or more microphones for recording natural ambient audio data throughout the entire duration of the event, where the natural ambient audio recordings are either of the event activities or event spectators, where each of the one or more microphones outputs a distinct ambient audio stream as a multiple data source of event live-content, and where the one or more streams fonn natural ambient audio data; and the blending algorithm is adapted to receive the natural ambient audio data and perform any one of, or any combination of the following operations: (a) blending any of the natural ambient audio data with the blended content; (b) detecting audio characteristics including either the decibel or pitch levels within any natural ambient audio stream for translation into a volume and tonal map and blending the volume and tonal map with the blended content; or (c) detecting audio characteristics including either the decibel or pitch levels within any natural ambient audio stream for translation into a volume and tonal map and converting the volume and tonal map into a new synthesized ambient audio stream as a multiple data source of event live-content for blending with the blended content.

85. The system of claim 1 where the event activity measured by the tracking system about any one or more of the event objects includes any one of, or any combination of the event object's type, identity, location, orientation, size, or color.

86. The system of claim 1 where the tracking system for measuring in real-time the event activity further includes:

one or more electronic devices that are attached to one or more of the event objects to be tracked, where each electronic device is adapted to output electronic signals, where the tracking system measures in real-time the event activity, and is adapted to receive and analyze the electronic signals output from the one or more electronic devices in order to determine activity data about the associated event object to which the electronic device is attached, including either the object's location or identity for inclusion in the tracking data.

87. The system of claim 1, where the event is a sporting event, and where scoreboard data are used to affect the blending algorithm for creating blended video, the system further comprising:

a scoring interface system for accepting or determining scoreboard data, where scoreboard data include any of official scoring information required by the type of sport being played or information that would be displayed on a scoreboard associated with the event, and where the scoring interface system outputs the scoreboard data as a multiple data source of event live-content, where the content assembly system is adapted to receive scoreboard data, and where the blending algorithm for selecting which of the two or more video frame streams from the multi-camera video data to include in any of the one or more blended video streams at least in part uses any one of, or any combination of the tracking data or scoreboard data.

88. The system of claim 87 where the content assembly system additionally blends other non-live-content with the blended content, the system further comprising:

non-live-content, where the non-live-content includes any one of, or any combination of: (a) event replay content comprising one or more portions of prior-captured live-content of or relating to the event, as prior captured by any of the live-content recording apparatus, or (b) other content that was not captured by any of the live-content recording apparatus including advertising content, where advertising content includes any of video, audio, images, graphics, text or any other electronic representations of information, where the blending algorithm is adapted to receive any of the non-live-content and blend any of the non-live-content with the blended content, where the blending algorithm performs any one of, or any combination of: (a) selecting which non-live-content to insert into, or overlay onto, the blended content, or (b) selecting the time at which non-live-content is inserted into, or overlaid onto, the blended content using at least in part the tracking data or scoreboard data.

89. The system of claim 87 where at least one electronically adjustable calibrated camera is adjusted using any combination of the tracking data or scoreboard data, the system further comprising:

at least one electronically adjustable calibrated camera for recording the event, where the electronically adjustable calibrated camera is fixed and movable with respect to the event venue, where the fixed X, Y, Z location of the calibrated camera with respect to the event venue is known to the system, and where any one of, or any combination of the movable pan, tilt, or zoom settings of the calibrated camera with respect to the event venue are electronically adjustable in response to control signals; and a filming system for controlling the live-content recording apparatus, where the filming system adjusts any one of, or any combination of the movable pan, tilt, or zoom settings of the electronic adjustable calibrated camera using at least the combination of: (a) the known fixed X, Y, Z location of the calibrated camera with respect to the venue; (b) the current combination of the pan, tilt, or zoom settings of the calibrated camera with respect to the venue; and (c) any one of, or any combination of the tracking data or scoreboard data, and where the filming system further transmits one or more control signals comprising the one or more adjustments to the electronically adjustable calibrated camera during the event.

90. The system of claim 87 where the scoring interface system uses one or more electronic devices operated by a person for accepting data from, or transmitting data to, the scoring interface system, and where the electronic devices include any of wireless clickers, scorekeeping devices, scoreboard control devices, or game officiating devices including whistles that detect usage.

91. The system of claim 87, where the event is a sporting event that uses a game clock, and where timing information related to the starting or stopping of the game clock is used to affect the blending of the multi-camera video data, where:

the scoreboard data include timing information associated with the starting or stopping of the game clock, and where the scoring interface system determines the timing information; and the blending algorithm is adapted to receive scoreboard data including the timing information associated with the starting or stopping of the game clock, where the content assembly system creates one or more blended video streams from the multi-camera video data, and where the blending algorithm selects which of the two or more video frame streams from the multi-camera video data to include in any of the one or more blended video streams using at least in part the timing information associated with the starting or stopping of the game clock.

92. The system of claim 91 where the timing information related to the starting and stopping of the game clock is generated by game clock control devices, the system further comprising:
one or more game clock control devices for generating timing information indicative of the time for starting or stopping of the game clock,
where the scoring interface system accepts or determines scoreboard data, and is adapted to receive from the one or more game clock devices the timing information indicating the time to start or to stop the game clock, where the scoring interface system then provides signals directing the game clock to start or stop, respectively.

93. The system of claim 92 where the sporting event is an ice hockey game, where the game clock control device for generating the signal commanding a game clock to start is a band worn on the hand of a referee, where the band is capable of sensing the instant that a puck is released from the referee's grip, and where the band generates and transmits a signal to the scoring interface system indicating that the game clock should be started.

94. The system of claim 92 where the sporting event is a game in which a referee uses a whistle to indicate the time at which the running state of the game clock is to be changed, where the game clock control device for generating the signal commanding a change in the running state of the game clock is a whistle blown by a referee, where the whistle is capable of sensing the instant that the whistle is blown by the referee, and where the whistle generates and transmits a signal to the scoring interface system indicating that the running state of the game clock should be changed.

95. The system of claim 92 where the sporting event is a game in which the real-time event activity is indicative of the time at which the running state of the game clock should be changed, where the game clock control device for generating the signal commanding a change in the running state of the game clock is the tracking system, where the tracking system is capable of sensing the instant that the event activity indicates that the running state of the game clock should be changed, and where the tracking system generates and transmits a signal to the scoring interface system indicating that the state of the game clock should be changed.

96. The system of claim 1 further adapted to create performance descriptor tokens describing the event activities based upon tracking data, the system further comprising:
a performance measurement and analysis system for receiving and analyzing any of the tracking data, where the performance measurement and analysis system creates a stream of one or more performance descriptor tokens during the event, where the tokens encode information that describes a particular event activity or action based upon any one of, or any combination of the tracking data, and where the performance measurement and analysis system outputs the stream of performance descriptor tokens as a multiple data source of event live-content.

97. The system of claim 96 where the event is a sporting event, the system is adapted to create performance descriptor tokens describing the event activities based upon tracking data and scoreboard data and further comprises:
a scoring interface system for accepting or determining scoreboard data, where scoreboard data include any official scoring information required by the type of sport being played or information that would be displayed on a scoreboard associated with the event, and where the scoring interface system outputs the scoreboard data as a multiple data source of event live-content,
where the performance measurement and analysis system is adapted to receive and analyze any of the scoreboard data, where the performance measurement and analysis system creates one or more performance descriptor tokens, where the tokens encode information that describes a particular event activity or action based upon any one of, or any combination of the tracking data or scoreboard data.

98. The system of claim 96 further adapted to create synthesized commentary audio data describing the event activities, the system further comprising:
a translation software module for creating synthesized commentary audio data, where the translation software module receives and translates into synthesized commentary audio data of the event any one or more of the performance descriptor tokens, where the translation process creates the synthesized commentary audio data from any combination of either pre-recorded speech or text-to-speech synthesis, and the translation software module outputs the synthesized commentary audio data as a multiple data source of event live-content.

99. The system of claim 98 further adapted to create customized synthesized commentary audio data, the system further comprising:
a database of viewer profile information known to the system, where
the translation software module is adapted to receive the database of viewer profile information, where the translation process accesses the viewer profile information for one or more directives to either: (a) customize the selection of tokens for translation into synthesized commentary audio data, or (b) customize the synthesized commentary audio characteristics including the choice of synthesized voice, expression style, or level of detail used for the audio commentary.

100. The system of claim 98 where the content assembly system additionally blends either performance descriptor tokens or synthesized or live commentary audio data with the blended content, and where:
the live-content recording apparatus includes one or more microphones for recording live commentary audio data during the event, where the live commentary audio recordings are of one or more live commentators, and where each of the one or more microphones outputs a distinct live commentary audio stream as a multiple data source of event live-content, and where the one or more streams form the live commentary audio data; and
the blending algorithm is adapted to receive any one of, or any combination of the performance descriptor tokens, synthesized commentary audio data, or live commentary audio data, and perform any one of, or any combination of the following operations: (a) blending any of the performance descriptor tokens with the blended content; (b) blending any of the synthesized commentary audio data with the blended content; or (c) blending any of the live commentary audio data with the blended content.

101. The system of claim 100 where the content assembly system additionally blends live commentary video data with the blended content, and where:
the live-content recording apparatus includes one or more cameras for recording live commentary video data during the event, where the live commentary video recordings are of one or more live commentators, and where each of the one or more cameras outputs a distinct live commentary video stream as a multiple data source of event live-content, and where the one or more streams form the live commentary video data; and the blending algorithm is adapted to receive the live commentary video data and blend any of the live commentary video data with the blended content.

102. The system of claim 1, further adapted to analyze event object movement to create event performance measurements and statistics forming a stream of event metrics, the system further comprising:

a performance measurement and analysis system for receiving and analyzing any of the tracking data, where the performance measurement and analysis system creates a stream of event metrics during the event comprising one or more performance measurements or statistics, where the measurements or statistics describe characteristics of one or more event activities or actions based upon any one of, or any combination of the tracking data, and where the performance measurement and analysis system outputs the stream of event metrics as a multiple data source of event live-content.

103. The system of claim 102, where the event is a sporting event, the system adapted to analyze event object movement or scoreboard data to create event performance measurements and statistics forming a stream of event metrics and further comprising:

a scoring interface system for accepting or determining scoreboard data, where scoreboard data include any official scoring information required by the type of sport being played or information that would be displayed on a scoreboard associated with the event, and where the scoring interface system outputs the scoreboard data as a multiple data source of event live-content, where the performance measurement and analysis system is adapted to receive and analyze any of the scoreboard data, where the performance measurement and analysis system creates a stream of event metrics during the event comprising one or more performance measurements or statistics, where the measurements or statistics describe characteristics of one or more event activities or actions based upon any one of, or any combination of the tracking data or scoreboard data.

104. The system of claim 1, where all event live-content is stored in one or more databases synchronized by time, the system further comprising:

a synchronizing algorithm for receiving and synchronizing all event live-content received, captured, or created by the system, where all event live-content is: (a) associated with a common time as it is received, captured, or created, and (b) stored in one or more databases along with the associated common time.

105. The system of claim 104, where the start and stop times of performance activities are determined in order to create distinct event-segments that are synchronized with the event live-content, the system further comprising:

a performance measurement and analysis system for receiving and analyzing any of the tracking data, where the performance measurement and analysis system determines and creates a stream of one or more event segments during the event, where the event segments describe at least the start and stop times within the event of a particular event activity or action based upon any one of, or any combination of the tracking data, and where the performance measurement and analysis system outputs the stream of event segments as a multiple data source of event live-content, where the synchronizing algorithm is adapted to receive the stream of one or more event segments, where all received event-segments are synchronized with the live-content based upon the common start time and common stop time of each event segment, such that the stream of event segments forms an index into any of the event-live content.

106. The system of claim 105, where the event is a sporting event, the system adapted to analyze scoreboard data in order to create distinct event segments that are synchronized with the event live-content and further comprising:

a scoring interface system for accepting or determining scoreboard data, where scoreboard data include any official scoring information required by the type of sport being played or information that would be displayed on a scoreboard associated with the event, and where the scoring interface system outputs the scoreboard data as a multiple data source of event live-content, where the performance measurement and analysis system is adapted to receive the scoreboard data, where the performance measurement and analysis system determines and creates a stream of one or more event segments during the event, and where the event segments describe at least the start and stop times within the event of a particular event activity or action based upon any one of, or any combination of the tracking data or scoreboard data.

107. The system of claim 105, where any of the two or more system cameras capture video frames at a high frame rate, and where the additional frames are either stored in the synchronized database or discarded based upon the event-segments, where the live-content recording apparatus includes two or more cameras for recording video data throughout the entire duration of the event, where one or more of the cameras is a high-speed camera capturing video at a high-frame rate, where the high-frame rate is at least more than the normal frame rate of the blended video to be created from the multi-camera video data, and where one or more high-frame rate video streams are present within the multi-camera video data, where the content assembly and compression system receives the stream of event-segment data, and where for each high-frame rate video stream selected for blending into any of the one or more of the blended video streams the blending algorithm further determines the number of video frames to be included in the blended video streams based at least in part on the event-segment data, such that the frame rate of any of the blended video streams is selectively transformed from a normal frame rate to a higher frame rate based upon the event-segments.

108. The system of claim 105, where any of the two or more system cameras capture video frames at a high frame rate, and where the additional frames are selectively blended into the blended video based upon the event segments, where the live-content recording apparatus includes two or more cameras for recording video data throughout the entire duration of the event, where one or more of the cameras is a high-speed camera capturing video at a high-frame rate, where the high-frame rate is at least more than the normal frame rate of the blended video to be created from the multi-camera video data, and where one or more high-frame rate video streams are present within the multi-camera video data, where the content assembly and compression system receives the stream of event-segment data, and where for each high-frame rate video stream selected for blending into any of the one or more of the blended video streams the blending algorithm further determines the number of video frames to be included in the blended video streams based at least in part on the event-segment data, such that the frame rate of any of the blended video streams is selectively transformed from a normal frame rate to a higher frame rate based upon the event-segments.

109. A system for processing content associated with an event, the system comprising:

at least one processor for processing detected data obtained in accordance with the event, where the detected data at least include (i) multi-camera video data as a multiple data source of event live-content, where the multi-camera video data include two or more original distinct streams of temporally sequential video frames captured from two or more cameras throughout the entire duration of the event, where the video data are either of the event or the event spectators, and (ii) real-time tracking data of the event activities as a multiple data source of event live-content, where the activities relate to one or more event objects, where event objects are either objects or one or more people associated with the event, where people are either participants in the event or spectators, and the at least one processor additionally processes a blending algorithm for assembling new blended content in real time from any of the multiple data sources of event live-content, where the new blended content at least includes one or more new streams of video frames, where each new stream is unique in its composition of video frames with respect to any and all of the original video streams, where each new stream contains at least two video frames taken from different original streams, and where the blending algorithm receives multi-camera video data and tracking data and selects each of the at least two video frames taken from different original streams at least in part using the tracking data, thereby creating a broadcast with undetectable delay to the human viewer of the on-going event.

110. A method for assembling blended content associated with an event, comprising the steps of:

recording video data with two or more cameras throughout the entire duration of the event, where the video recordings are either of the event activities or event spectators, where each of form multi-camera video data;

tracking the event in order to measure in real-time the event activity of one or more event objects throughout the entire duration of the event, where event objects are either objects or one or more people associated with the event, where people are either participants in the event or spectators;

outputting the tracking data as a multiple data source of event live-content; and assembling new blended content in real time from the multiple data sources of event live-content using a blending algorithm, where the new blended content at least includes one or more new streams of video frames, where each new stream is unique in its composition of video frames with respect to any and all of the original video streams where each new stream contains at least two video frames taken from different original streams, and where the blending algorithm receives multi-camera video data and tracking data and selects each of the at least two video frames taken from different original streams at least in part using the tracking data, thereby creating a broadcast with undetectable delay to the human viewer of the on-going event.

\* \* \* \* \*